US010303252B2

(12) United States Patent
Chaudhri et al.

(10) Patent No.: US 10,303,252 B2
(45) Date of Patent: May 28, 2019

(54) DEVICES, METHODS, AND GRAPHICAL USER INTERFACES FOR PROVIDING FEEDBACK DURING INTERACTION WITH AN INTENSITY-SENSITIVE BUTTON

(71) Applicant: Apple Inc., Cupertino, CA (US)

(72) Inventors: Imran A. Chaudhri, San Francisco, CA (US); Sebastian J. Bauer, San Francisco, CA (US); Kenneth L. Kocienda, San Jose, CA (US); Marcos Alonso Ruiz, San Francisco, CA (US); Gary I. Butcher, Los Gatos, CA (US); Camille Moussette, Los Gatos, CA (US); Jean-Pierre M. Mouilleseaux, Cupertino, CA (US); Madeleine S. Cordier, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 312 days.

(21) Appl. No.: 15/272,398

(22) Filed: Sep. 21, 2016

(65) Prior Publication Data

US 2018/0067555 A1 Mar. 8, 2018

Related U.S. Application Data

(63) Continuation of application No. 15/271,194, filed on Sep. 20, 2016, now Pat. No. 9,740,381.

(Continued)

(51) Int. Cl.
*G06F 3/048* (2013.01)
*G06F 3/01* (2006.01)
(Continued)

(52) U.S. Cl.
CPC ............ *G06F 3/016* (2013.01); *G06F 1/1626* (2013.01); *G06F 1/1671* (2013.01); *G06F 3/02* (2013.01);
(Continued)

(58) Field of Classification Search
None
See application file for complete search history.

(56) References Cited

U.S. PATENT DOCUMENTS 7,954,066 B2 5/2011 Simister et al.
8,659,571 B2 2/2014 Birnbaum et al.
(Continued)

FOREIGN PATENT DOCUMENTS

CN 101408823 A 4/2009
EP 2 134 069 A1 12/2009
(Continued)

OTHER PUBLICATIONS

Office Action, (Search Report), dated Jan. 25, 2017, received in Danish Patent Application No. 201670728, which corresponds with U.S. Appl. No. 15/271,194, 10 pages.

(Continued)

*Primary Examiner* — Justin S Lee
(74) *Attorney, Agent, or Firm* — Morgan, Lewis & Bockius LLP

(57) ABSTRACT

An electronic device has a home button that is available in a plurality of different contexts to dismiss user interfaces in response a first type of input. The device detects a first input of the first type directed to a displayed first user interface. In response, the device determines whether user interface tactile outputs are enabled. If so, the device performs a first operation and provides a corresponding first tactile output. If not, the device performs the first operation and forgoes providing at least a portion of the corresponding first tactile output. After performing the first operation, the device detects a second input of the first type on the home button. In response, the device performs a second operation that is associated with the home button and provides tactile output (Continued)

that is associated with activation of the home button, regardless of whether user interface tactile outputs are enabled.

39 Claims, 170 Drawing Sheets

Related U.S. Application Data

(60) Provisional application No. 62/384,180, filed on Sep. 6, 2016.

(51) Int. Cl.

| | | |
|---|---|---|
| *G06F 3/0484* | (2013.01) | |
| *G06F 3/0481* | (2013.01) | |
| *G06F 3/0488* | (2013.01) | |
| *G06F 3/02* | (2006.01) | |
| *G06T 13/80* | (2011.01) | |
| *G06F 1/16* | (2006.01) | |
| *G06F 3/0482* | (2013.01) | |
| *G06F 3/0485* | (2013.01) | |
| *G06F 3/16* | (2006.01) | |

(52) U.S. Cl.
CPC .......... *G06F 3/0227* (2013.01); *G06F 3/0482* (2013.01); *G06F 3/0485* (2013.01); *G06F 3/0488* (2013.01); *G06F 3/04817* (2013.01); *G06F 3/04845* (2013.01); *G06F 3/04847* (2013.01); *G06F 3/04883* (2013.01); *G06F 3/04886* (2013.01); *G06F 3/167* (2013.01); *G06T 13/80* (2013.01); *G06F 3/04842* (2013.01); *G06F 3/165* (2013.01); *G06F 2203/04105* (2013.01)

(56) References Cited

U.S. PATENT DOCUMENTS

| | | | |
|---|---|---|---|
| 8,692,736 | B1 | 4/2014 | Johnston et al. |
| 9,244,561 | B2 | 1/2016 | Rosenberg et al. |
| 9,250,660 | B2 | 2/2016 | Ballard et al. |
| 9,891,709 | B2 | 2/2018 | Heubel |
| 9,898,084 | B2 | 2/2018 | Da Costa et al. |
| 2002/0198504 | A1* | 12/2002 | Risk, Jr. .............. A61M 1/0058 604/318 |
| 2007/0139167 | A1 | 6/2007 | Gilson et al. |
| 2007/0236475 | A1 | 10/2007 | Wherry |
| 2009/0069081 | A1 | 3/2009 | Thorner |
| 2009/0167508 | A1* | 7/2009 | Fadell .................... G06F 3/016 340/407.2 |
| 2009/0224955 | A1* | 9/2009 | Bates .................... G08C 17/02 341/175 |
| 2009/0319893 | A1 | 12/2009 | Pihlaja |
| 2009/0322498 | A1* | 12/2009 | Yun ..................... G06F 3/016 340/407.2 |
| 2010/0156818 | A1 | 6/2010 | Burrough et al. |
| 2010/0231367 | A1 | 9/2010 | Cruz-Hernandez et al. |
| 2011/0018695 | A1 | 1/2011 | Bells et al. |
| 2011/0050630 | A1 | 3/2011 | Ikeda |
| 2011/0054837 | A1 | 3/2011 | Ikeda |
| 2011/0069028 | A1 | 3/2011 | Li et al. |
| 2011/0304559 | A1 | 12/2011 | Pasquero |
| 2012/0032801 | A1 | 2/2012 | Ujii et al. |
| 2012/0194466 | A1* | 8/2012 | Posamentier ......... G06F 3/016 345/174 |
| 2012/0229514 | A1 | 9/2012 | Mozafari |
| 2012/0299859 | A1 | 11/2012 | Kinoshita |
| 2013/0067336 | A1 | 3/2013 | Villaron et al. |
| 2013/0082974 | A1* | 4/2013 | Kerr .................. G06F 21/6245 345/174 |
| 2013/0229427 | A1 | 9/2013 | Bhatnagar et al. |
| 2013/0234972 | A1 | 9/2013 | Bogsanyi |
| 2013/0332827 | A1* | 12/2013 | Smith ..................... G06F 3/016 715/702 |
| 2014/0089791 | A1 | 3/2014 | Ishimaru |
| 2014/0123021 | A1 | 5/2014 | Walkin et al. |
| 2014/0198068 | A1* | 7/2014 | Lee ..................... G06F 3/04886 345/173 |
| 2014/0198069 | A1* | 7/2014 | Park ..................... G06F 3/03545 345/173 |
| 2014/0230575 | A1 | 8/2014 | Picciotto et al. |
| 2015/0077364 | A1* | 3/2015 | Parthasarathy ......... G06F 3/016 345/173 |
| 2015/0096876 | A1 | 4/2015 | Mittleman et al. |
| 2015/0149964 | A1 | 5/2015 | Bernstein et al. |
| 2015/0149967 | A1 | 5/2015 | Bernstein et al. |
| 2015/0192997 | A1 | 7/2015 | Nakagawa |
| 2015/0234493 | A1 | 8/2015 | Parivar et al. |
| 2015/0253851 | A1* | 9/2015 | Oh ......................... G06F 3/016 345/179 |
| 2015/0323992 | A1* | 11/2015 | Einaudi ................ G06F 3/0412 345/173 |
| 2016/0029077 | A1 | 1/2016 | Shin et al. |
| 2016/0062530 | A1 | 3/2016 | Huppi et al. |
| 2016/0139671 | A1* | 5/2016 | Jun ........................ G06F 3/016 715/702 |
| 2016/0170471 | A1 | 6/2016 | Gu |
| 2016/0224117 | A1* | 8/2016 | Braun .................... G06F 3/016 |
| 2016/0231815 | A1 | 8/2016 | Moussette et al. |
| 2017/0041455 | A1 | 2/2017 | Hong et al. |
| 2018/0067554 | A1 | 3/2018 | Chaudhri et al. |
| 2018/0067622 | A1 | 3/2018 | Chaudhri et al. |
| 2018/0188874 | A1* | 7/2018 | Cho ......................... G01L 1/14 |
| 2018/0253717 | A1* | 9/2018 | Kim ....................... G06F 3/016 |
| 2018/0260803 | A1* | 9/2018 | Seol ....................... G06F 21/32 |

FOREIGN PATENT DOCUMENTS

| | | |
|---|---|---|
| EP | 2 194 444 A2 | 6/2010 |
| KR | 20140092134 A | 7/2014 |
| WO | WO 2011/008292 A1 | 1/2011 |
| WO | WO 2013/169299 A1 | 11/2013 |
| WO | WO 2013/169854 A2 | 11/2013 |
| WO | WO 2013/173838 A2 | 11/2013 |
| WO | WO 2014/201151 A1 | 12/2014 |
| WO | WO 2016/022205 A1 | 2/2016 |

OTHER PUBLICATIONS

Office Action (Search Report), dated Jan. 25, 2017, received in Danish Patent Application No. 201670738, which corresponds with U.S. Appl. No. 15/271,194, 9 pages.

Office Action (Search Report), dated Jan. 27, 2017, received in Danish Patent Application No. 201670739, which corresponds with U.S. Appl. No. 15/271,194, 8 pages.

Office Action, dated Feb. 3, 2017, received in Danish Patent Application No. 201670740, which corresponds with U.S. Appl. No. 15/271,194, 7 pages.

Betters, "What is Force Touch? Apple's Haptic Feedback Technology Explained", http://www.pocket-lint.com/news/133176-what-is-force-touch-apple-s-haptic-feedback-technology-explained, Mar. 11, 2015, 10 pages.

Kelly, "iPhone 7 Leak Reveals 'All New' Home Button", Forbes, http://www.forbes.com/sites/gordonkelly/2016/06/16/iphone-7-leak-no-more-home-button/#6c570a9e508b, Jun. 16, 2016, 5 pages.

Vanhemert, "Apple's Haptic Tech is a Glimpse at the UI of the Future", https://www.wired.com/2015/03/apples-haptic-tech-makes-way-tomorrows-touchable-uis/, Mar. 19, 2015, 5 pages.

Notice of Allowance, dated Mar. 17, 2017, received in U.S. Appl. No. 15/271,194, 10 pages.

Office Action, dated May 17, 2017, received in Danish Patent Application No. 201670738, which corresponds with U.S. Appl. No. 15/271,194, 4 pages.

Office Action, dated Jul. 17, 2017, received in Danish Patent Application No. 201670738, which corresponds with U.S. Appl. No. 15/271,194, 2 pages.

(56) References Cited

OTHER PUBLICATIONS

Office Action, dated Aug. 30, 2017, received in Danish Patent Application No. 201670739, which corresponds with U.S. Appl. No. 15/271,194, 3 pages.
Office Action, dated Mar. 2, 2017, received in Danish Patent Application No. 201670740, which corresponds with U.S. Appl. No. 15/271,194, 2 pages.
Office Action, dated Mar. 28, 2017, received in Danish Patent Application No. 201670740, which corresponds with U.S. Appl. No. 15/271,194, 2 pages.
Office Action, dated Oct. 13, 2017, received in Danish Patent Application No. 201670740, which corresponds with U.S. Appl. No. 15/271,194, 3 pages.
Office Action, dated Sep. 18, 2017, received in Australian Patent Application No. 2017218929, which corresponds with U.S. Appl. No. 15/273,464, 7 pages.
Office Action, dated Feb. 20, 2018, received in Danish Patent Application No. 201670728, which corresponds with U.S. Appl. No. 15/271,194, 3 pages.
Office Action, dated Oct. 31, 2017, received in Danish Patent Application No. 201670738, which corresponds with U.S. Appl. No. 15/271,194, 2 pages.
Patent, dated Feb. 12, 2018, received in Danish Patent Application No. 201670738, which corresponds with U.S. Appl. No. 15/271,194, 4 pages.
Office Action, dated Feb. 21, 2018, received in European Patent Application No. 17188831.6, which corresponds with U.S. Appl. No. 15/273,464, 8 pages.
International Search Report, dated Jan. 31, 2018, received in International Patent Application No. PCT/US2017/048372, which corresponds with U.S. Appl. No. 15/271,194, 19 pages.
European Search Report, dated Feb. 5, 2018, received in European Patent Application No. 17188831.6, which corresponds with U.S. Appl. No. 15/273,464, 4 pages.
Office Action, dated Apr. 10, 2018, received in Danish Patent Application No. 201670739, which corresponds with U.S. Appl. No. 15/271,194, 3 pages.
Office Action, dated May 14, 2018, received in Danish Patent Application No. 201670740, which corresponds with U.S. Appl. No. 15/271,194, 2 pages.
Notice of Allowance, dated Sep. 12, 2018, received in U.S. Appl. No. 15/272,386, 13 pages.
Notice of Allowance, dated Oct. 16, 2018, received in U.S. Appl. No. 15/273,464, 9 pages.
Office Action, dated Sep. 14, 2018, received in Australian Patent Application No. 2017218929, which corresponds with U.S. Appl. No. 15/273,464, 7 pages.
Office Action, dated Nov. 15, 2018, received in Danish Patent Application No. 201670739, which corresponds with U.S. Appl. No. 15/271,194, 3 pages.
Intention to Grant, dated Nov. 28, 2018, received in Danish Patent Application No. 201670740, which corresponds with U.S. Appl. No. 15/271,194, 2 pages.
Intention to Grant, dated Oct. 25, 2018, received in European Patent Application No. 17188831.6, which corresponds With U.S. Appl. No. 15/273,464, 5 pages.
Notice of Allowance, dated Dec. 3, 2018, received in Korean Patent Application No. 20187023491, which corresponds with U.S. Appl. No. 15/273,464, 3 pages.

\* cited by examiner

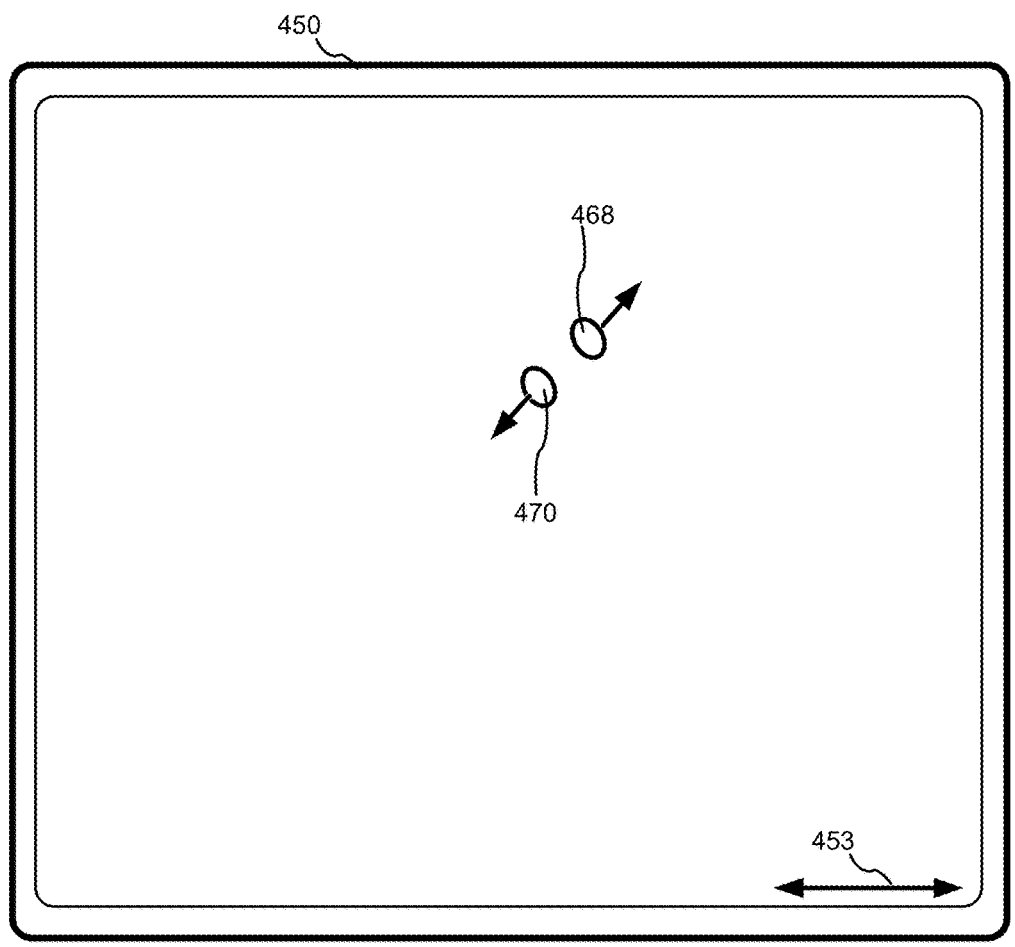
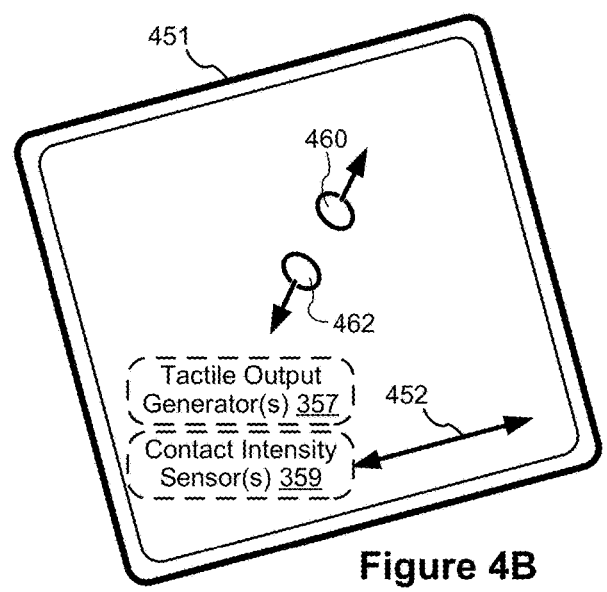
Figure 4B

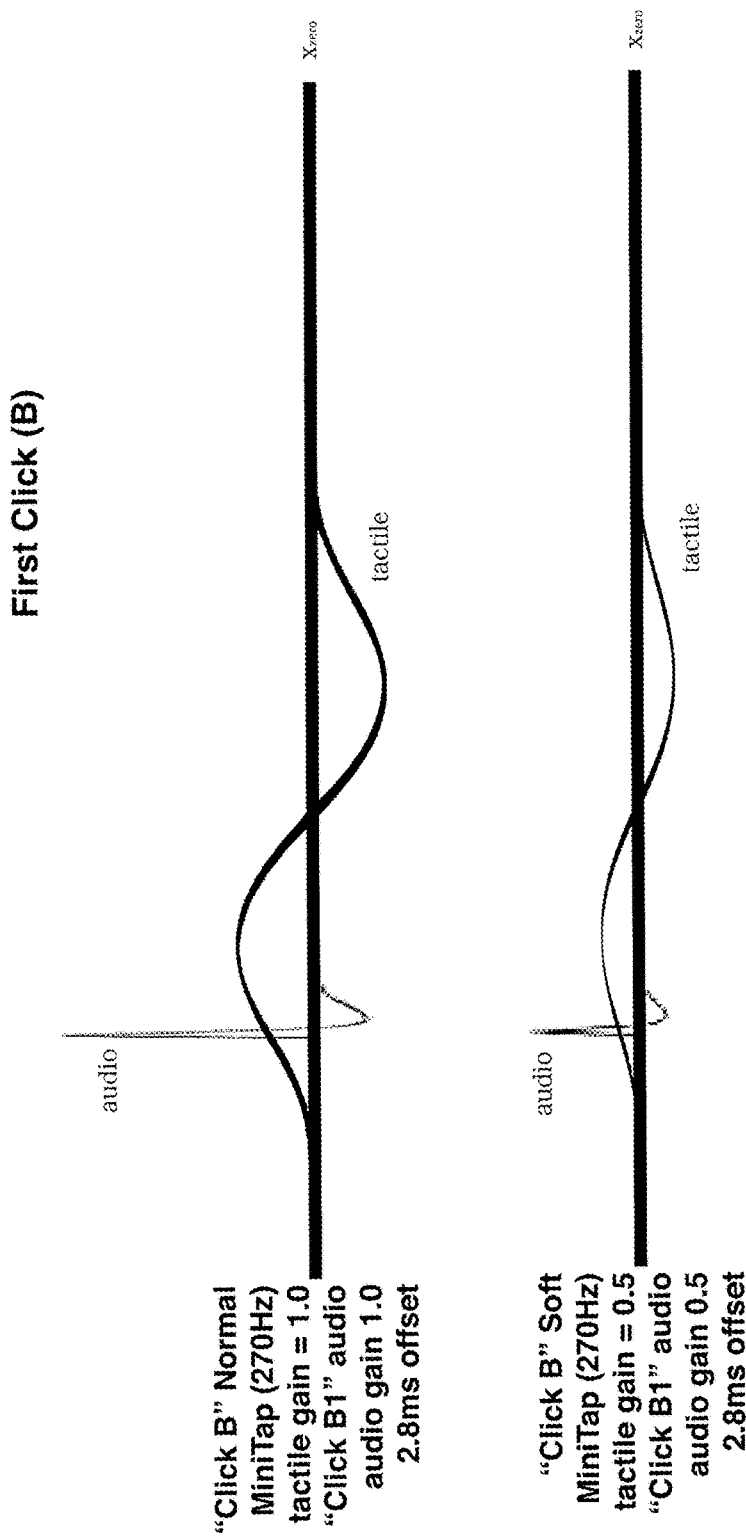

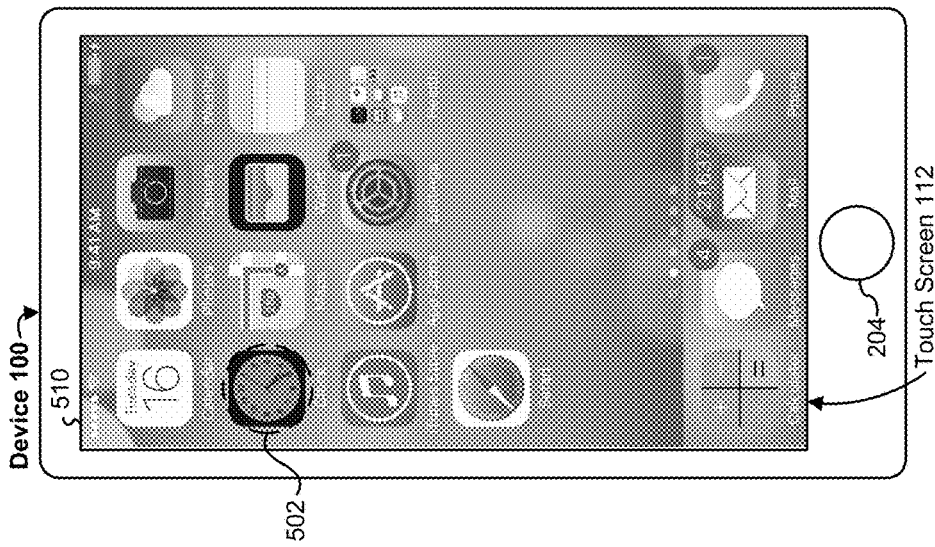
Figure 5A2
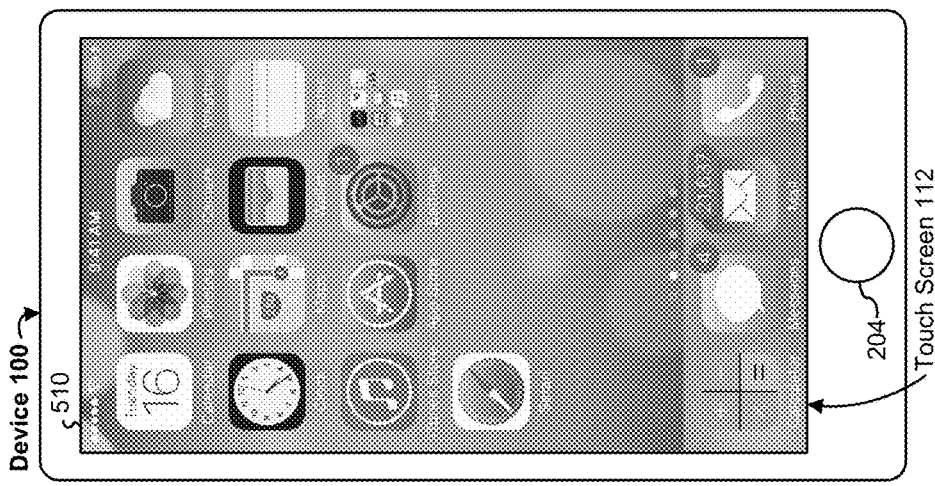
Figure 5A1

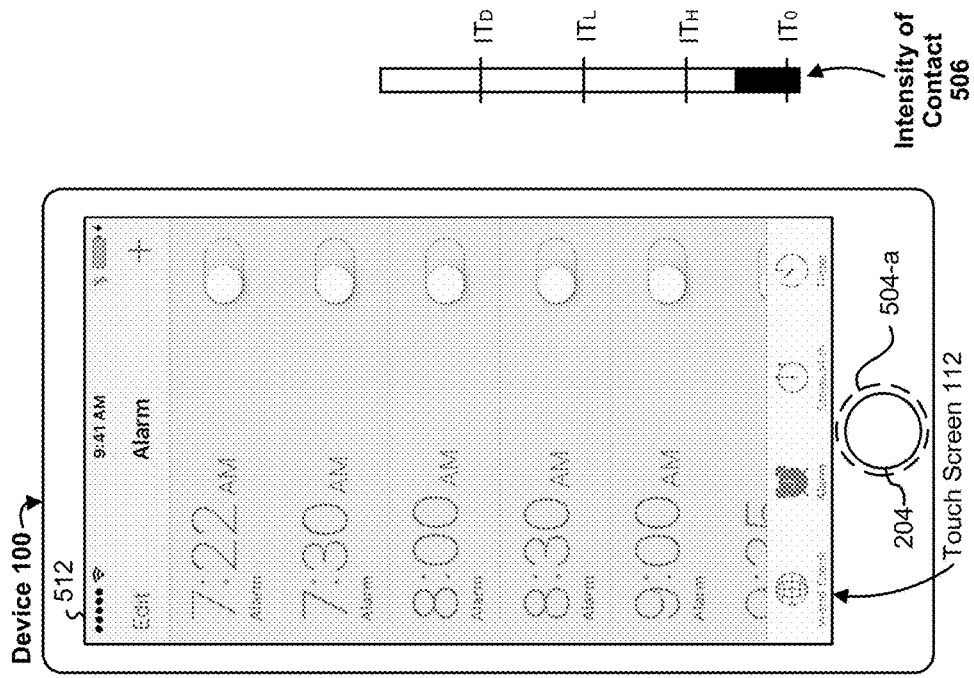
Figure 5A4
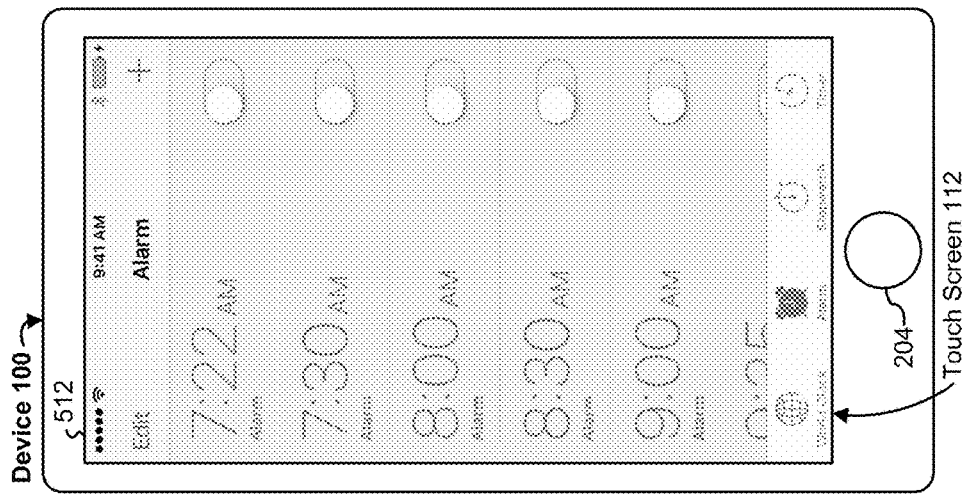
Figure 5A3

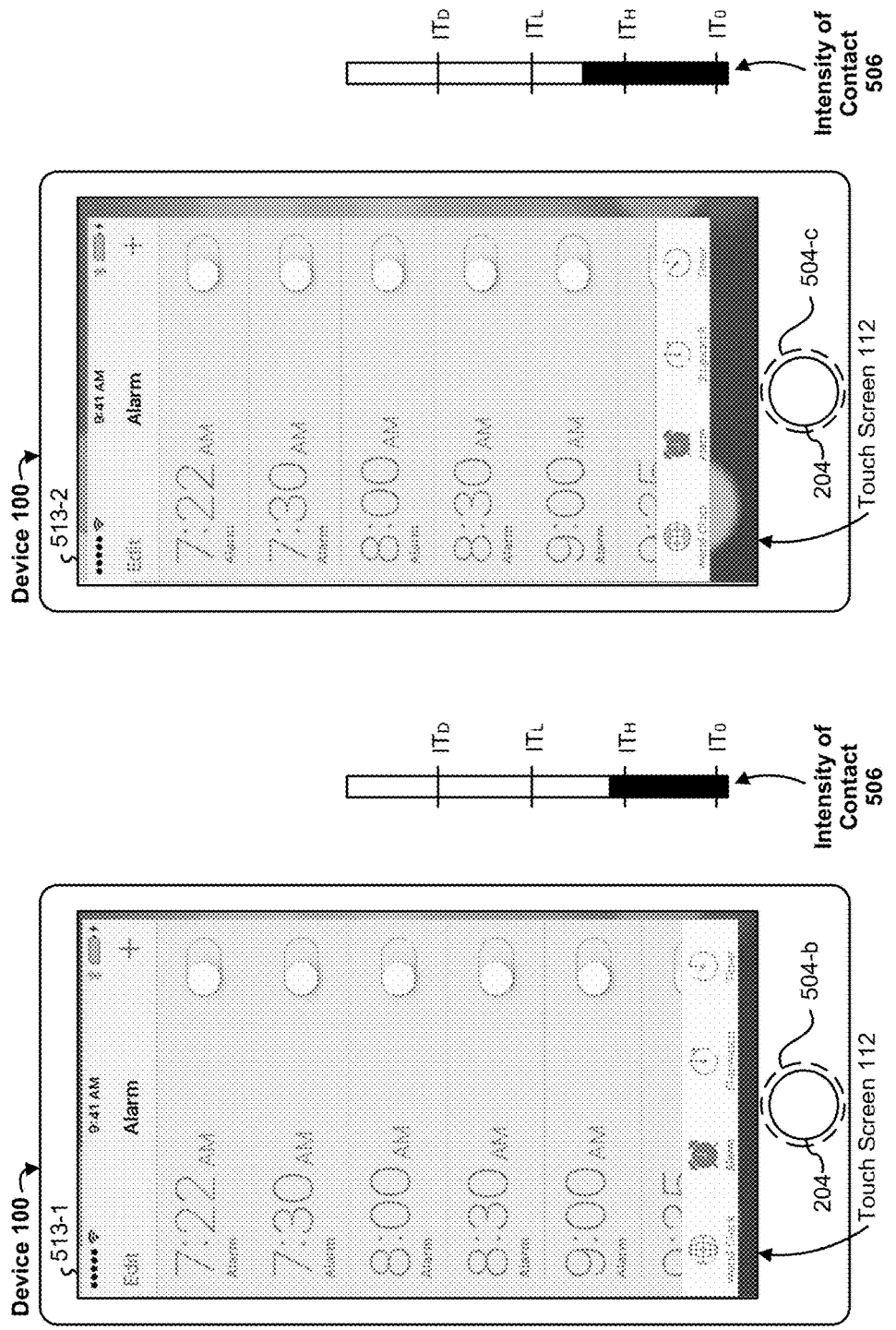

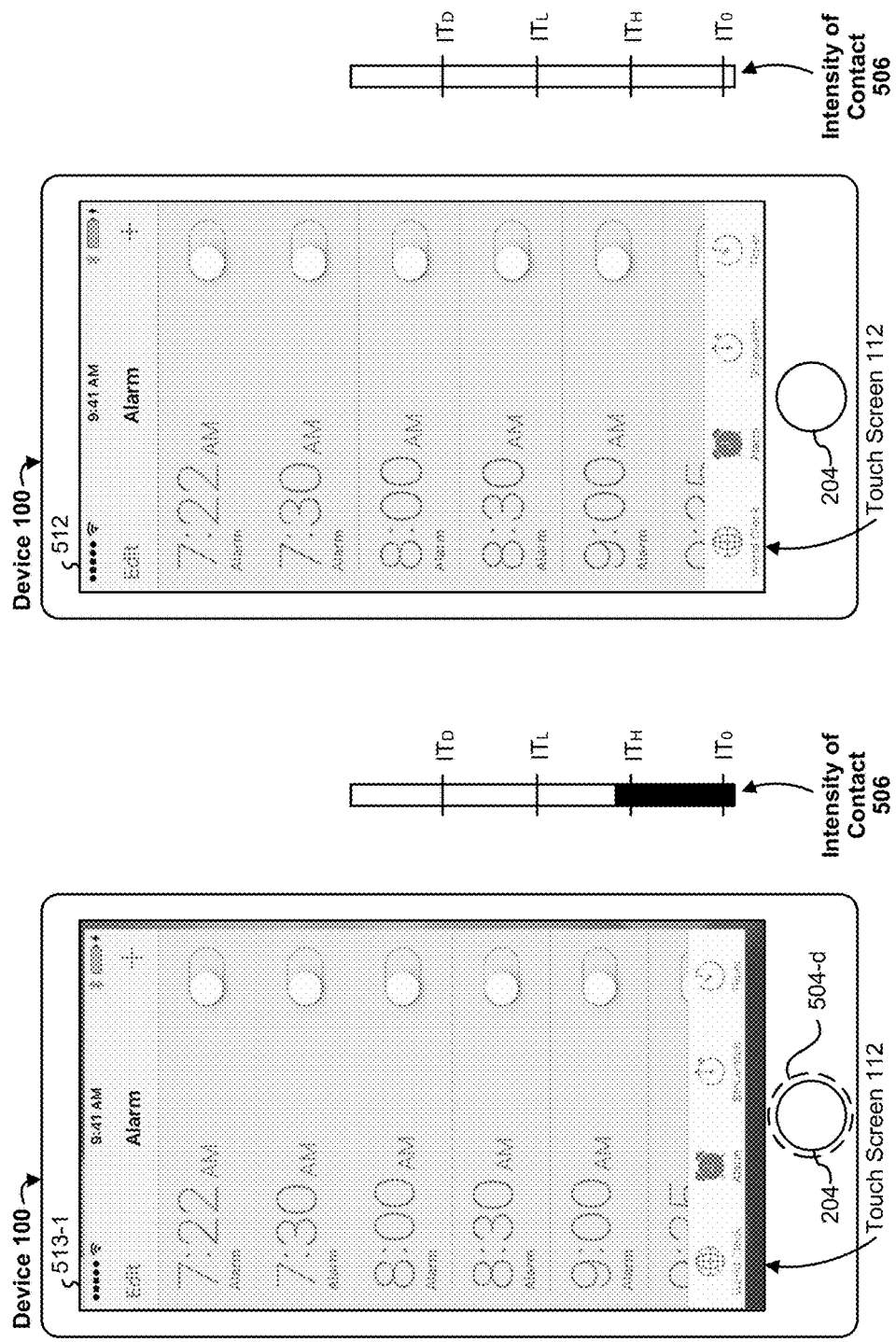
Figure 5A8
Figure 5A7

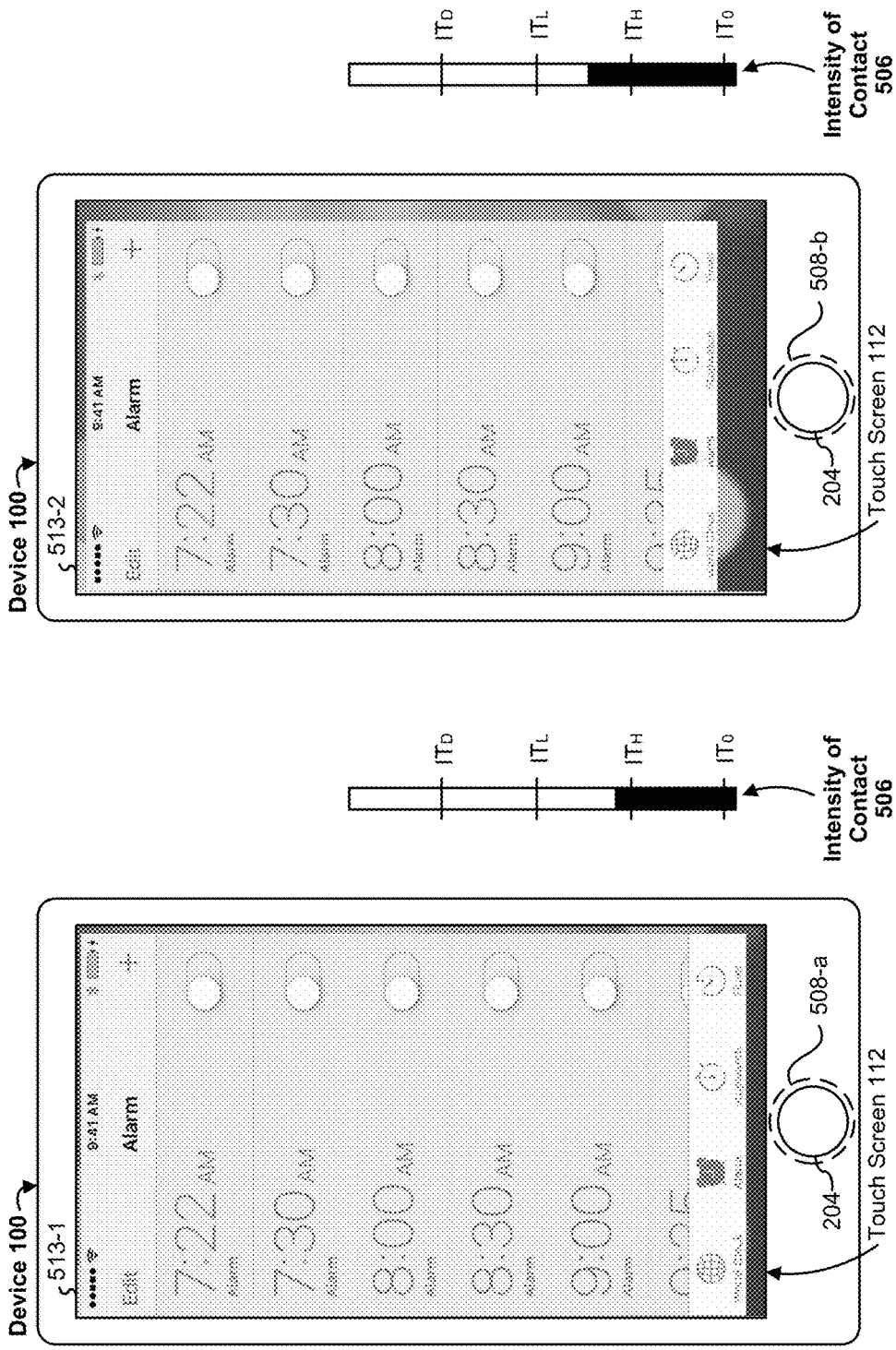

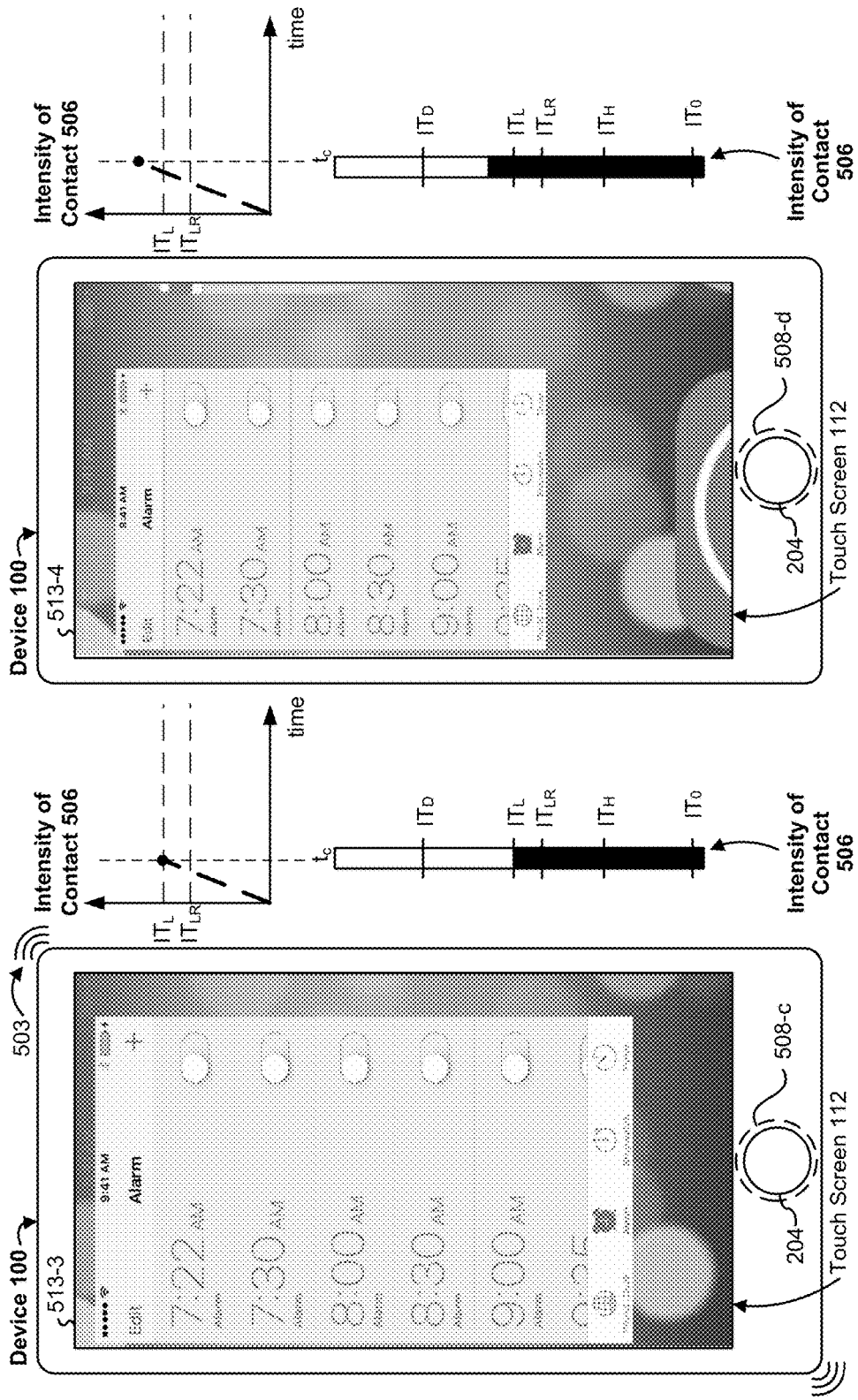

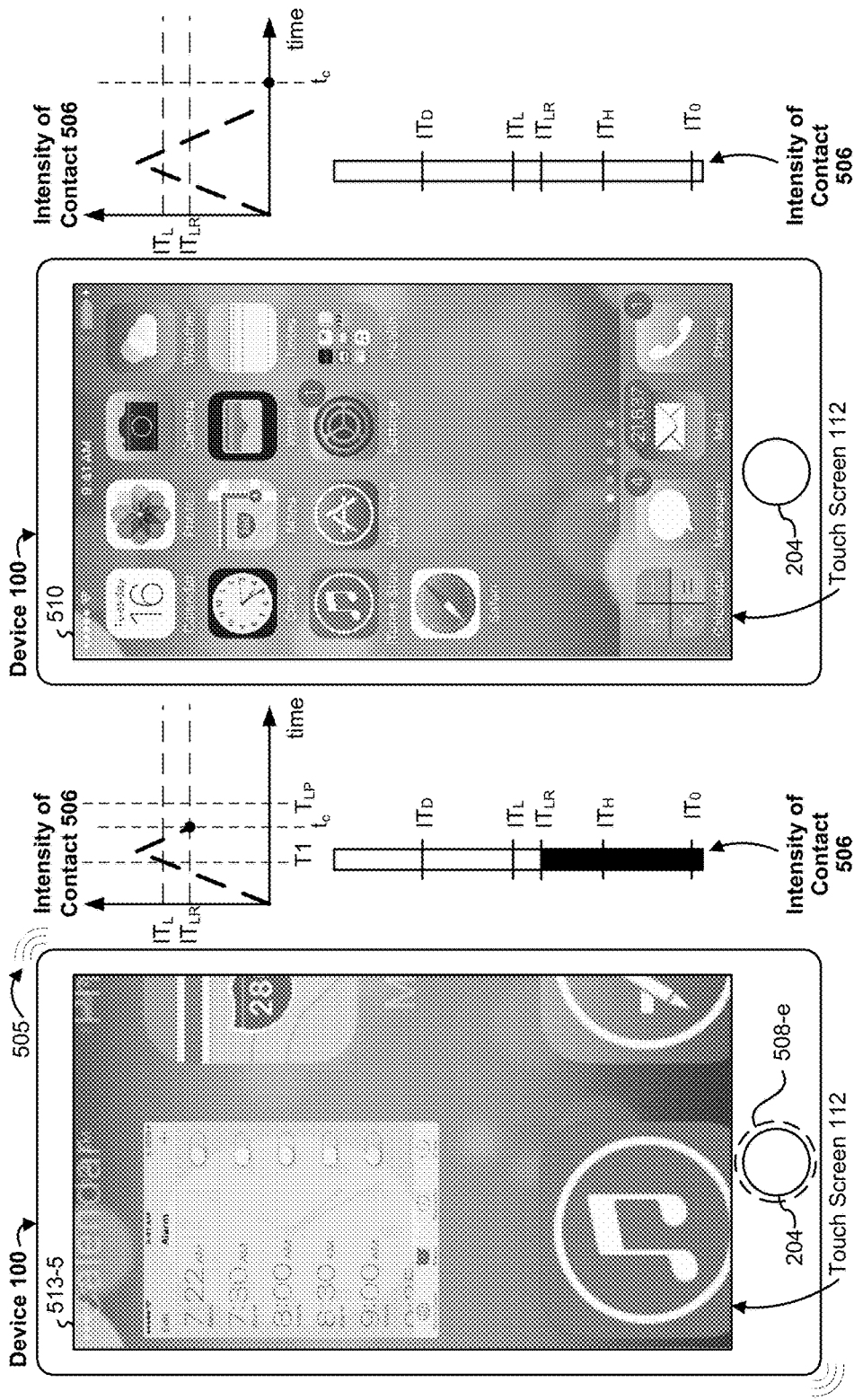

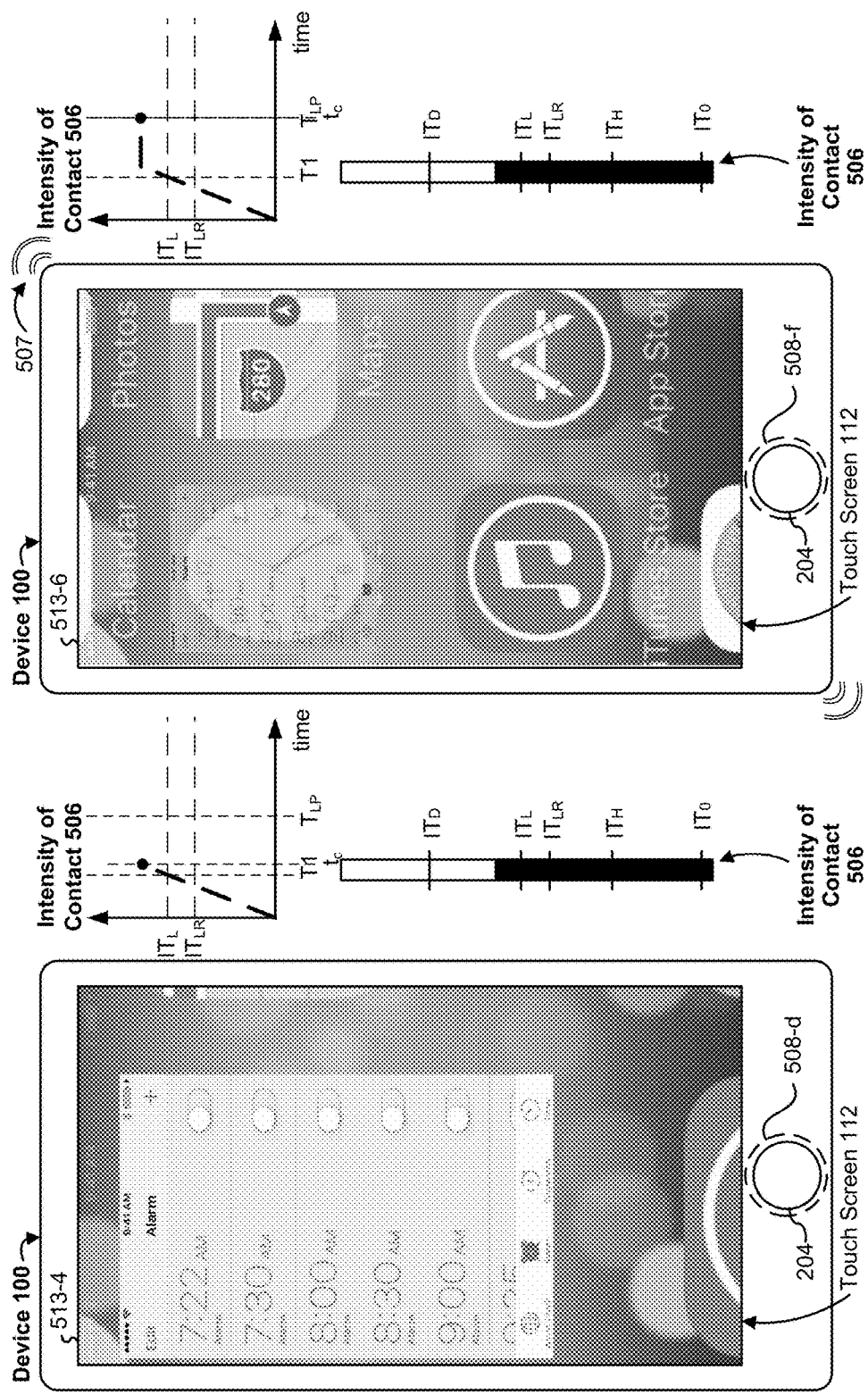

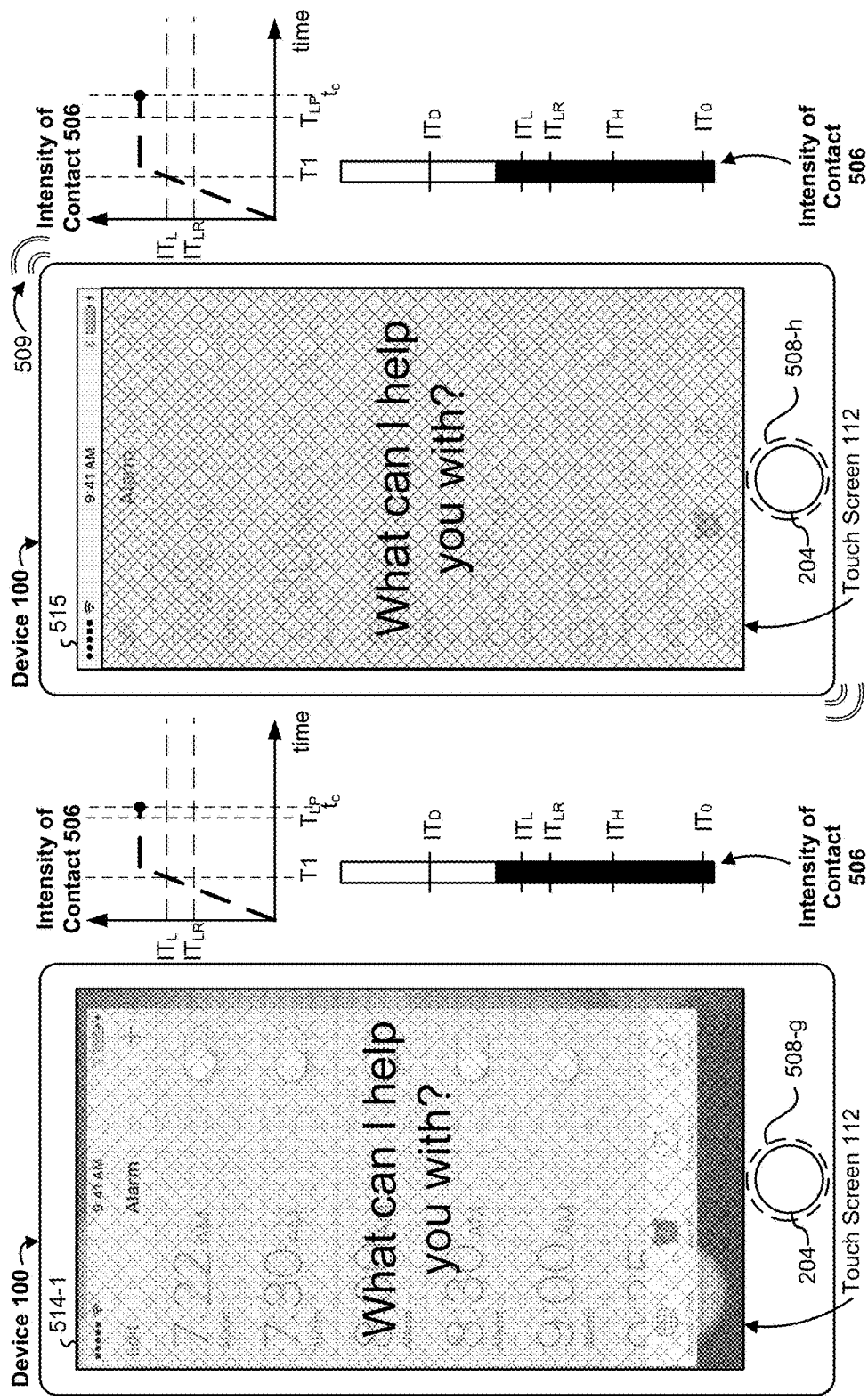

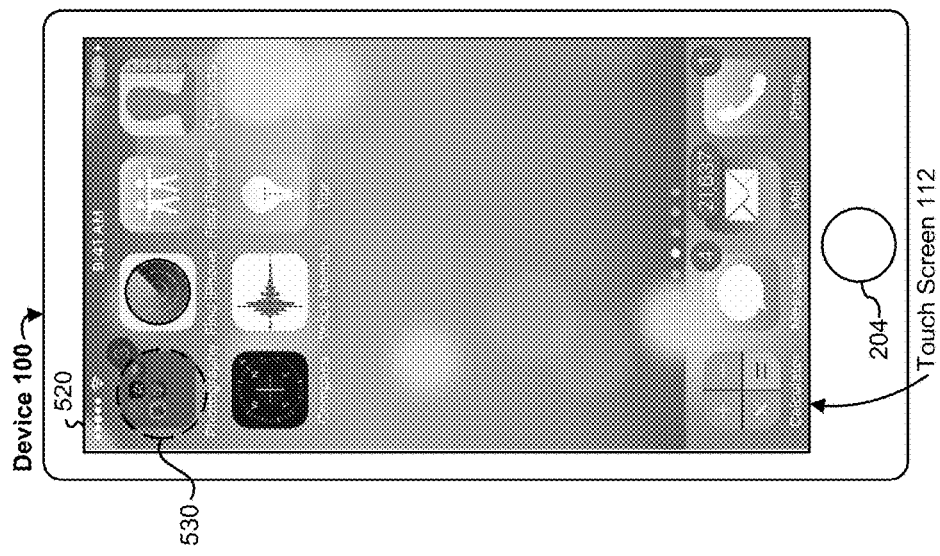
Figure 5B2
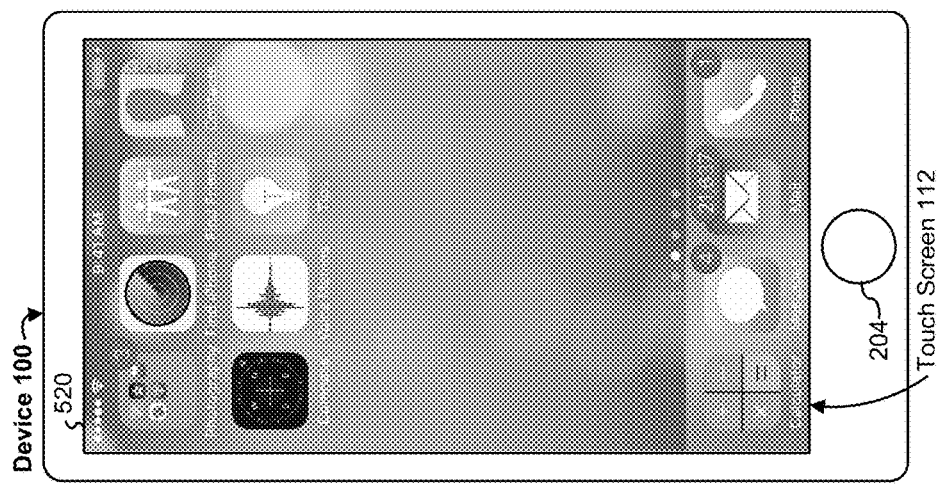
Figure 5B1

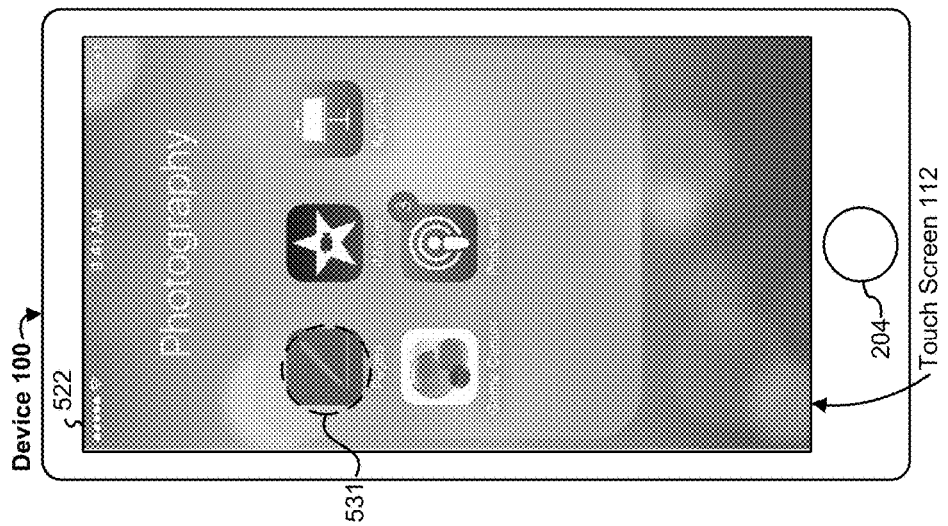
Figure 5B4
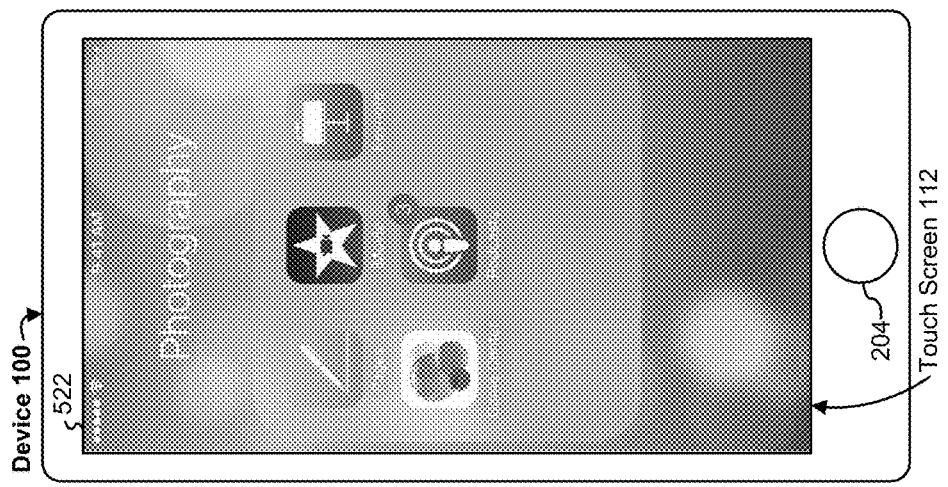
Figure 5B3

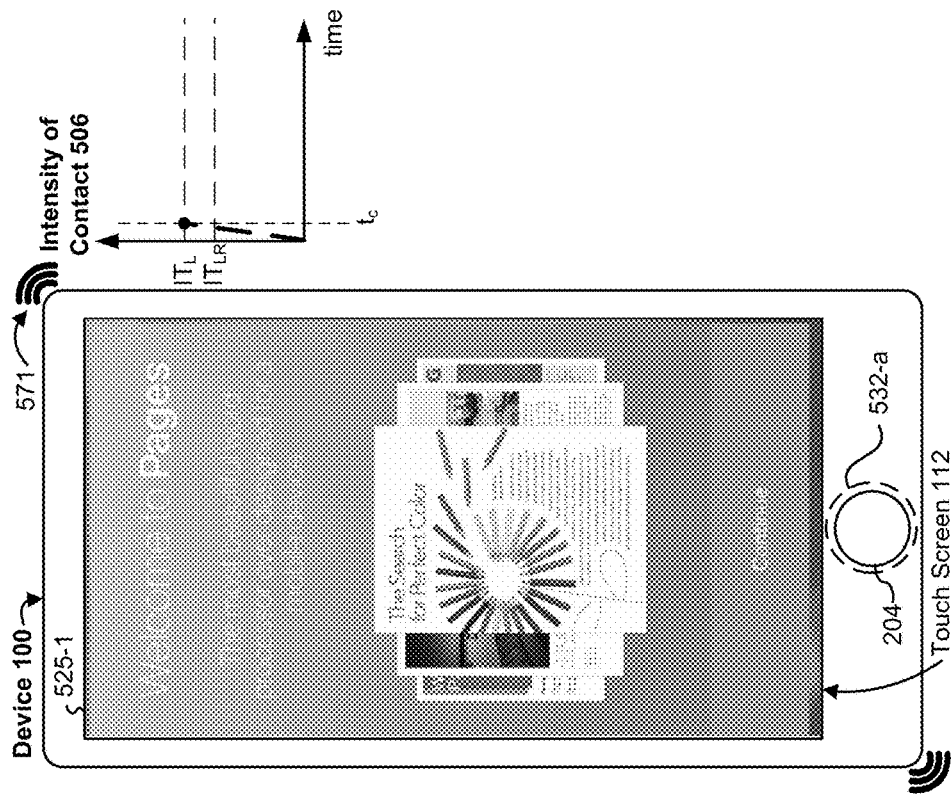
Figure 5B6
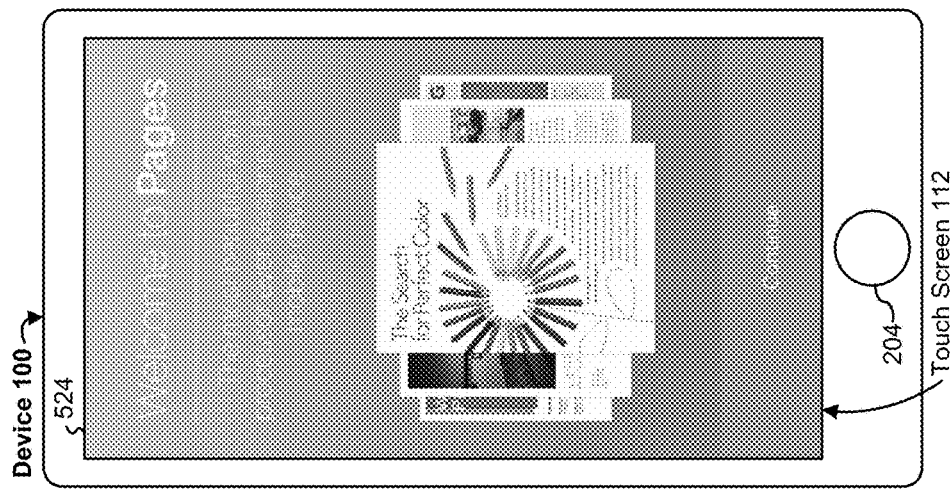
Figure 5B5

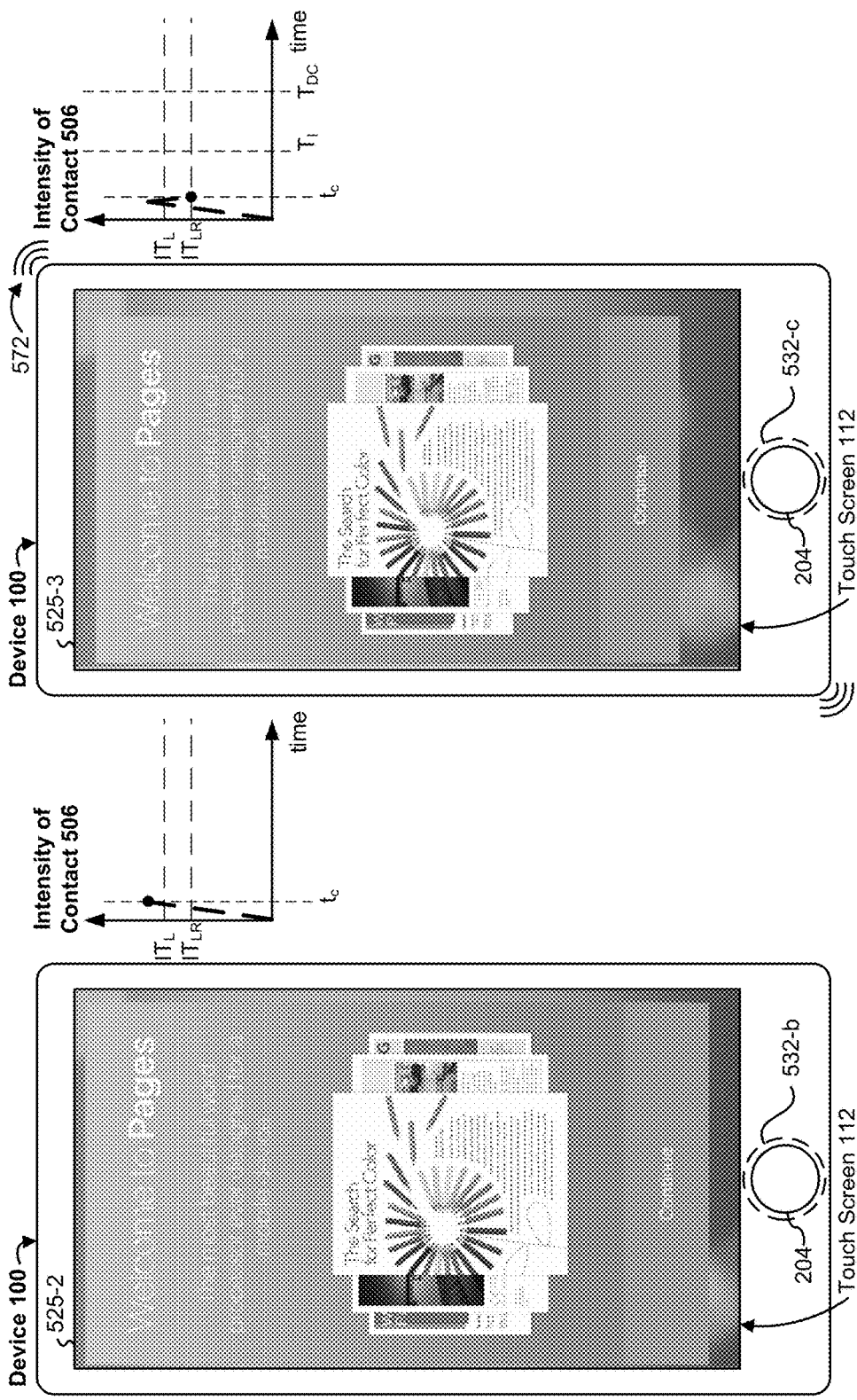

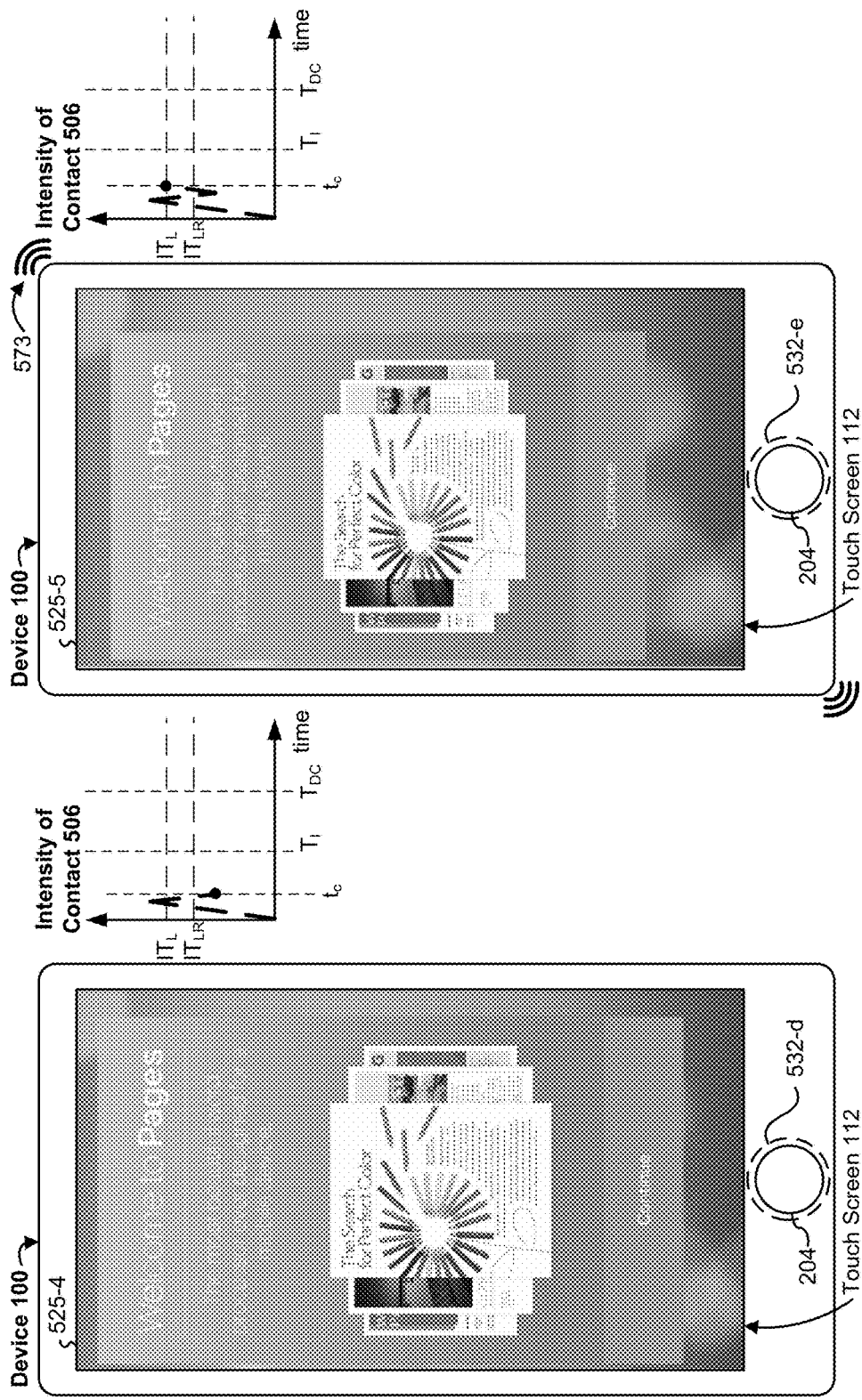

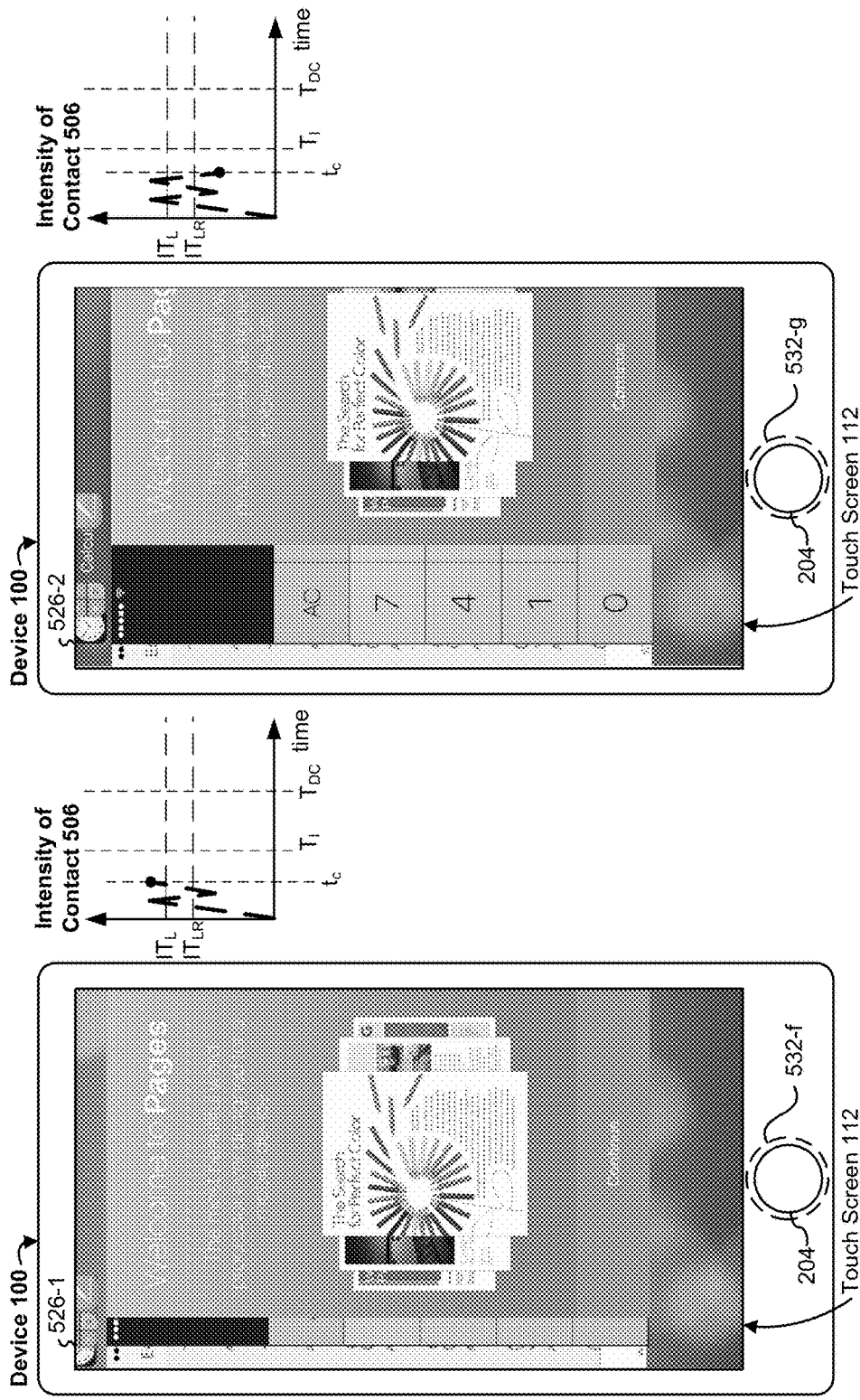

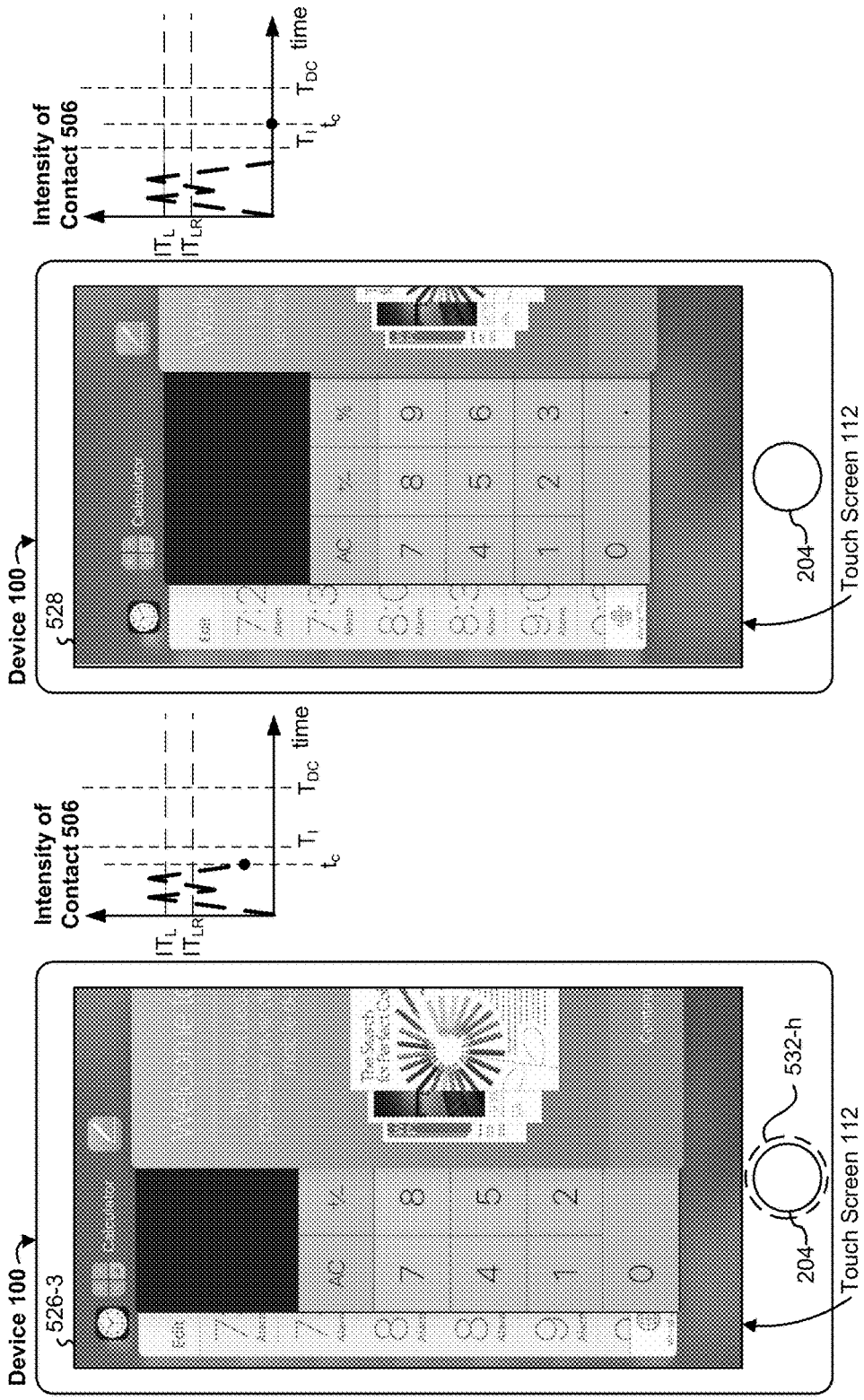

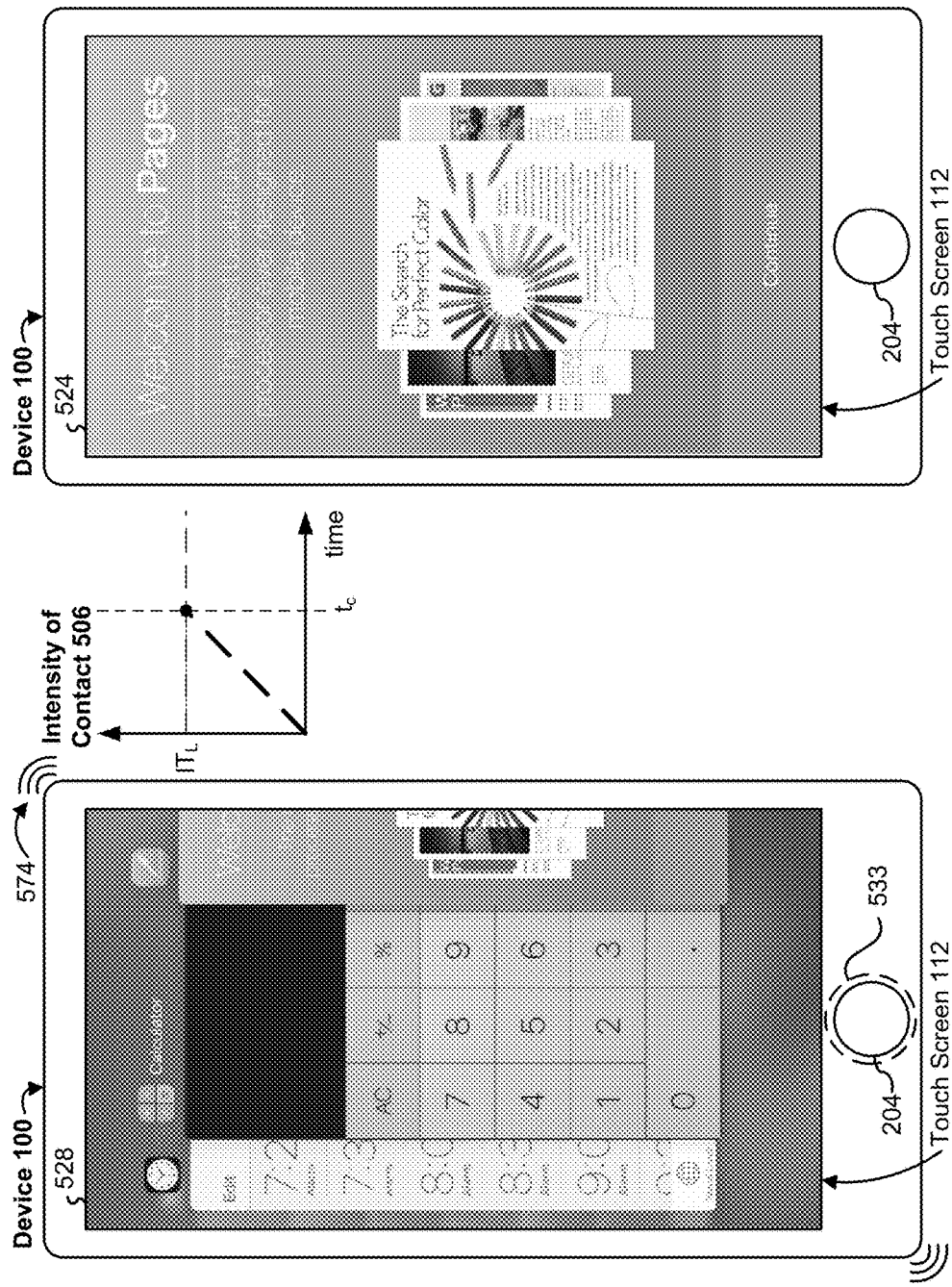

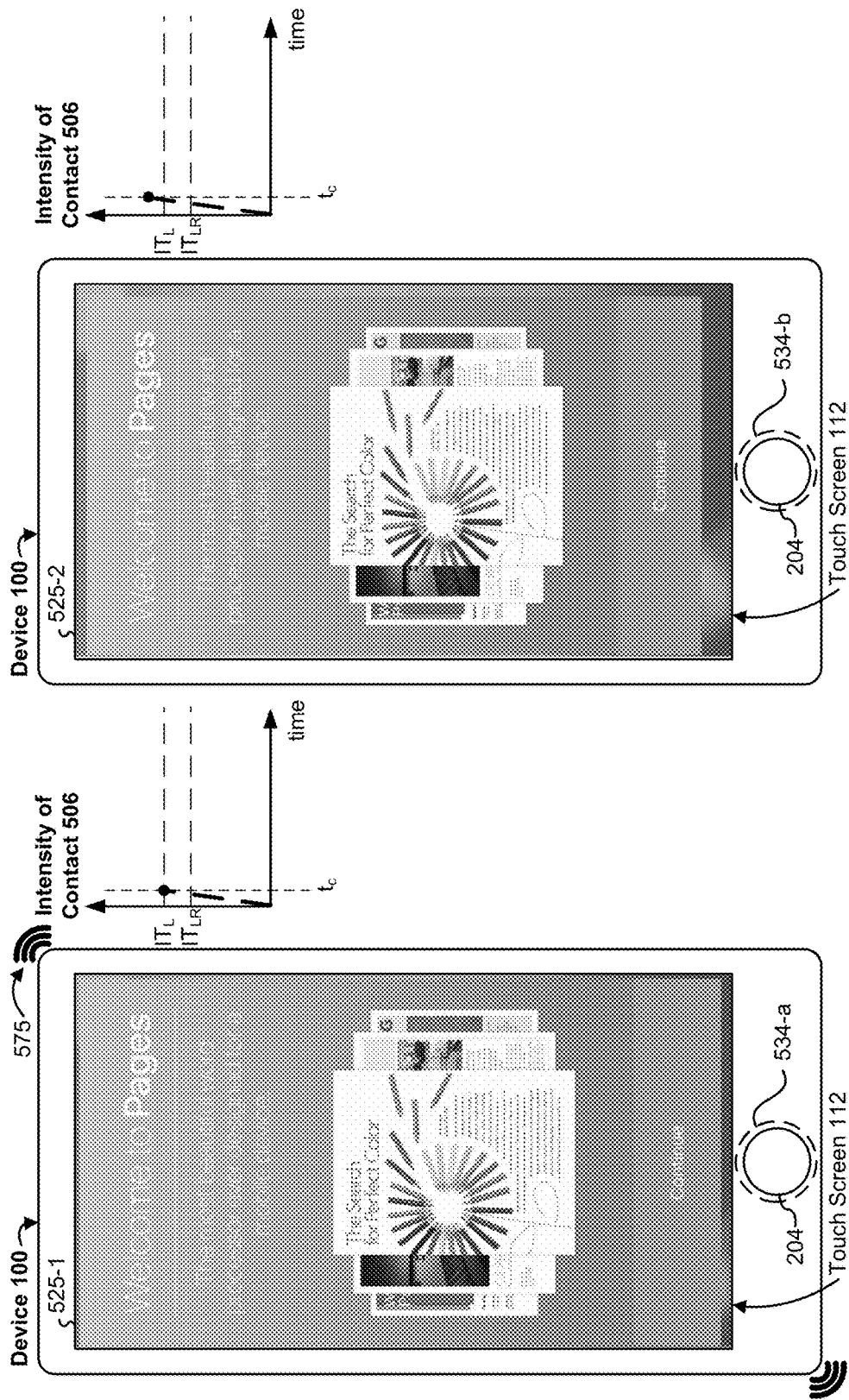

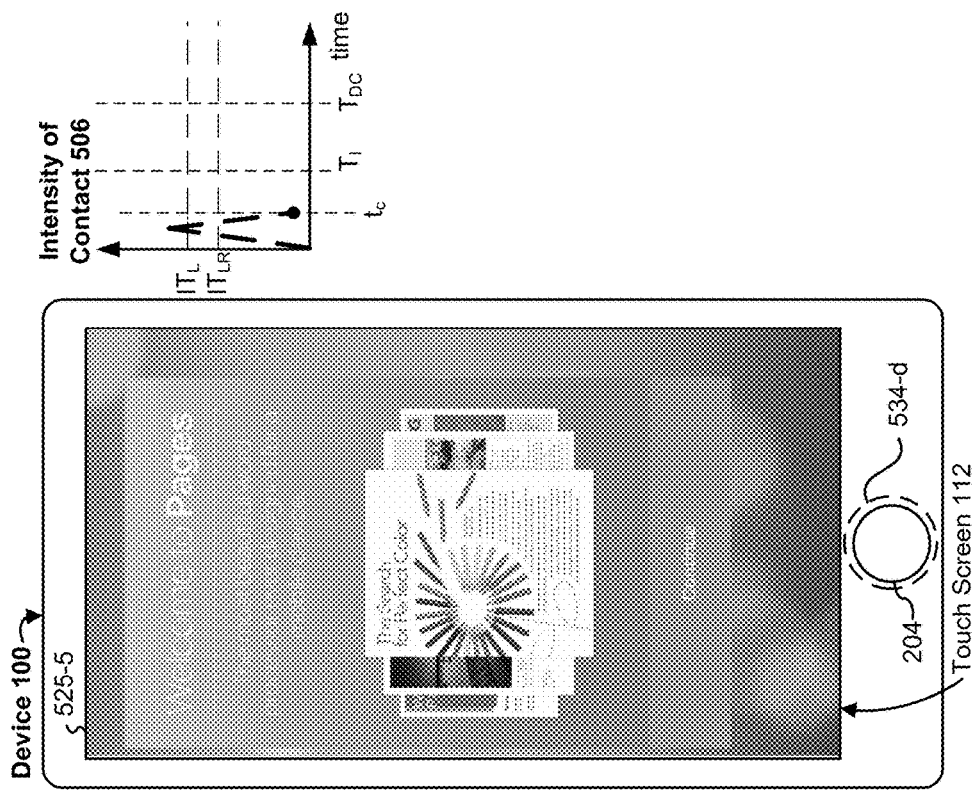
Figure 5B19
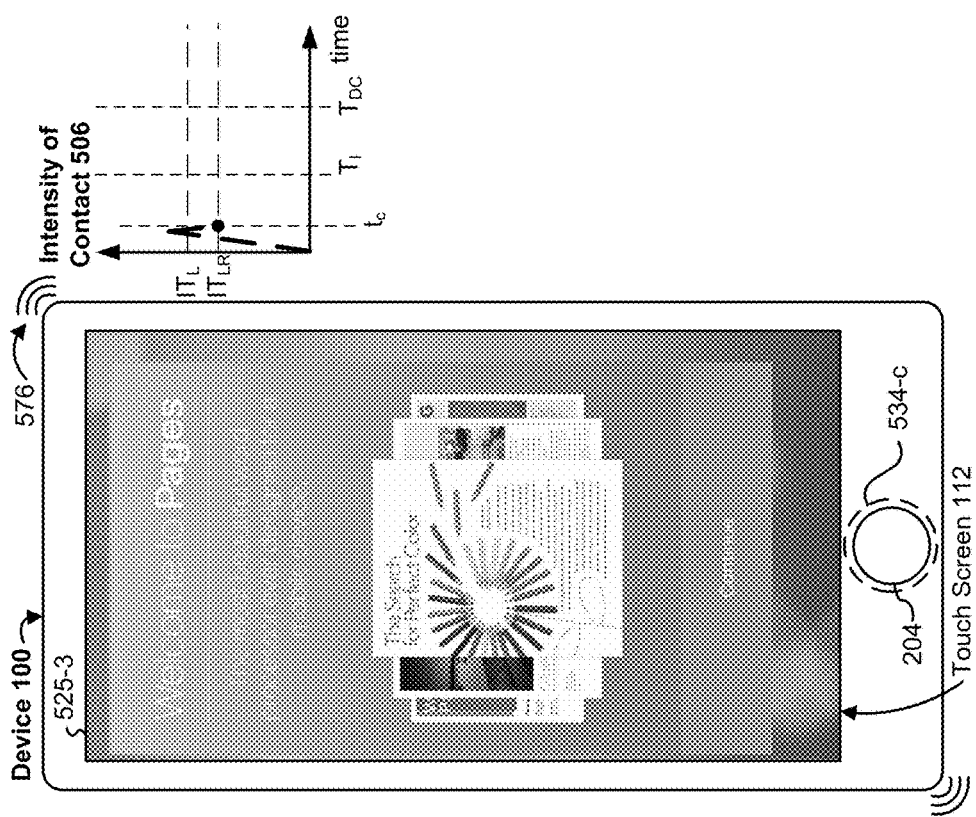
Figure 5B20

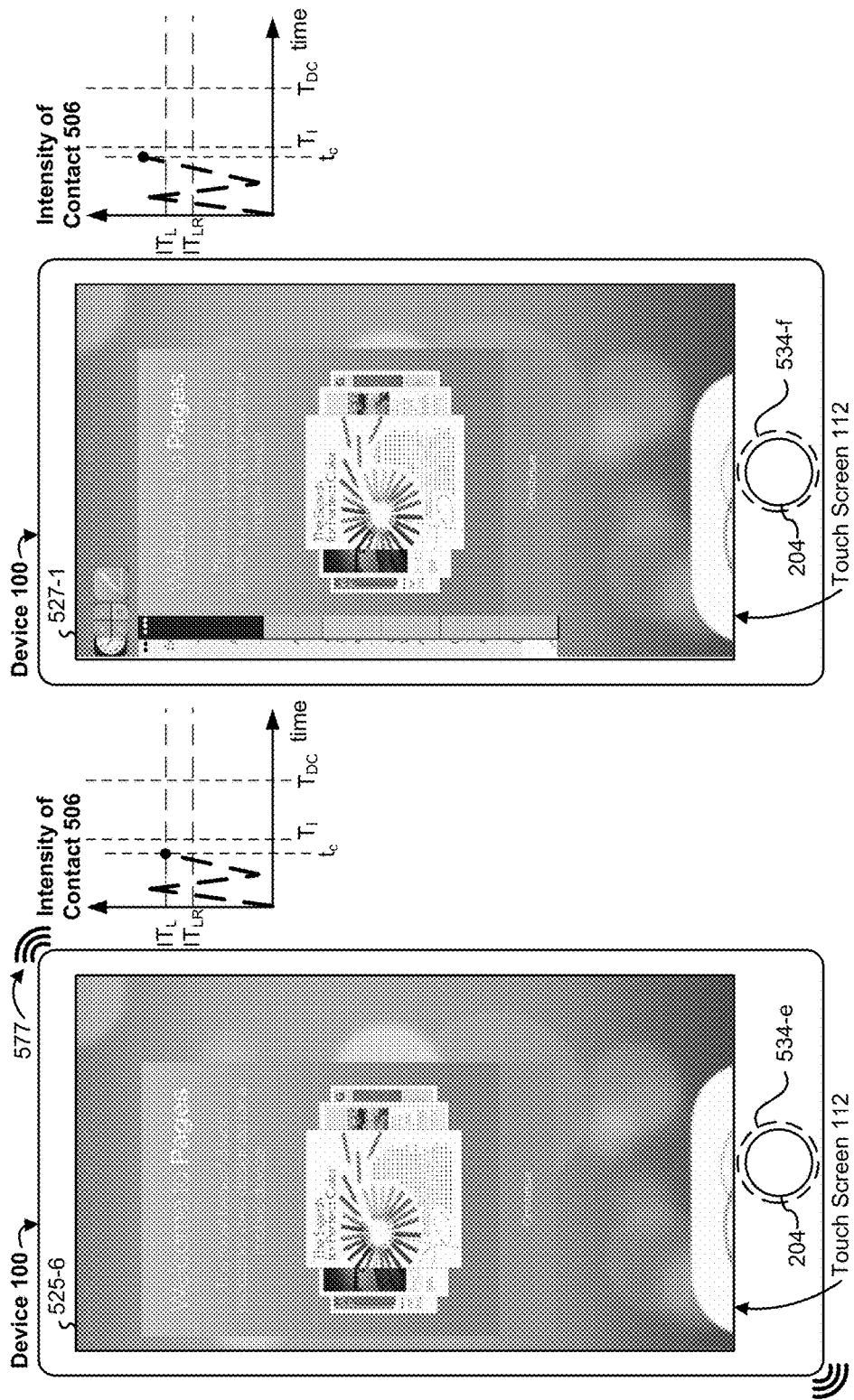

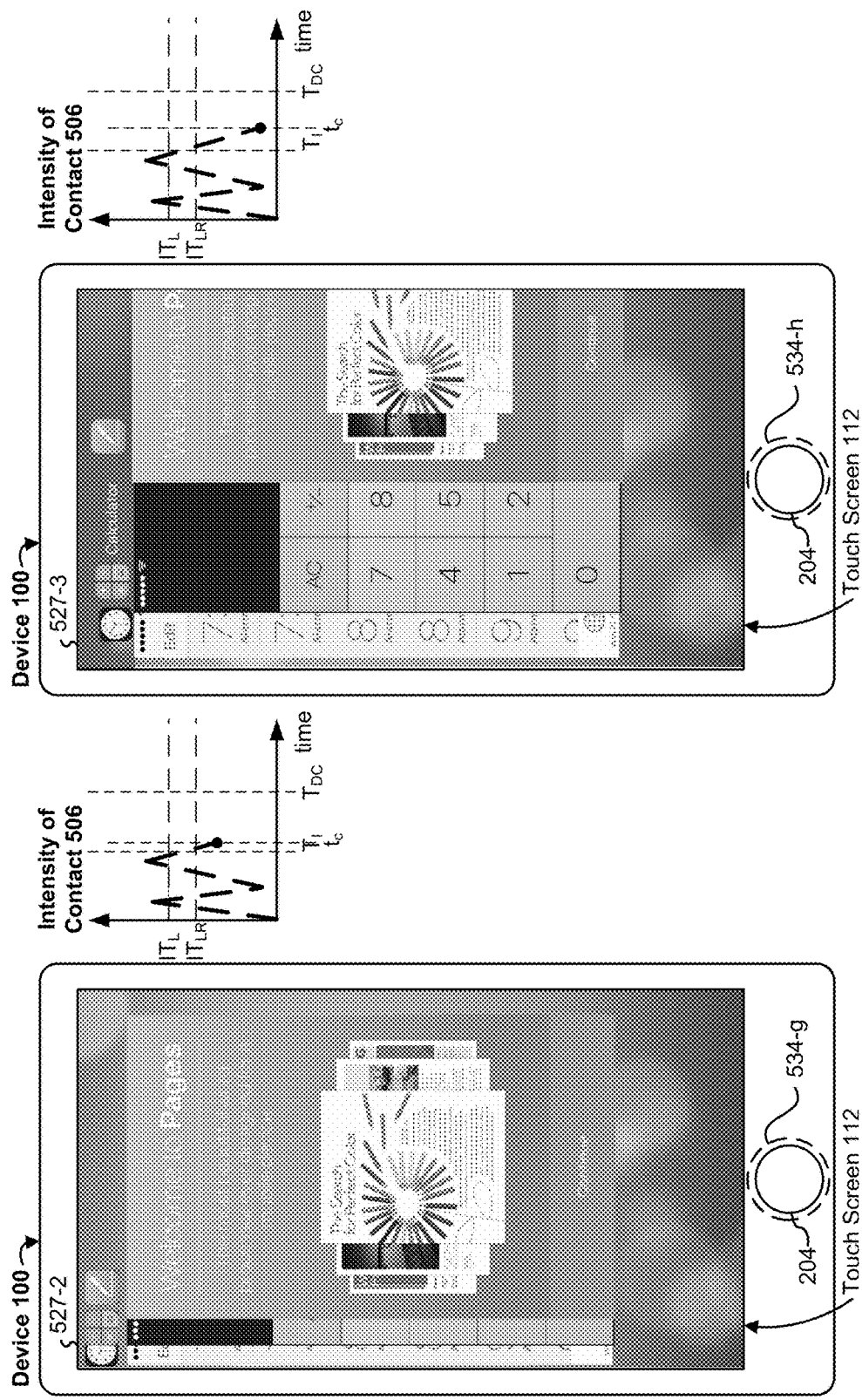

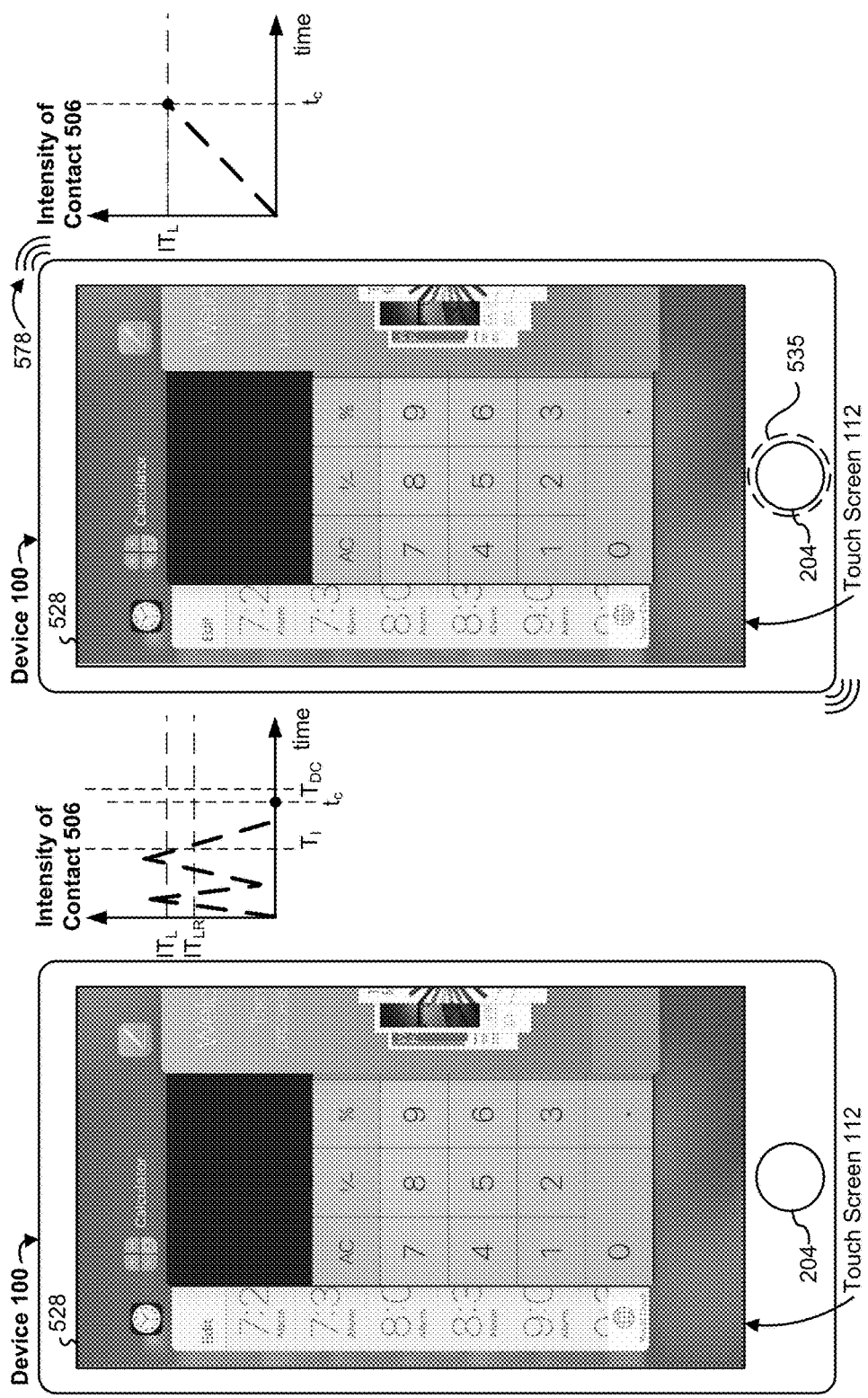

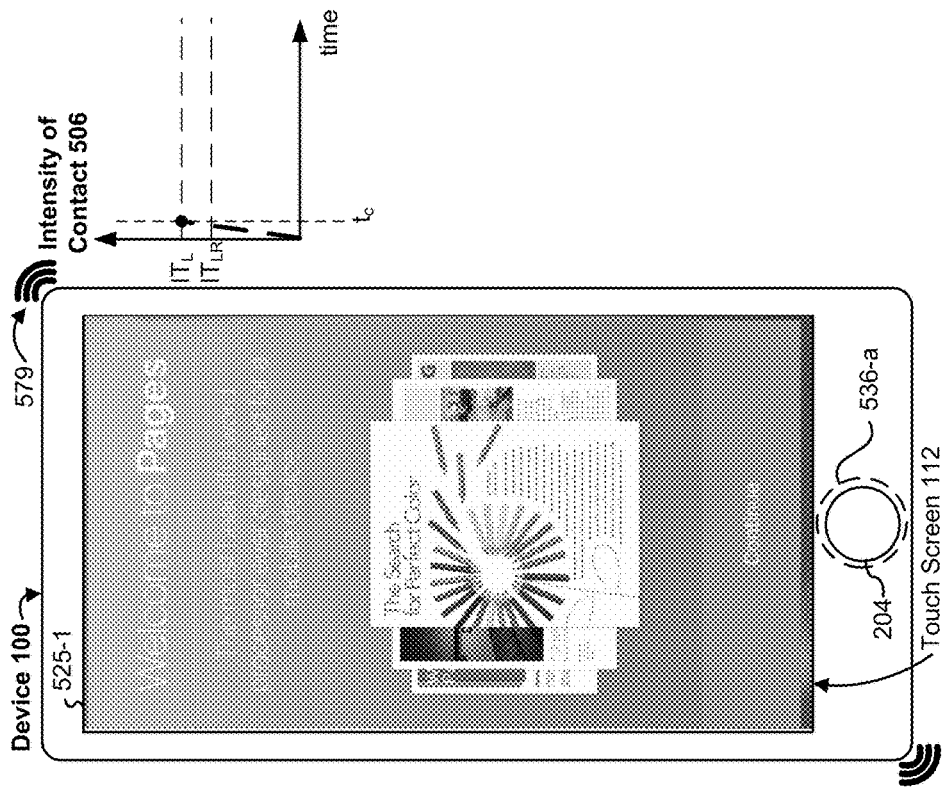
Figure 5B28
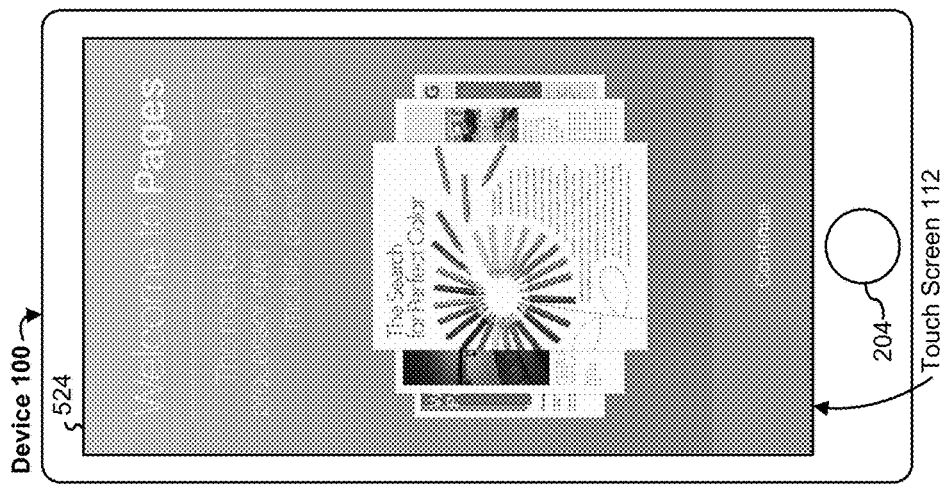
Figure 5B27 (same as 5B5)

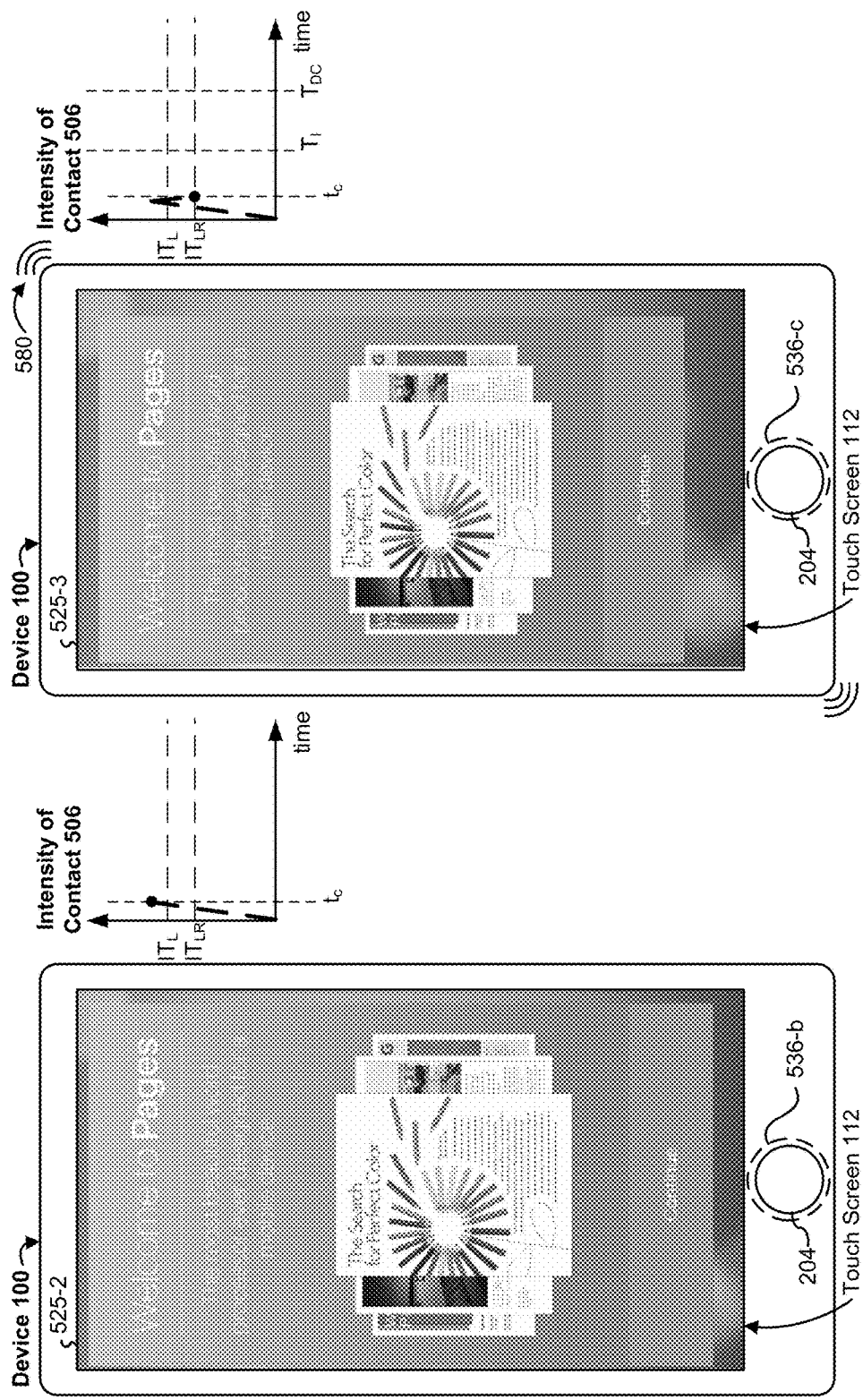

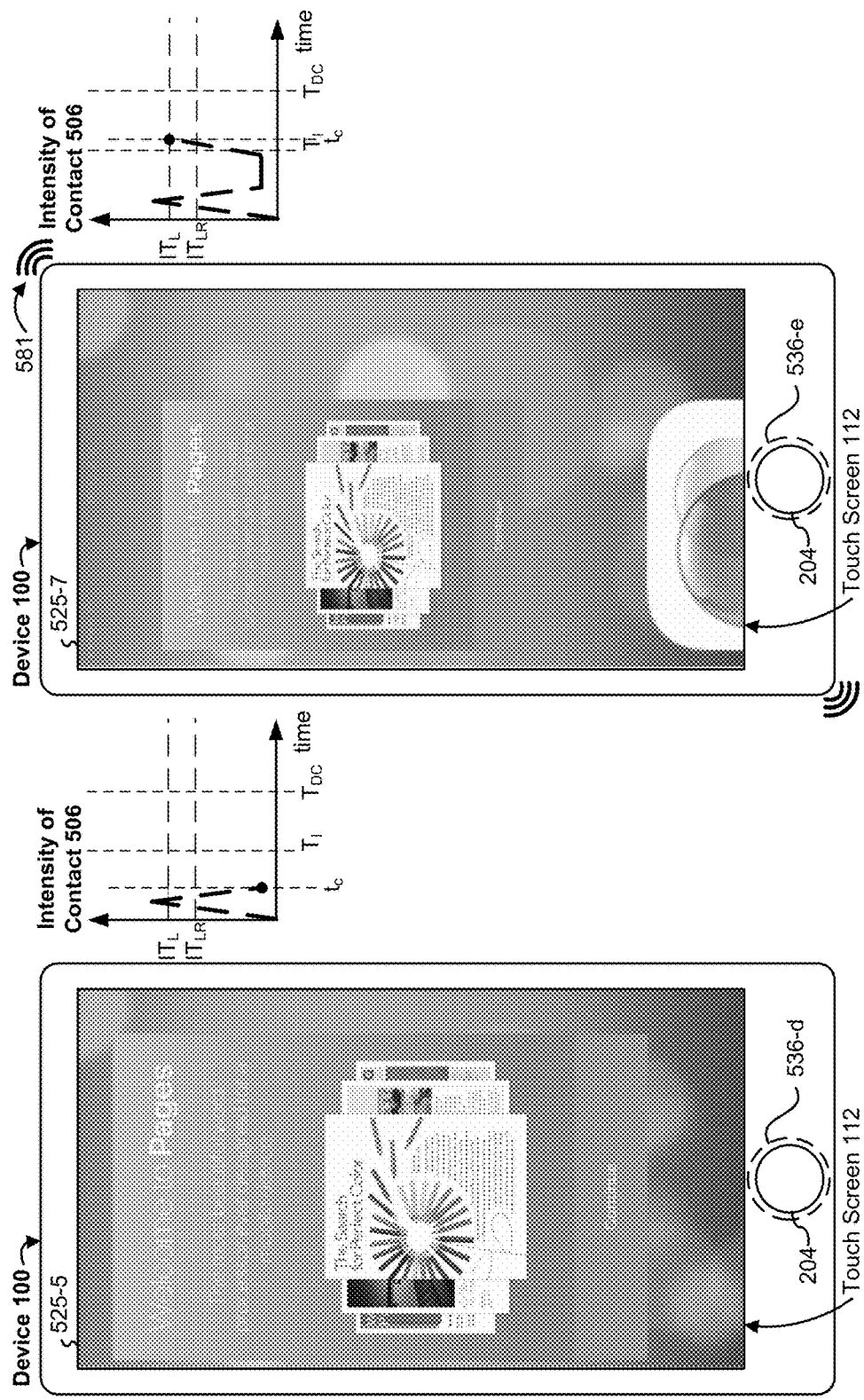

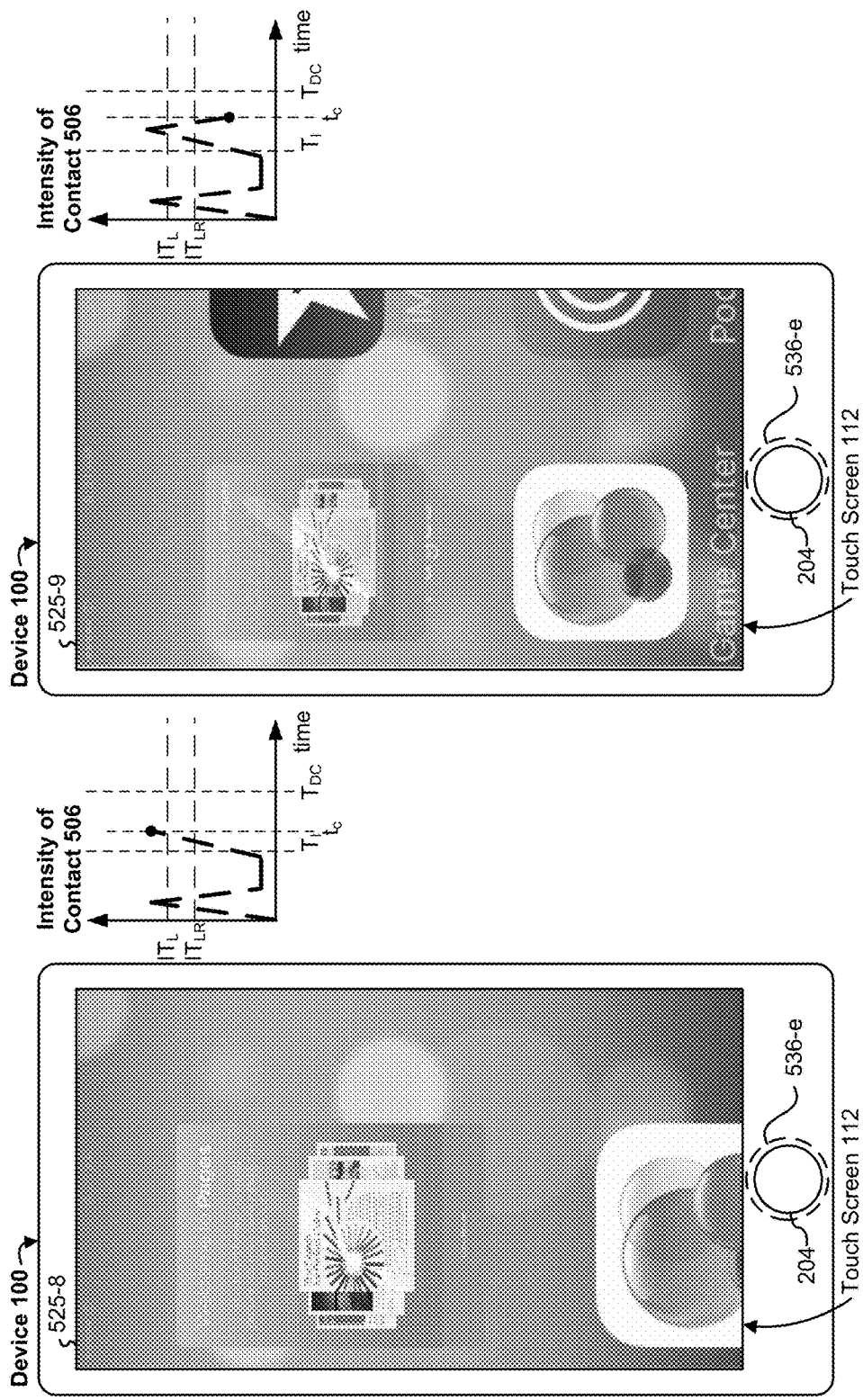

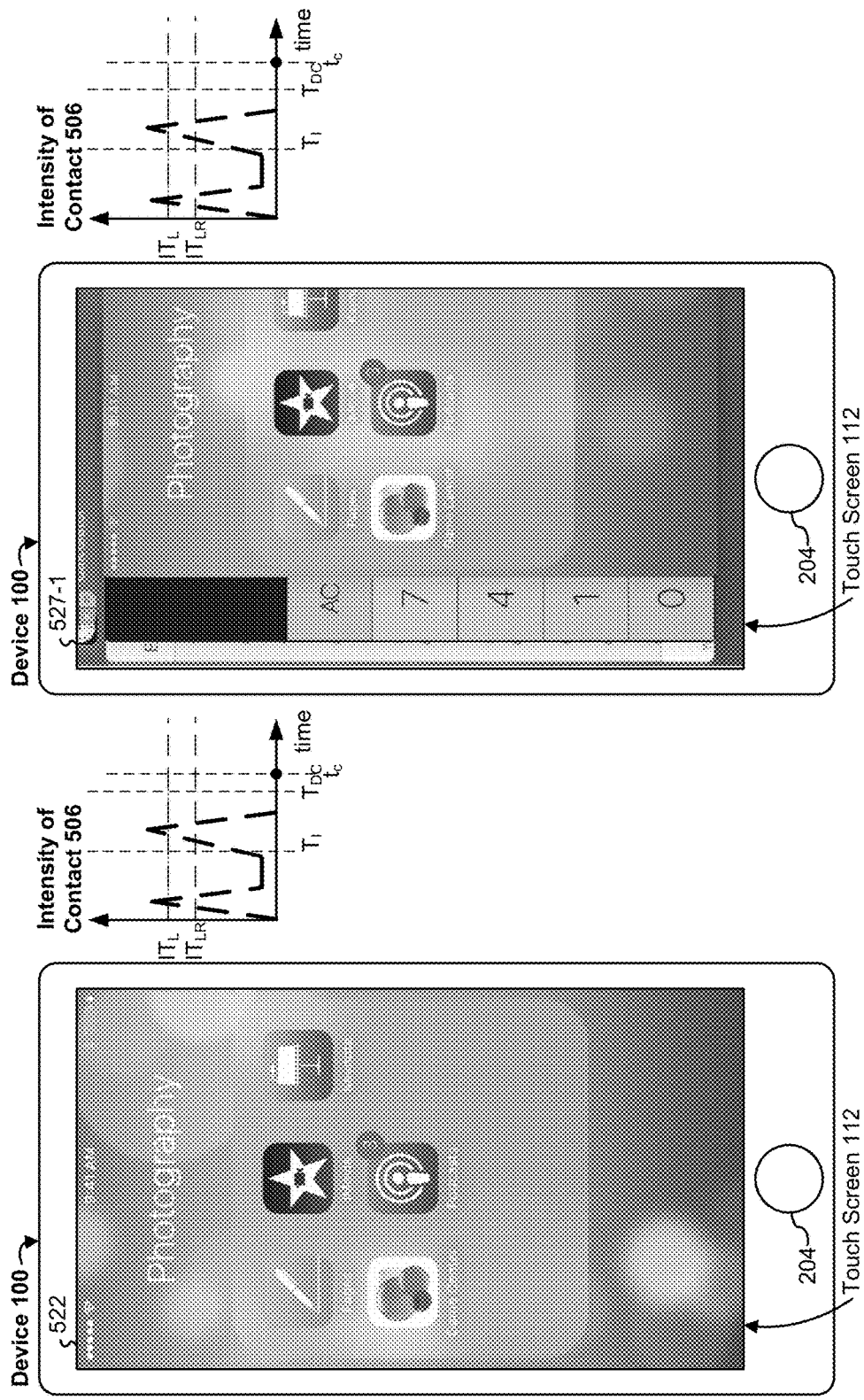
Figure 5B35
Figure 5B36

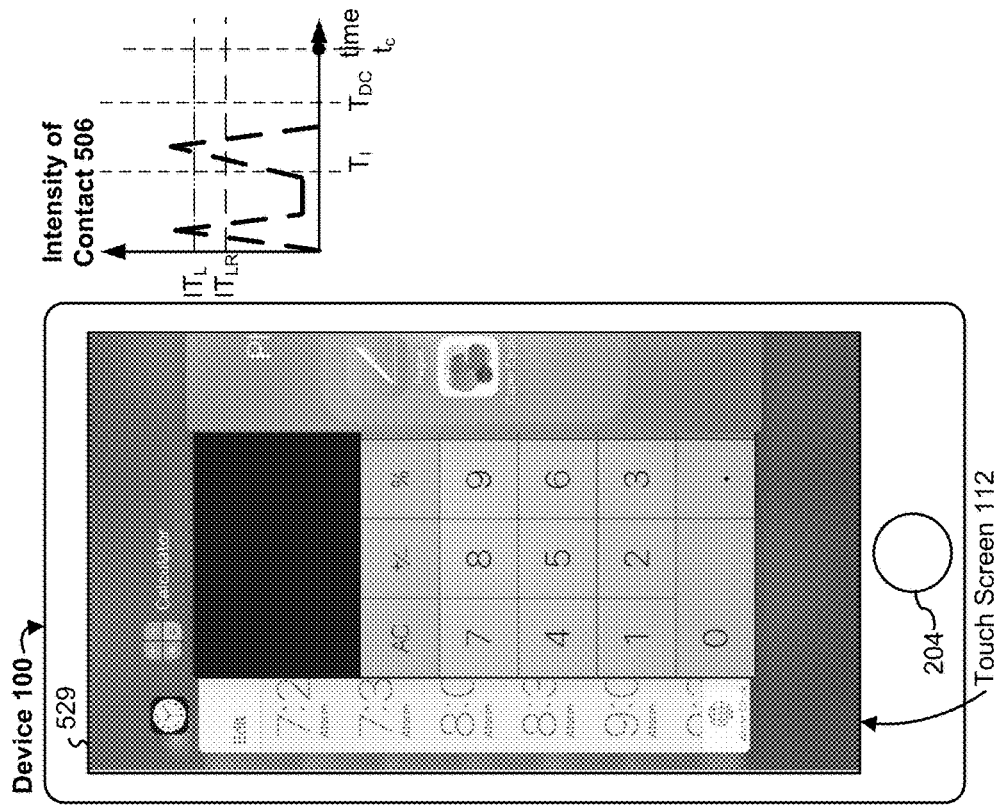
Figure 5B38
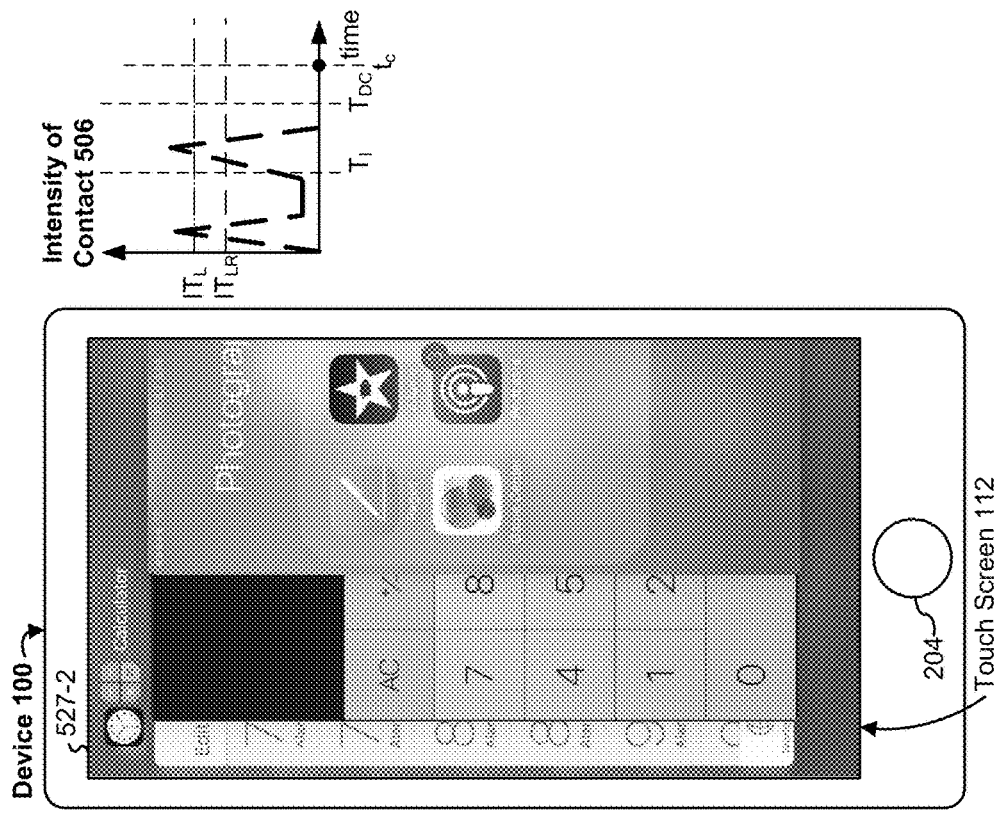
Figure 5B37

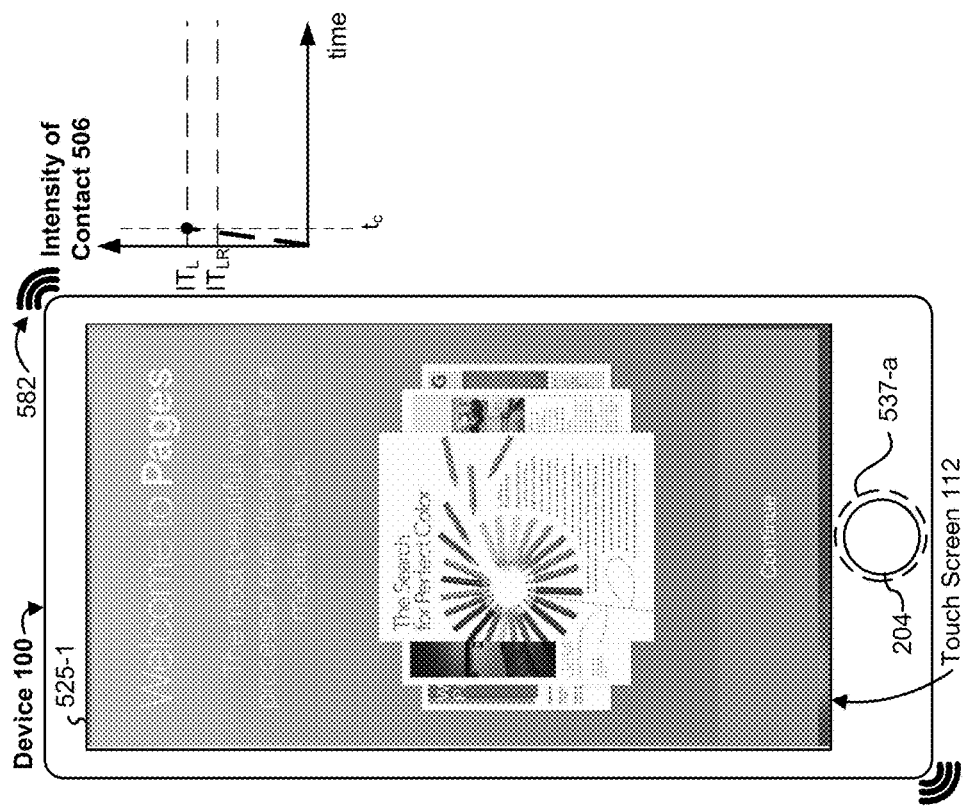
Figure 5B40
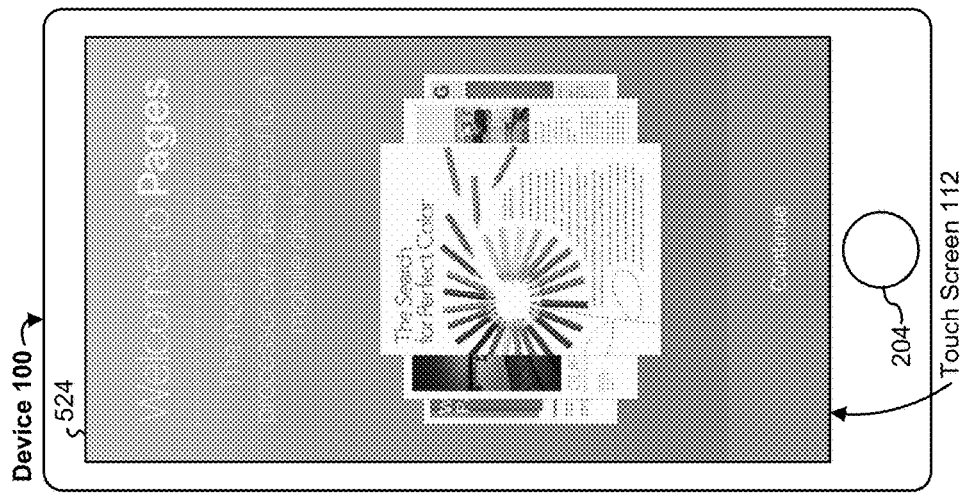
Figure 5B39 (same as 5B5)

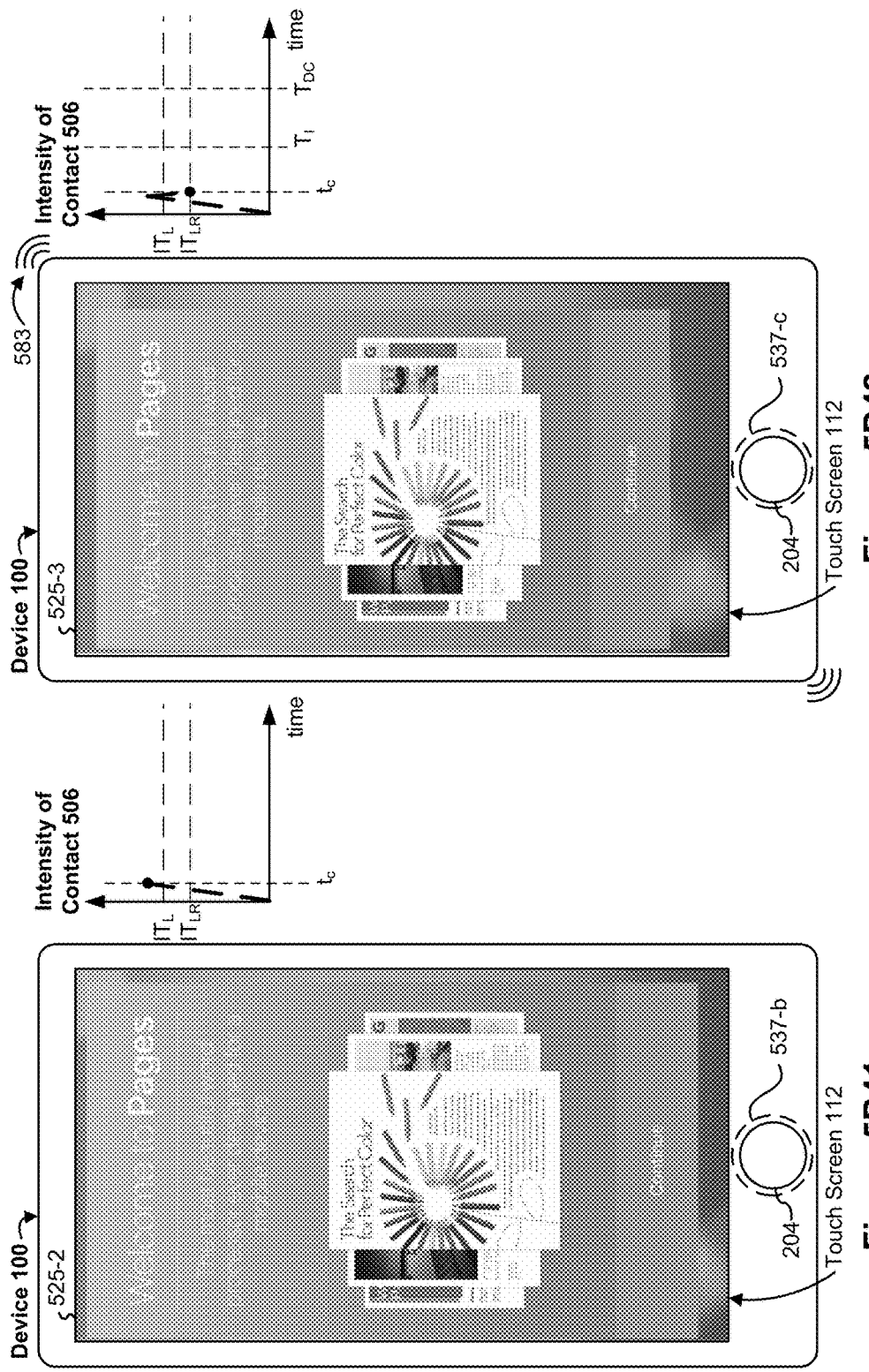

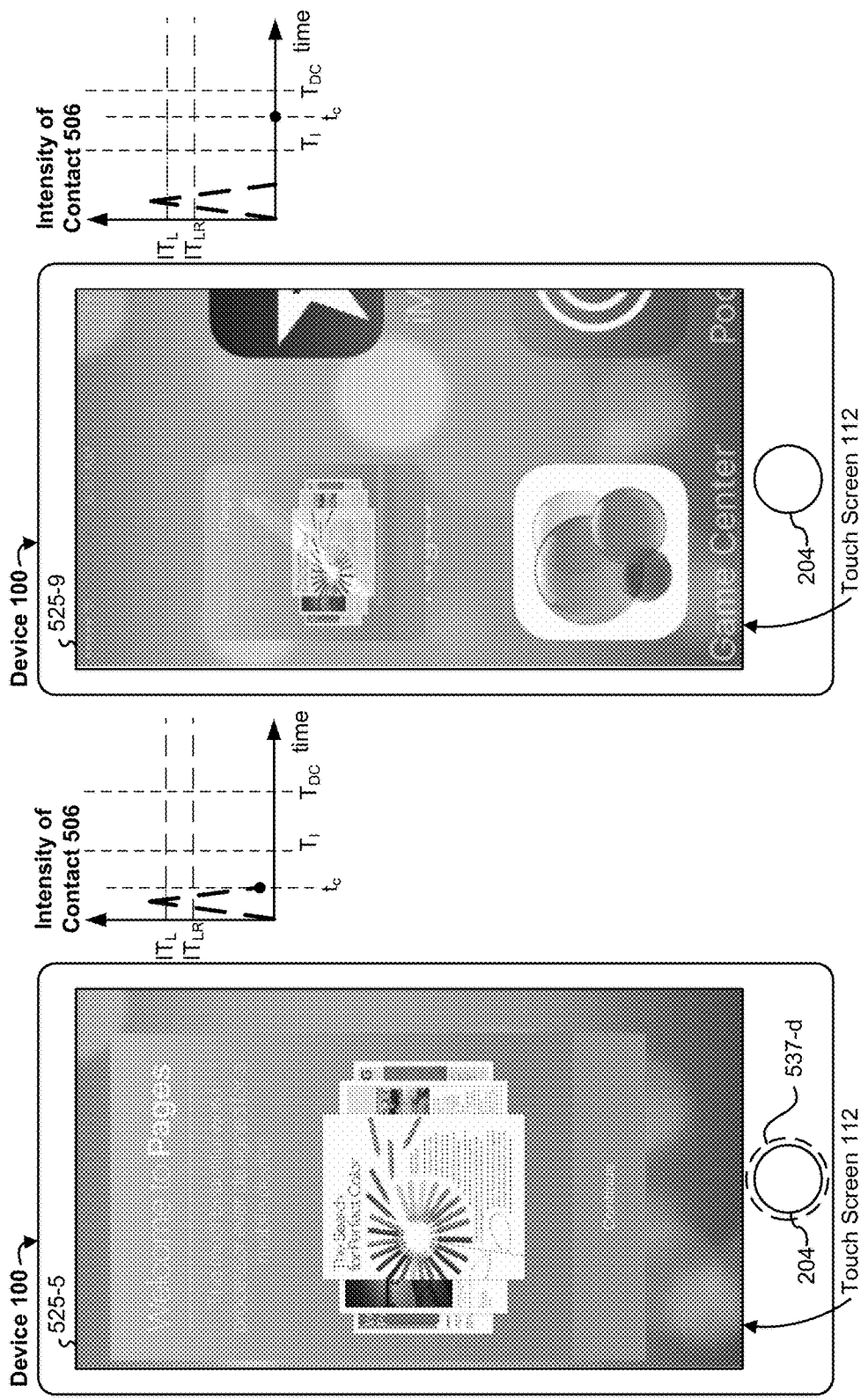

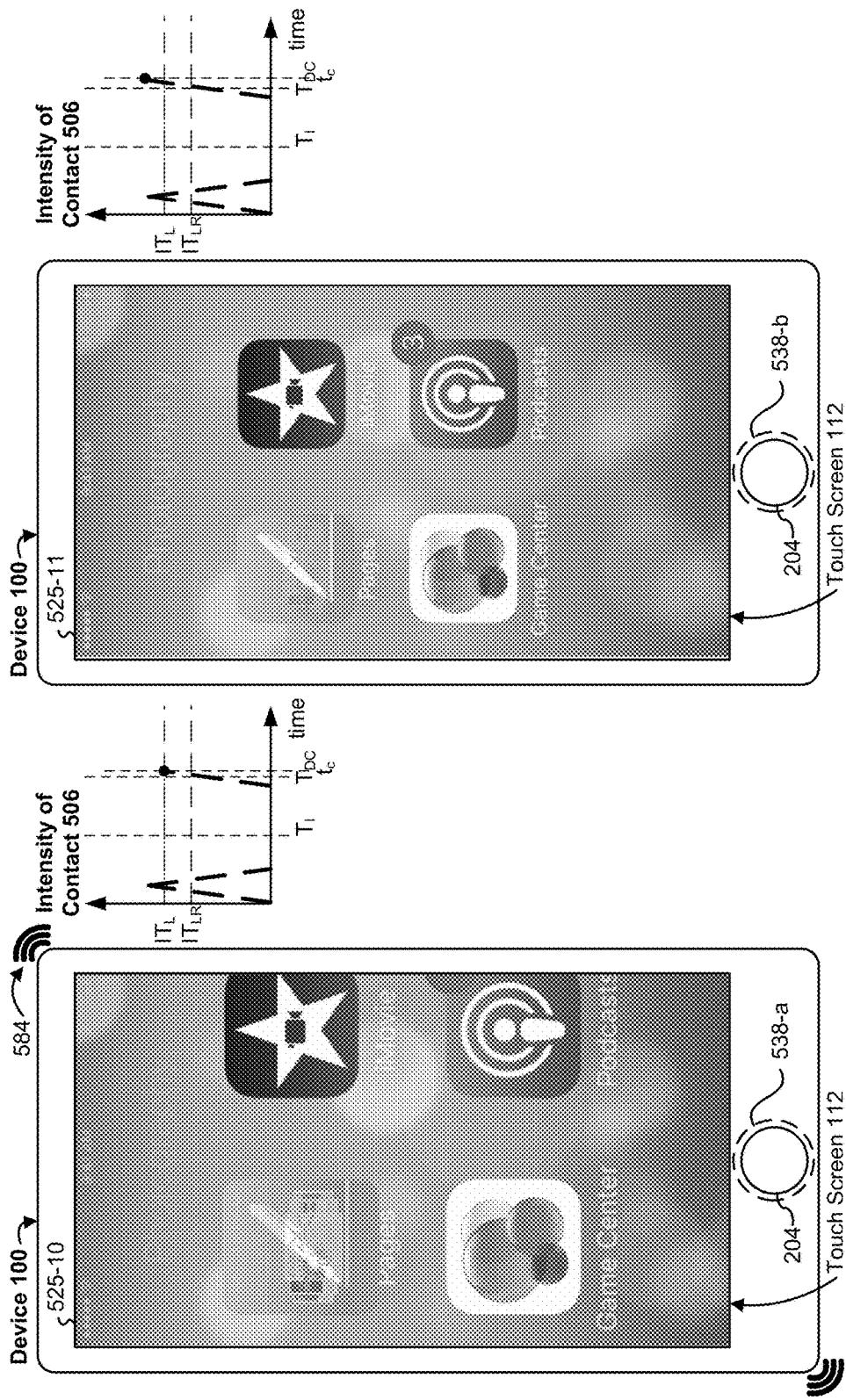

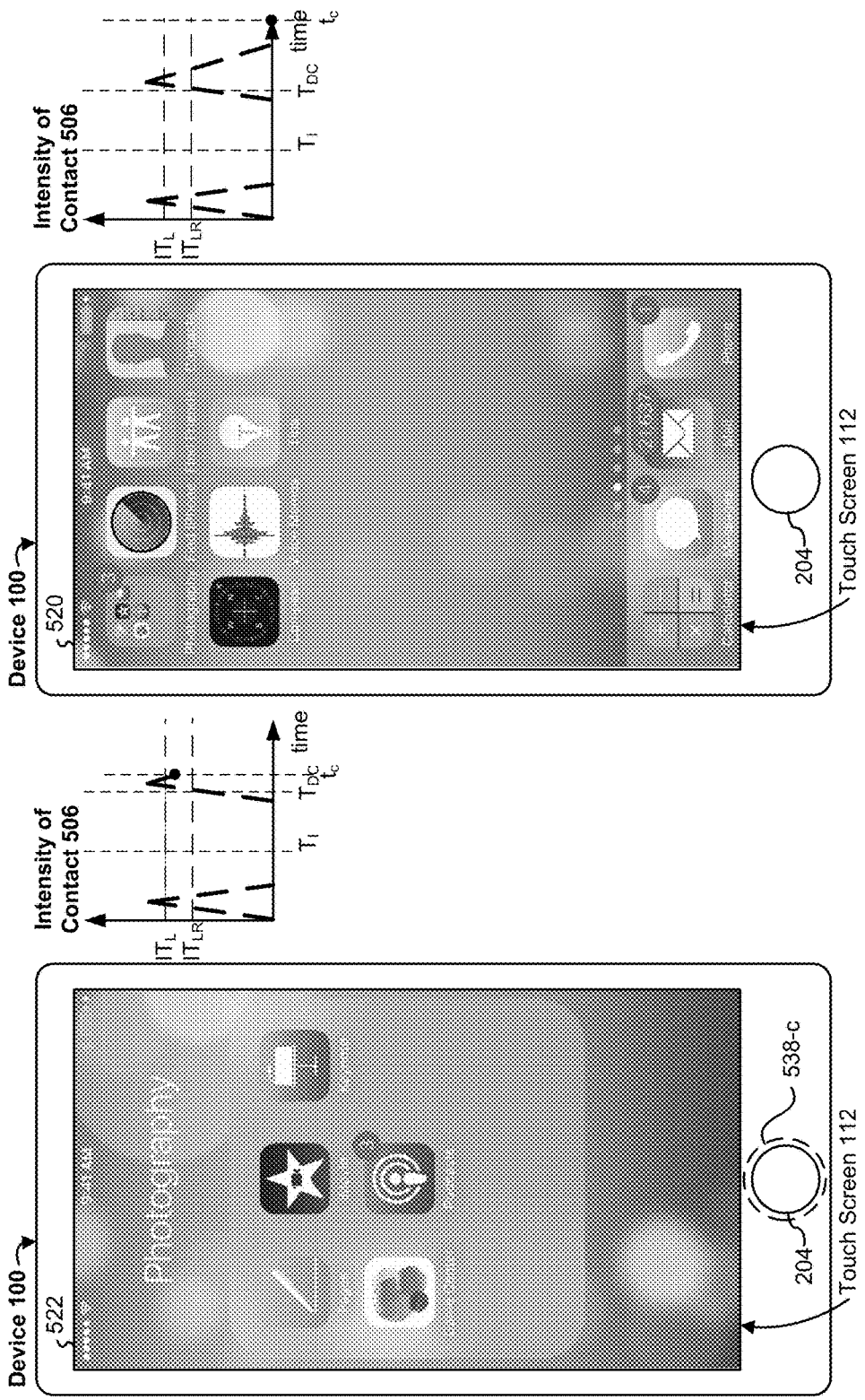

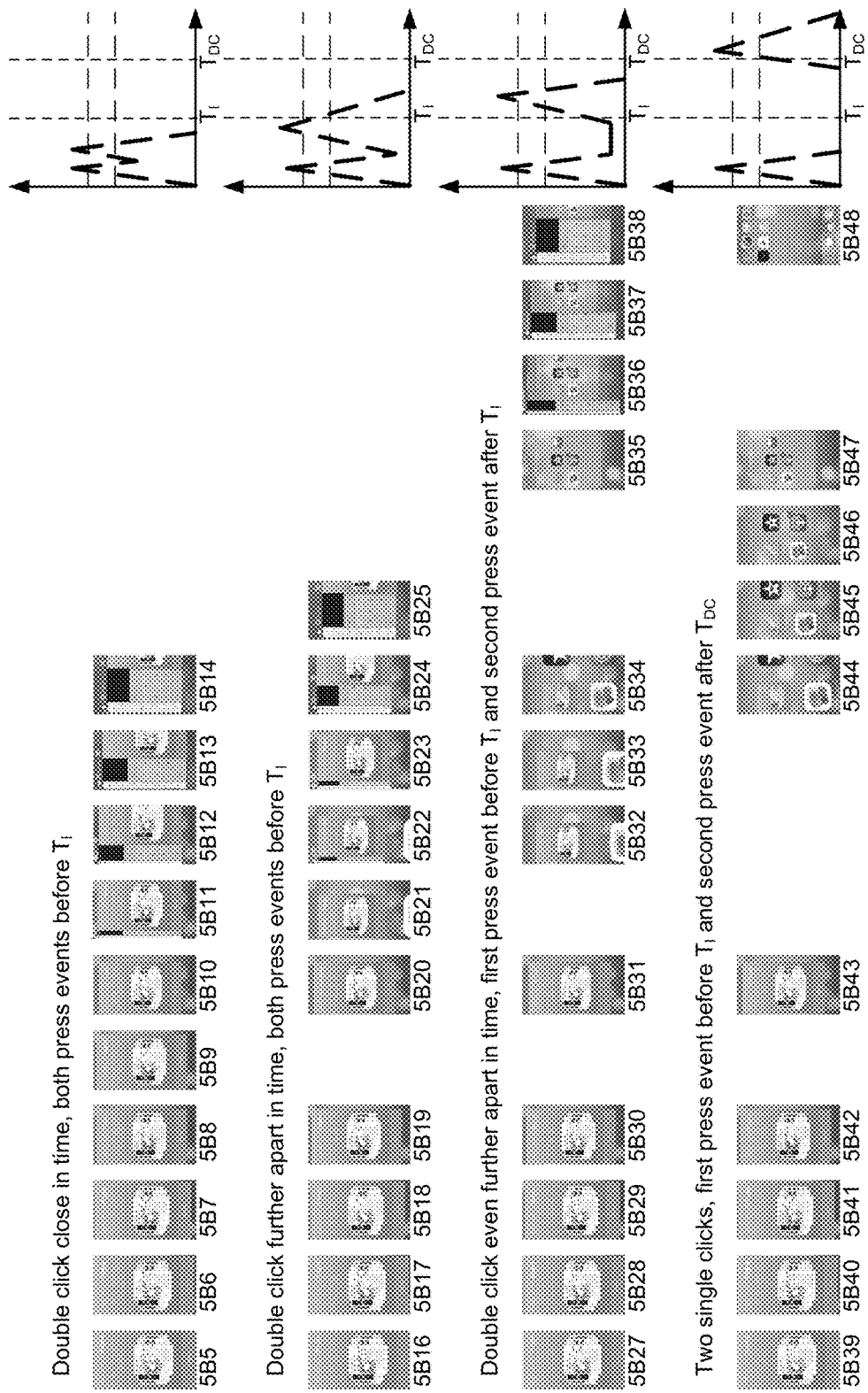
Figure 5B49

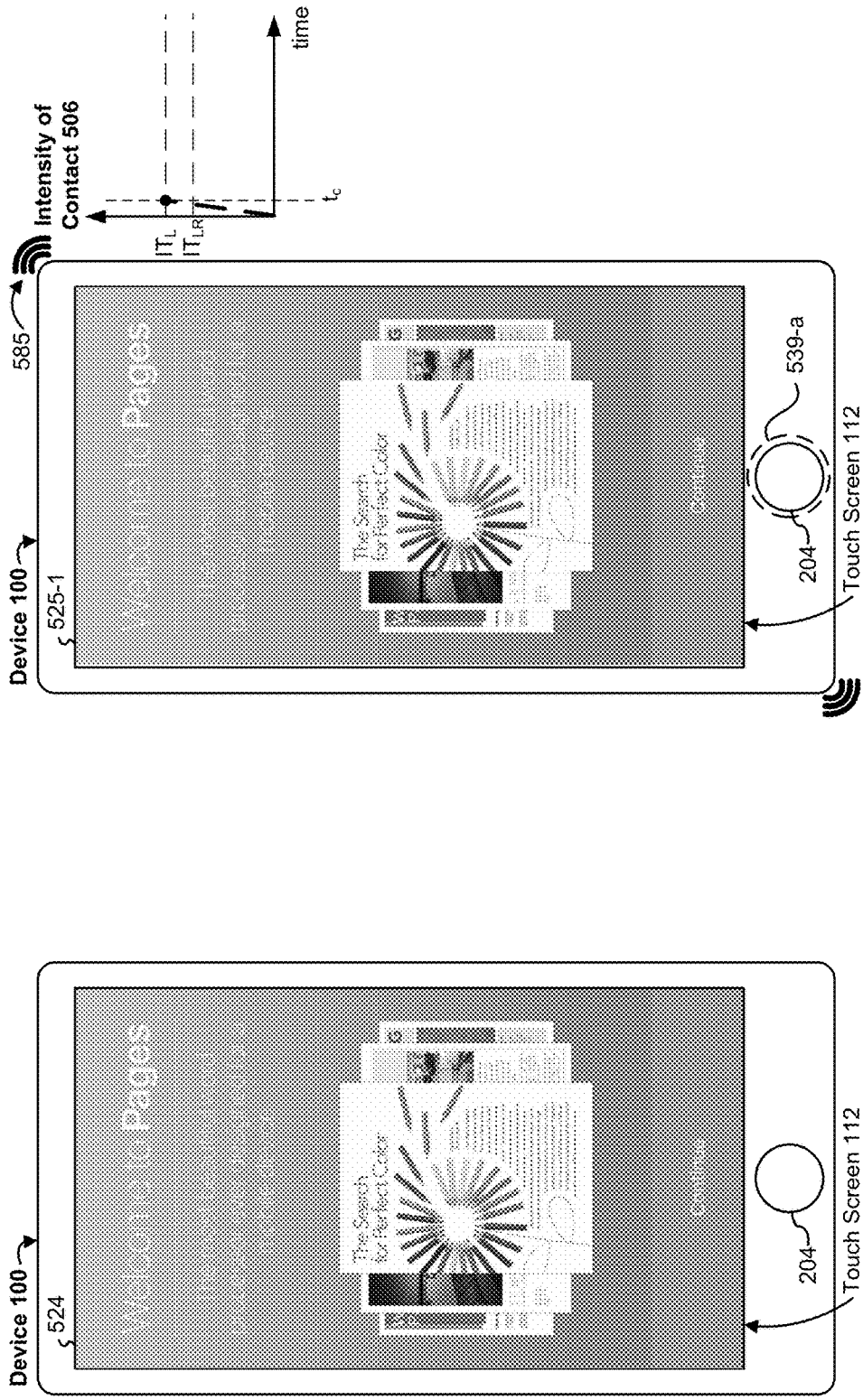

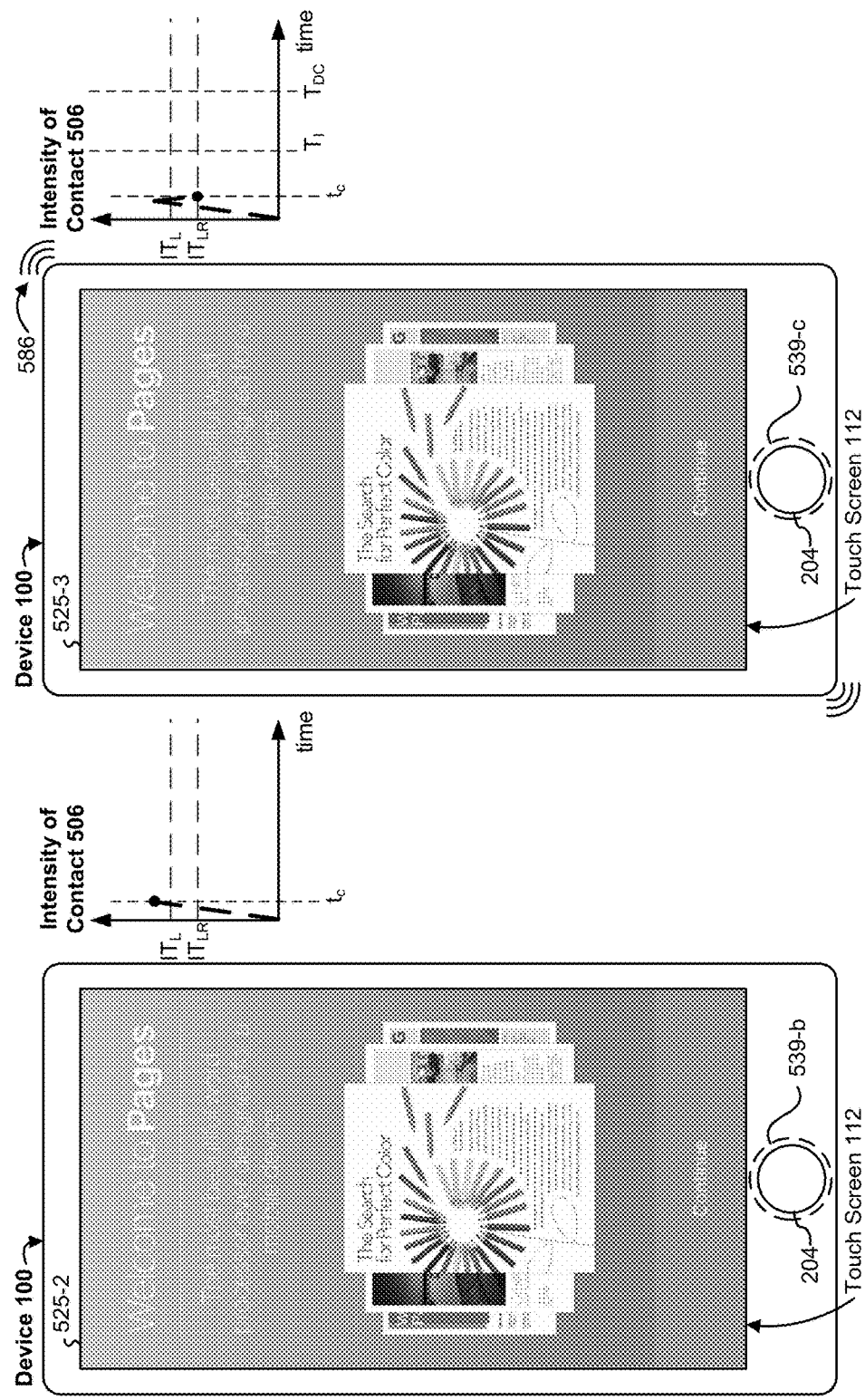

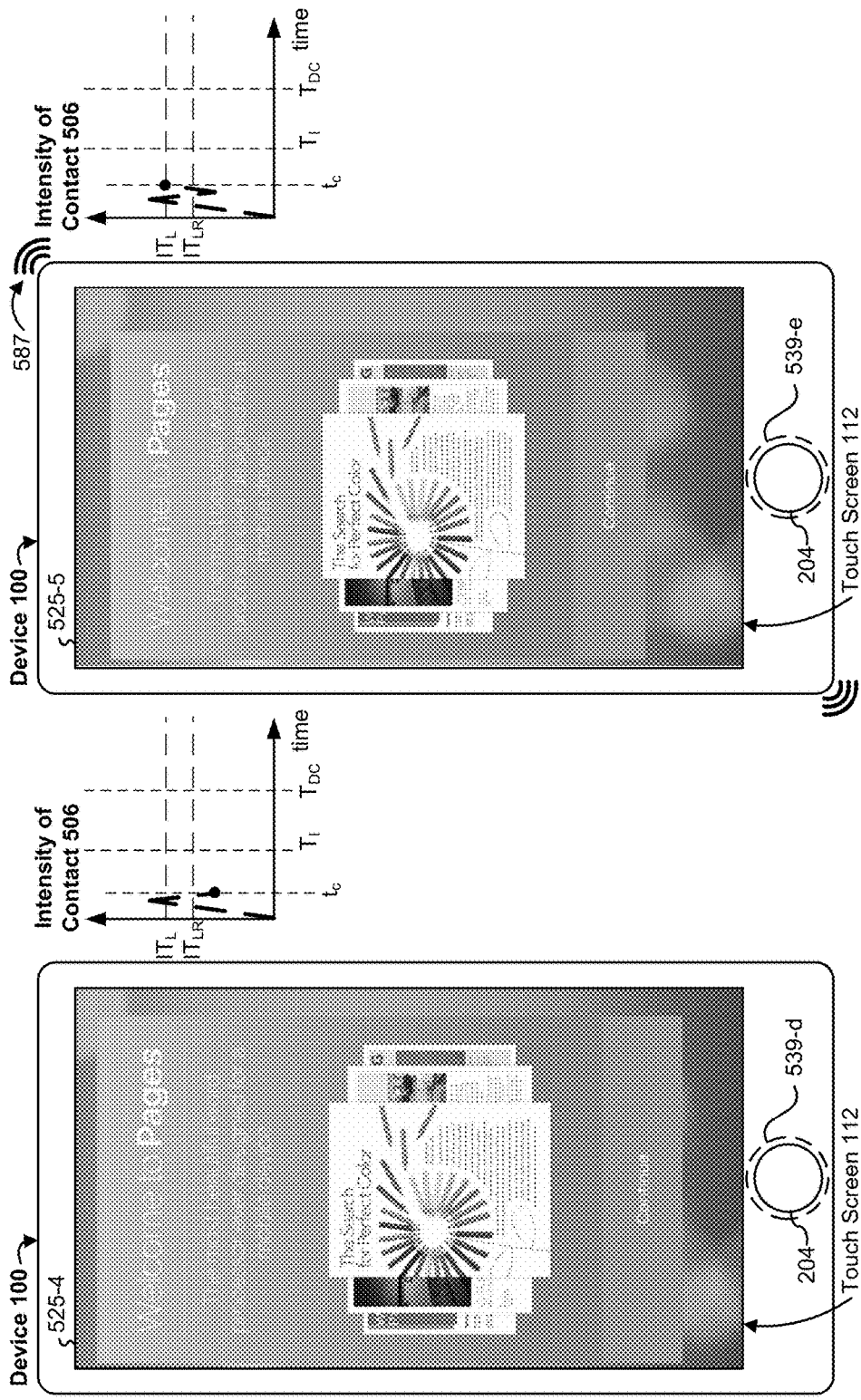

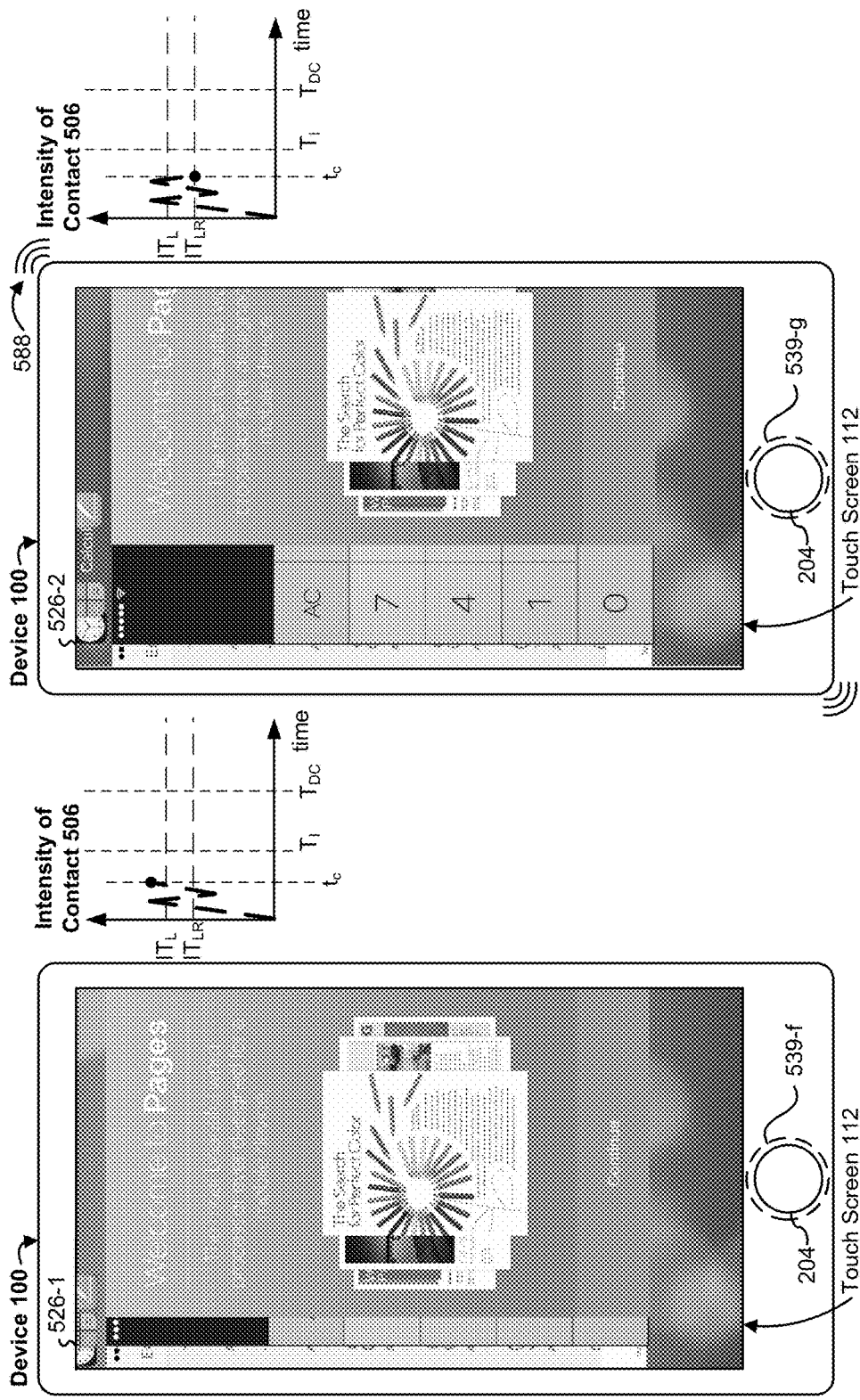

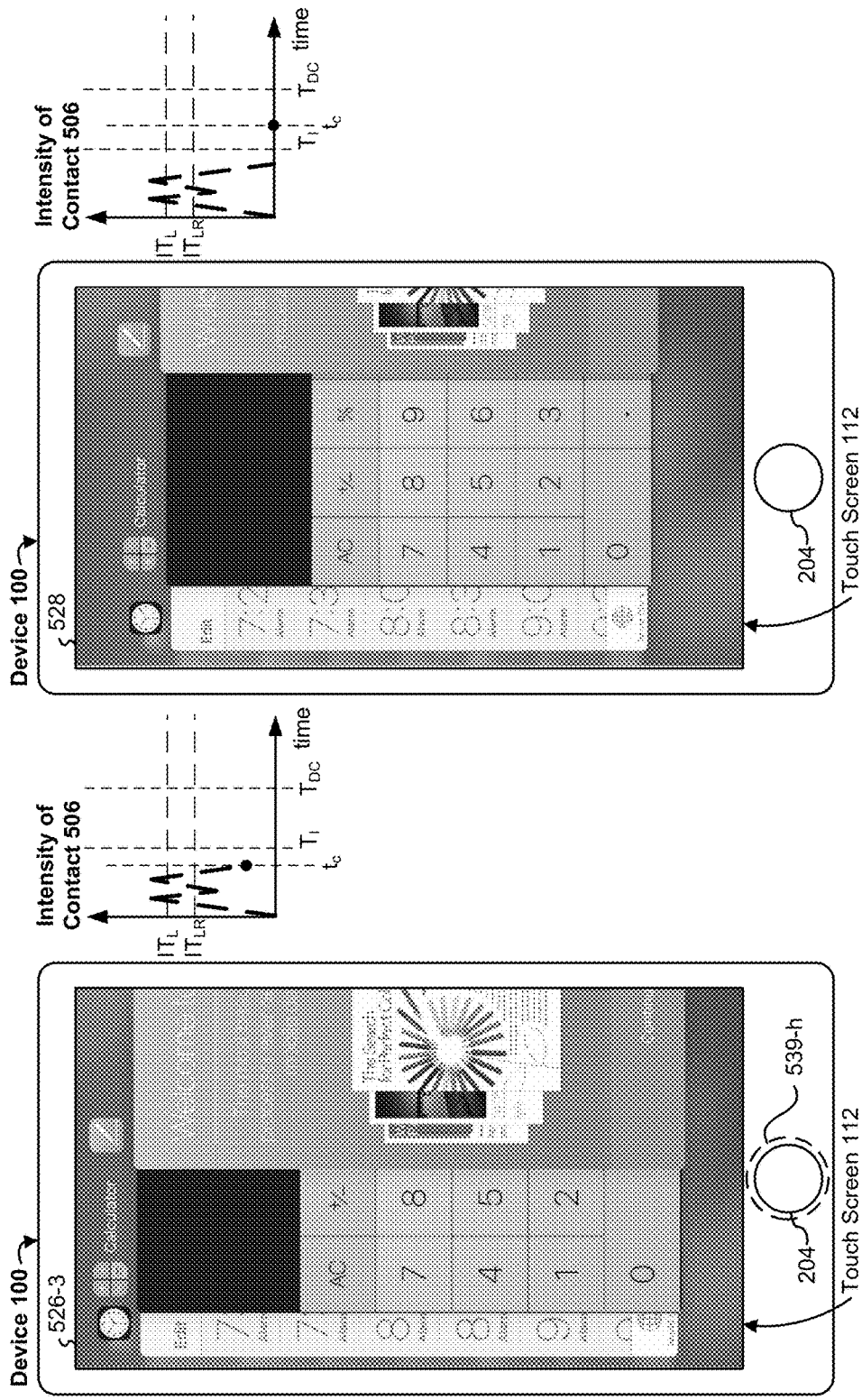

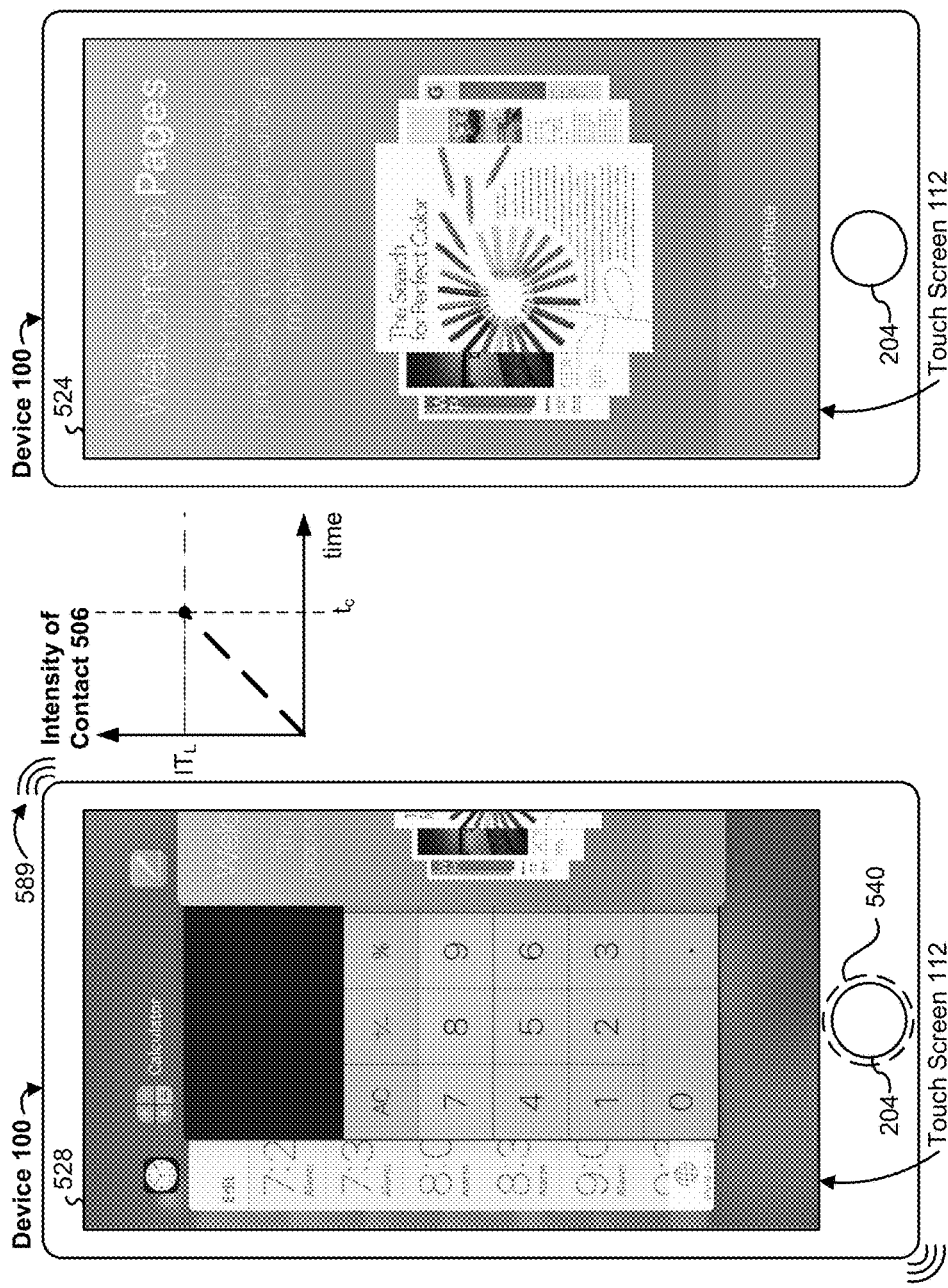

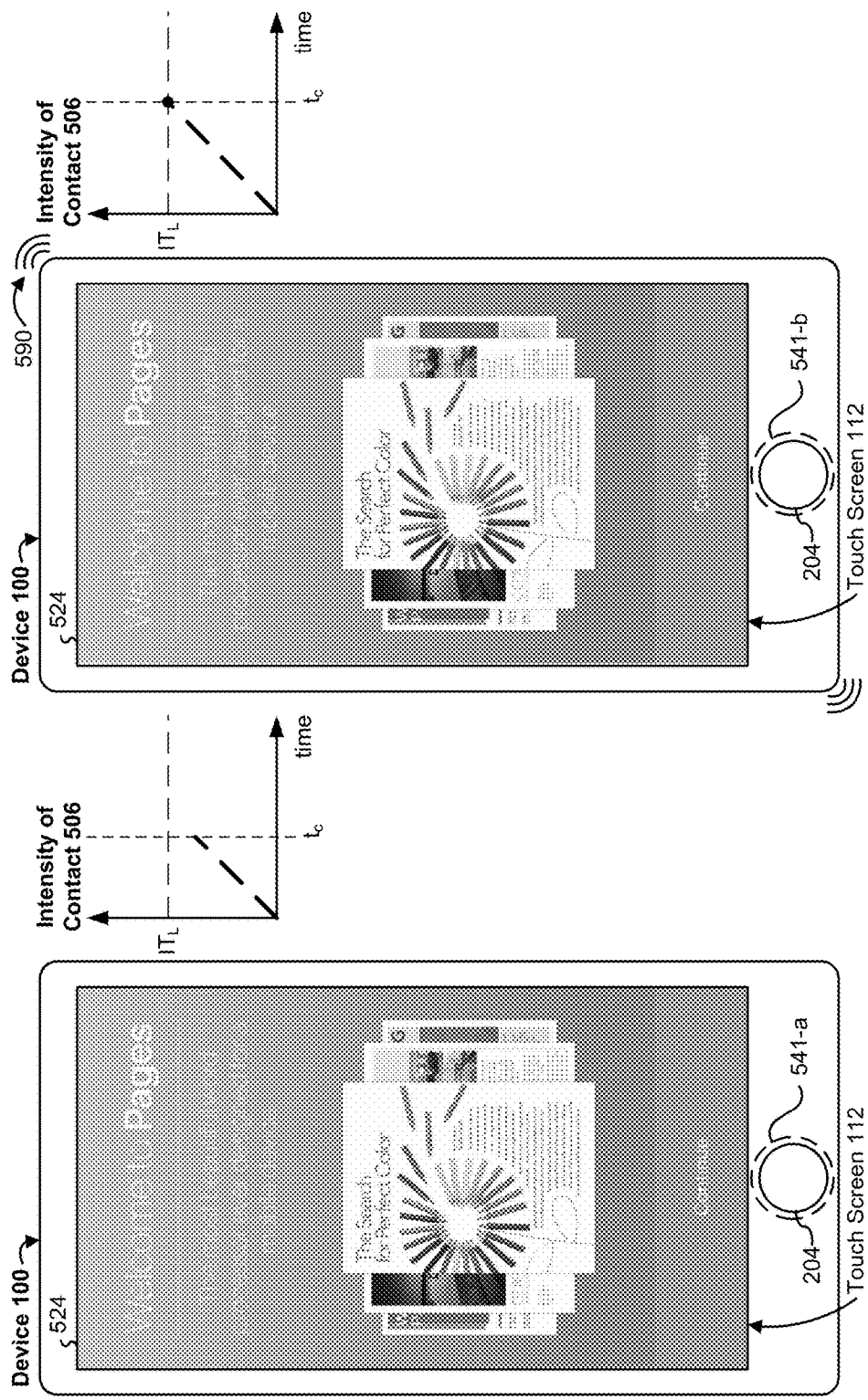

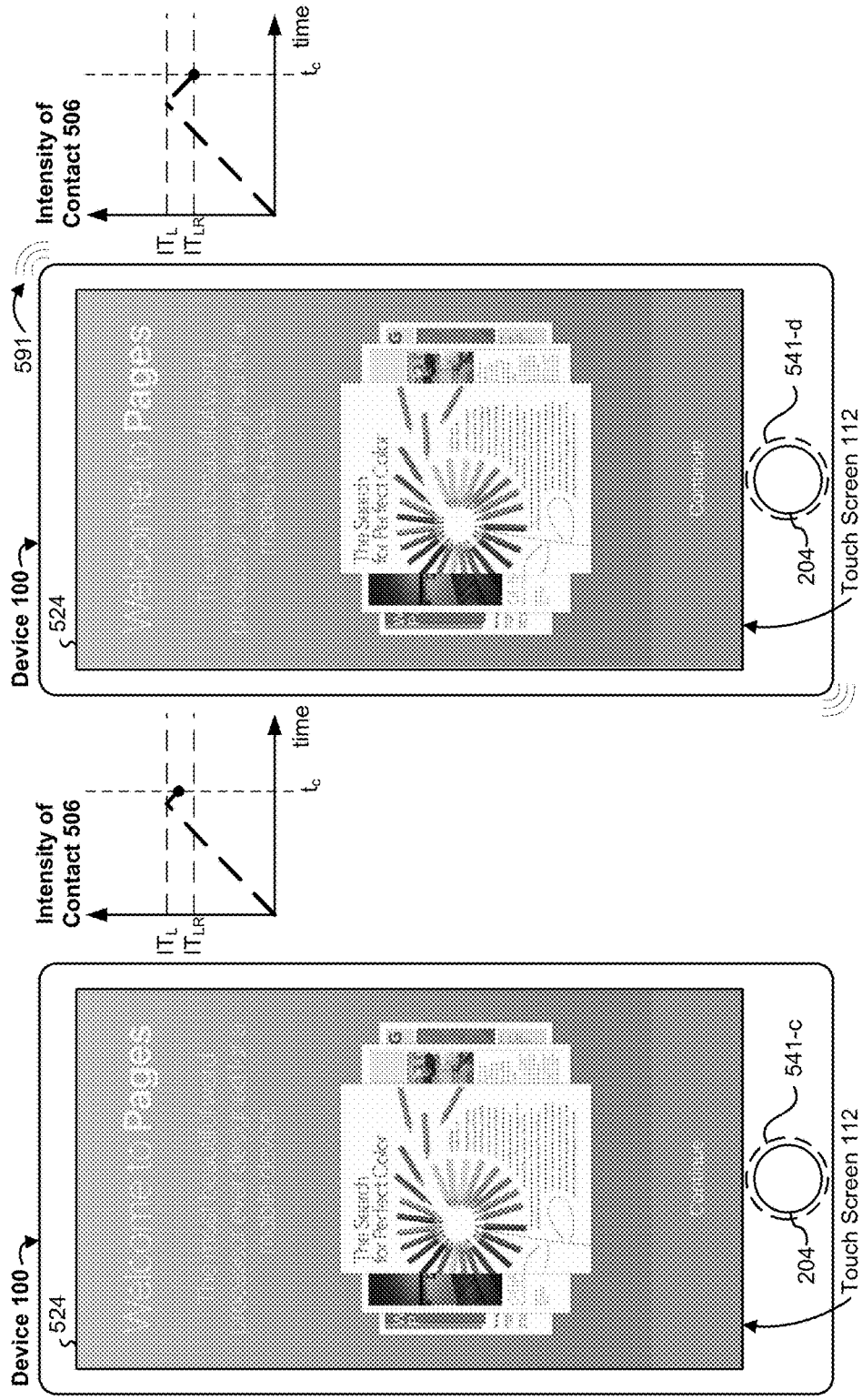

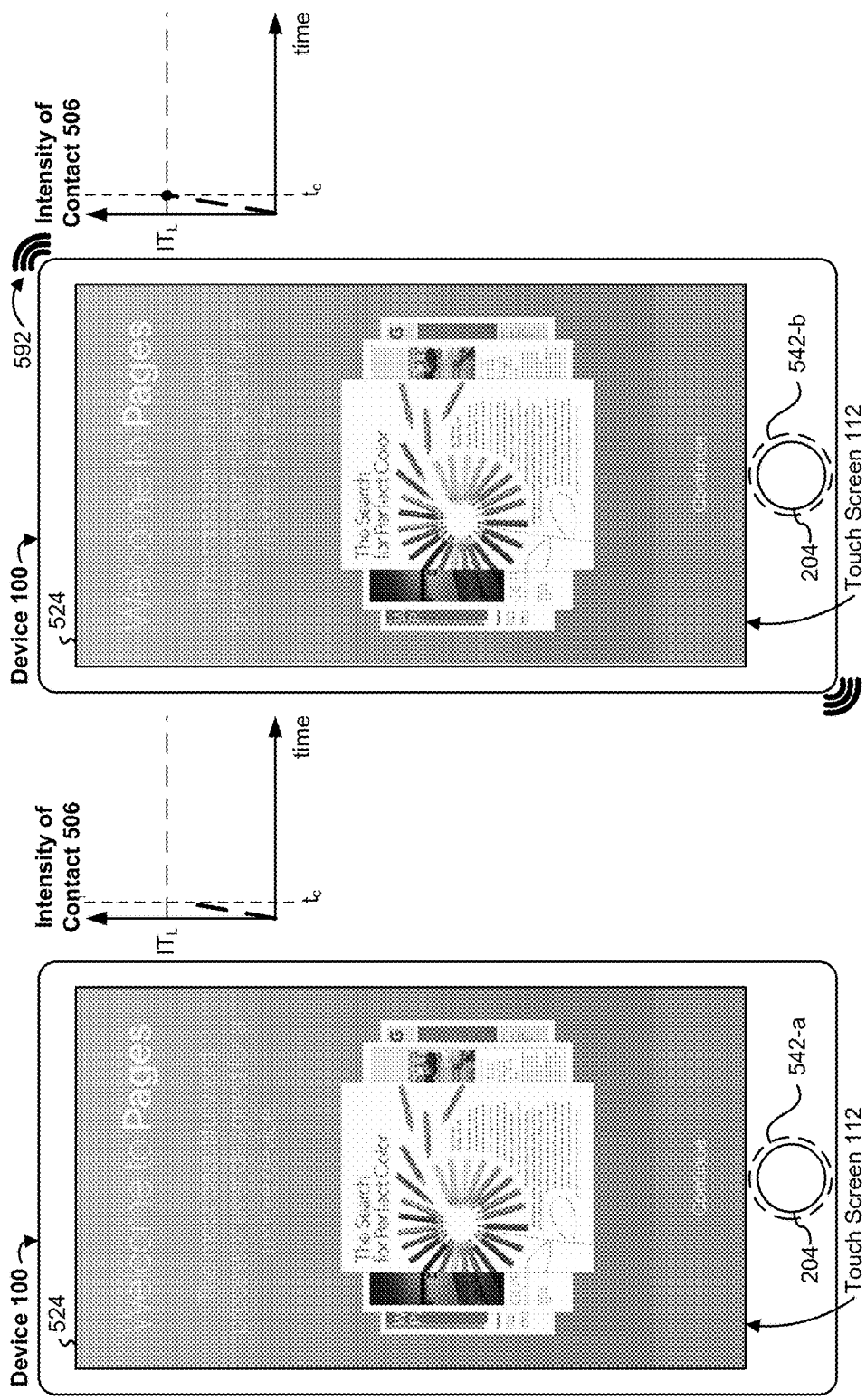

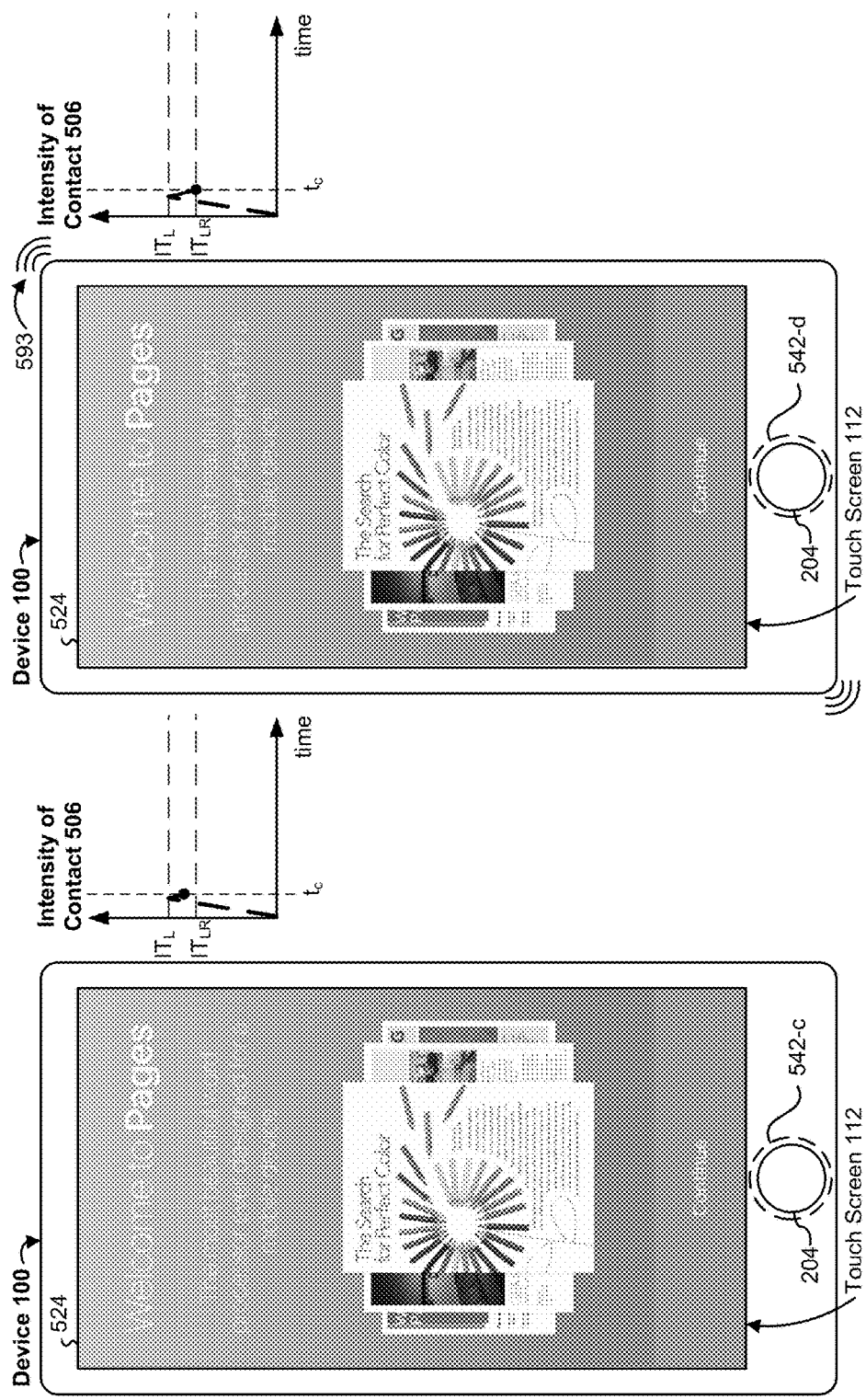

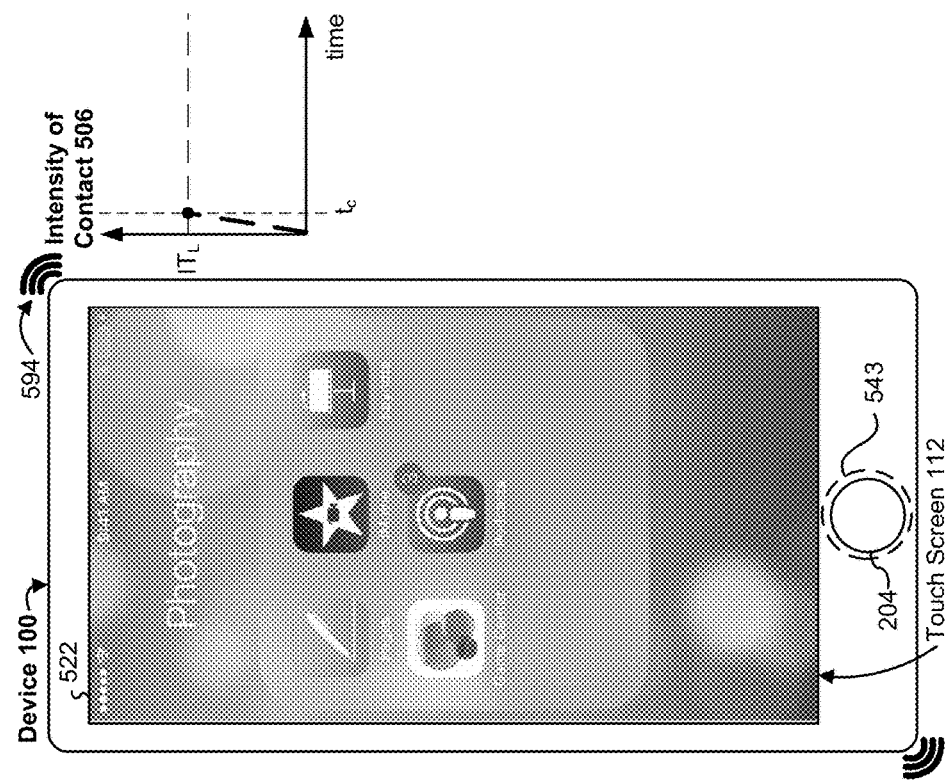
Figure 5B71
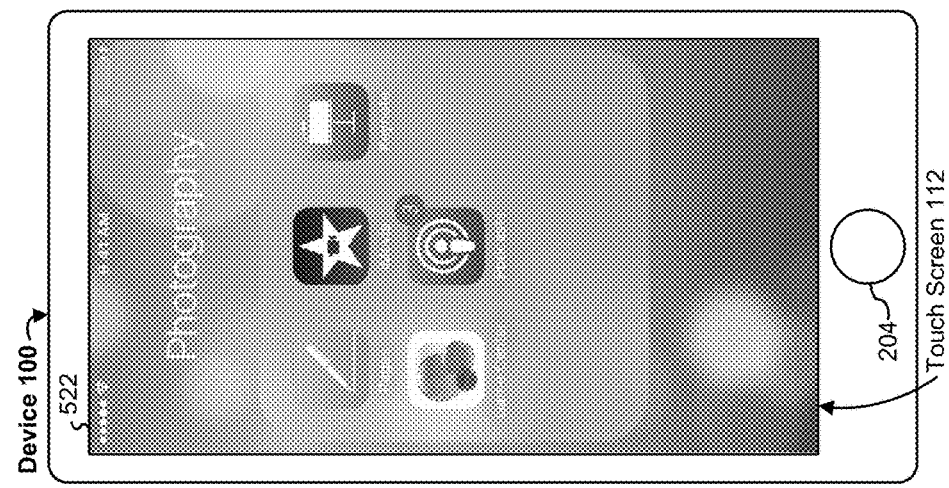
Figure 5B70

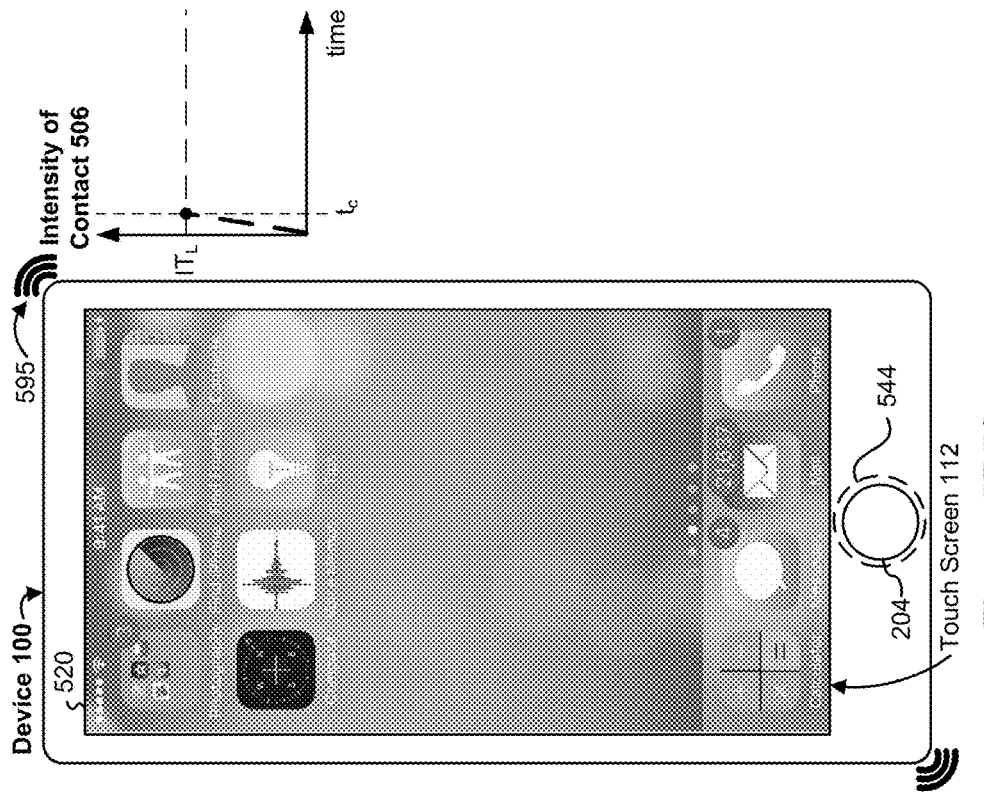
Figure 5B73
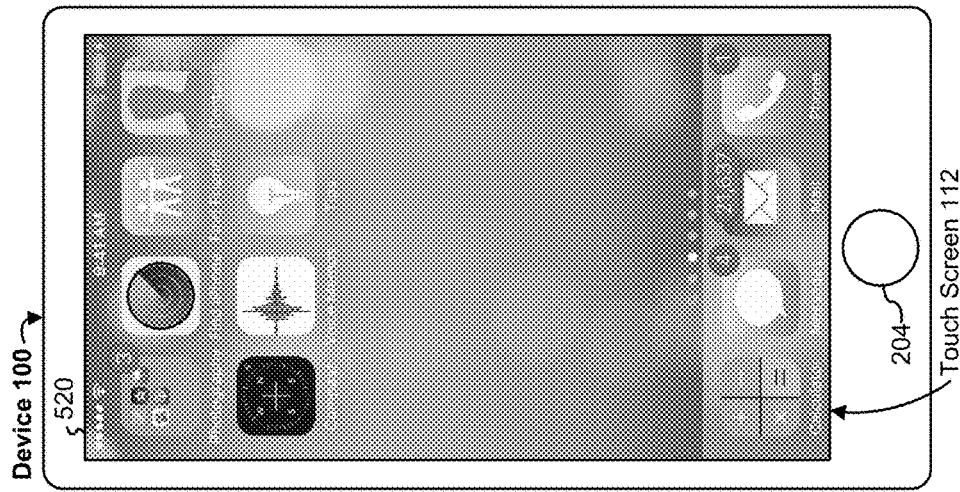
Figure 5B72

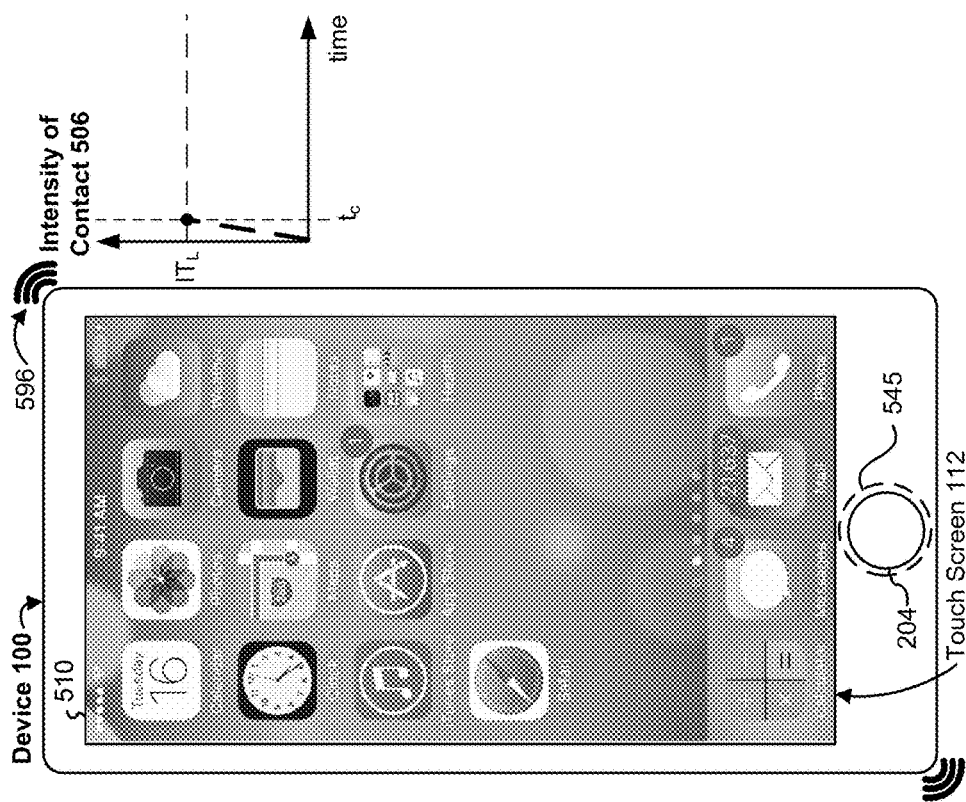
Figure 5B75
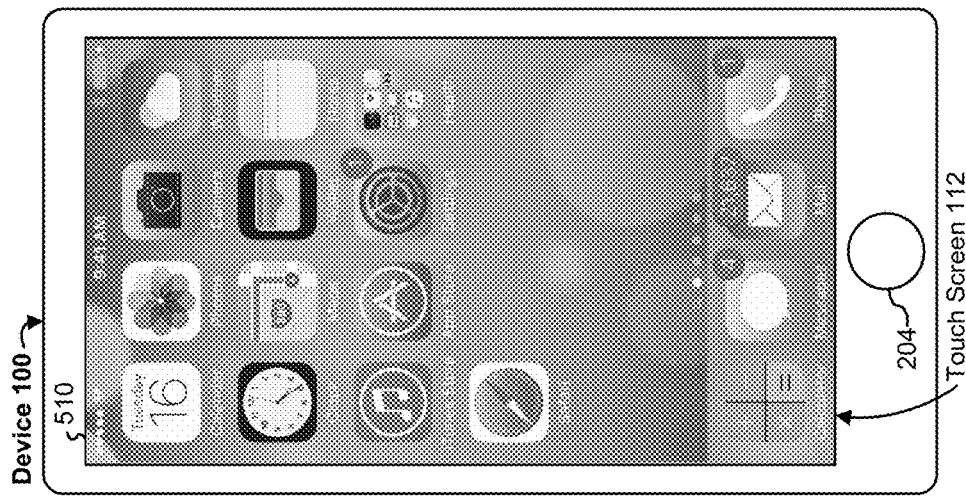
Figure 5B74

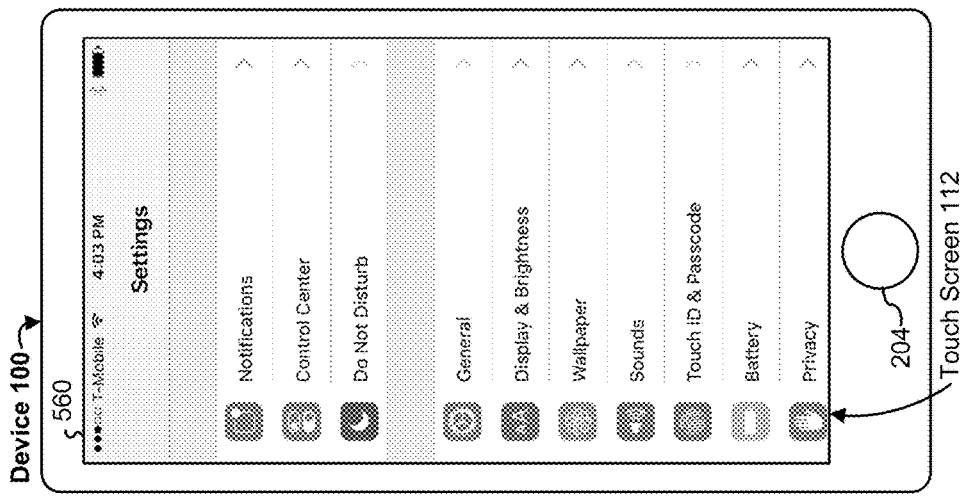
Figure 5C2
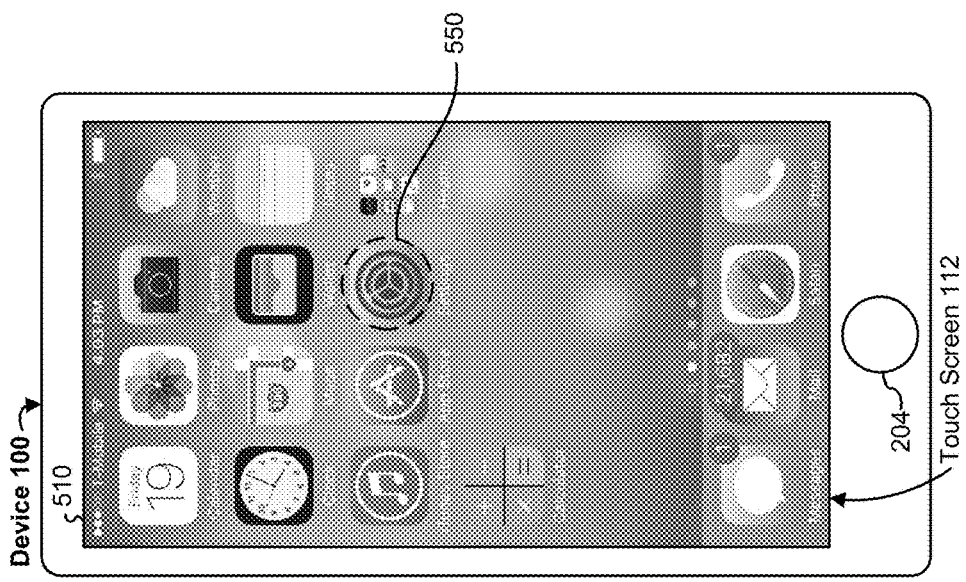
Figure 5C1

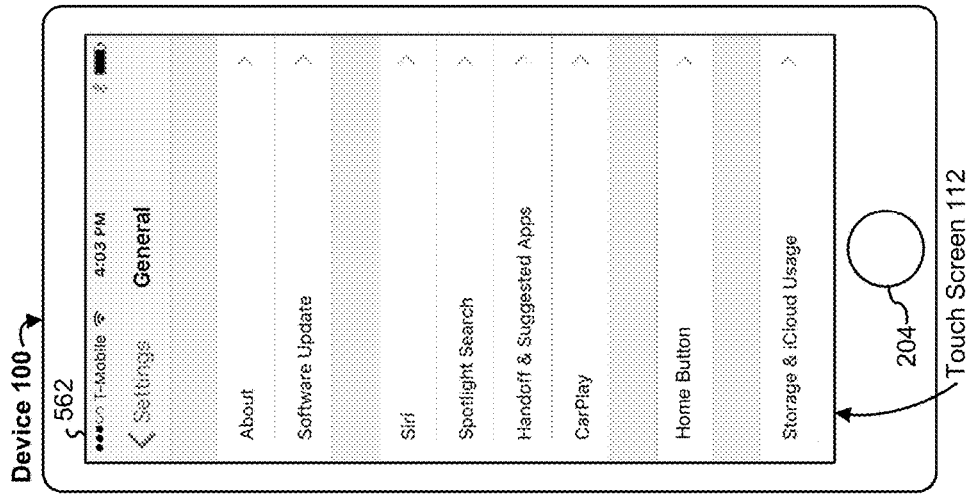
Figure 5C4
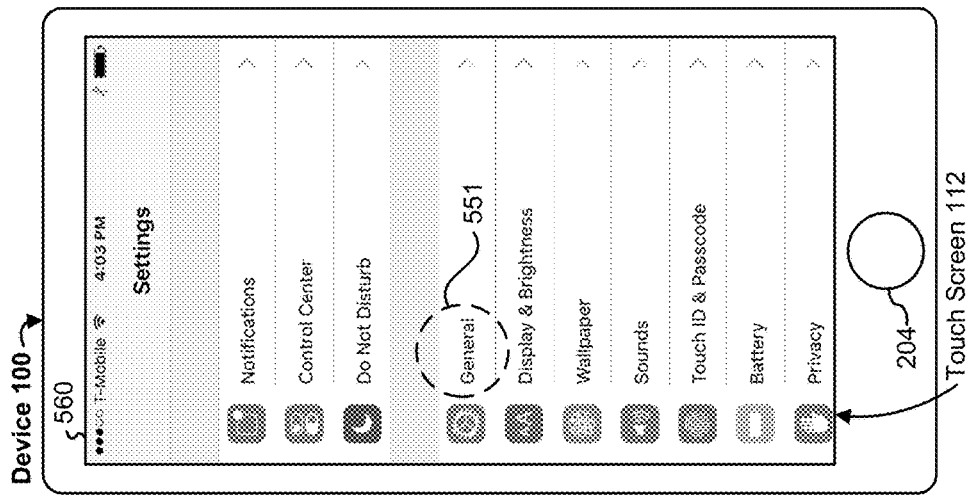
Figure 5C3

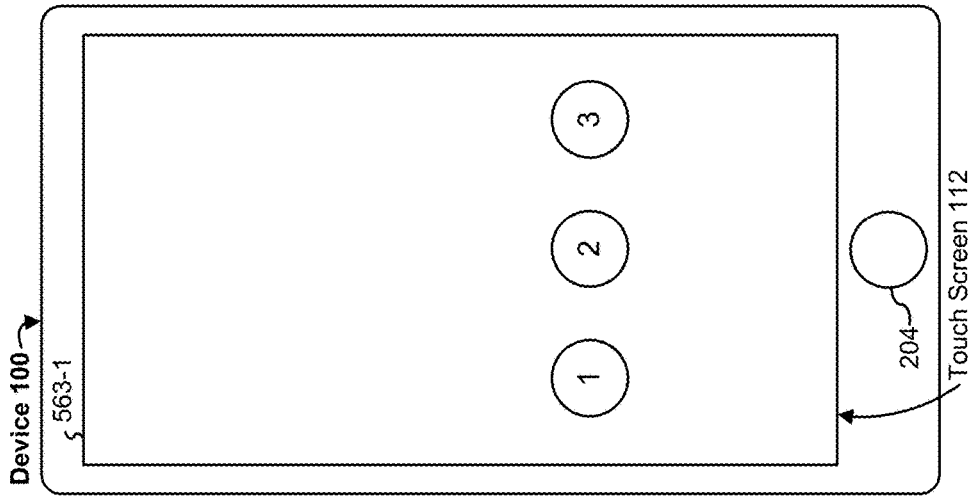
Figure 5C6
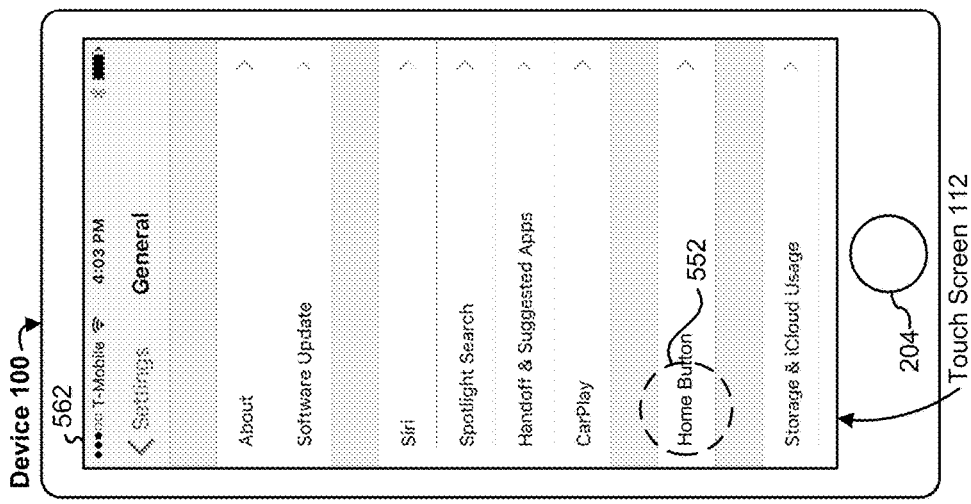
Figure 5C5

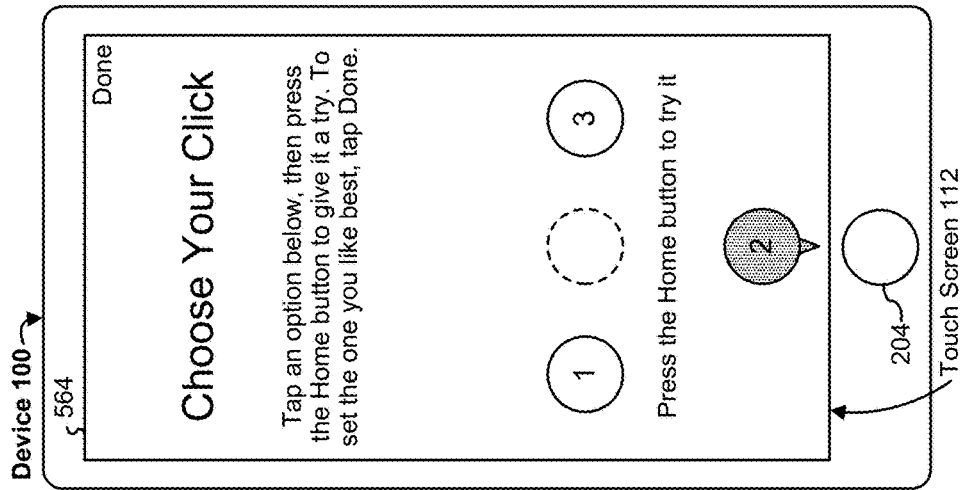
Figure 5C8
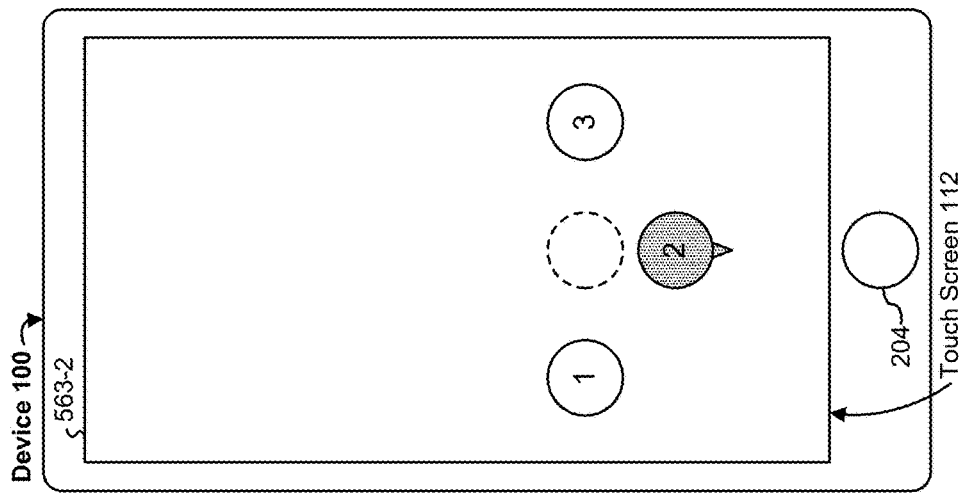
Figure 5C7

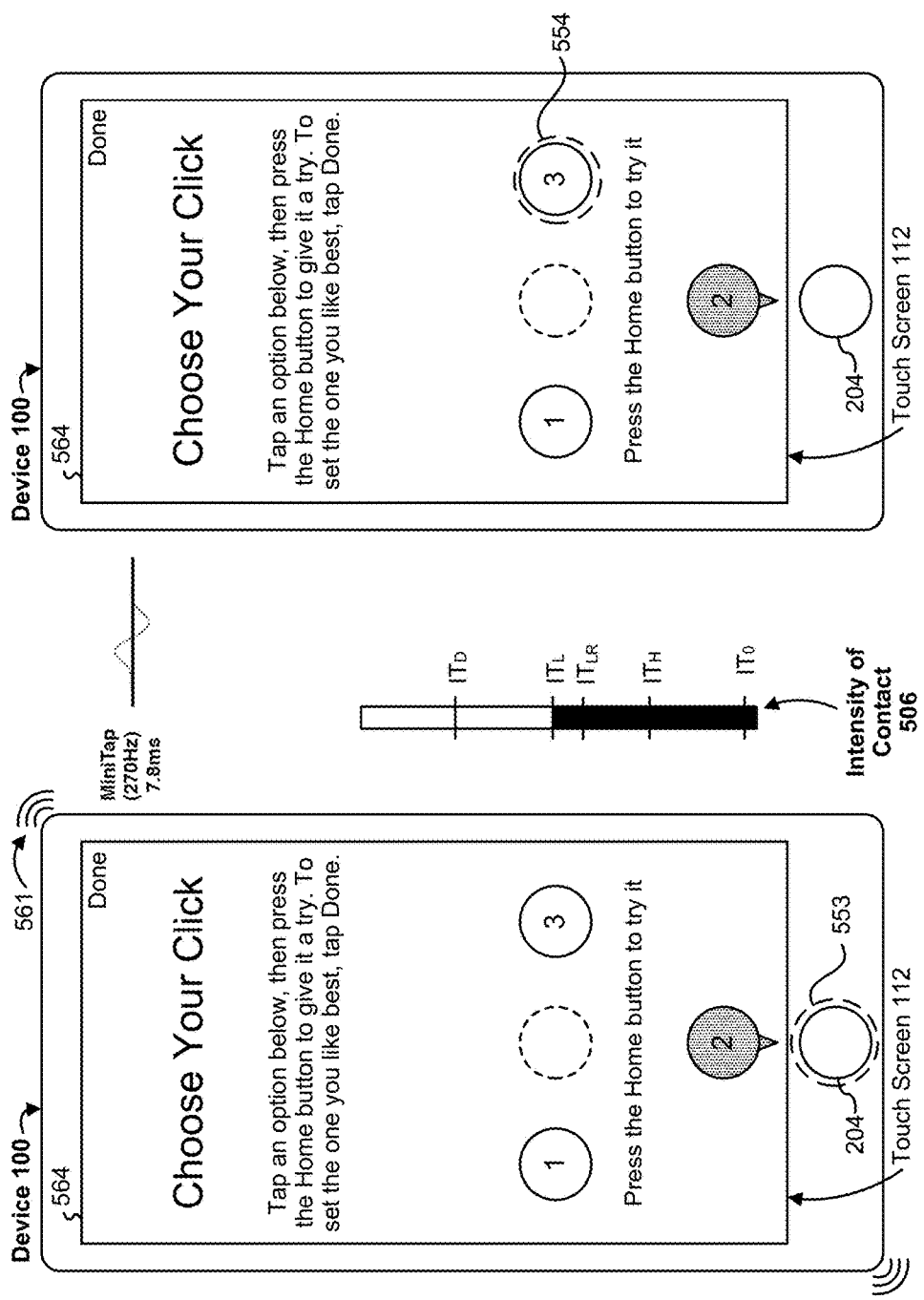

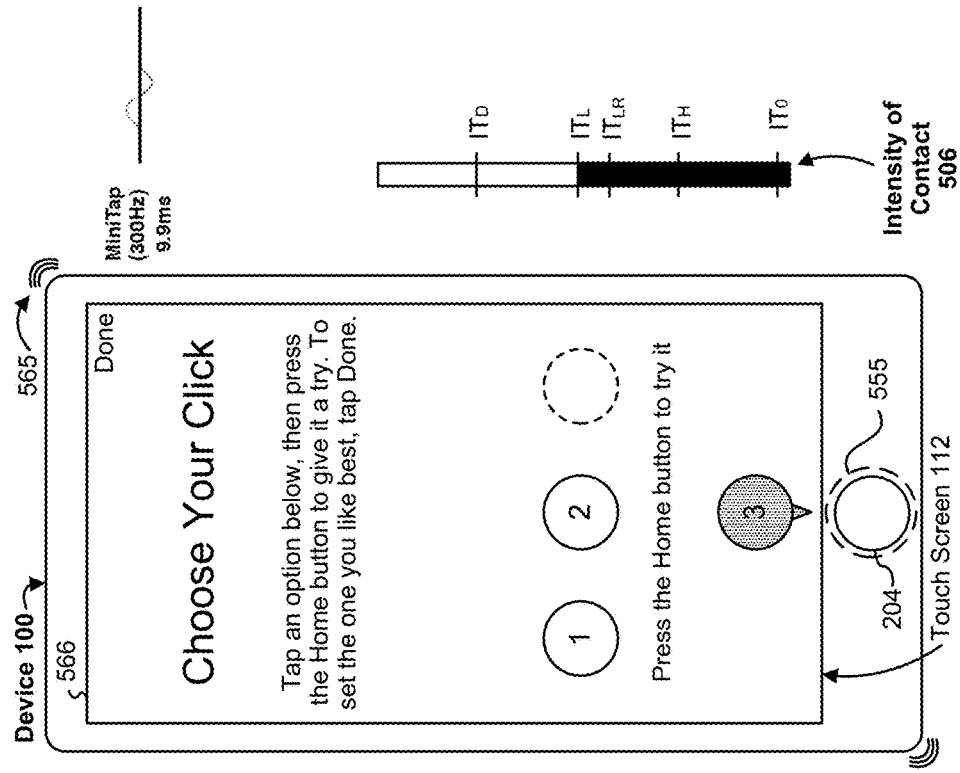
Figure 5C12
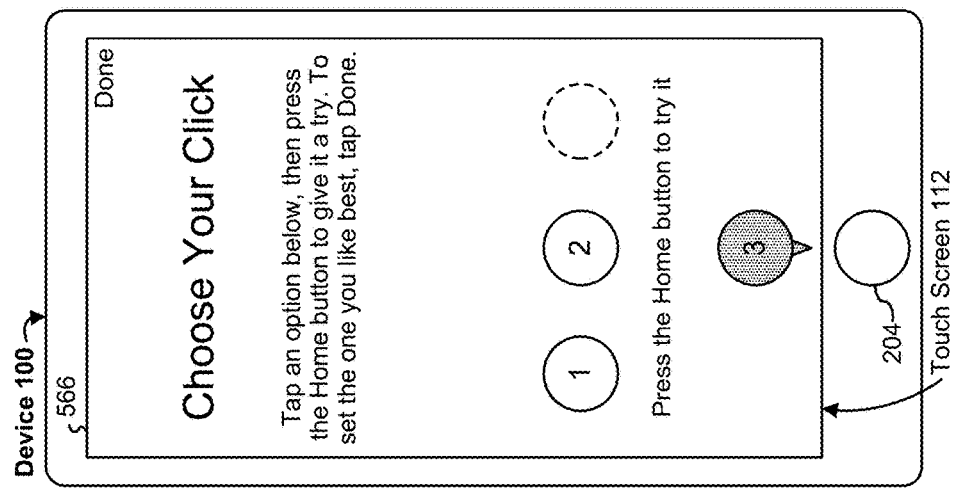
Figure 5C11

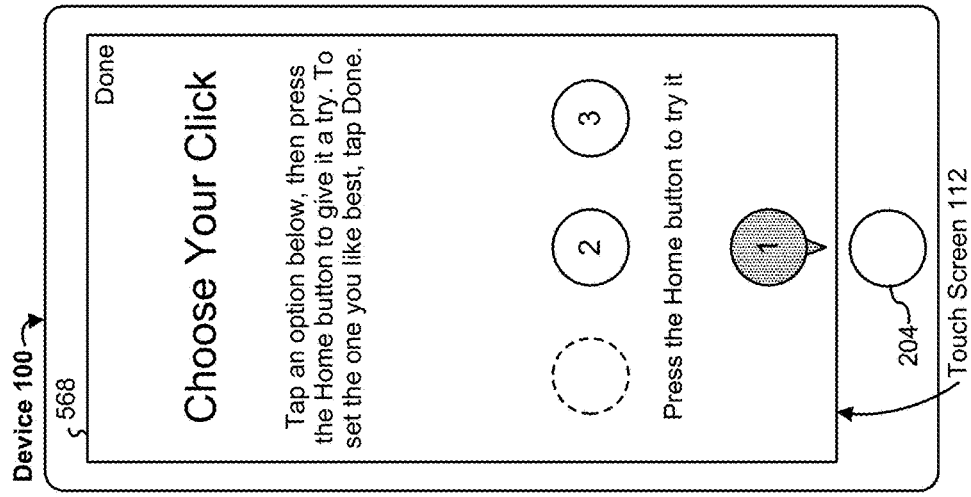
Figure 5C14
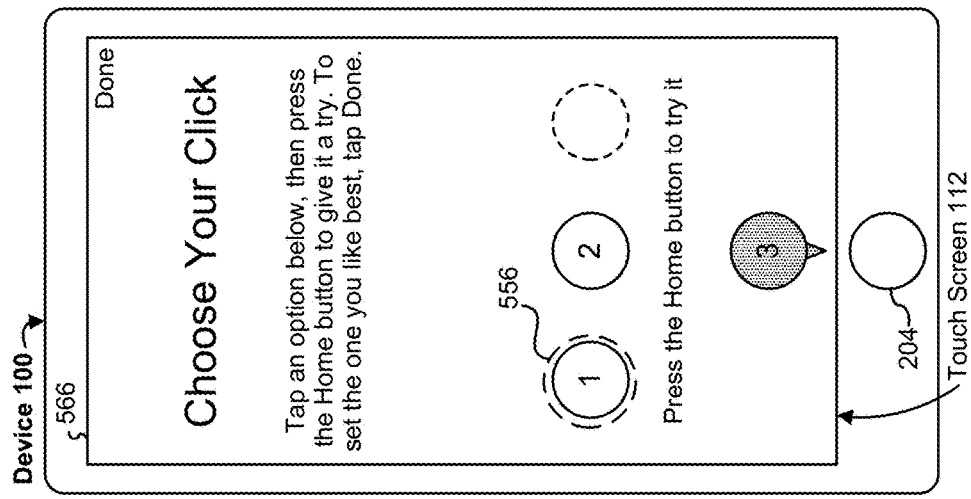
Figure 5C13

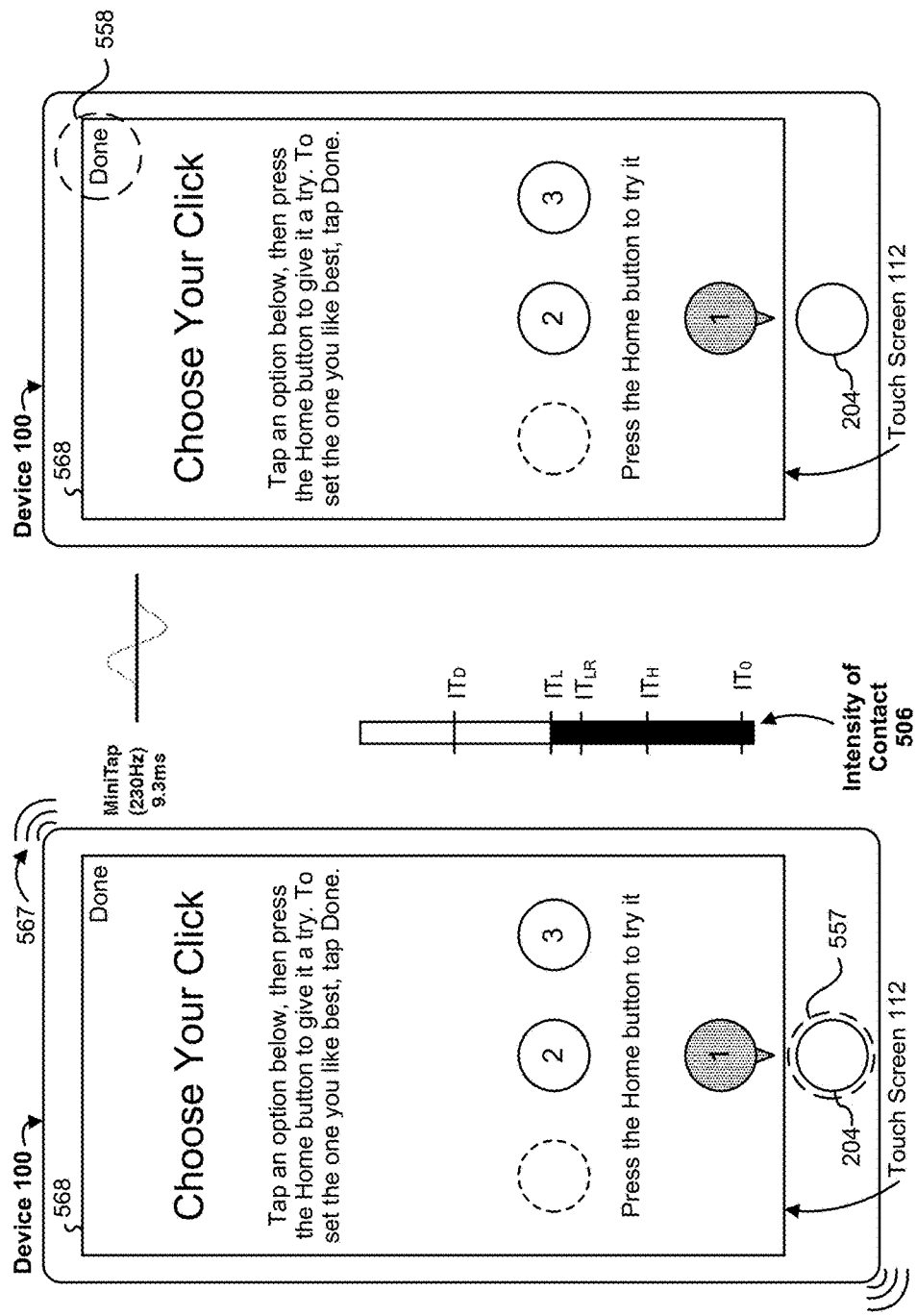

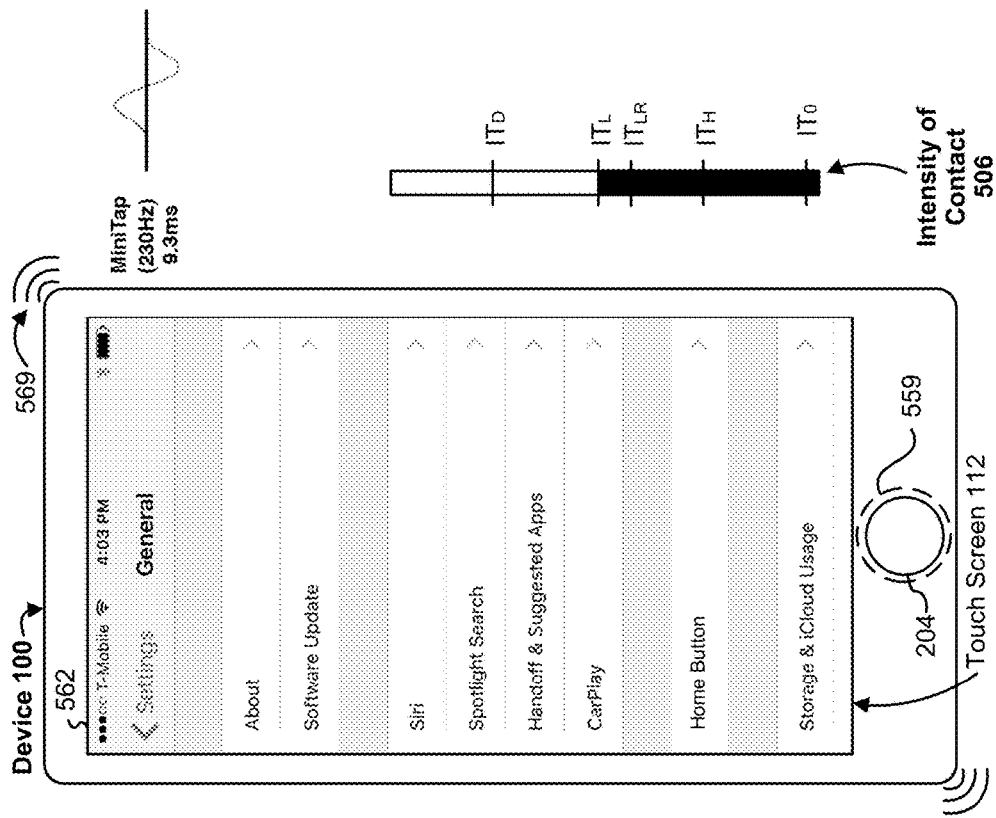
Figure 5C18
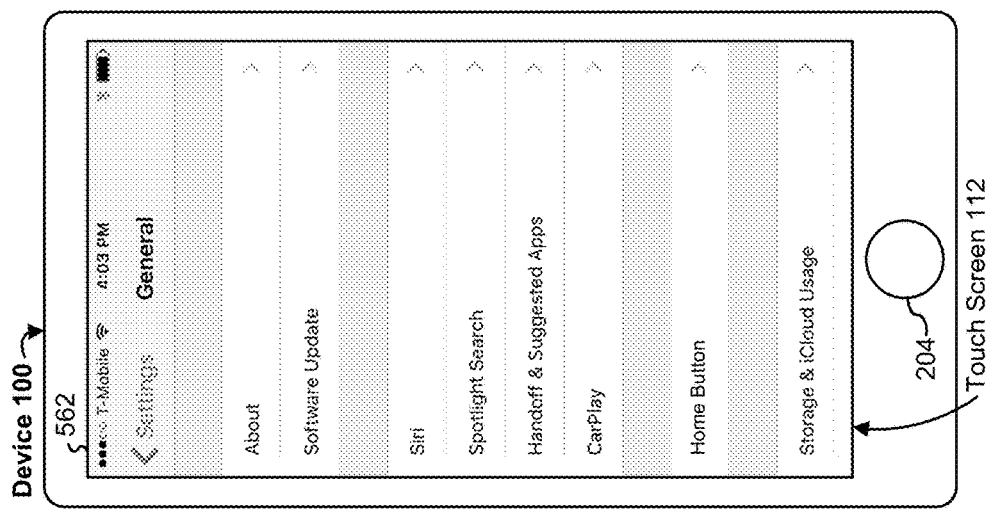
Figure 5C17

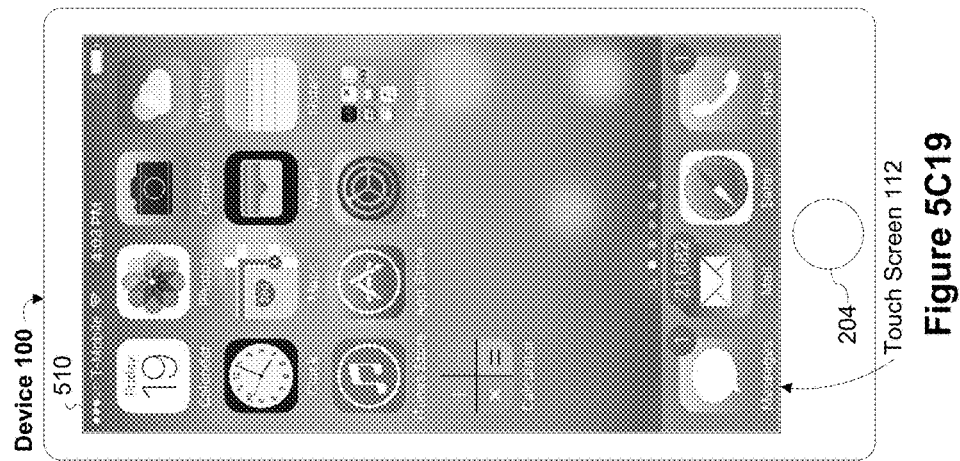

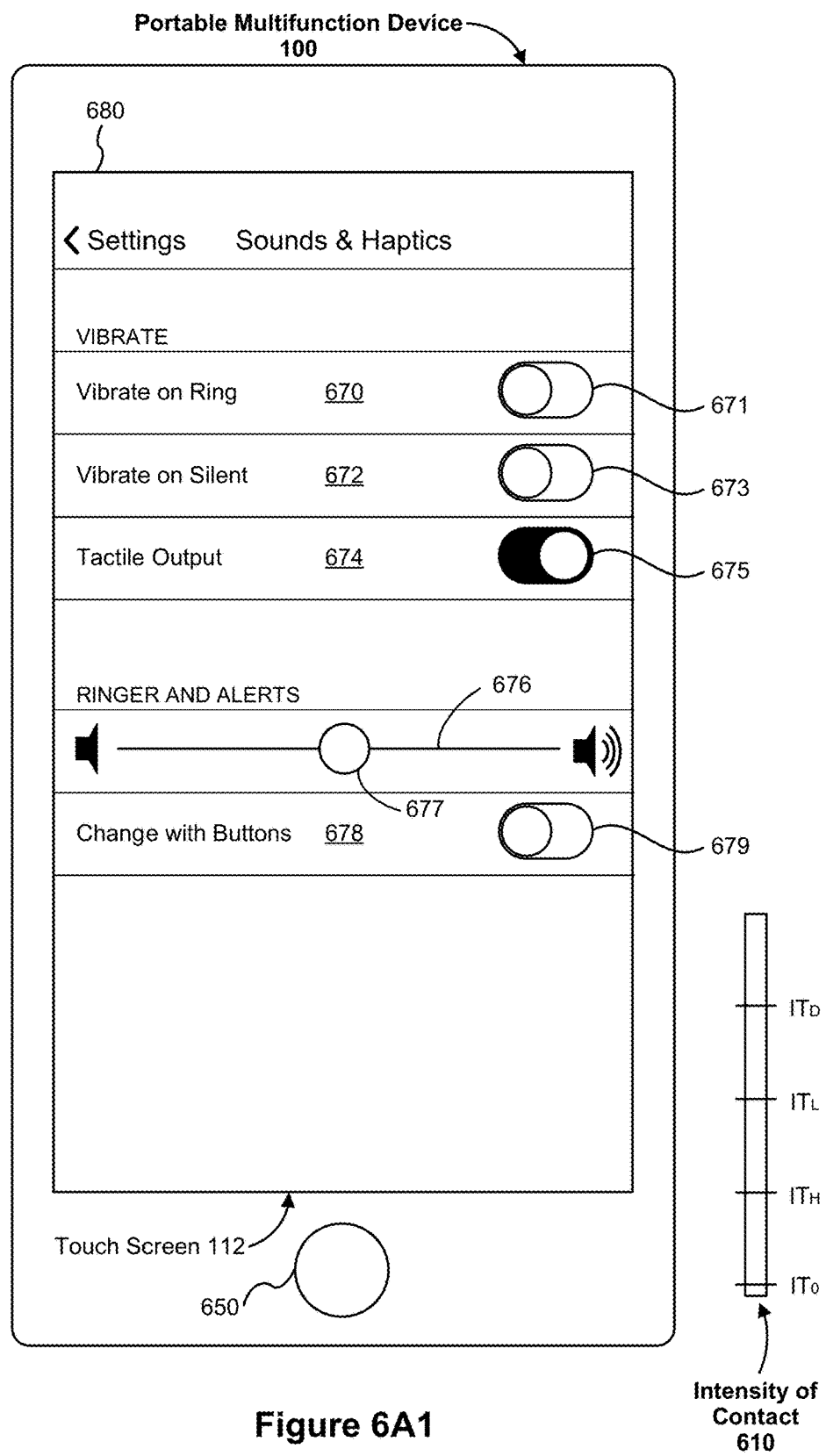
Figure 6A1

Figure 6A2

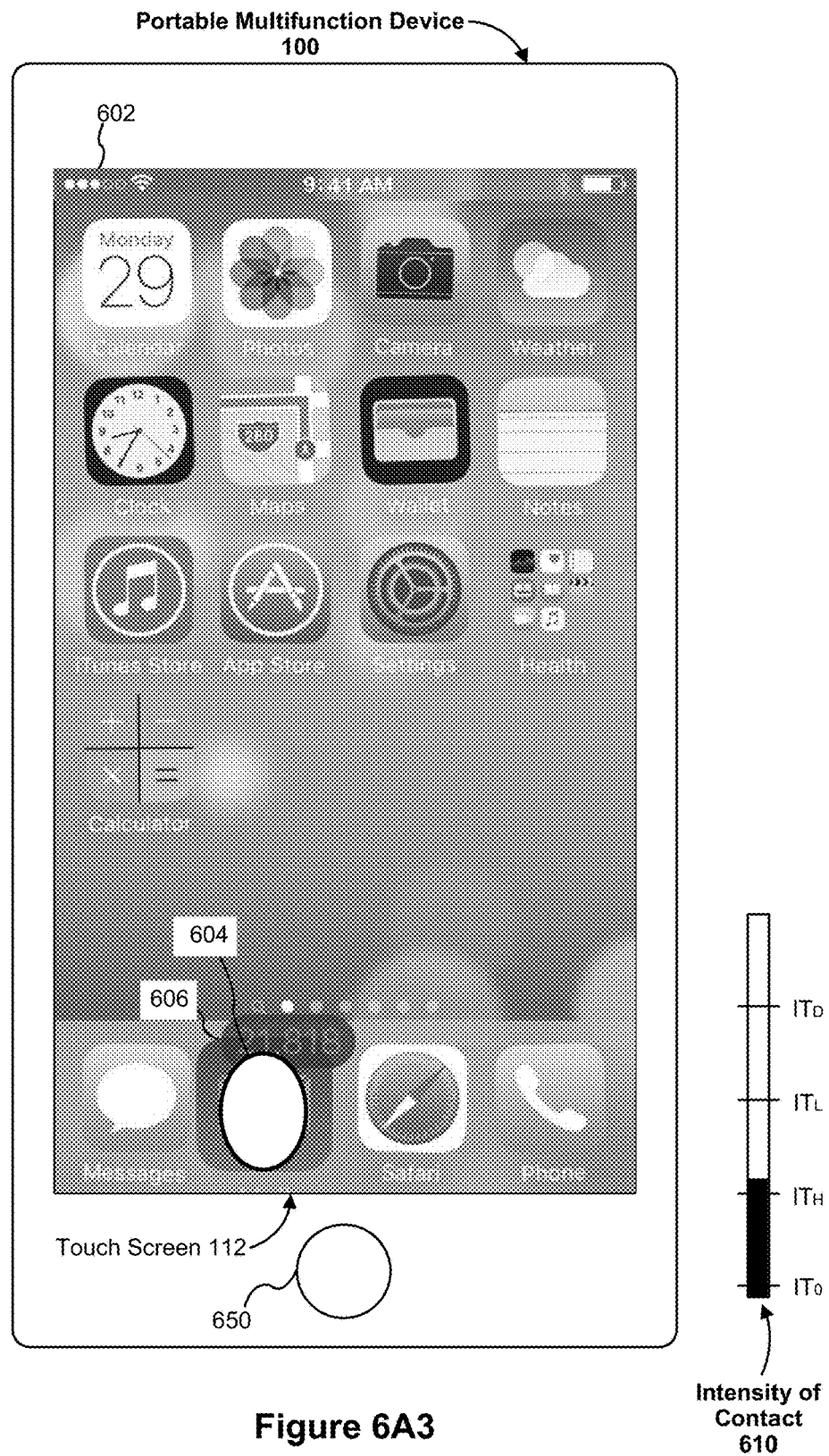
Figure 6A3

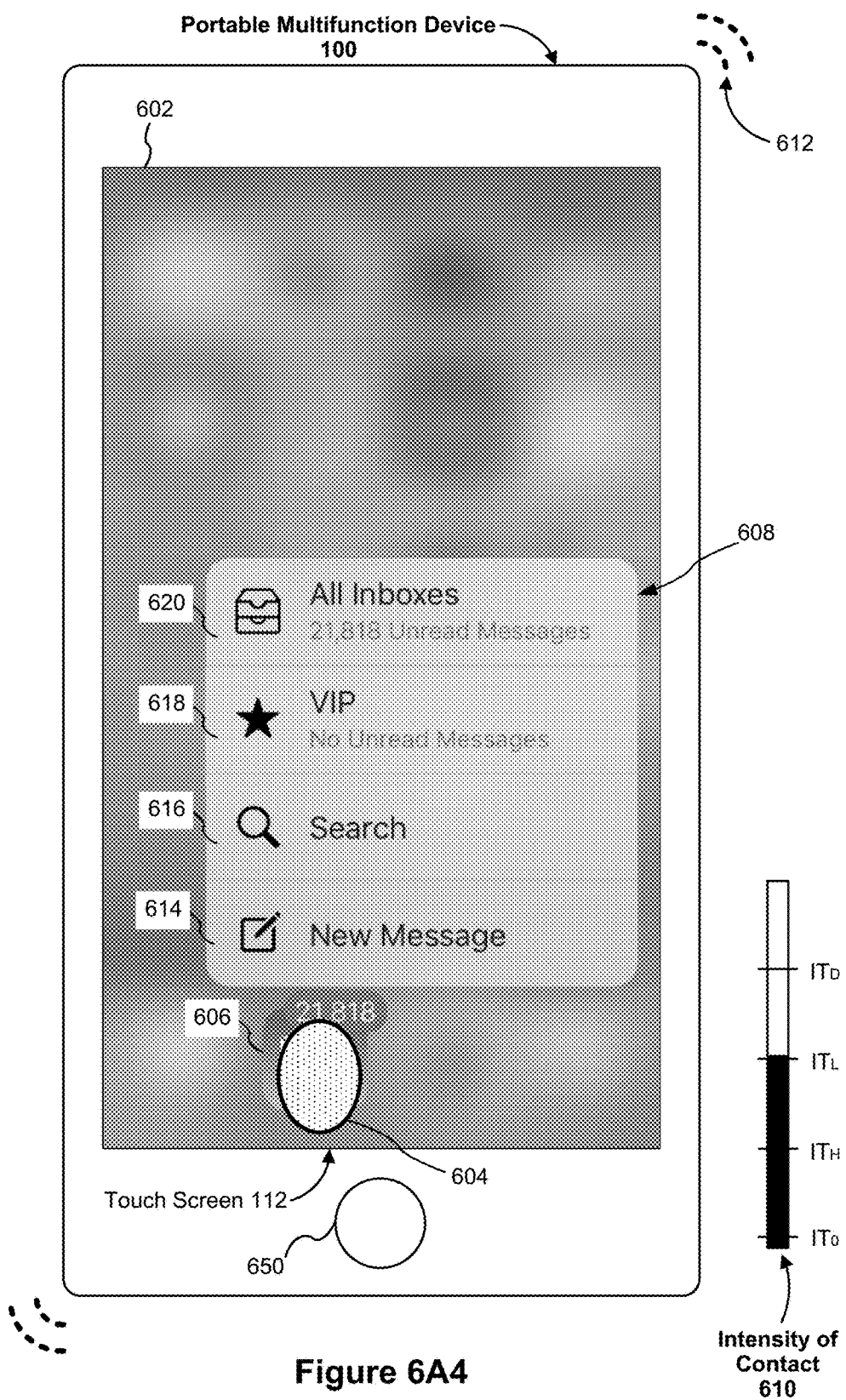
Figure 6A4

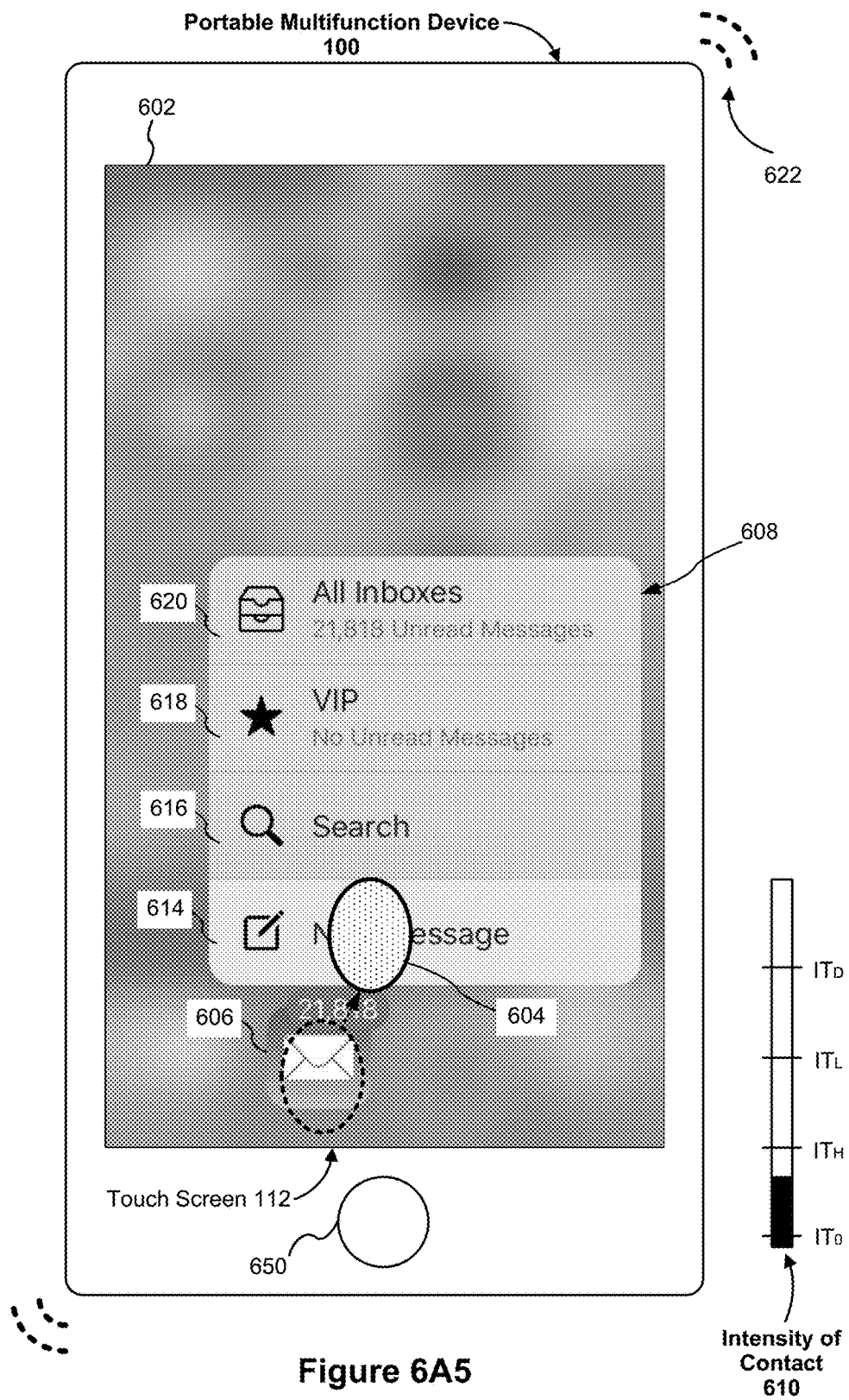
Figure 6A5

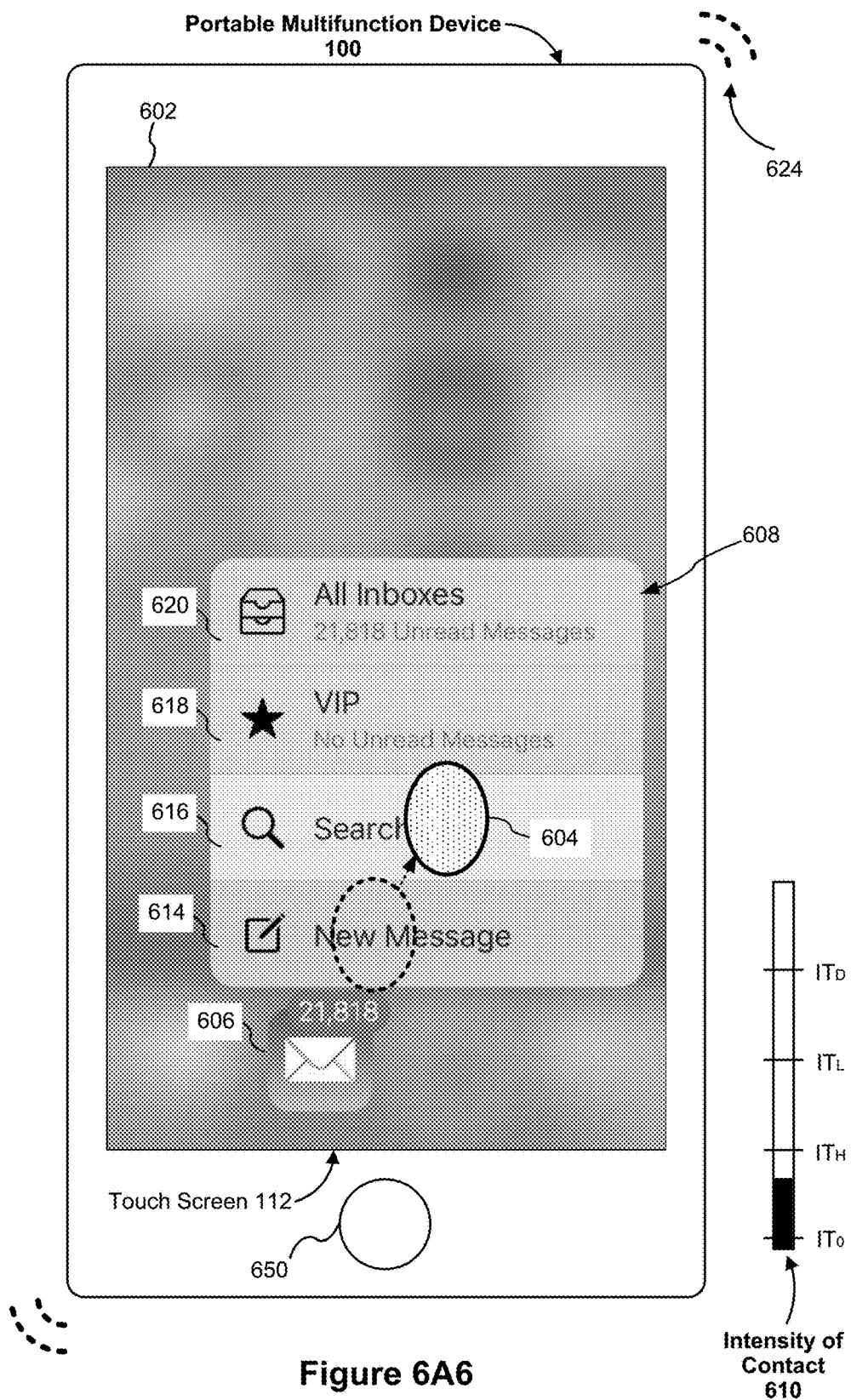
Figure 6A6

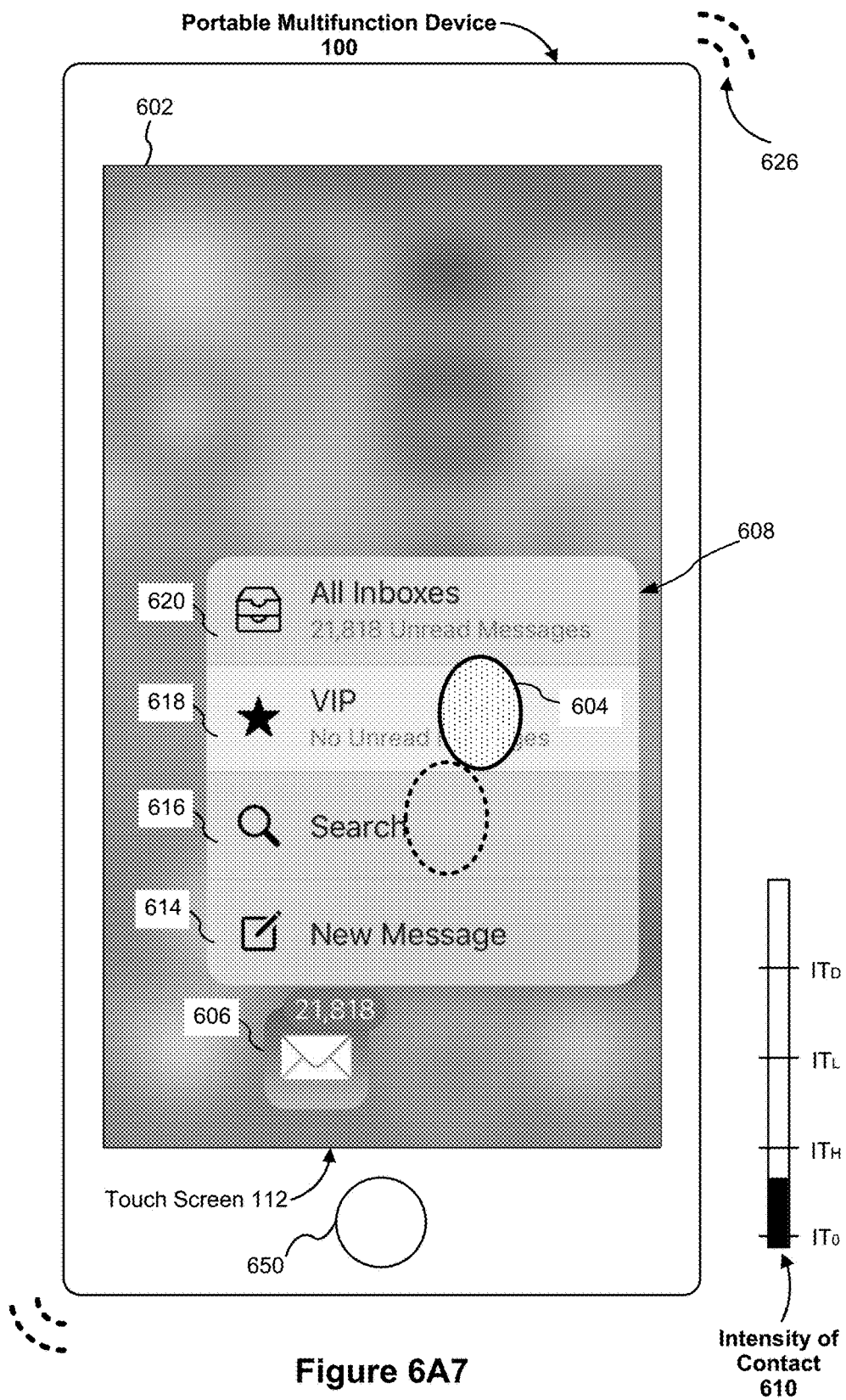
Figure 6A7

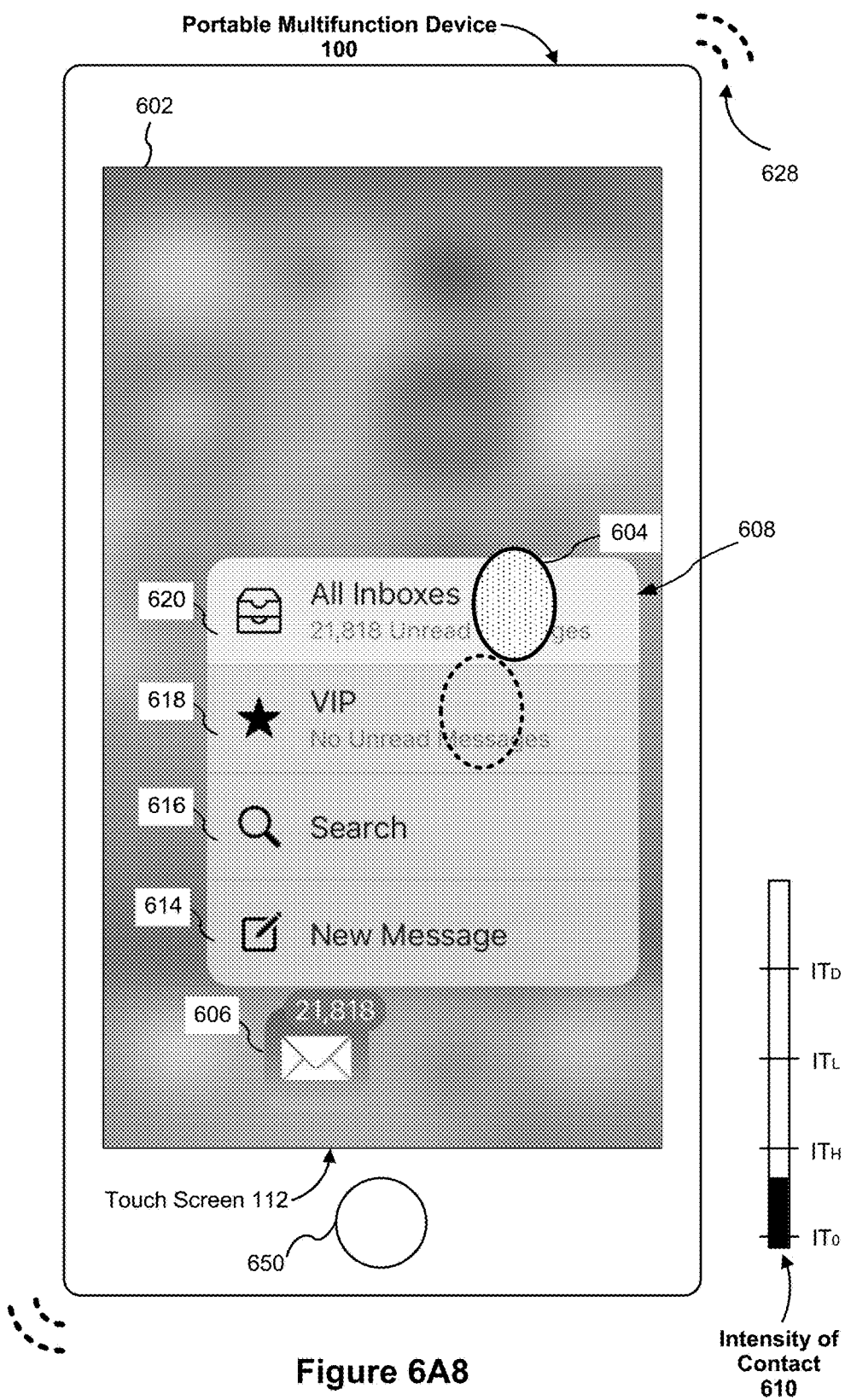
Figure 6A8

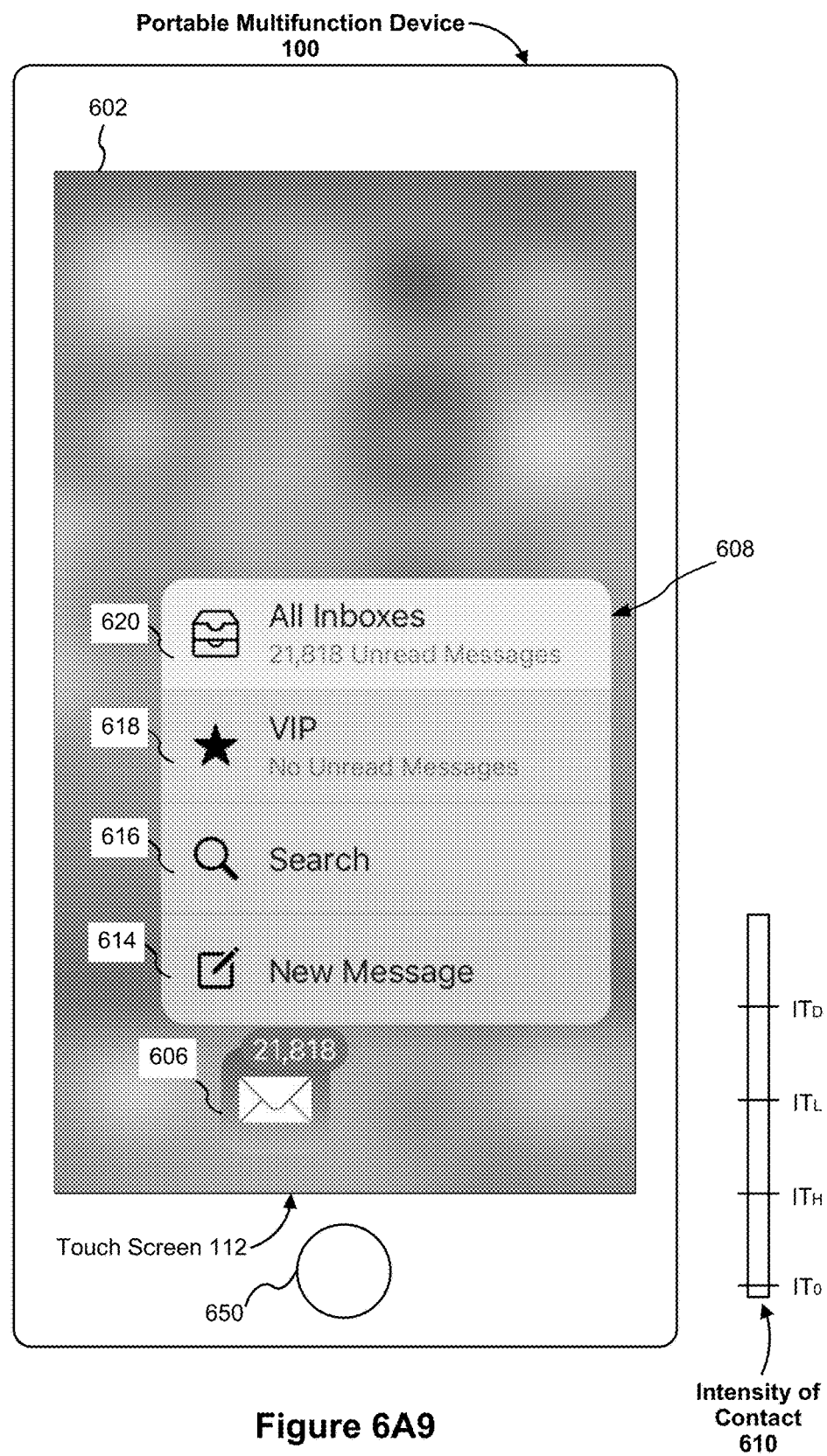
Figure 6A9

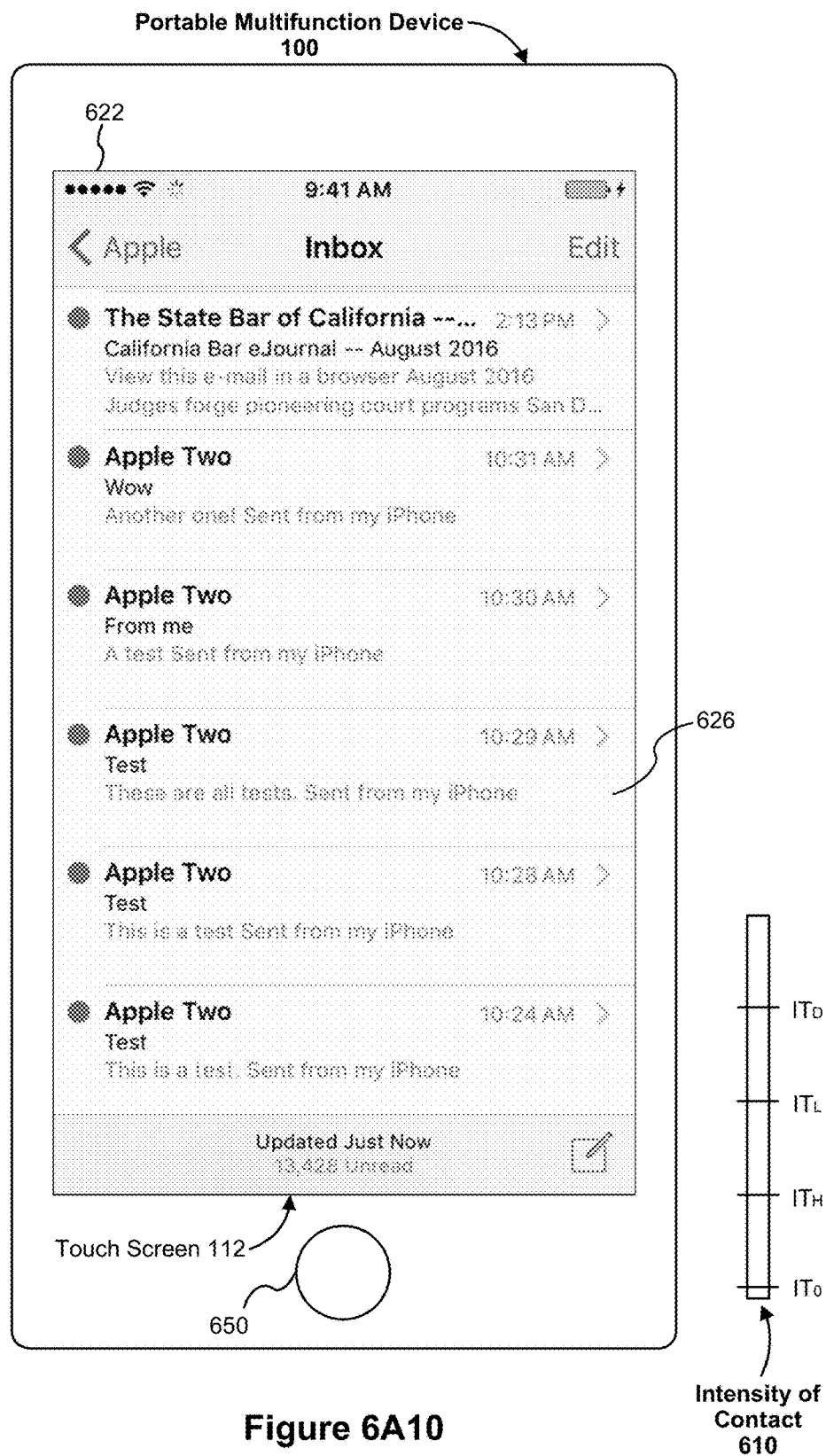
Figure 6A10

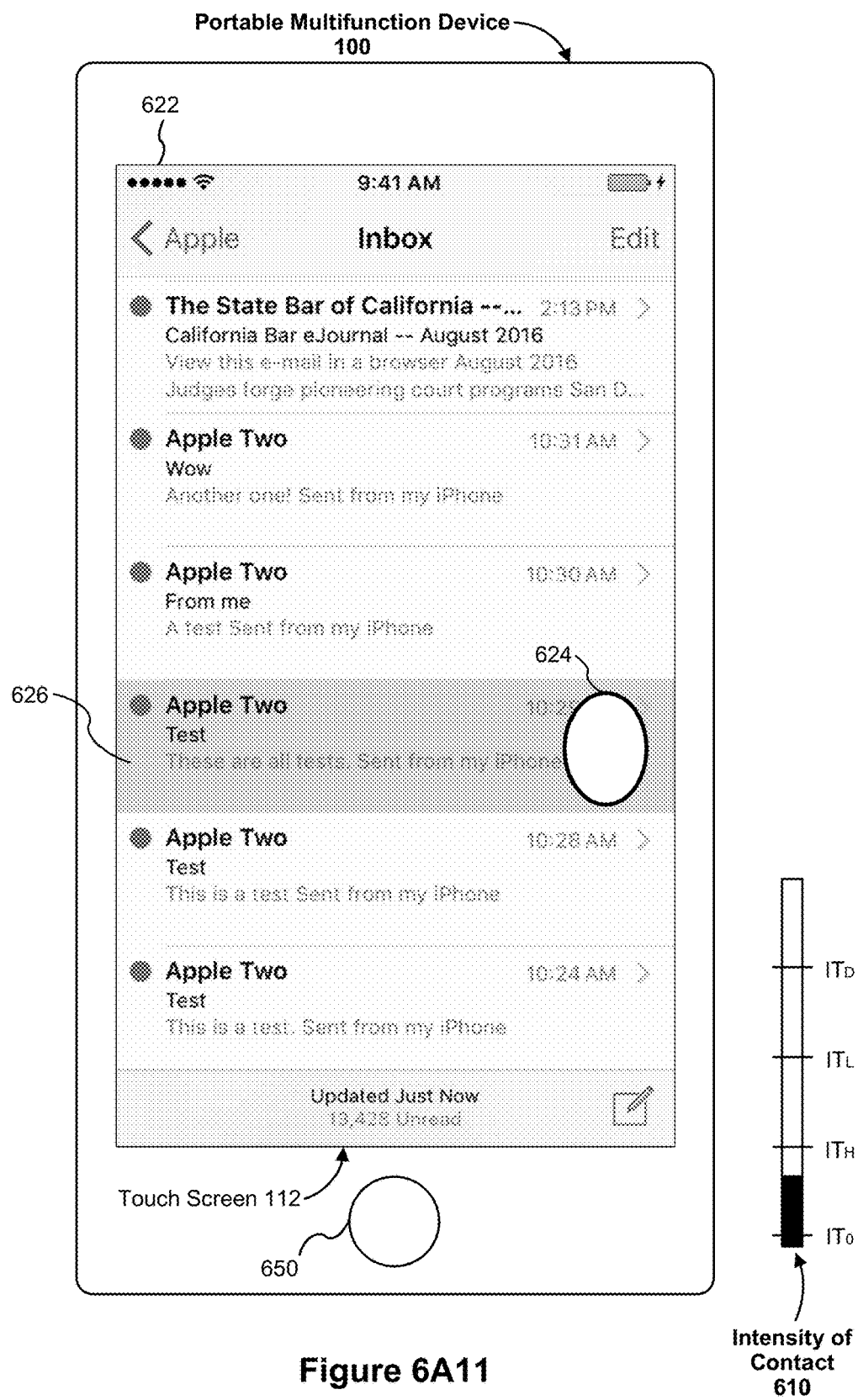
Figure 6A11

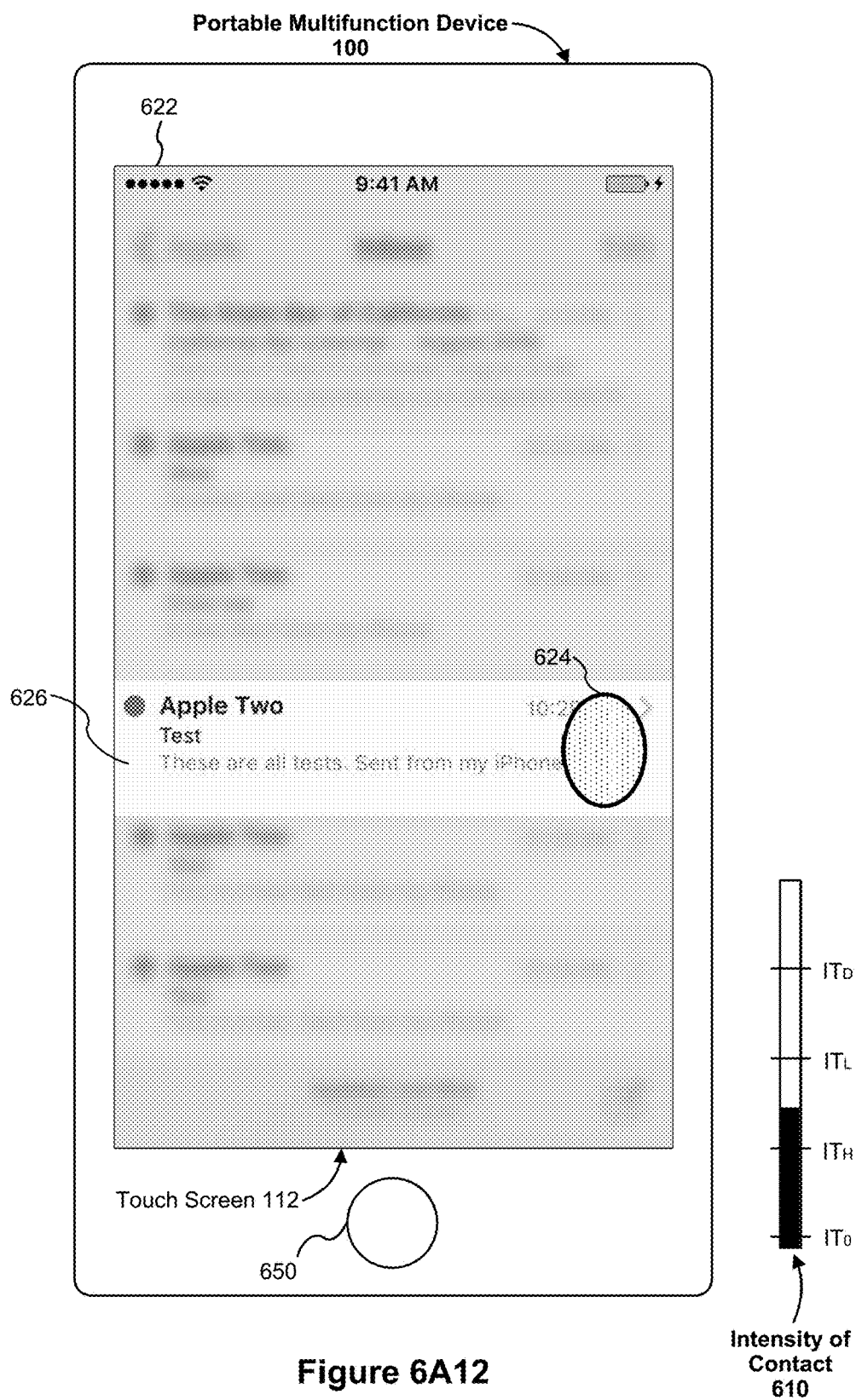
Figure 6A12

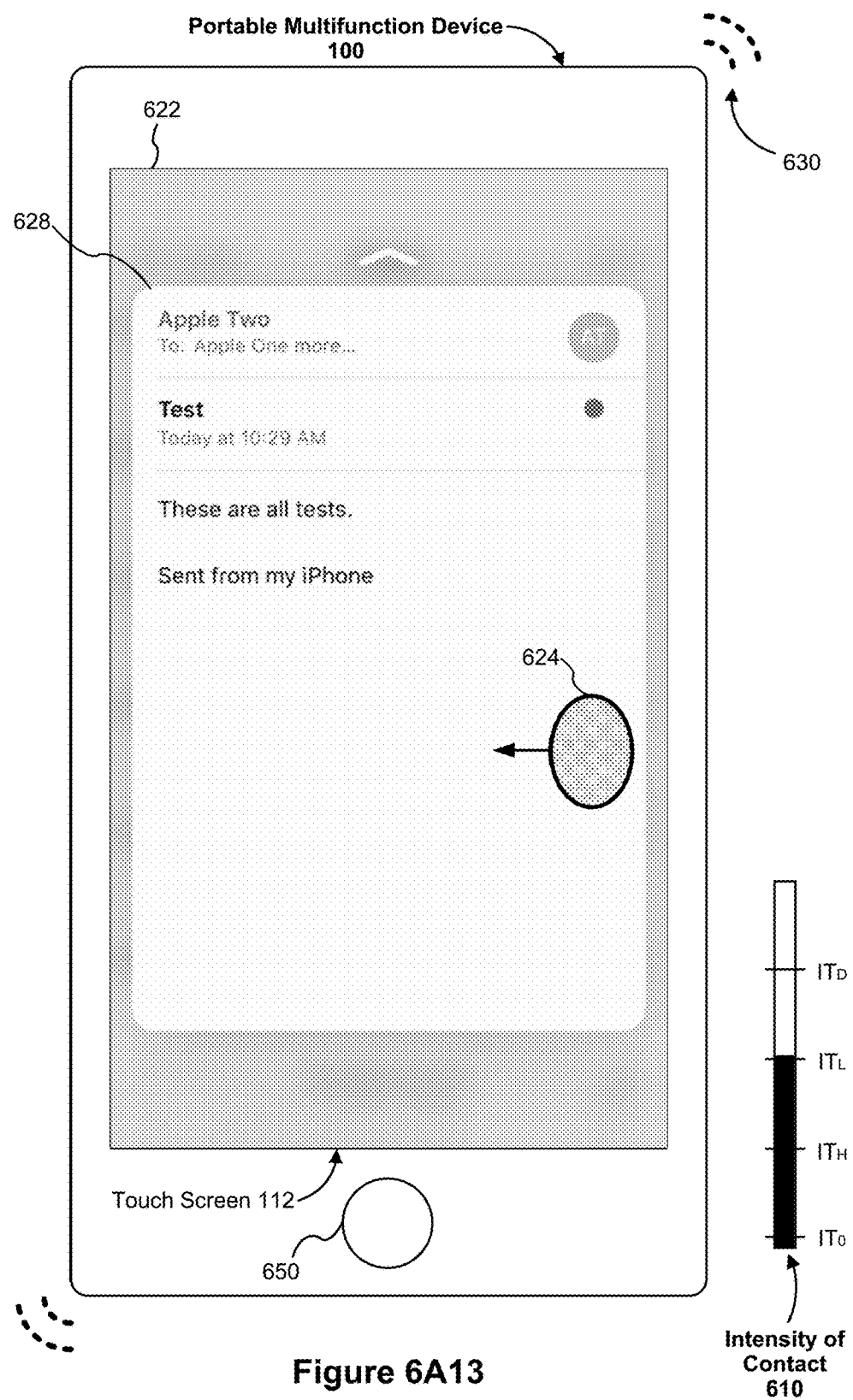
Figure 6A13

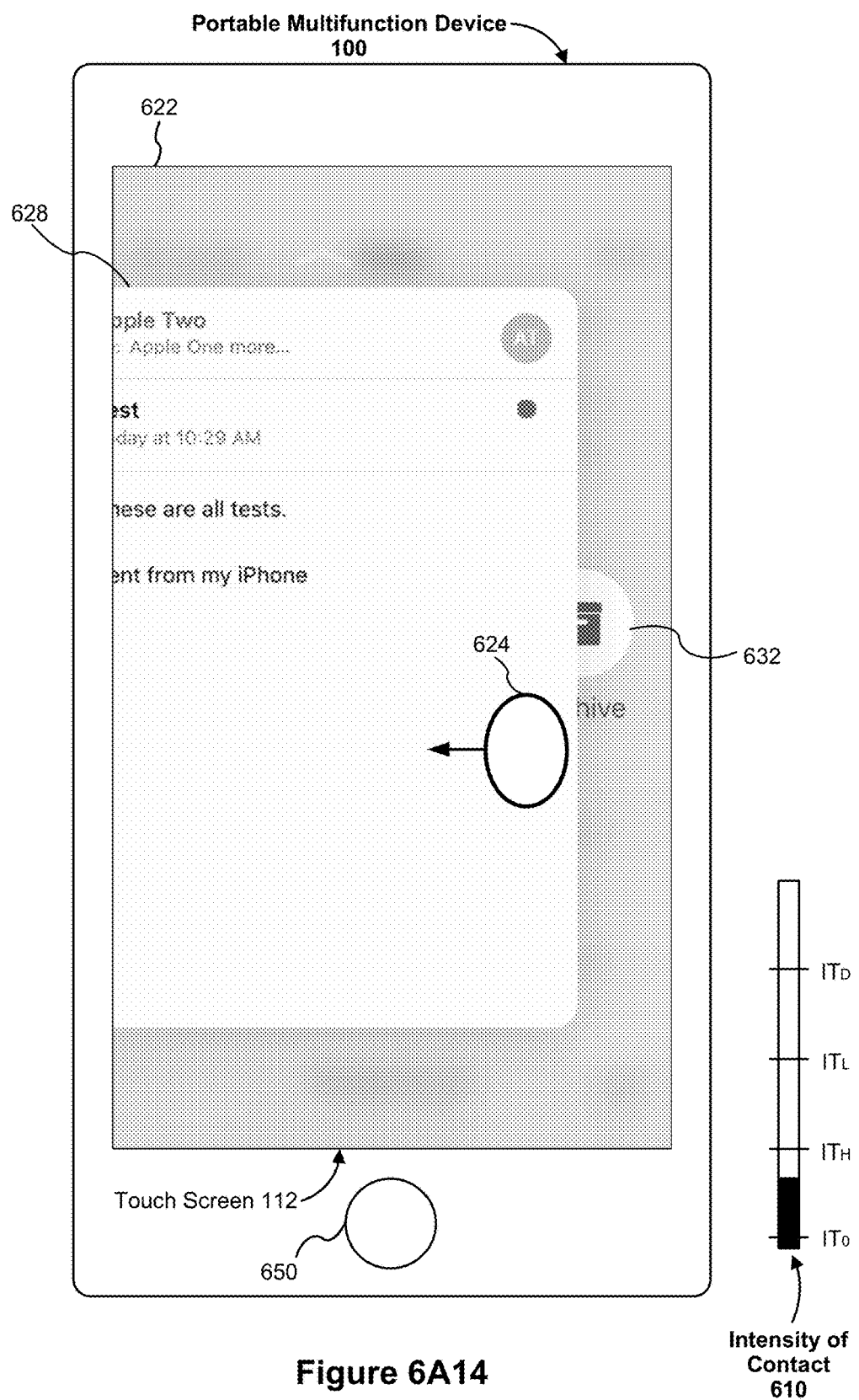
Figure 6A14

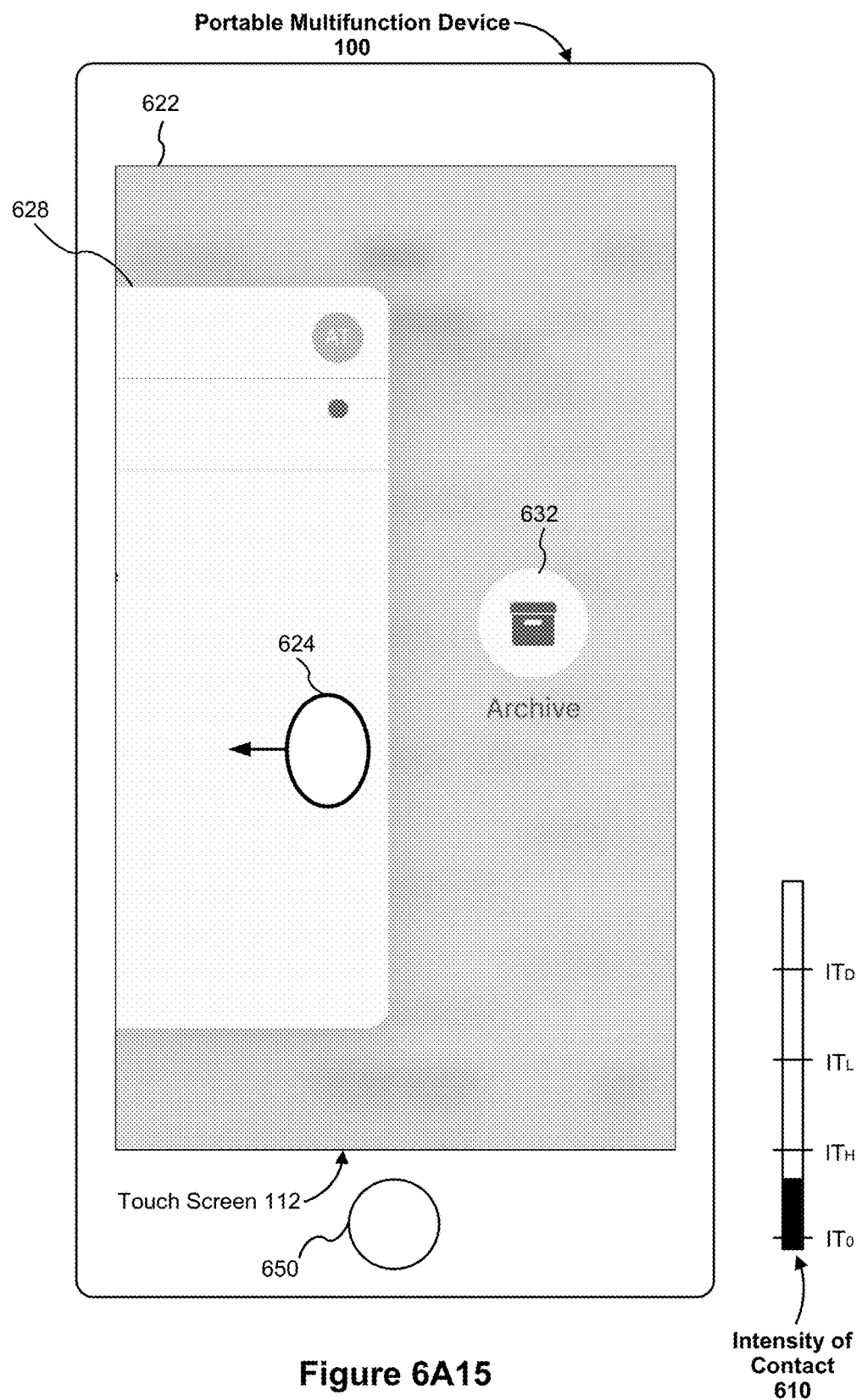
Figure 6A15

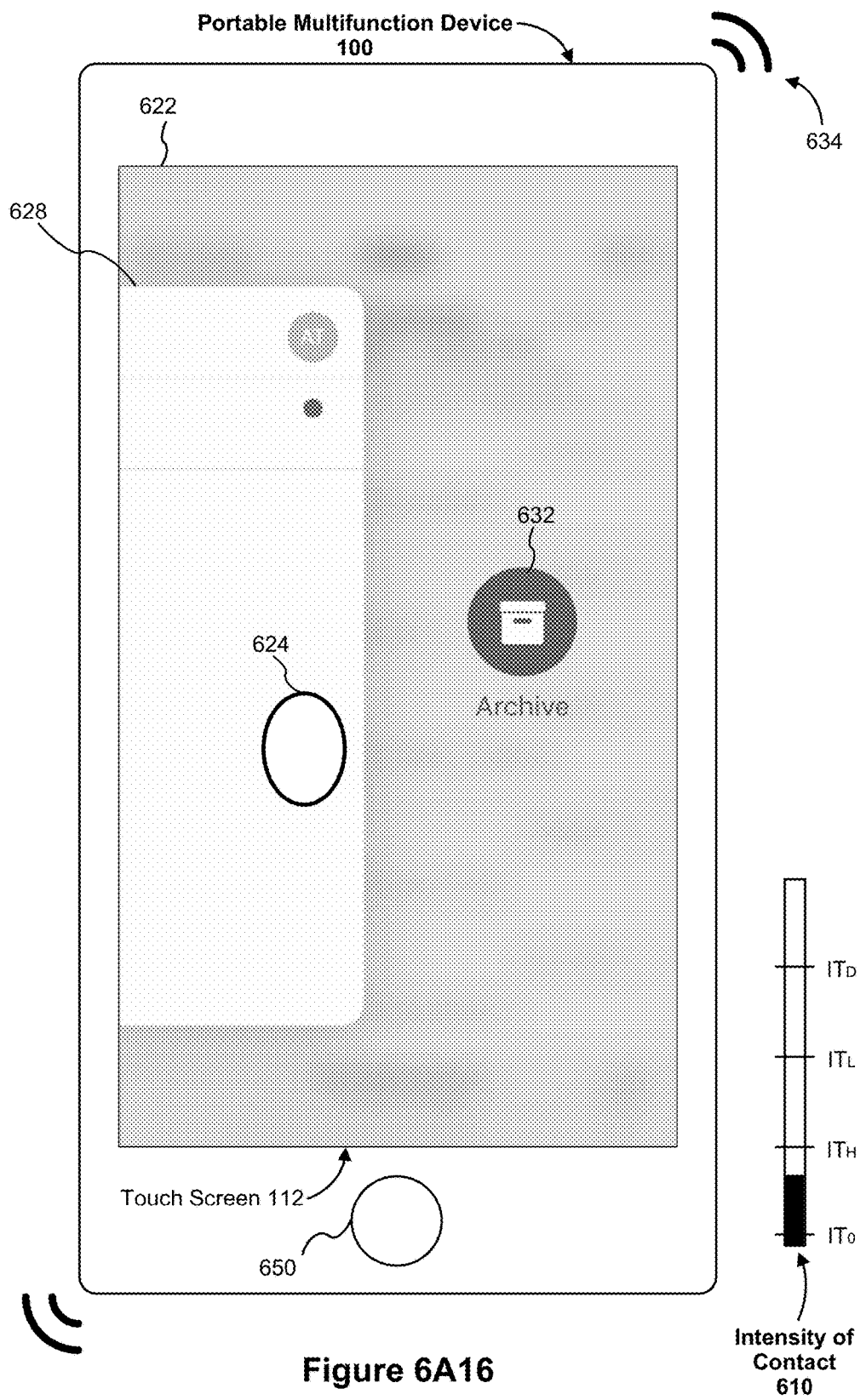
Figure 6A16

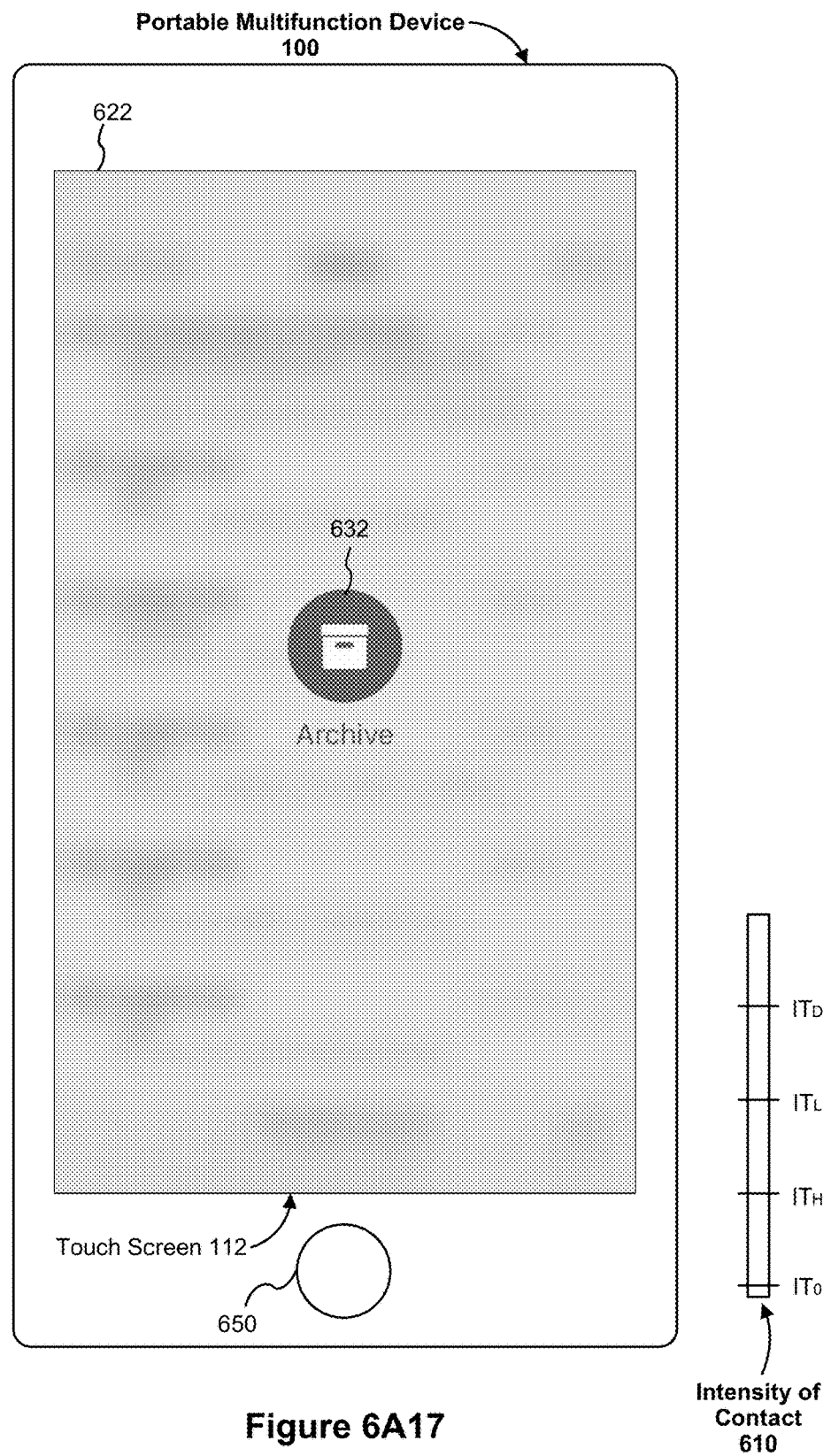
Figure 6A17

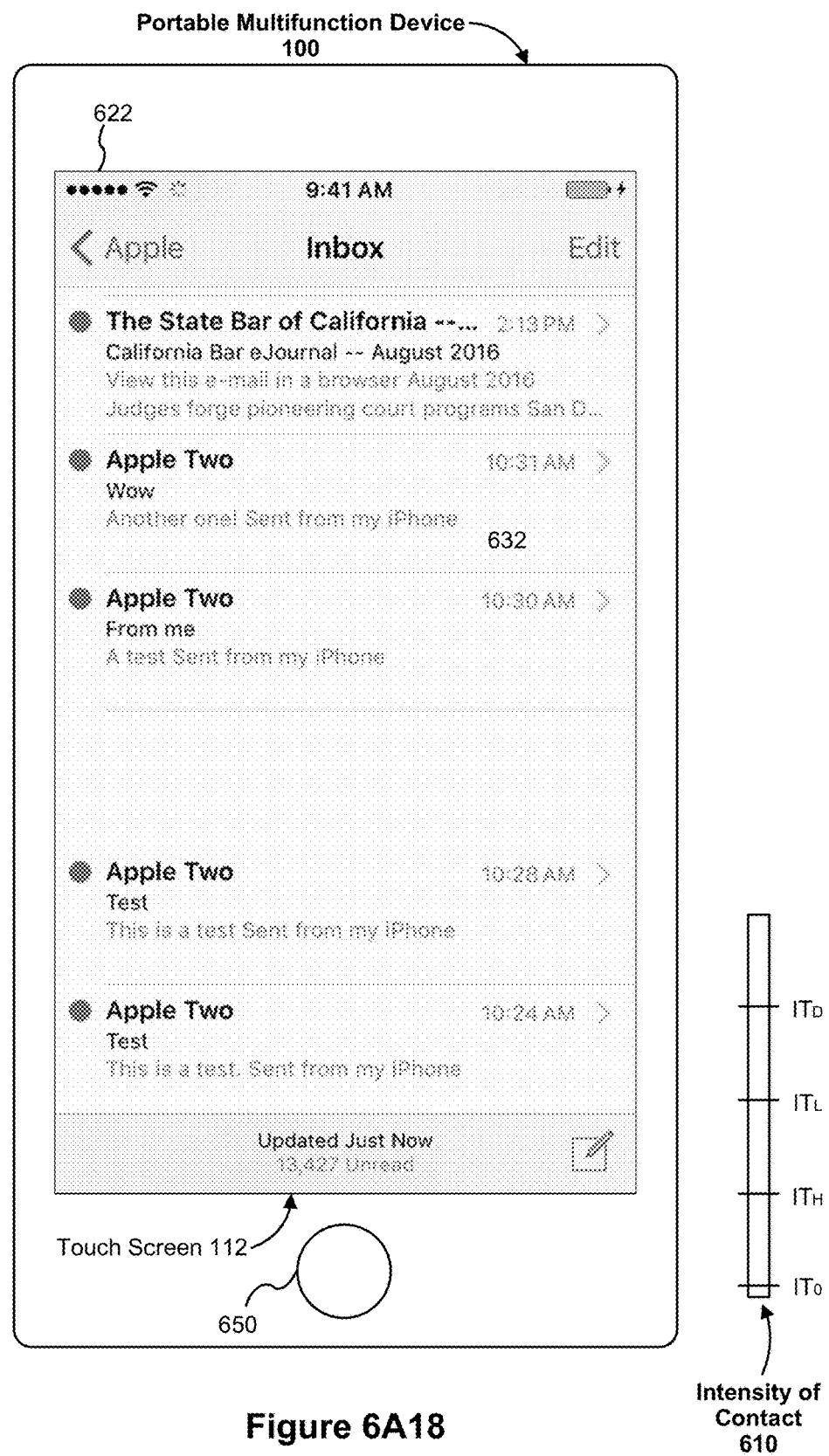
Figure 6A18

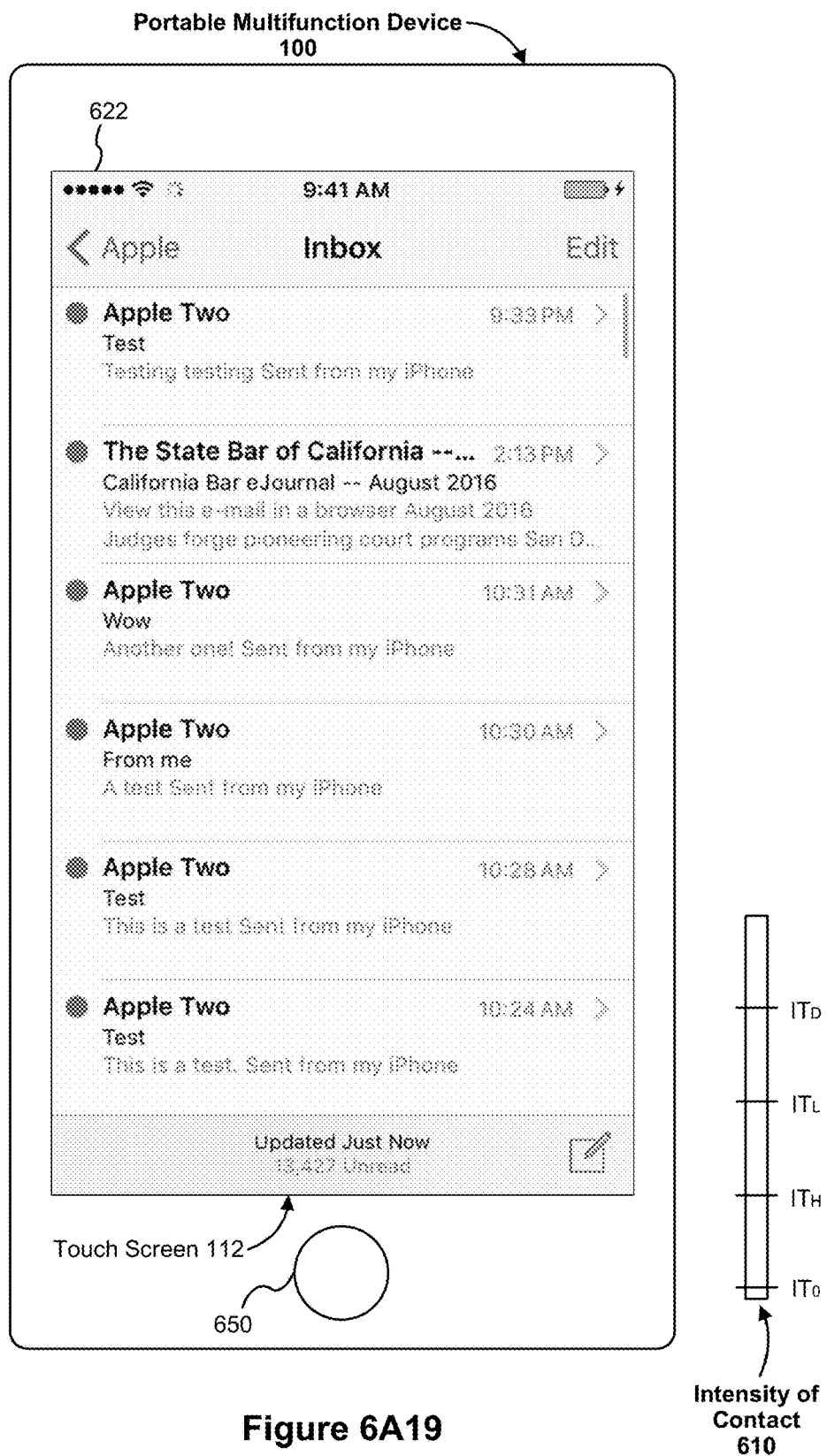
Figure 6A19

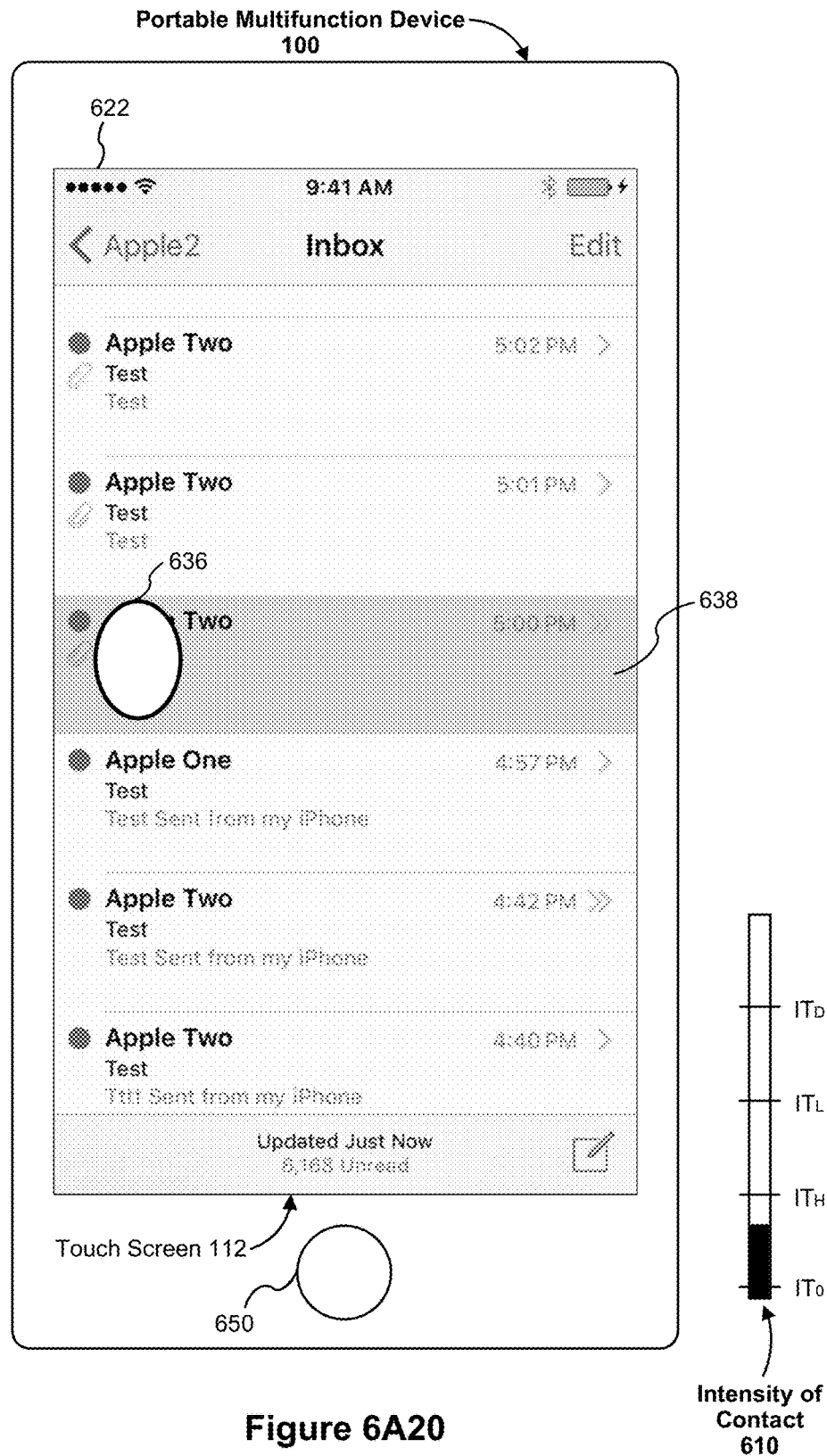
Figure 6A20

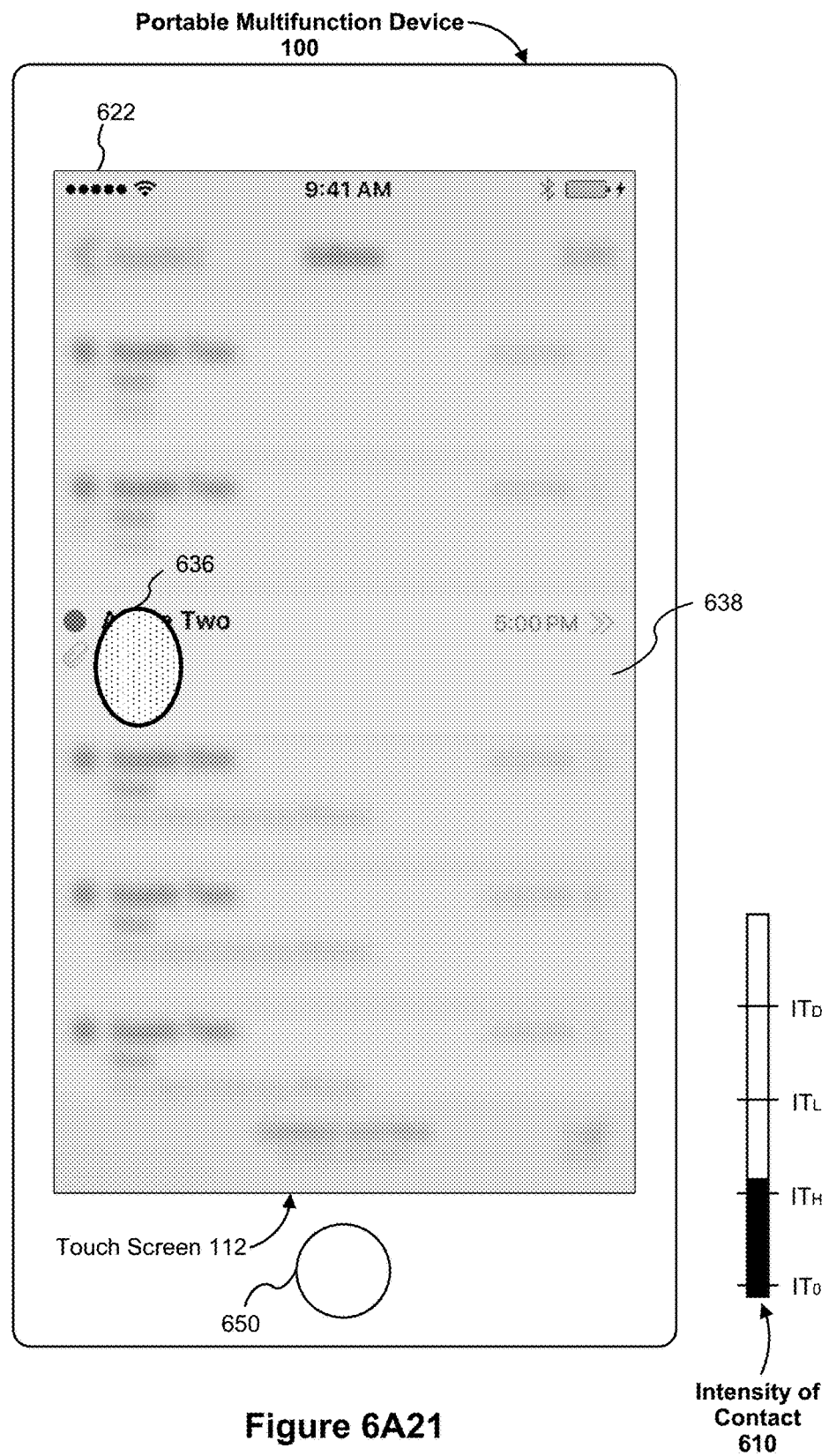
Figure 6A21

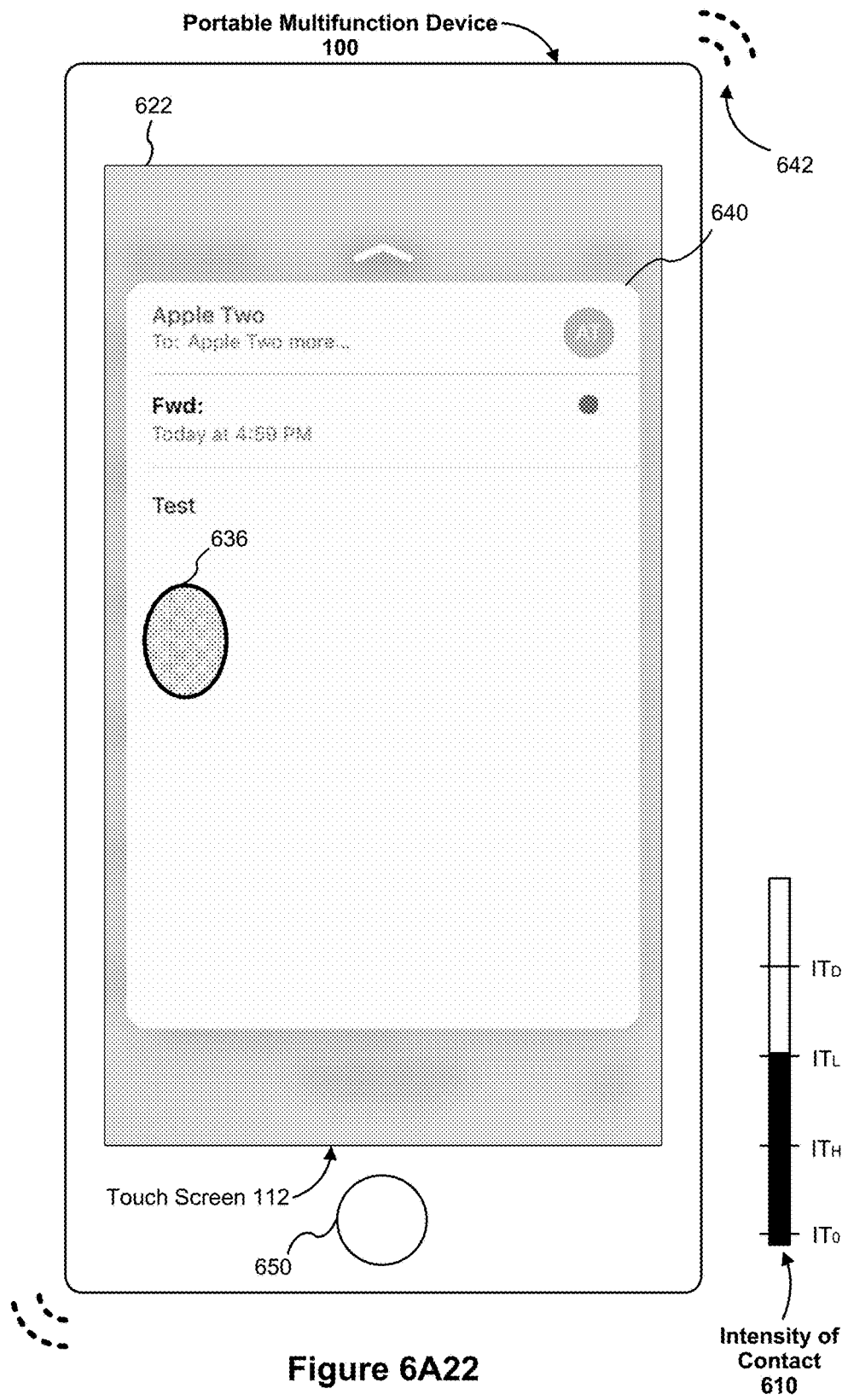
Figure 6A22

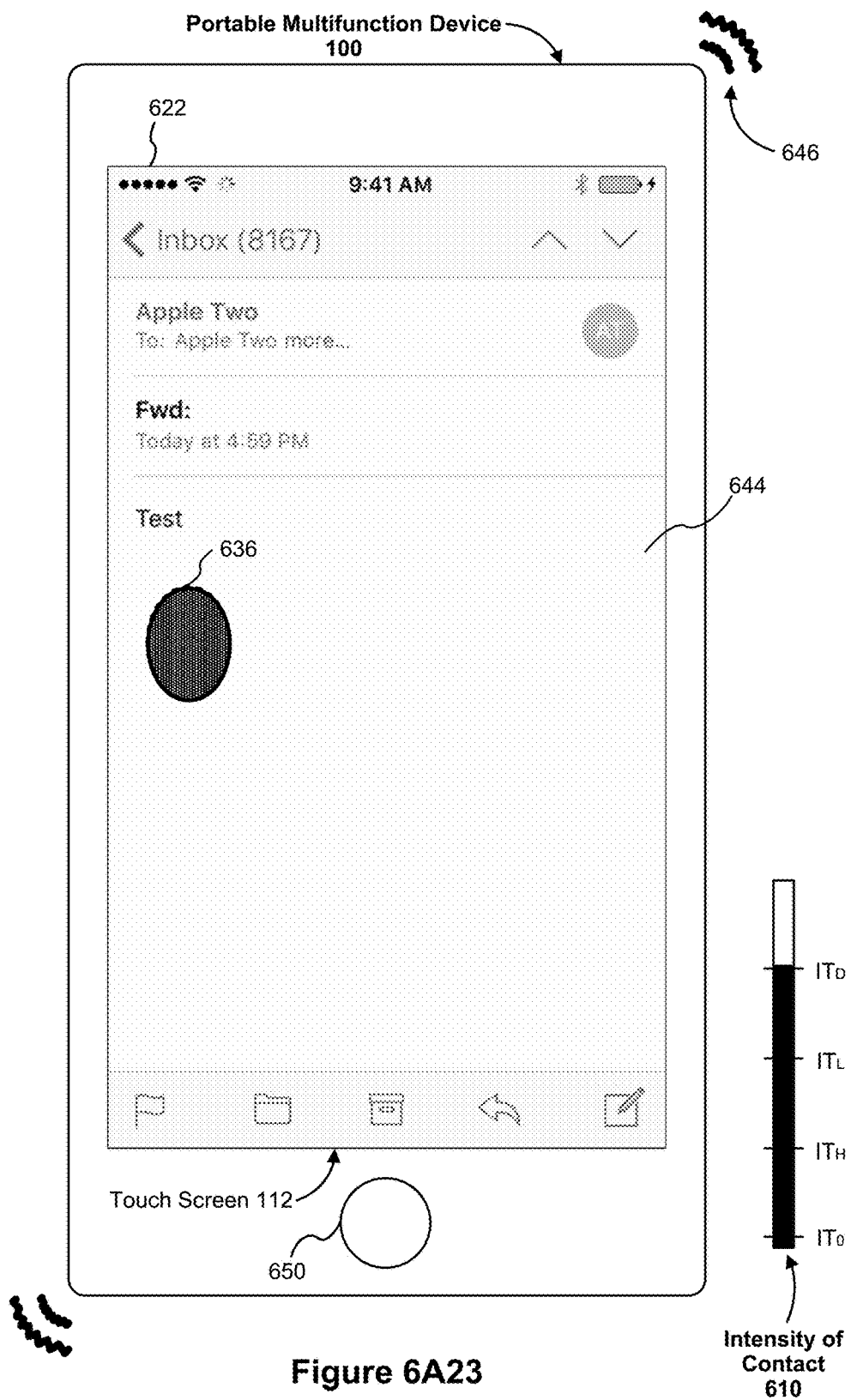
Figure 6A23

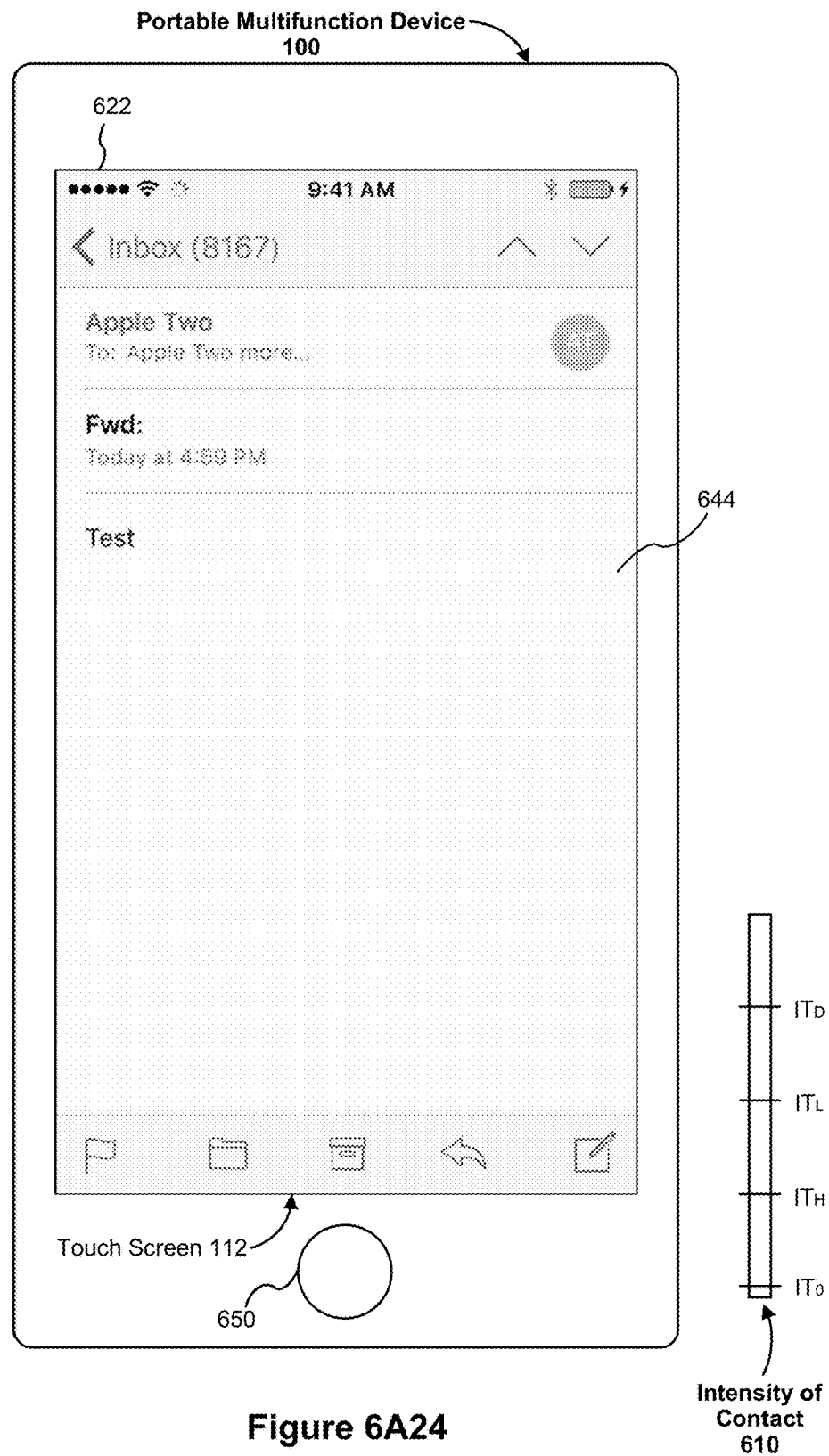
Figure 6A24

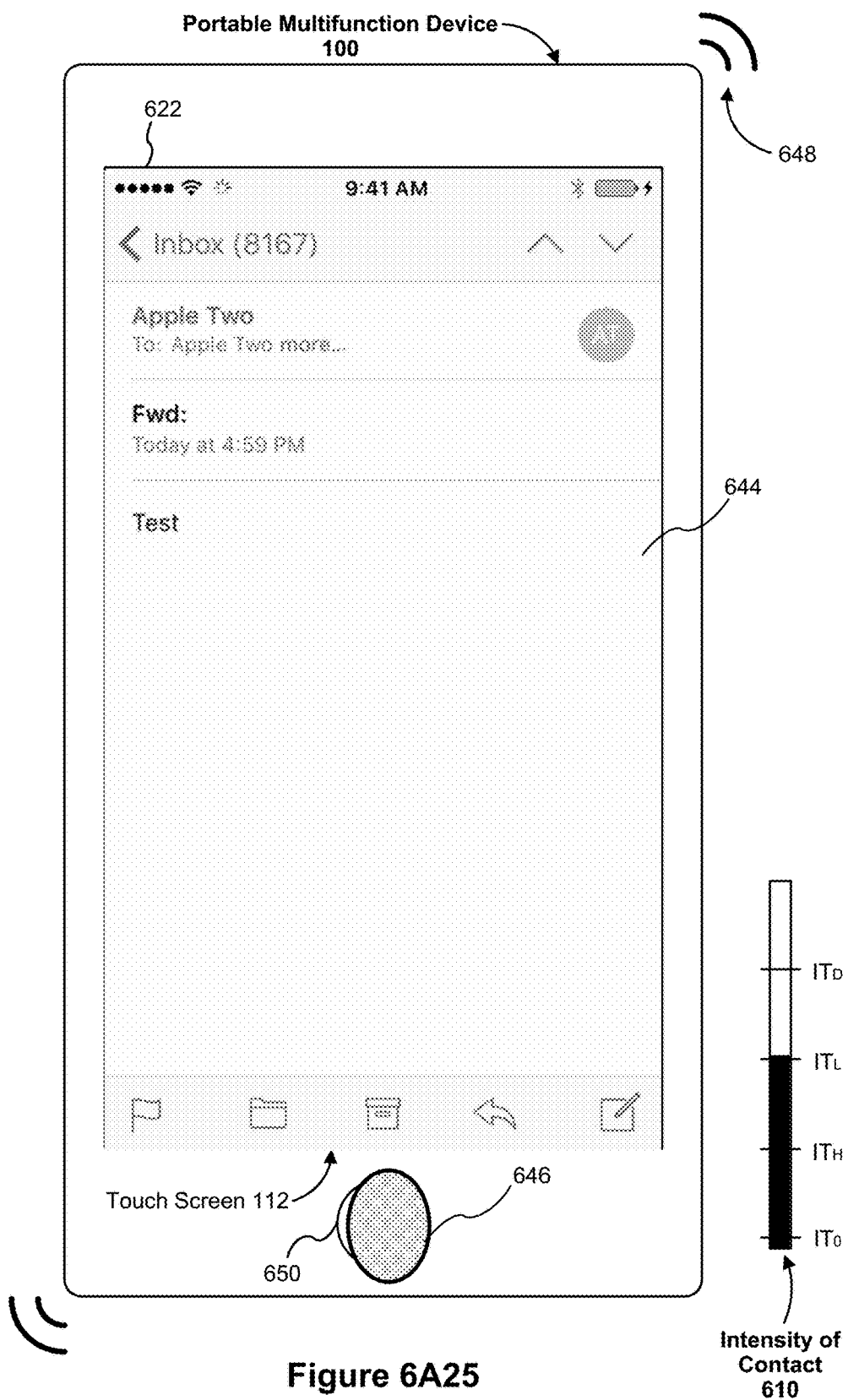
Figure 6A25

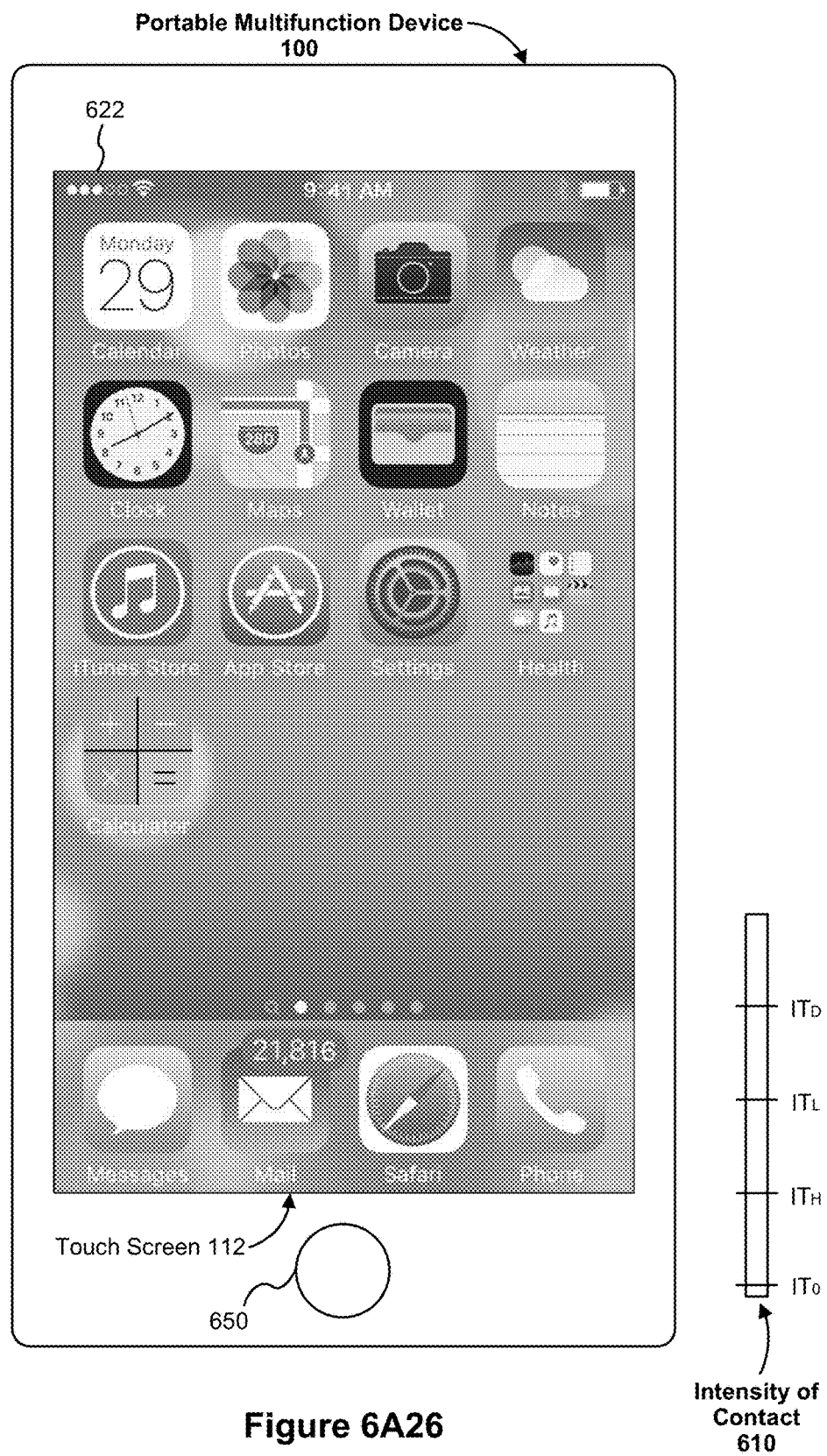
Figure 6A26

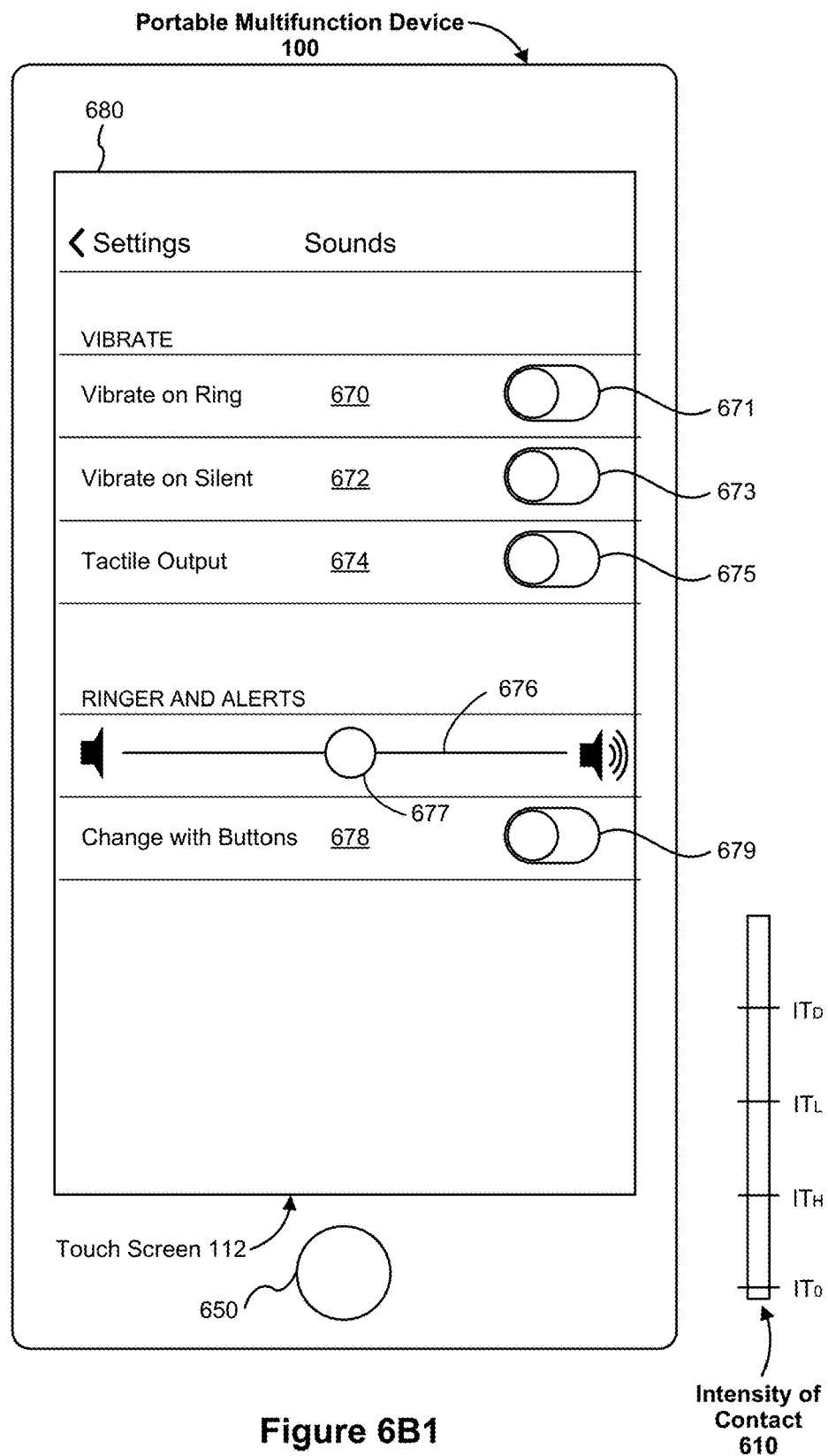
Figure 6B1

Figure 6B2

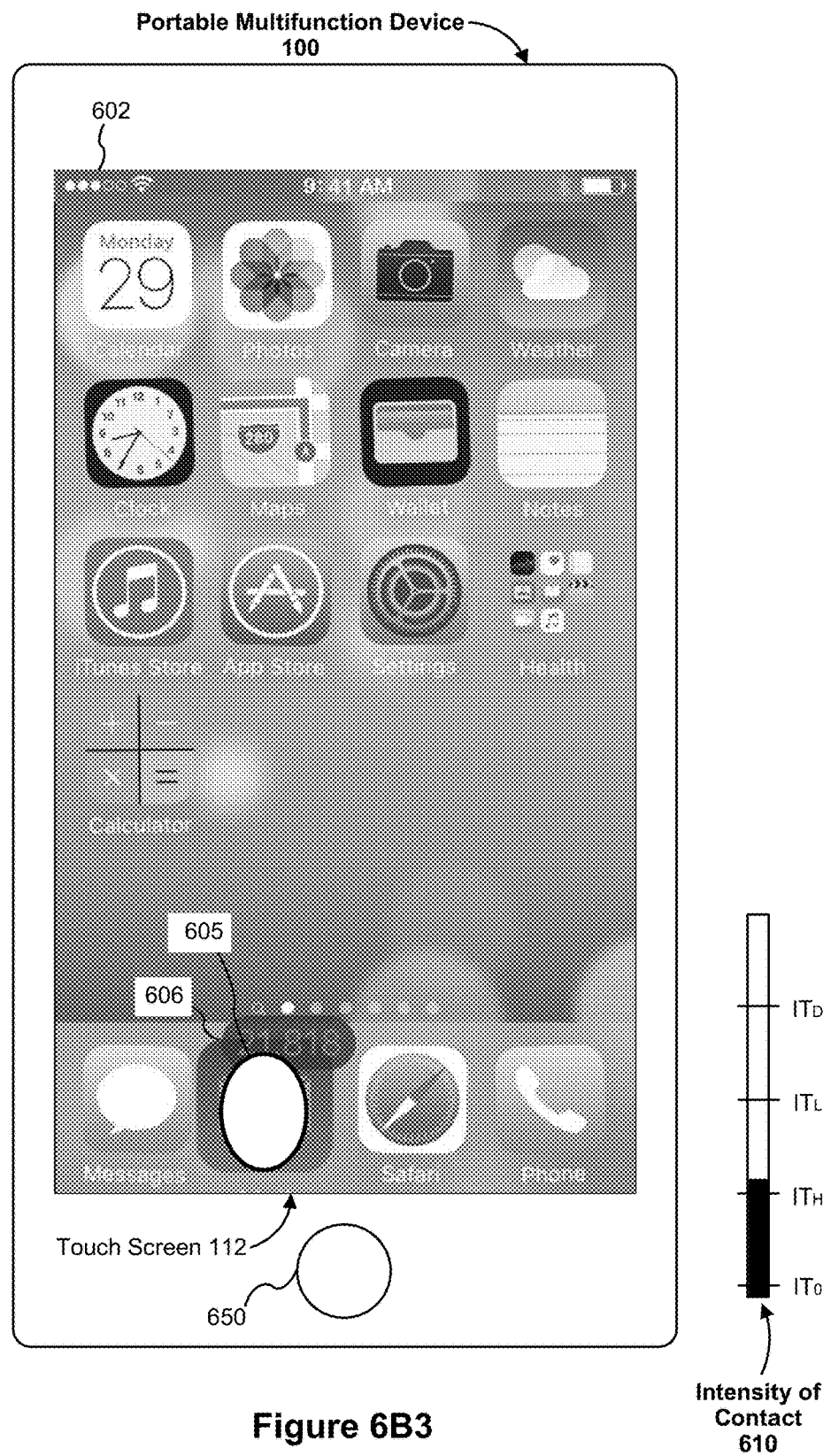
Figure 6B3

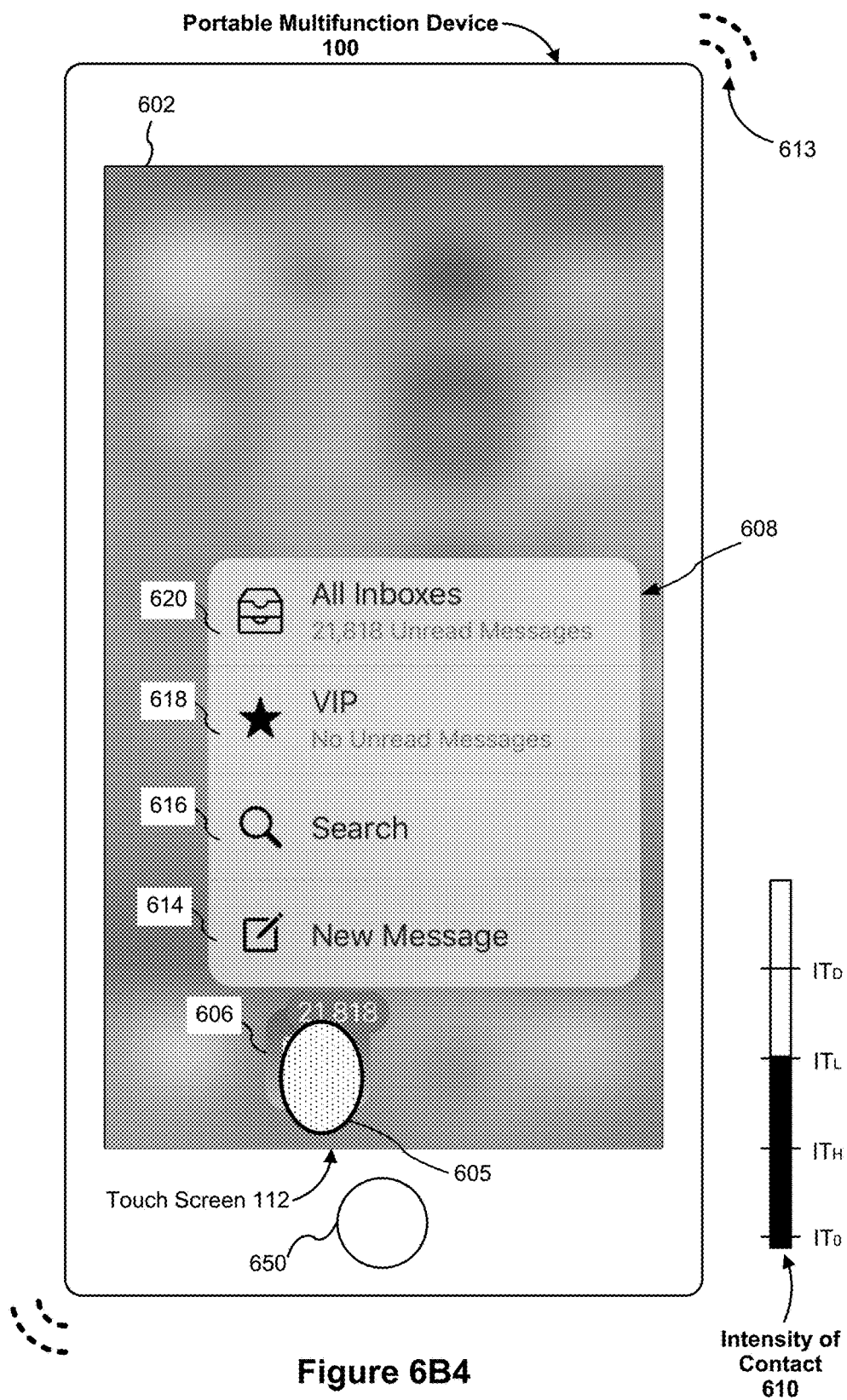
Figure 6B4

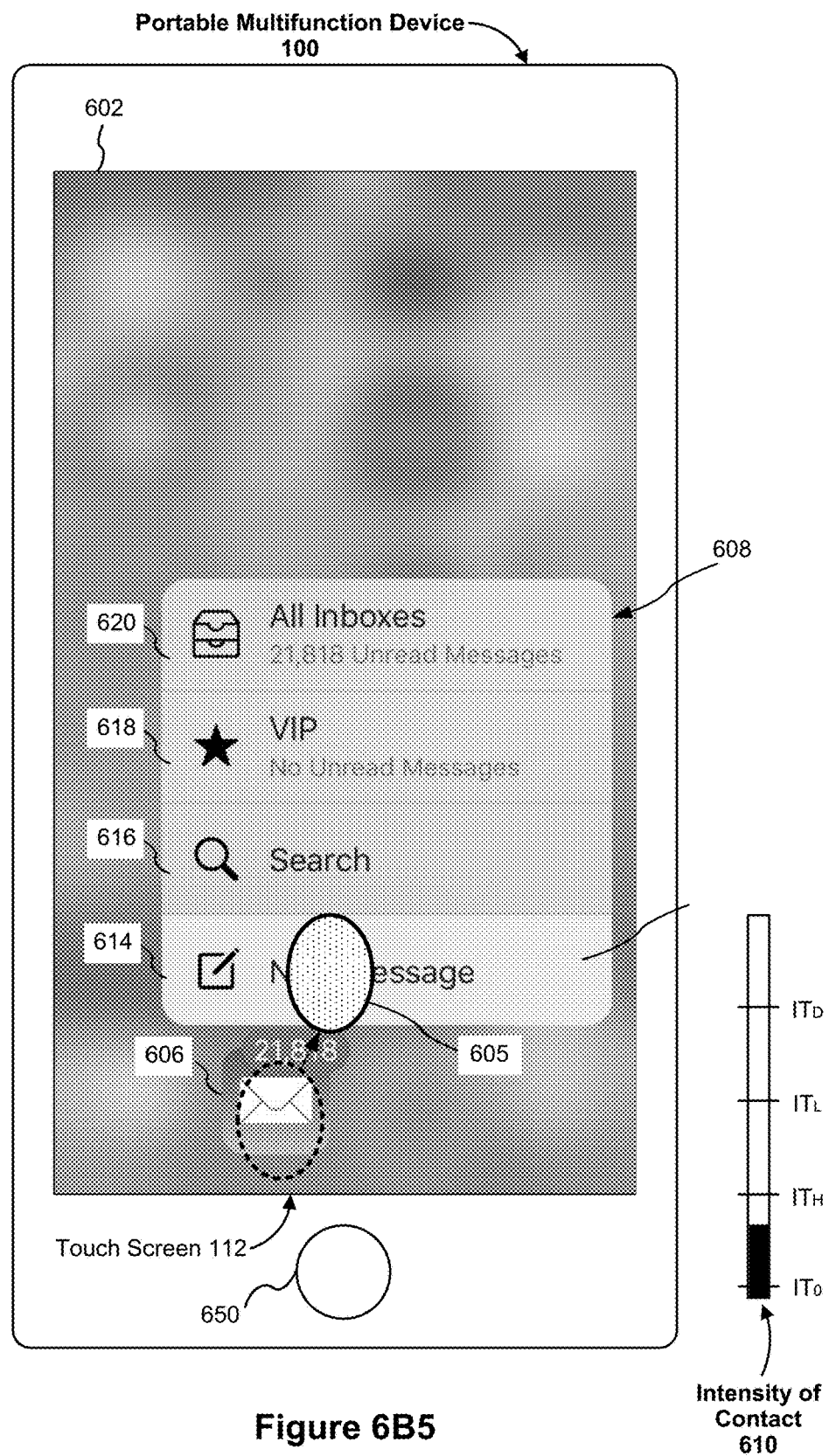
Figure 6B5

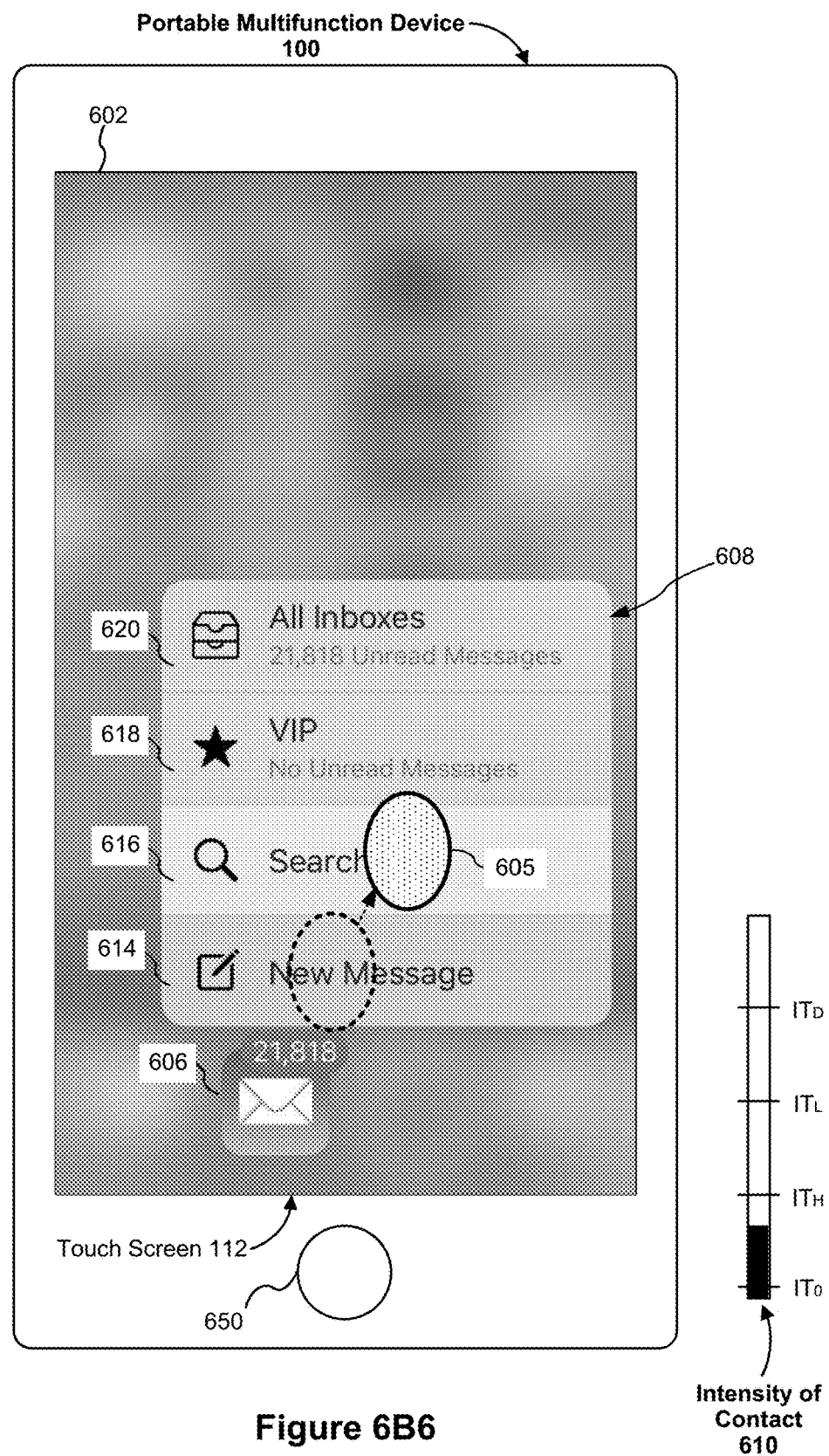
Figure 6B6

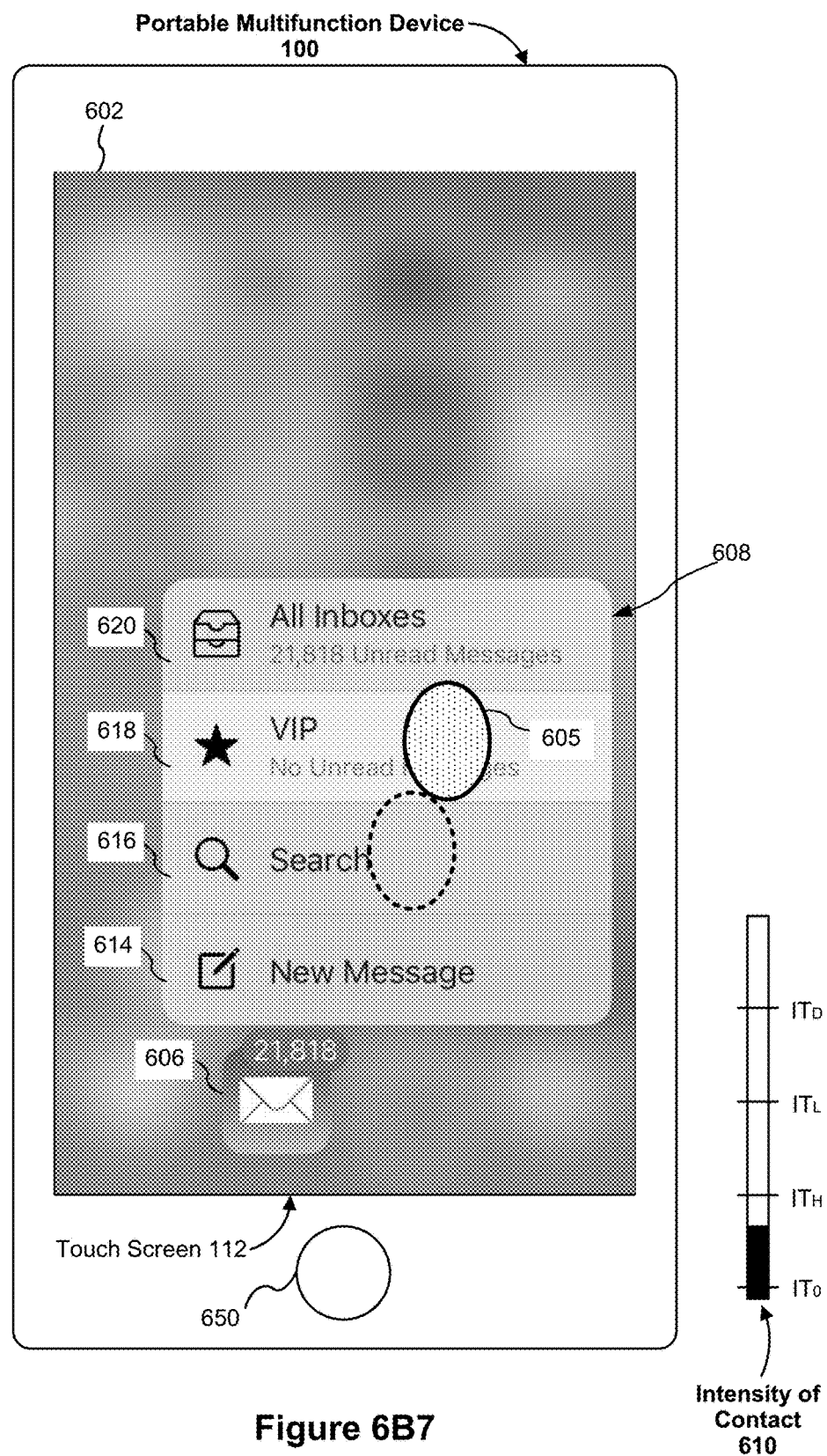
Figure 6B7

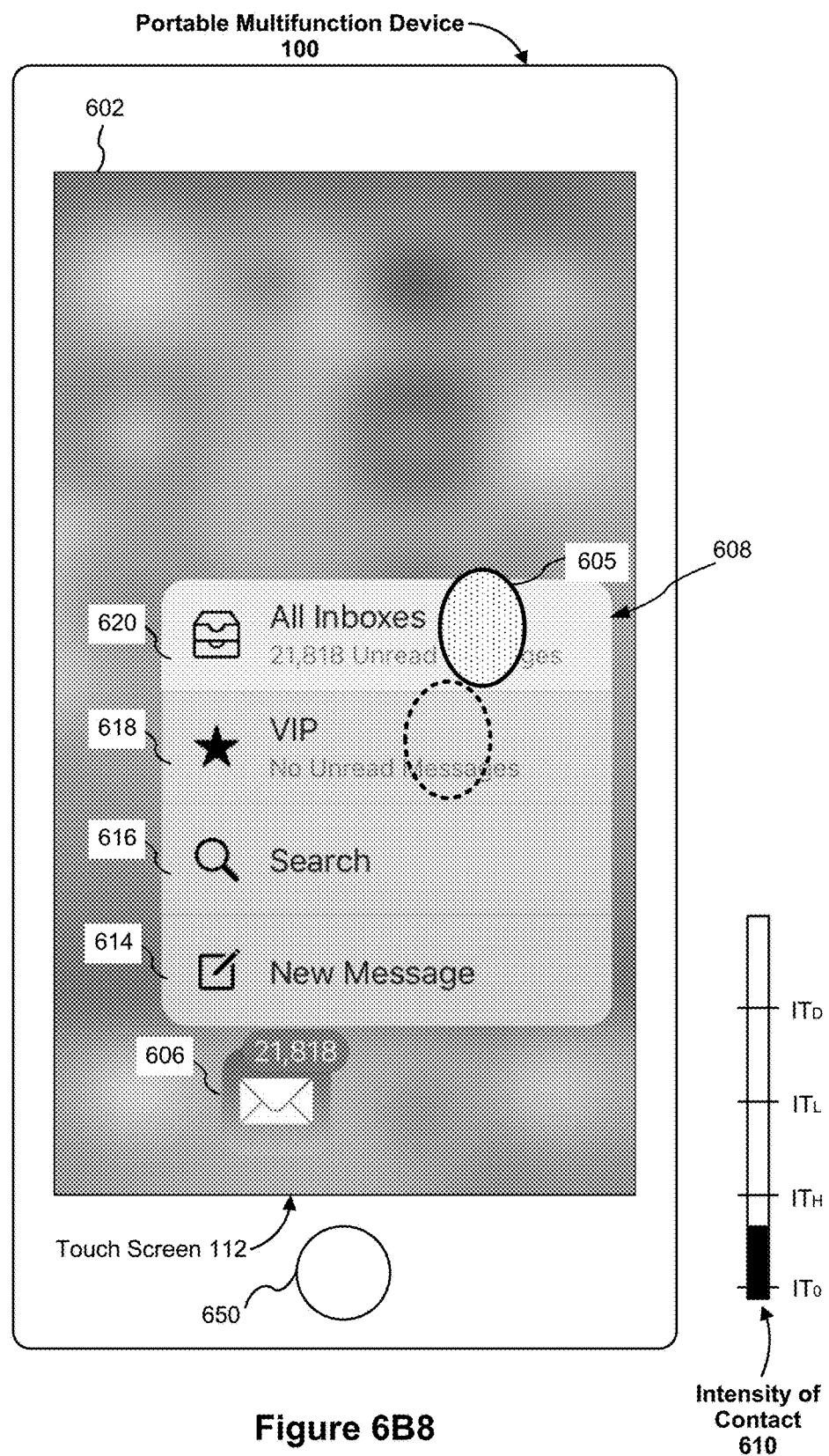
Figure 6B8

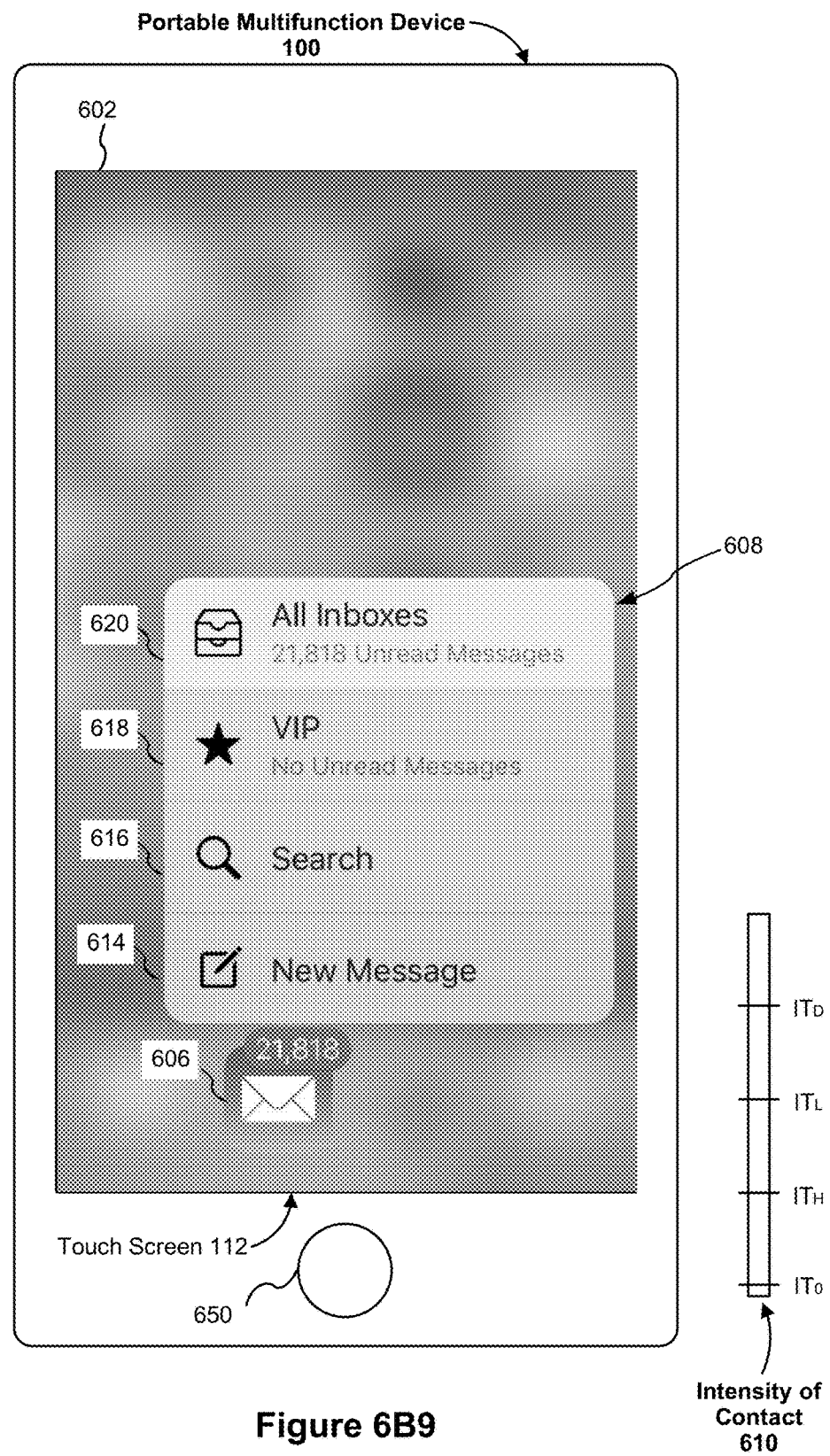
Figure 6B9

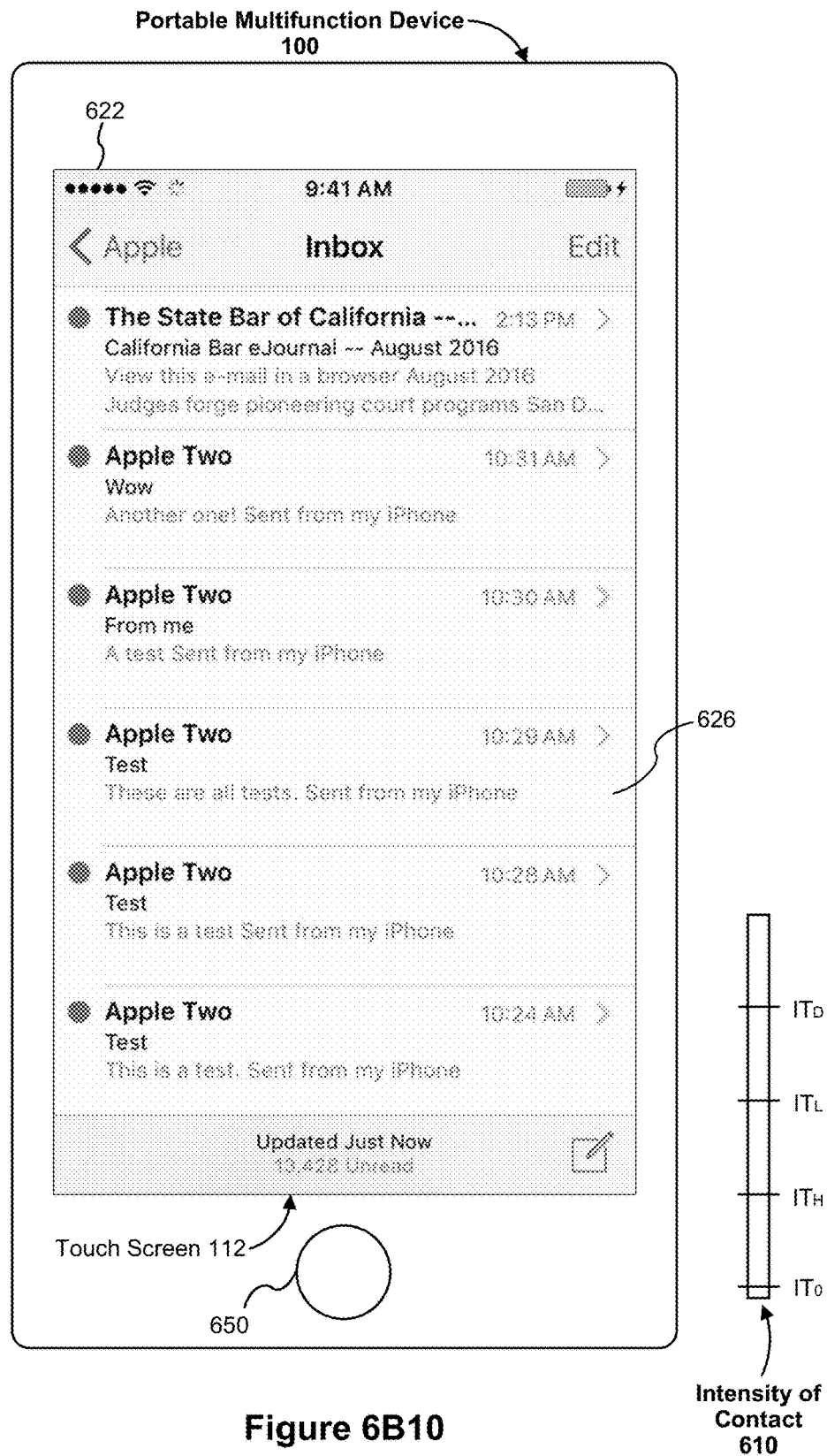
Figure 6B10

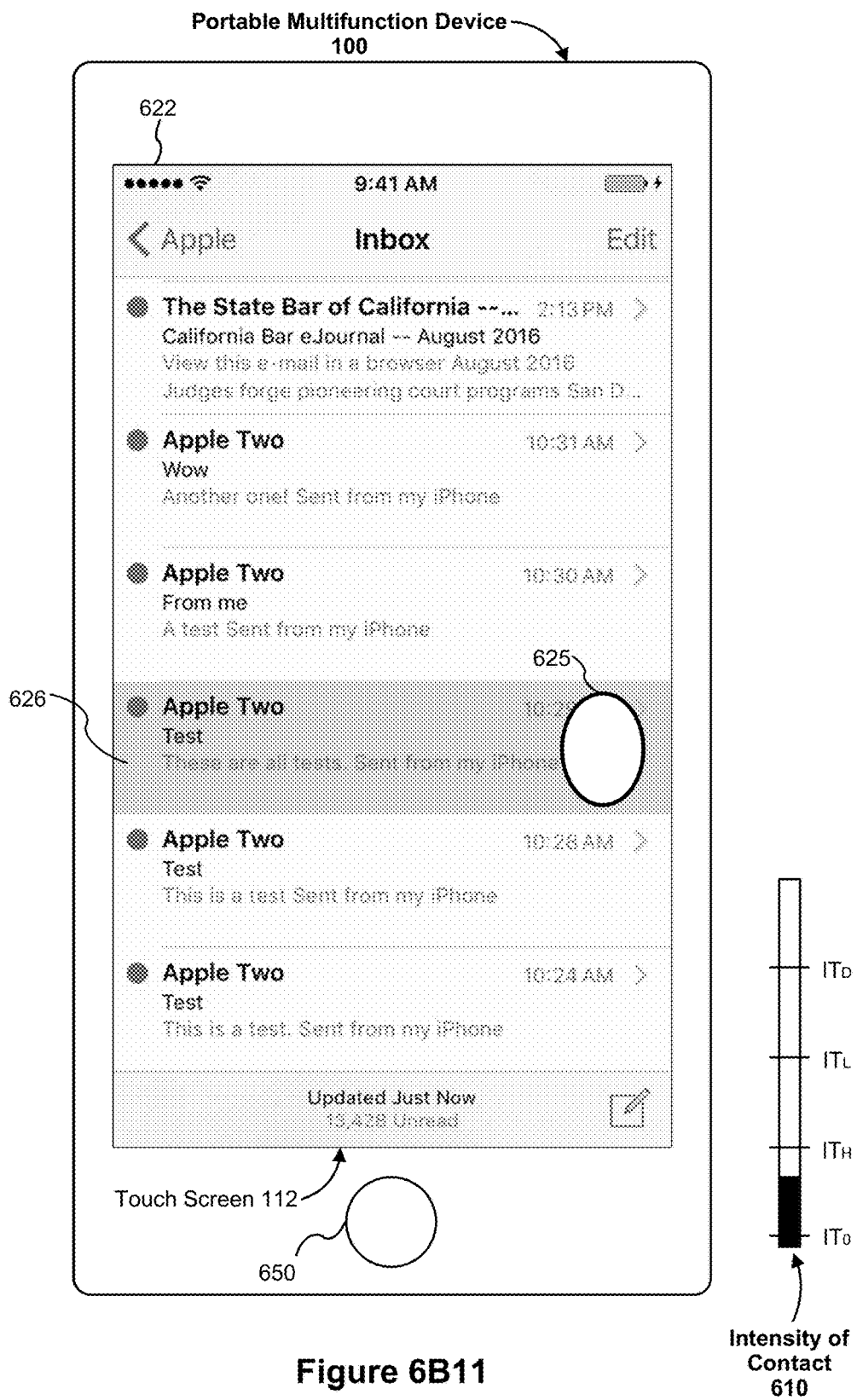
Figure 6B11

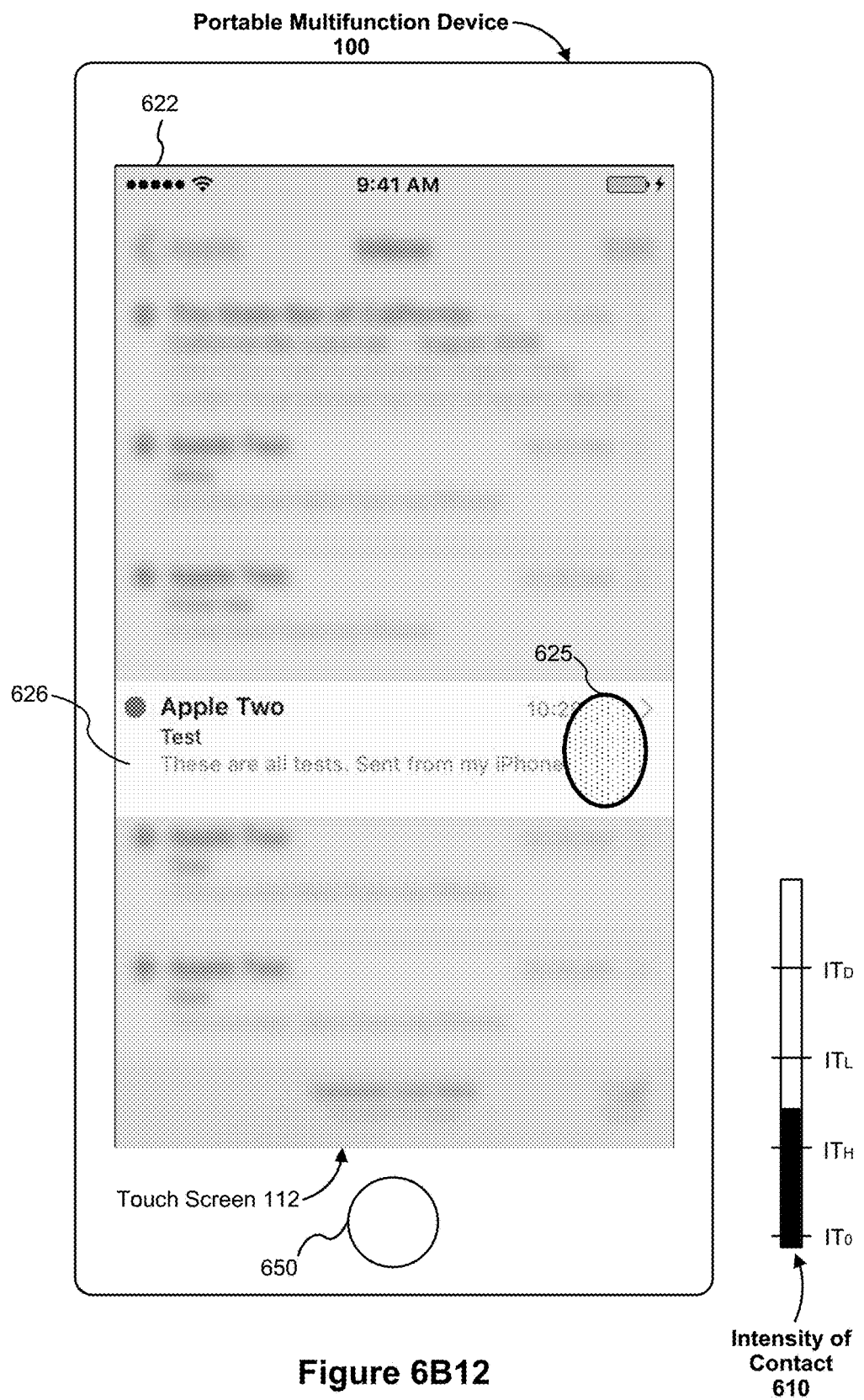
Figure 6B12

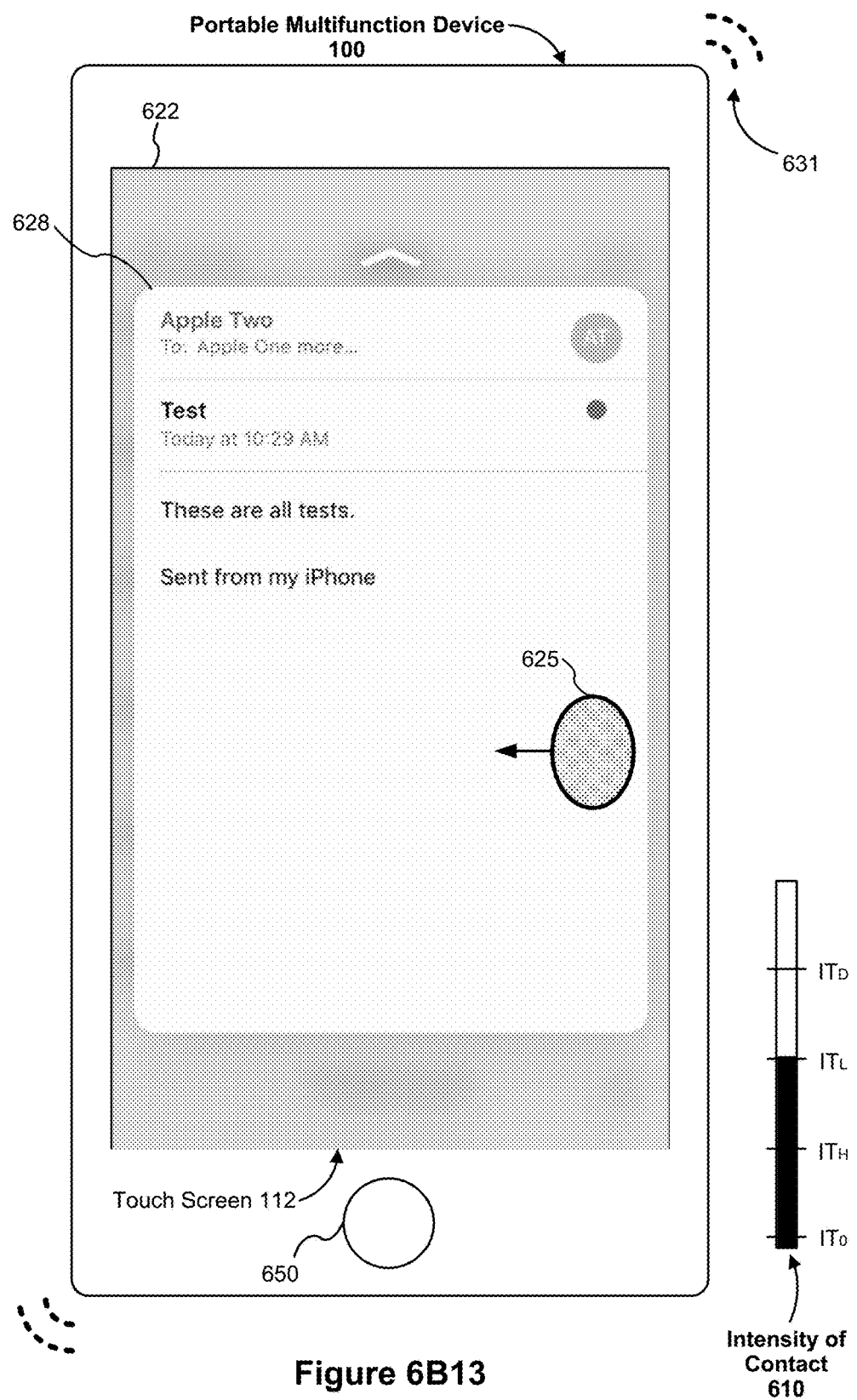
Figure 6B13

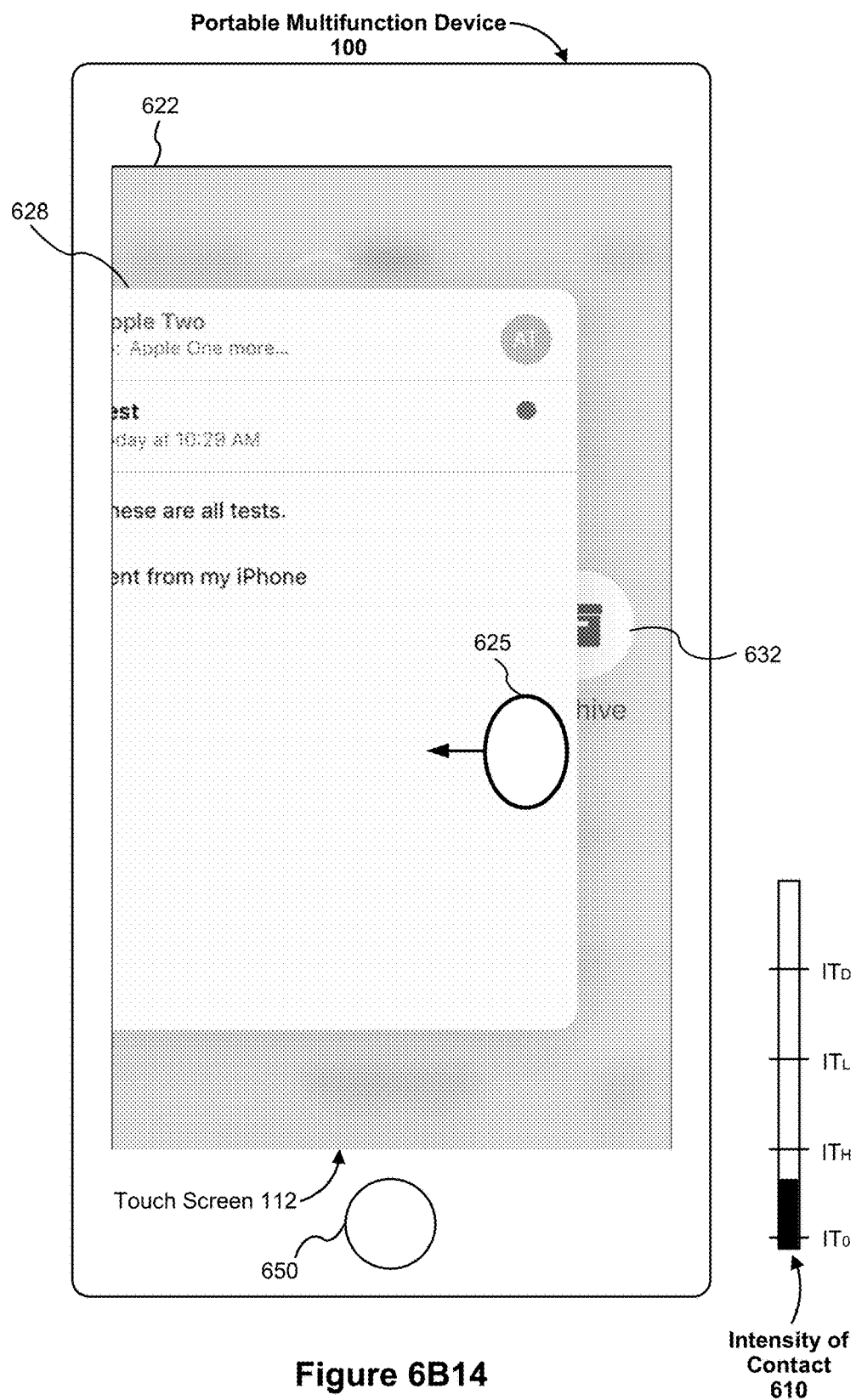
Figure 6B14

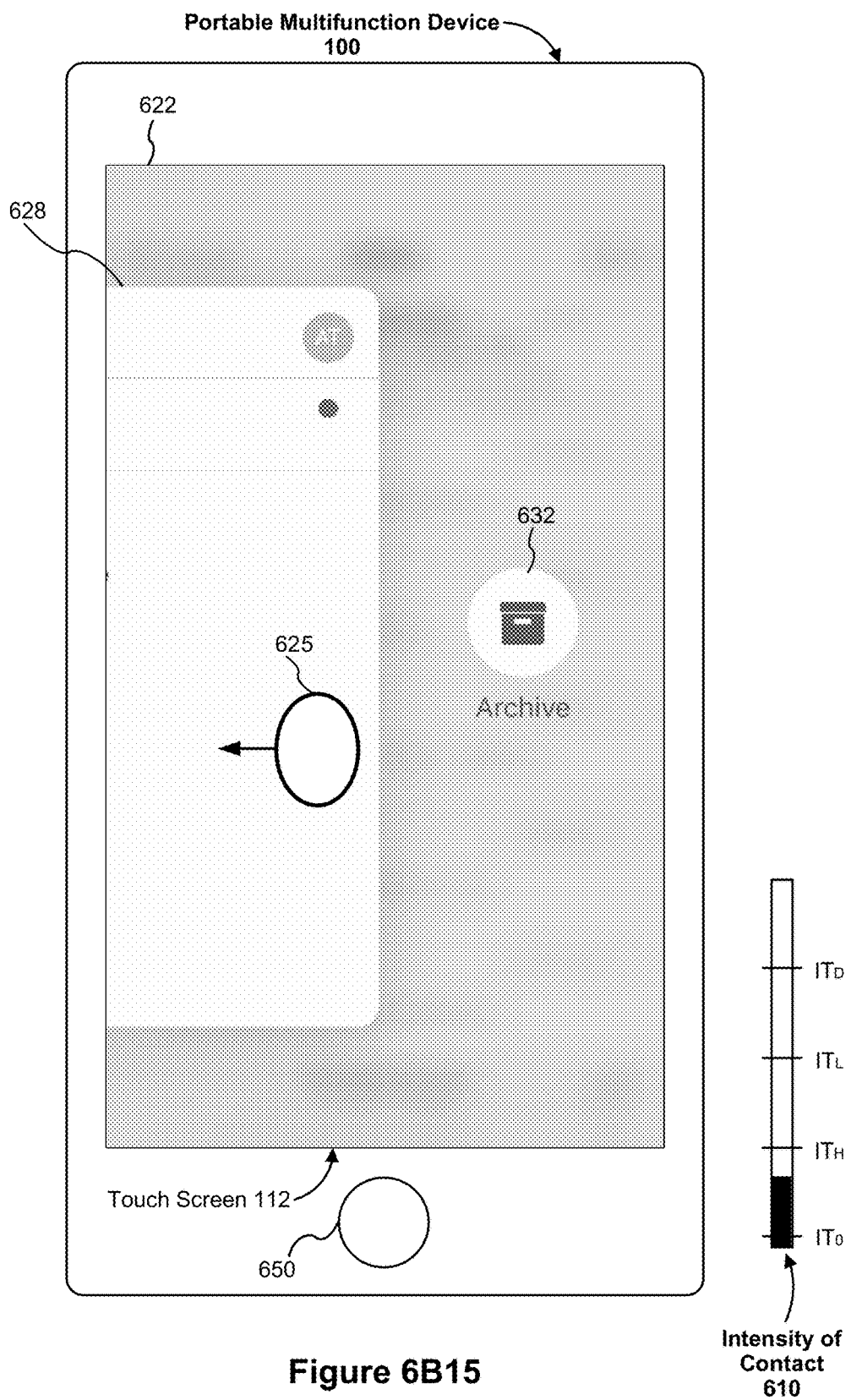
Figure 6B15

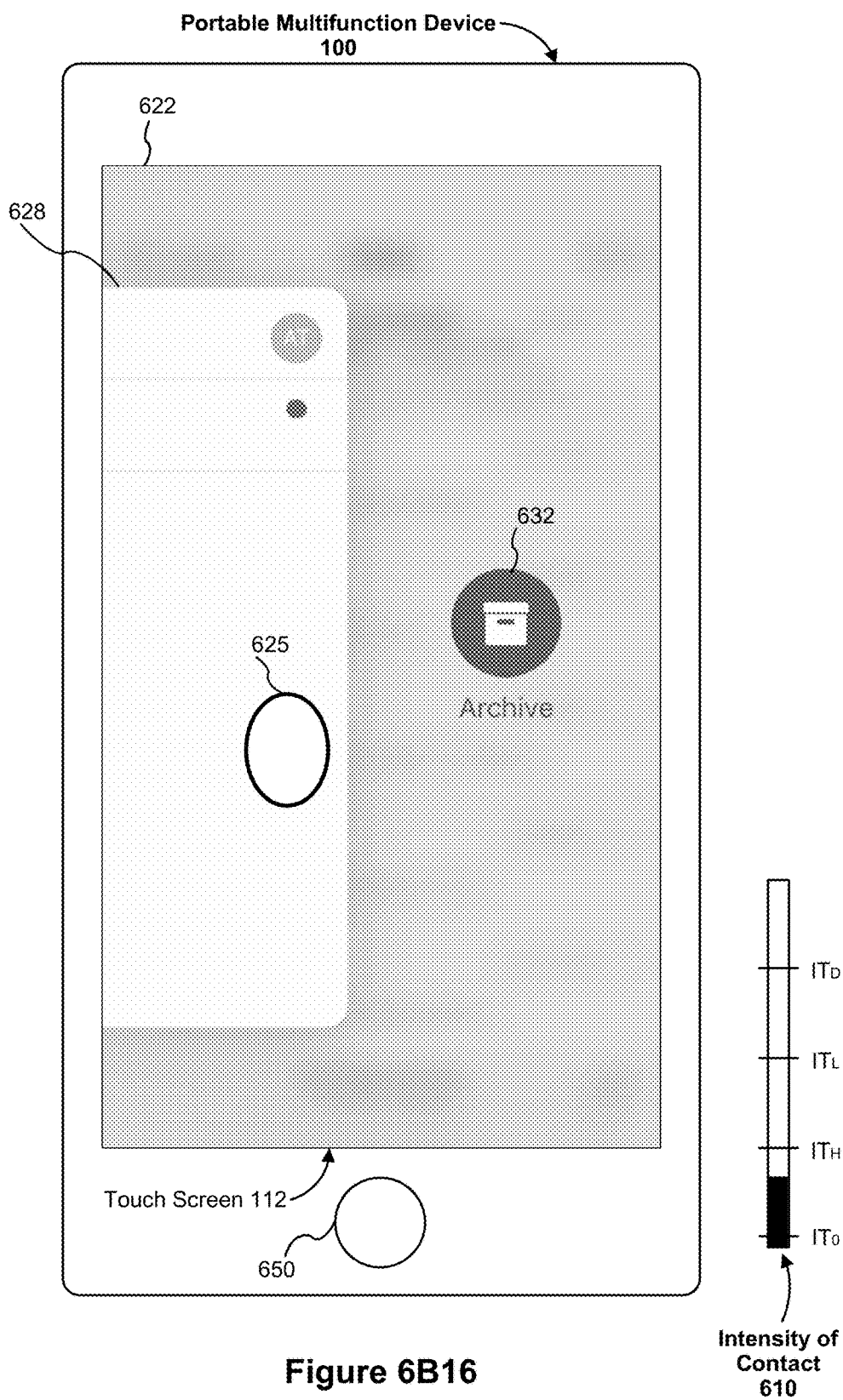
Figure 6B16

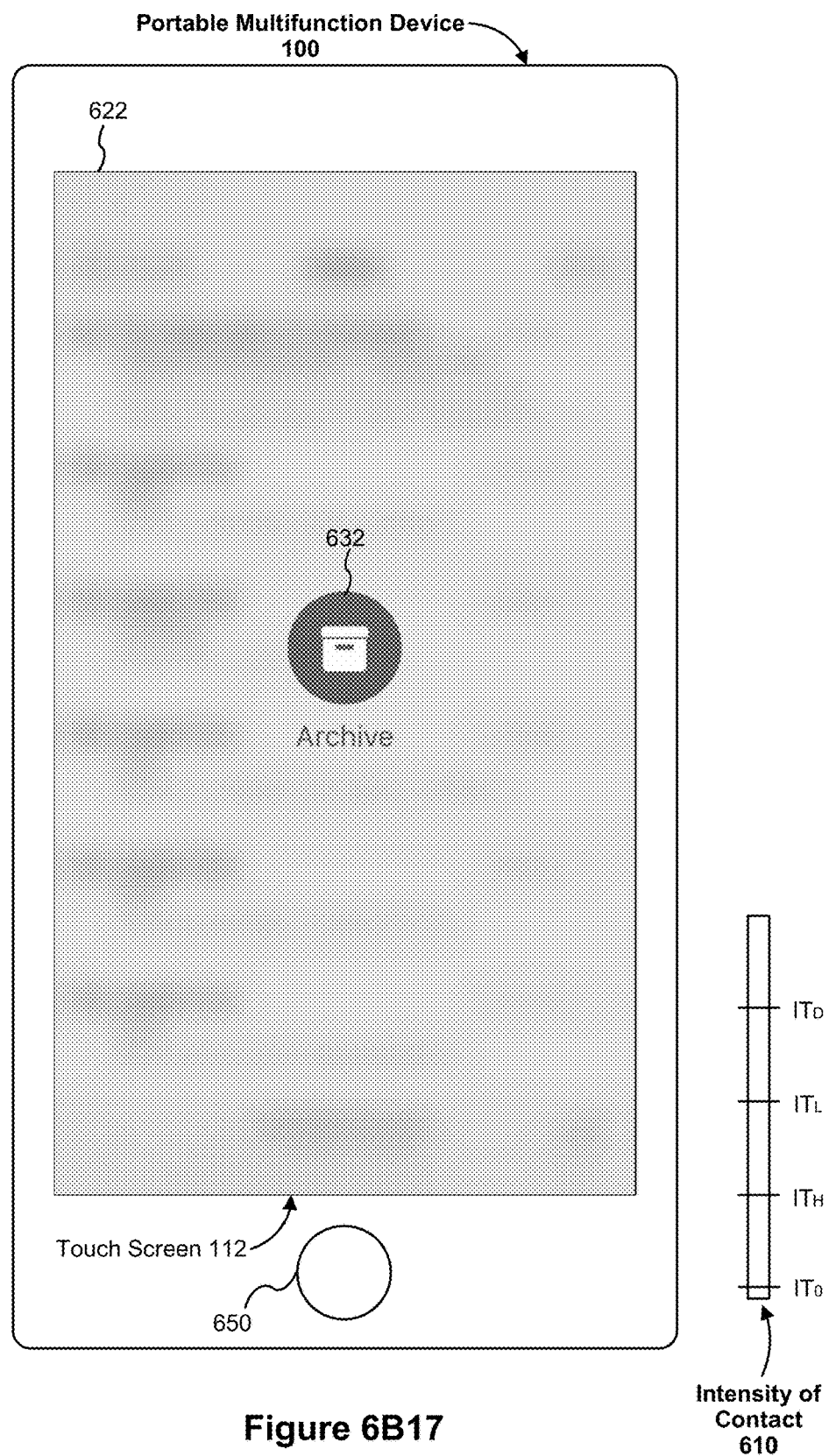
Figure 6B17

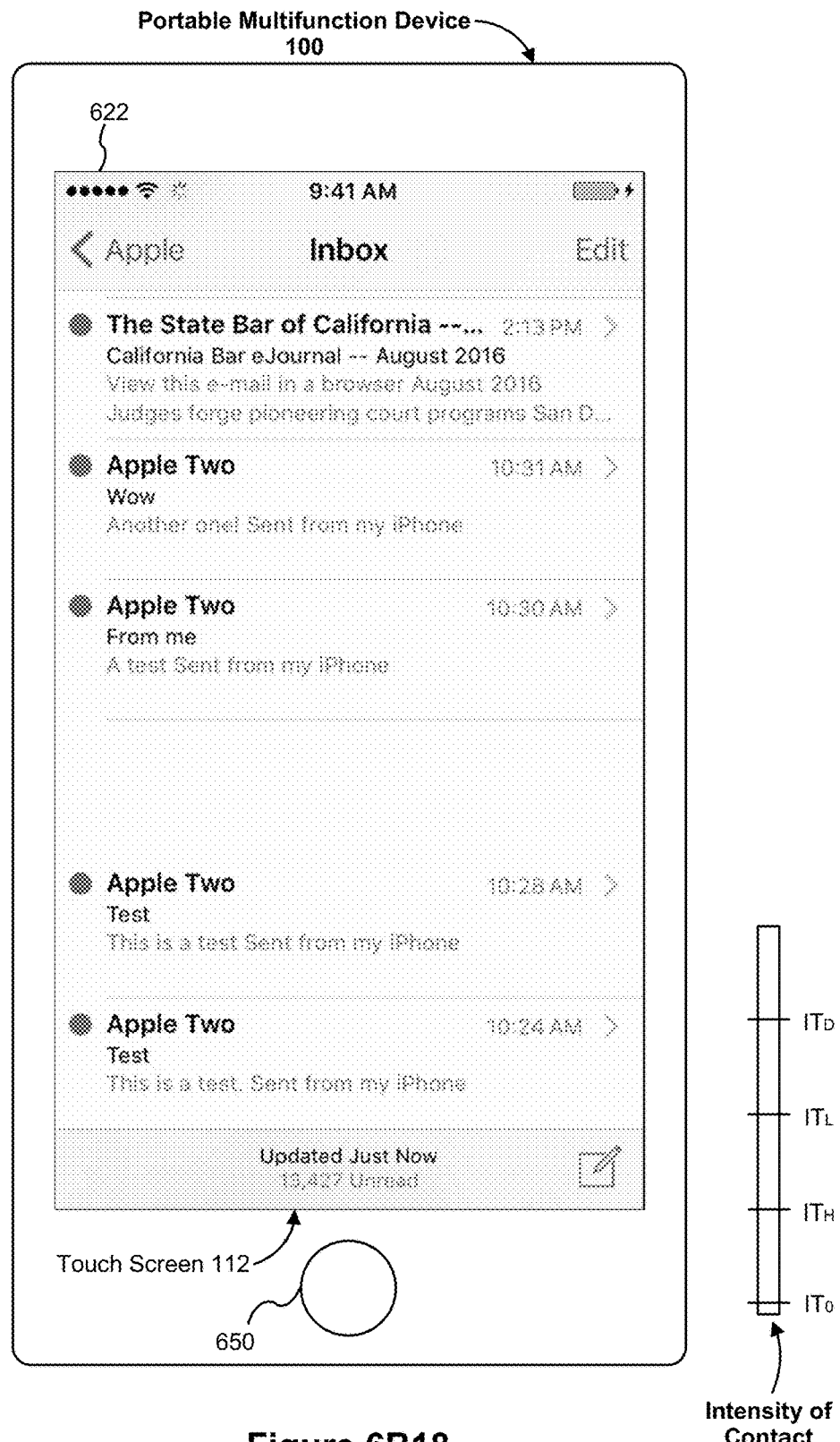
Figure 6B18

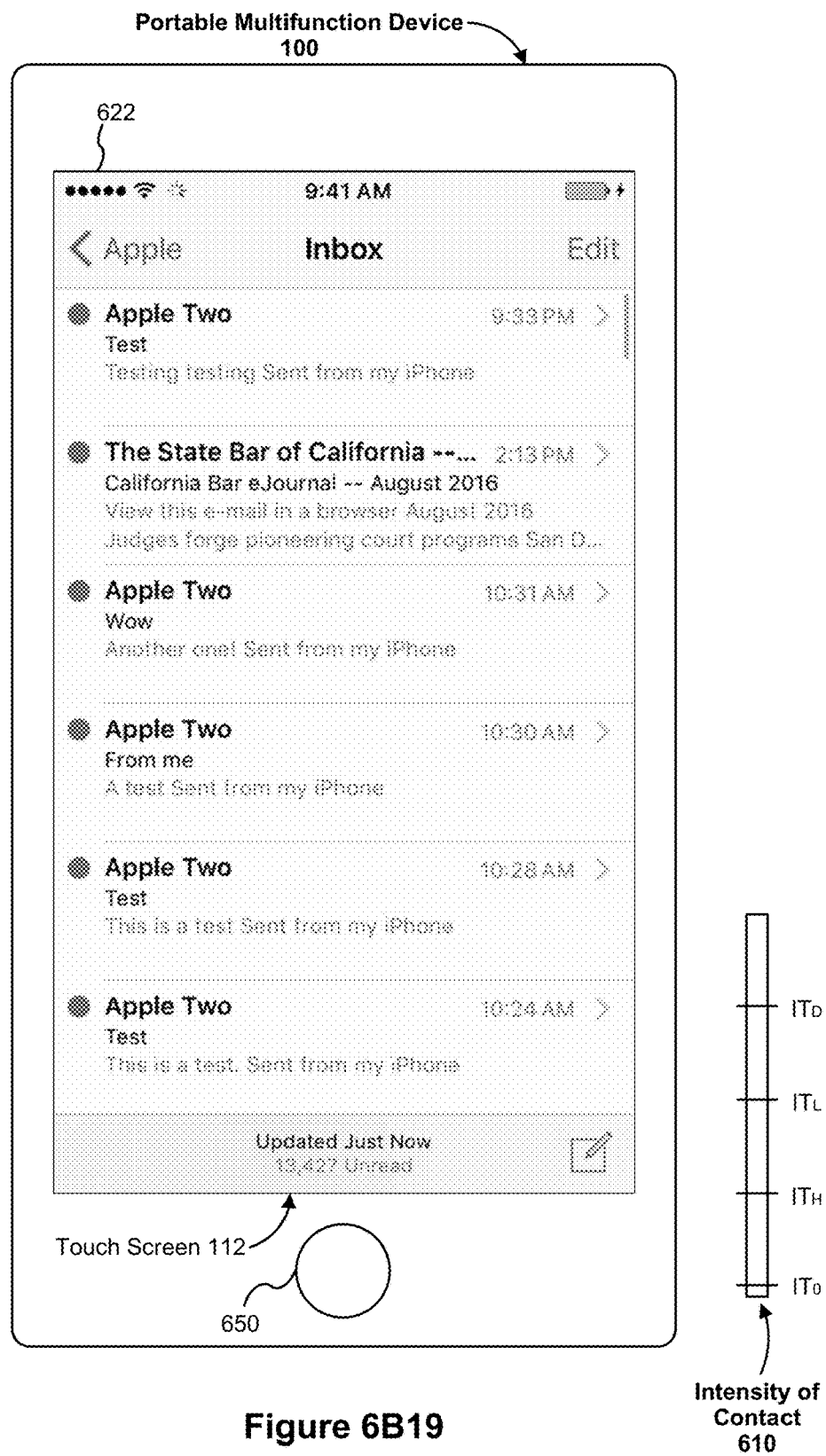
Figure 6B19

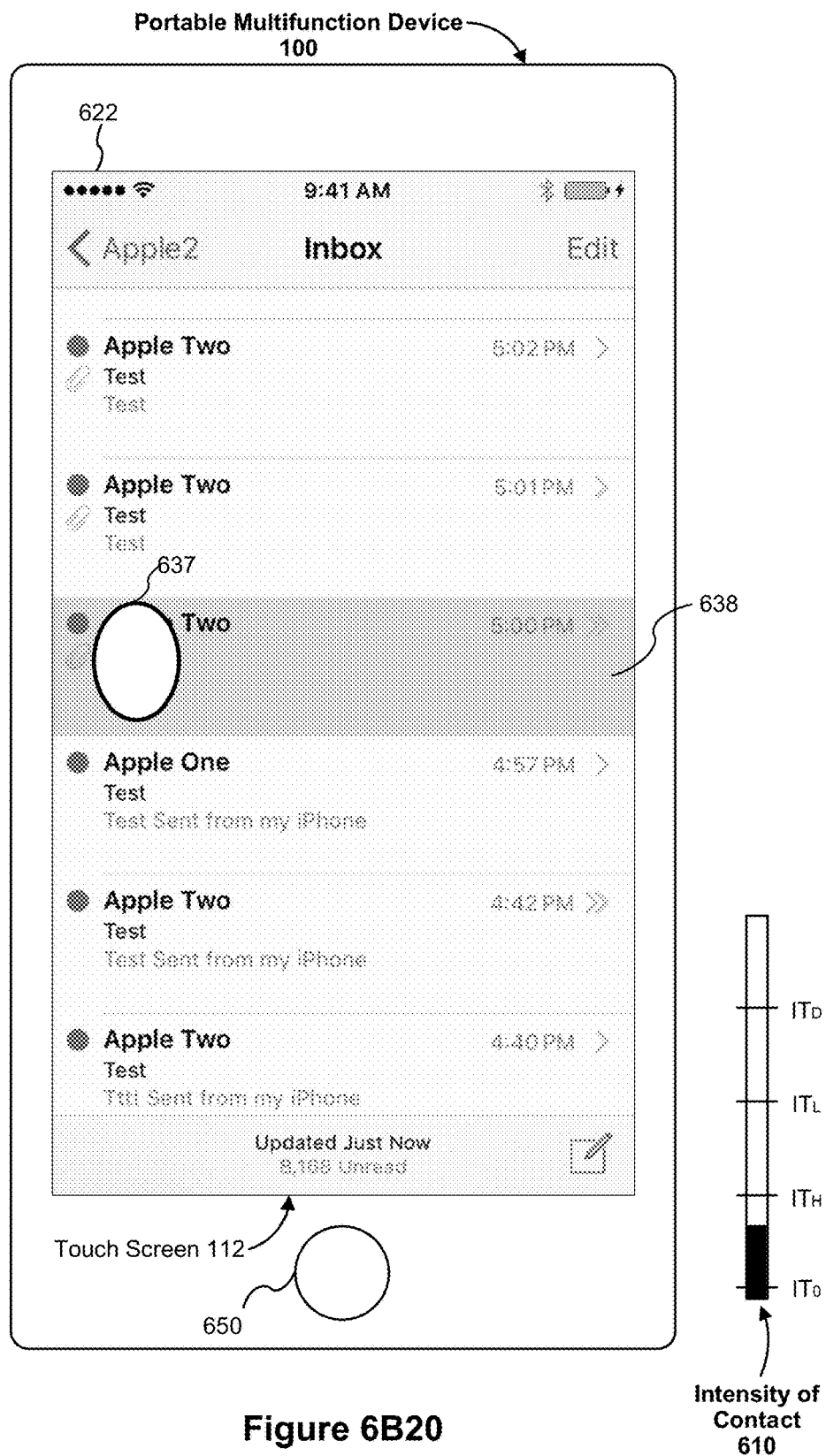
Figure 6B20

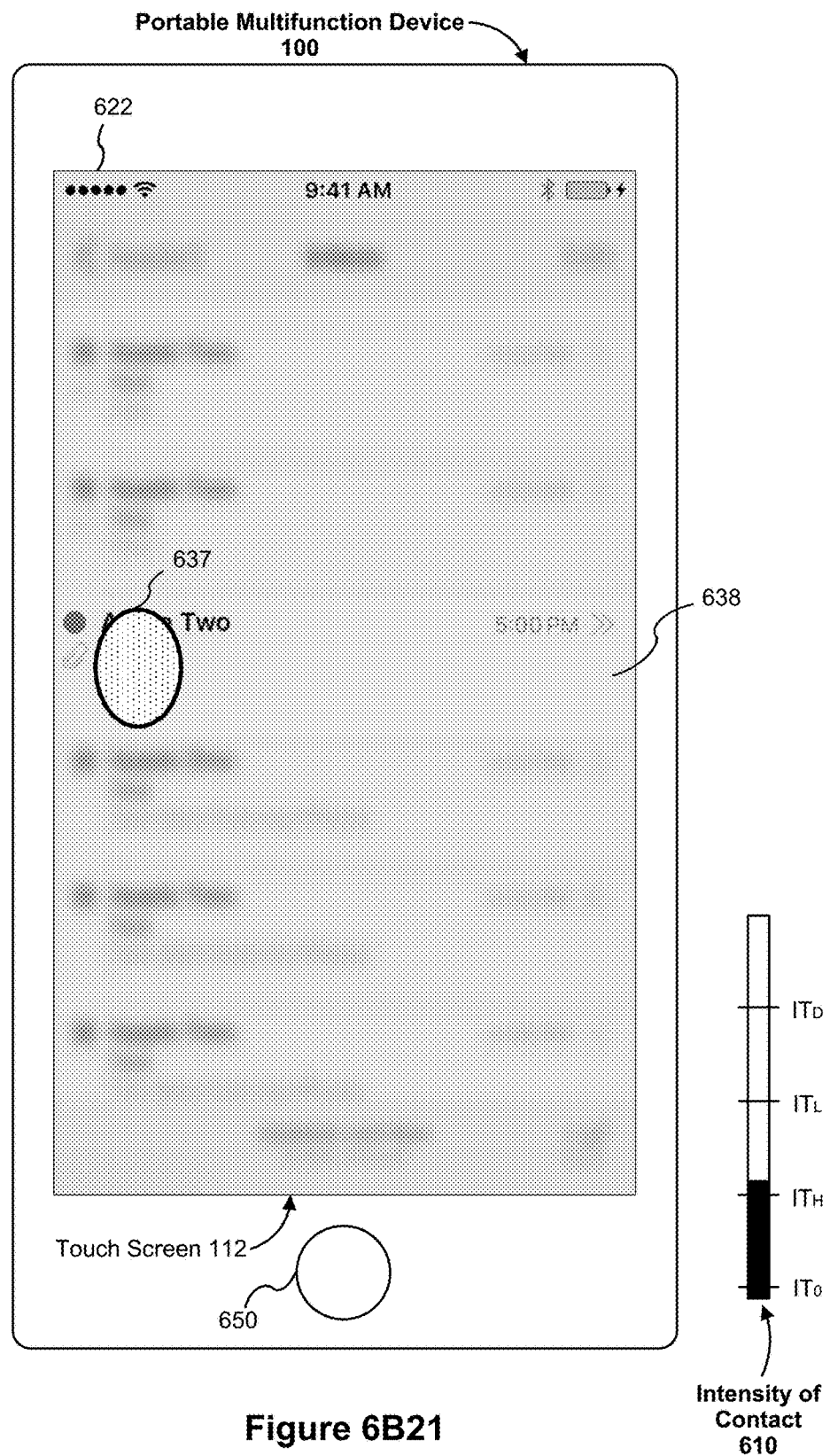
Figure 6B21

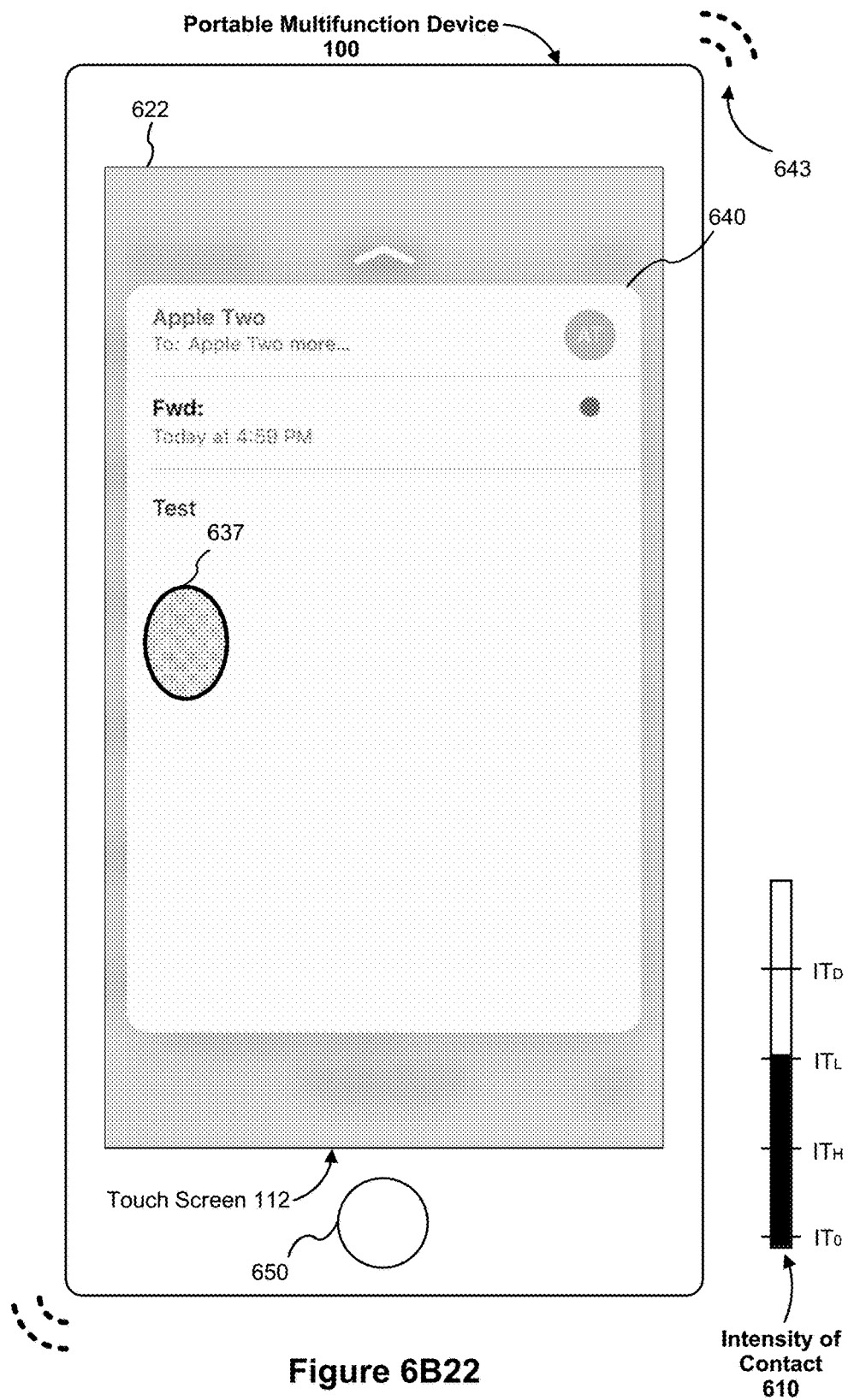
Figure 6B22

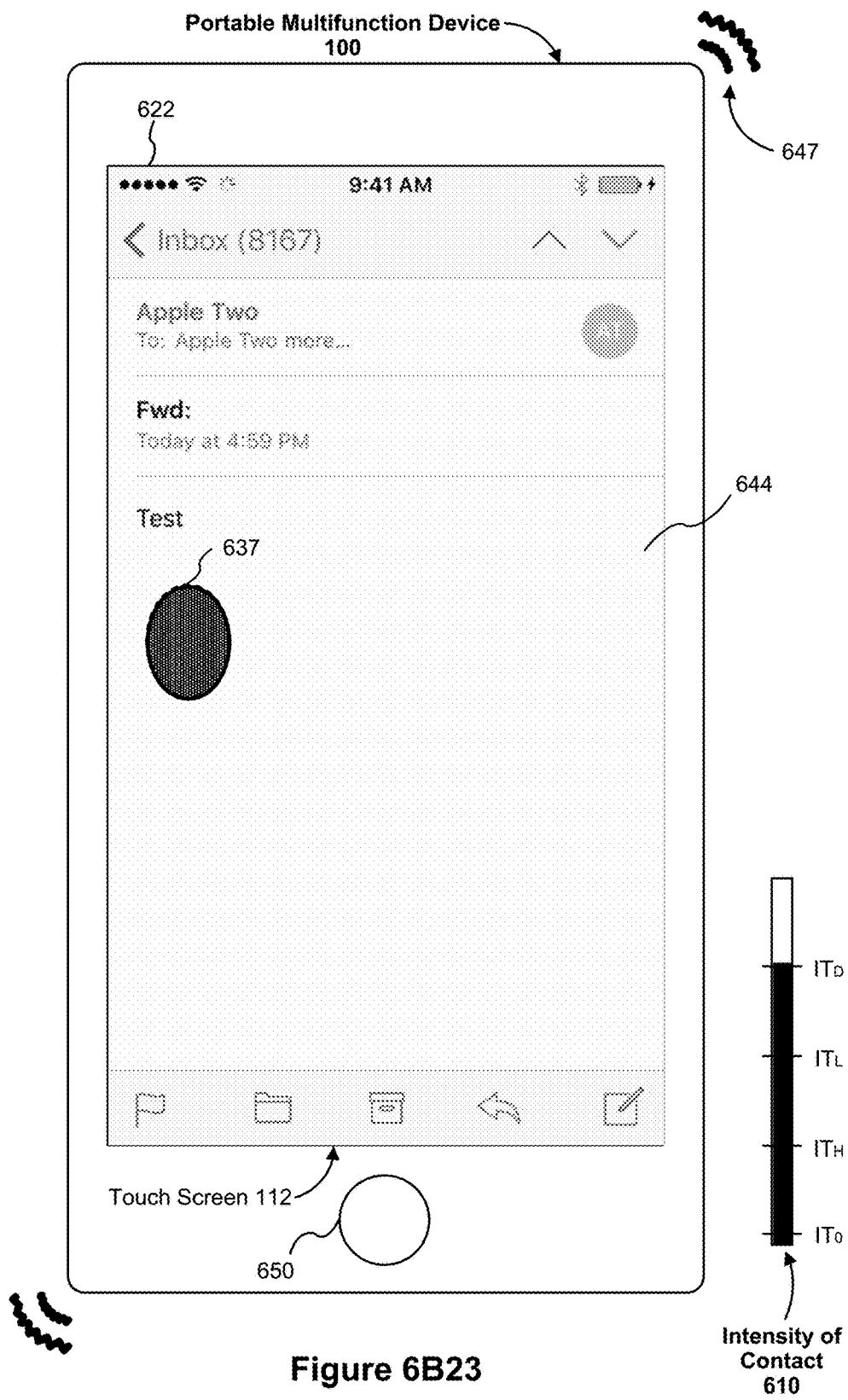
Figure 6B23

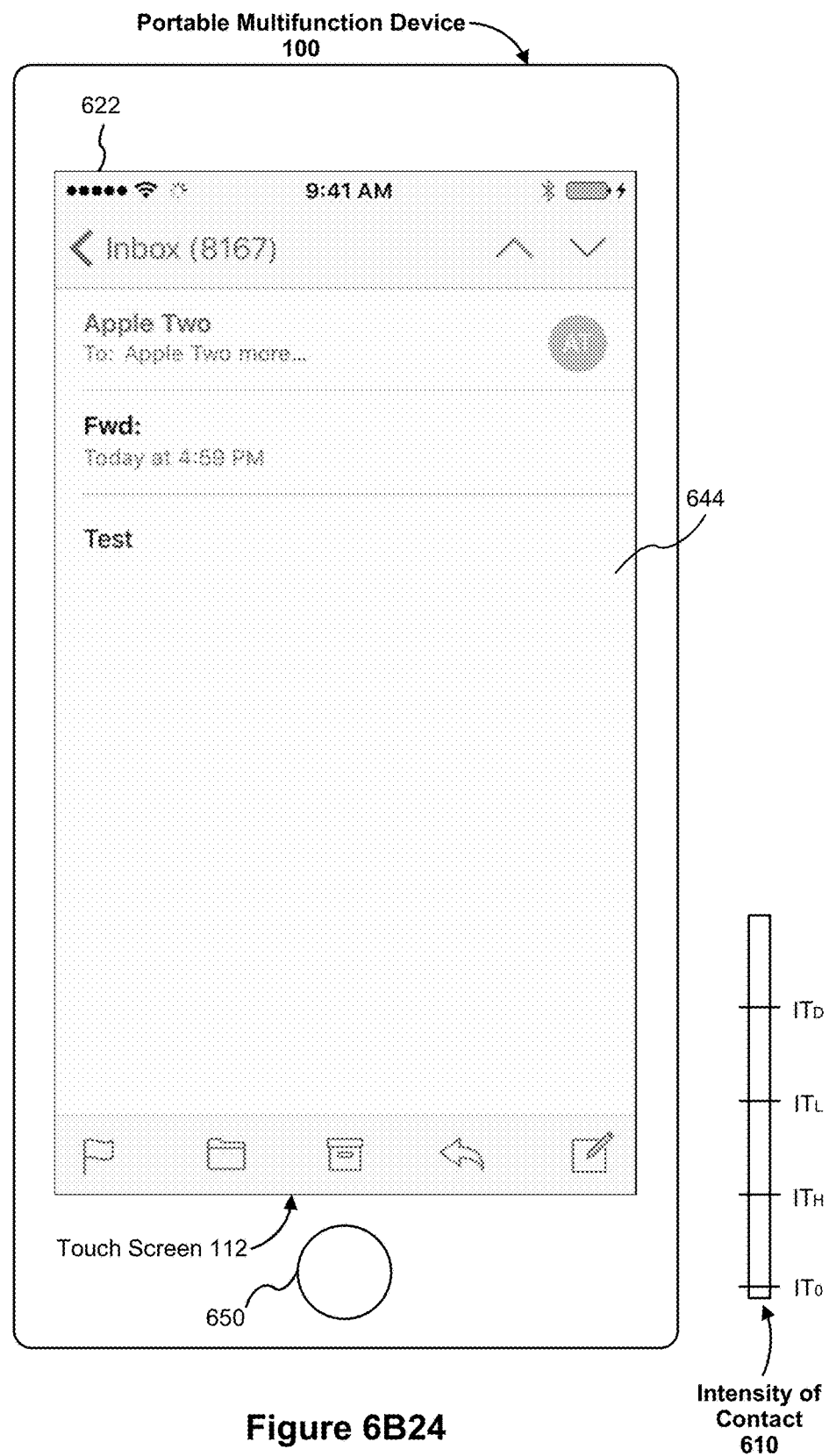
Figure 6B24

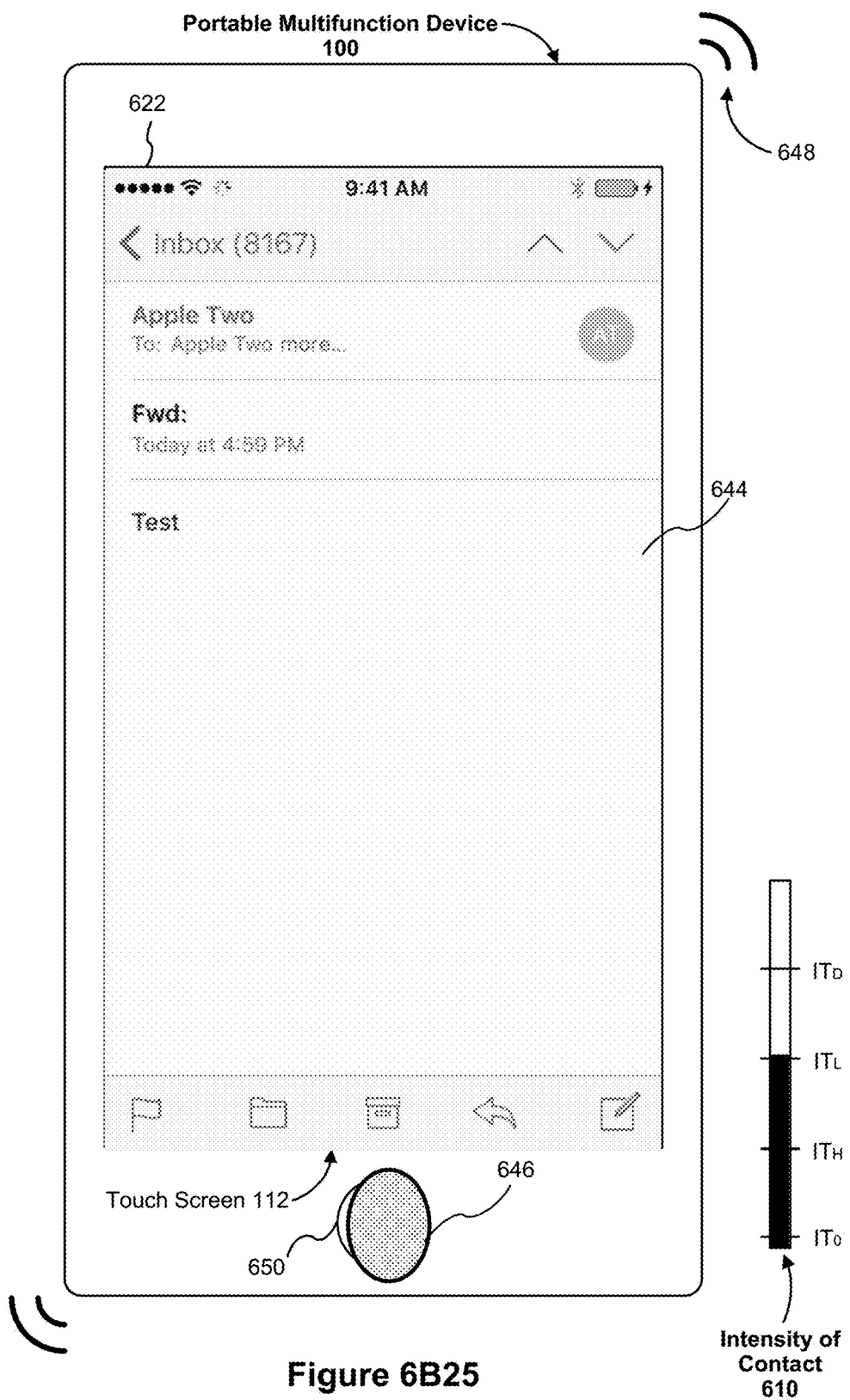
Figure 6B25

Figure 6B26

700

702 At an electronic device with a display, a touch-sensitive surface, and one or more sensors to detect intensities of contacts with a home button of the device, display, on the display, a first user interface (A)

704 While displaying the first user interface, detect an input directed to the first user interface

706 In response to detecting the input directed to the first user interface:
cease to display the first user interface, and
display a second user interface, distinct from the first user interface (B)

708 While displaying the second user interface, detect a contact on the home button

710 While continuously detecting the contact on the home button:
detect an increase in a characteristic intensity of the contact above a first intensity threshold;
in response to detecting the increase in the characteristic intensity of the contact to the first intensity threshold, display a beginning of a transition from the second user interface back to the first user interface; and
while displaying the beginning of the transition from the second user interface back to the first user interface, detect an input sequence that includes detecting a press input that includes an increase in the characteristic intensity of the contact above the first intensity threshold (C)

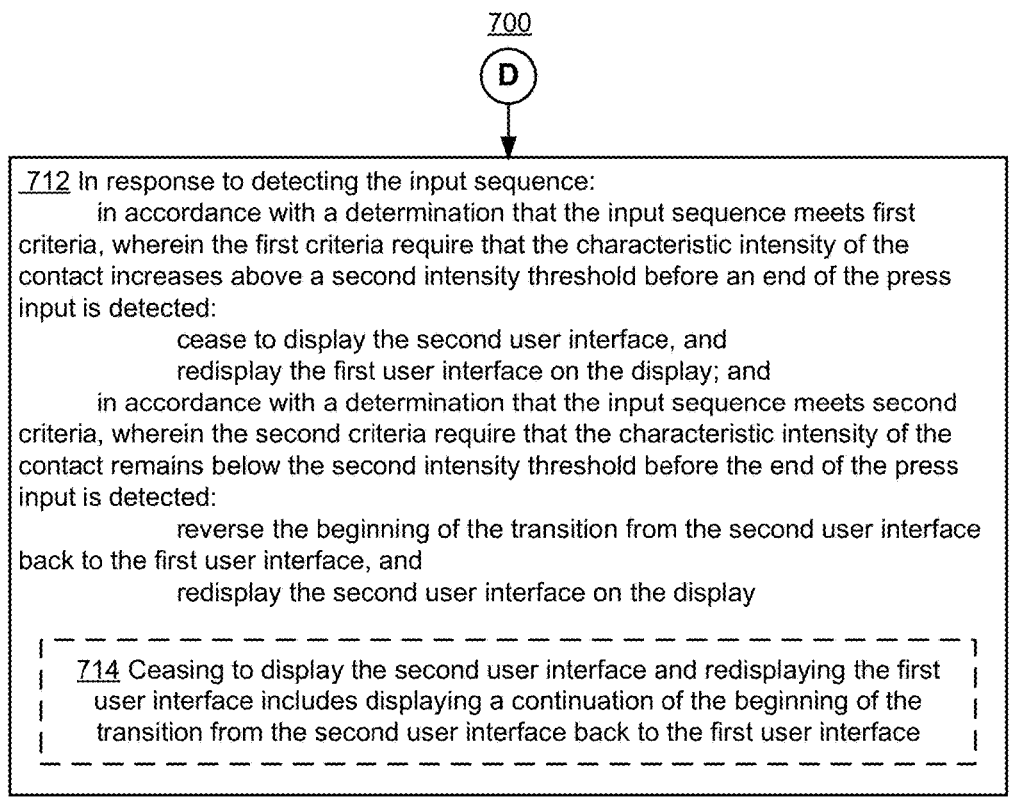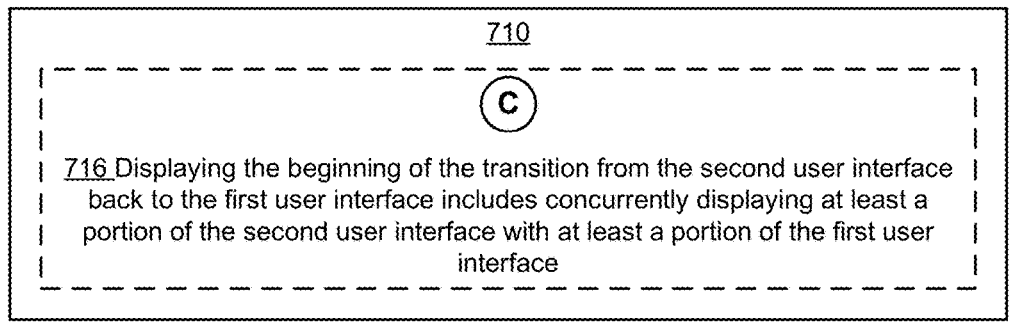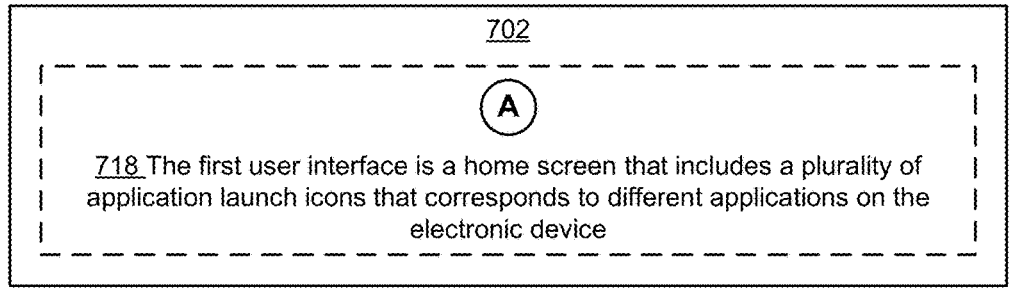
Figure 7B

700

710

(C)

734 Displaying the beginning of the transition from the second user interface back to the first user interface includes fading the second user interface 736 Shift the first user interface laterally in a first direction to cover the second user interface, as the second user interface fades out (C)

738 Displaying the beginning of the transition from the second user interface back to the first user interface includes changing a virtual depth of at least one of the first user interface and the second user interface (C)

742 The second user interface includes a representation of the first user interface, and displaying the beginning of the transition from the second user interface back to the first user interface includes expanding the representation of the first user interface included in the second user interface and reducing a virtual depth of the representation of the first user interface

744 Detecting the input sequence further includes detecting that the characteristic intensity of the contact varies between the first intensity threshold and the second intensity threshold before the first criteria are met by the input sequence; and,
    in response to detecting that the characteristic intensity of the contact varies between the first intensity threshold and the second intensity threshold before the first criteria are met by the input sequence, dynamically advance and reverse the transition from the second user interface to the first user interface in accordance with the characteristic intensity of the contact 746 Dynamically advancing and reversing the transition from the second user interface to the first user interface in accordance with the characteristic intensity of the contact includes:
    dynamically changing a blur radius applied to the first user interface in accordance with the characteristic intensity of the contact 748 Dynamically advancing and reversing the transition from the second user interface to the first user interface in accordance with the characteristic intensity of the contact includes:
    dynamically revealing at least a portion of the first user interface in accordance with the characteristic intensity of the contact 750 Dynamically advancing and reversing the transition from the second user interface to the first user interface in accordance with the characteristic intensity of the contact includes:
    dynamically shifting a position of the second user interface on the display in accordance with the characteristic intensity of the contact, wherein a corresponding amount of the first user interface is revealed as the position of the second user interface is dynamically shifted in accordance with the characteristic intensity of the contact (F)

762 The first user interface is a primary page of a multi-page home screen, and the second user interface is a secondary page of a multi-page home screen 764 The first user interface is a home screen, and the home screen includes a first folder icon that corresponds to a first folder that includes one or more folder items, and the second user interface includes an expanded view of the first folder that includes larger representations of the one or more folder items 766 The device includes one or more tactile output generators

768 In response to detecting the input sequence:
  in accordance with the determination that the input sequence meets the first criteria, generate a first tactile output 770 Generate a tactile output upon detecting the increase in the characteristic intensity of the contact above the first intensity threshold 772 Forgo generating a tactile output in response to detecting the increase in the characteristic intensity of the contact above the first intensity threshold 774 In accordance with a determination that the input sequence includes an increase in the characteristic intensity of the contact above the second intensity threshold and satisfaction of long press criteria, interrupt an animated transition from the second user interface to the first user interface to display an animated transition to a third user interface that is associated with the long press criteria 776 In accordance with a determination that the input sequence includes an increase in the characteristic intensity of the contact above the second intensity threshold and satisfaction of multiple-click criteria, interrupt an animated transition from the second user interface to the first user interface to display an animated transition to a fourth user interface that is associated with the multiple-click criteria

912 In response to detecting the second input:
in accordance with a determination that the second input meets first criteria, and that that the second input is received at a third time that is after the second time, continue to display the first animated transition 914 The first time and the second time occur before a threshold time for detecting a double-click input that includes the first input 916 The third time occurs after the threshold time for detecting a double-click input that includes the first input 918 The second input is a repetition of the first input 920 The first animated transition from the first user interface to the second user interface includes movement of the first user interface in a first direction, and the second animated transition includes movement of the first user interface in a second direction that is distinct from the first direction 922 In response to detecting the second input:
in accordance with a determination that the second input is consistent with a request to display a fourth user interface, distinct from the first, second, and third user interfaces:
interrupt the first animated transition from the first user interface to the second user interface at a third point in the first animated transition, distinct from the first and second points in the first animated transition, and
display a fourth animated transition from the third point in the first animated transition to the fourth user interface, wherein the fourth animated transition is different from the first, second and third animated transitions 924 The first animated transition from the first user interface to the second user interface includes movement of the first user interface in a first direction, the fourth animated transition includes movement of the first user interface in a second direction that is opposite the first direction, and the third animated transition is in a third direction that is orthogonal to the first and second directions

926 In response to detecting the second input:
in accordance with a determination that the second input is consistent with a request to transition to a fifth user interface:
interrupt the first animated transition from the first user interface to the second user interface at a fourth point in the first animated transition, and
display a fifth animated transition from the fourth point in the first animated transition to the fifth user interface, wherein the fifth animated transition is different from the first, second and third animated transitions 928 While displaying the first user interface, prior to detecting the first input:
detect a precursor input for the first input;
in response to detecting the precursor input, display a hint animation wherein the hint animation includes a start of the first animated transition from the first user interface to the second user interface 930 The first user interface is a user interface of a first application, and the method includes generating the first animated transition in accordance with a location of a first application launch icon on the second user interface 932 Detecting the first input includes detecting a first press input by a first contact on a home button, wherein the first press input includes an increase in a characteristic intensity of the first contact above a first intensity threshold followed by a decrease in the characteristic intensity of the first contact below a second intensity threshold 934 Generate a first tactile output in response to detecting the increase in the characteristic intensity of the first contact above the first intensity threshold 936 Generate a second tactile output in response to detecting the decrease in the characteristic intensity of the first contact below the second intensity threshold

938 In response to detecting the second input:
  in accordance with a determination that the second input is consistent with the request to display the third user interface, and that the second input is received at a fourth time that is after the second time:
    continue to display the first animated transition from the first user interface to the second user interface, and
    display a fifth animated transition from an end of the first animated transition to the third user interface, wherein the fifth animated transition is different from the second animated transition and the third animated transition

---

940 In response to detecting the second input:
  in accordance with a determination that the second input is not consistent with the request to display the third user interface, forgoing transitioning to the third user interface

1102 At an electronic device with a display, a touch-sensitive surface, and one or more tactile output generators, display, on the display, a home button configuration user interface that includes displaying a plurality of different tactile output settings for the home button, wherein the home button is available on the device in a plurality of different contexts to dismiss a currently displayed user interface in response to detecting an input of a first type on the home button;

1104 While displaying the home button configuration user interface, detect selection of a respective tactile output setting of the home button of the plurality of different tactile output settings

1105 While the respective tactile output setting for the home button is selected, detect a first input of the first type on the home button

1106 In response to detecting the first input of the first type on the home button:
in accordance with a determination that the respective tactile output setting is a first tactile output setting for the home button, provide, via the one or more tactile output generators, a first tactile output that corresponds to the first tactile output setting for the home button without dismissing the home button configuration user interface; and,
in accordance with a determination that the respective tactile output setting is a second tactile output setting, different from the first tactile output setting, for the home button, provide, via the one or more tactile output generators, a second tactile output that corresponds to the second tactile output setting for the home button without dismissing the home button configuration user interface

1108 In accordance with a determination that the respective tactile output setting is a third tactile output setting, different from the first tactile output setting and the second tactile output setting, for the home button, provide, via the one or more tactile output generators, a third tactile output that corresponds to the third tactile output setting for the home button without dismissing the home button configuration user interface

1110 In response to detecting selection of the respective tactile output setting of the home button, present a prompt requesting a user to provide an input of the first type on the home button

---

1112 The first tactile output and the second tactile output have different frequencies and the same waveform

---

1114 In response detecting the first input of the first type on the home button:
    in accordance with a determination that the respective tactile output setting is the first tactile output setting for the home button, provide a first audio output concurrently with the first tactile output; and,
    in accordance with a determination that the respective tactile output setting is the second tactile output setting for the home button, provide a second audio output concurrently with the second tactile output

---

1116 Providing the first tactile output that corresponds to the first tactile output setting for the home button includes providing the first tactile output in response to detecting a first portion of the first input of the first type; and the method includes, in response detecting the first input of the first type on the home button, in accordance with a determination that the respective tactile output setting is the first tactile output setting for the home button, provide, via the one or more tactile output generators, a first additional tactile output in response to detecting a second portion of the first input of the first type

---

1118 Provide a first audio output concurrently with the first tactile output, in response to detecting the first portion of the first input of the first type; and providing a first additional audio output concurrently with the first additional tactile output, in response to detecting the second portion of the first input of the first type 1120 The amplitudes of the first audio output the first additional audio output differ by a first amount, the amplitudes of the first tactile output and the first additional tactile output differ by a second amount, distinct from the first amount

1122 Providing the second tactile output that corresponds to the second tactile output setting for the home button includes providing the second tactile output in response to detecting a first portion of the first input of the first type; and the method includes, in response detecting the first input of the first type on the home button, in accordance with a determination that the respective tactile output setting is the second tactile output setting for the home button, provide, via the one or more tactile output generators, a second additional tactile output in response to detecting a second portion of the first input of the first type

---

1124 in response to detecting selection of the respective tactile output setting of the home button:
 in accordance with a determination that the respective tactile output setting is the first tactile output setting for the home button, display a first animated indication that includes movement of a representation of the first tactile output setting toward the home button, and
 in accordance with a determination that the respective tactile output setting is the second tactile output setting for the home button, display a second animated indication that includes movement of a representation of the second tactile output setting toward the home button

1126 The representation of the first tactile output setting and the representation of the second tactile output setting have the same shape as the home button

1128 the first animated indication includes an animated representation of a first tactile output characteristic associated with the first tactile output setting, and the second animated indication includes an animated representation of a second tactile output characteristic associated with the second tactile output setting

1130 in response to detecting the first input of the first type on the home button:
   in accordance with a determination that the respective tactile output setting is the first tactile output setting for the home button, change an appearance of a representation of the first tactile output setting in the home button configuration user interface, and
   in accordance with a determination that the respective tactile output setting is the second tactile output setting for the home button, change an appearance of a representation of the second tactile output setting in the home button configuration user interface 1132 While displaying the home button configuration user interface, display a first affordance that, when activated, causes dismissal of the home button configuration user interface, and causes display of another user interface in place of the home button configuration user interface 1134 While displaying the home button configuration user interface and the first affordance, detecting activation of the first affordance; and
in response to detecting the activation of the first affordance:
   cease to display the home button configuration user interface; and
   display a respective user interface that is distinct from the home button configuration user interface;
while displaying the respective user interface, detect a second input of the first type on the home button; and,
in response detecting the second input of the first type on the home button:
   cease to display the respective user interface;
   display a third user interface that is distinct from the respective user interface; and
   provide, via the one or more tactile output generators, a respective tactile output that corresponds to the respective tactile output setting for the home button that was selected at the time when the affordance was activated

1136 While the respective tactile output setting for the home button is selected, detecting a first input of a second type on the home button, the second type is distinct from the first type; and, in response to detecting the first input of the second type on the home button:

in accordance with a determination that the respective tactile output setting is the first tactile output setting for the home button, provide, via the one or more tactile output generators, the first tactile output that corresponds to the first tactile output setting for the home button without dismissing the home button configuration user interface; and in accordance with a determination that the respective tactile output setting is the second tactile output setting for the home button, provide, via the one or more tactile output generators, the second tactile output that corresponds to the second tactile output setting for the home button without dismissing the home button configuration user interface

1302 At an electronic device with a touch-sensitive surface, a display, and one or more tactile output generators, display, on the display, a first user interface, wherein a home button is available on the device in a plurality of different contexts to dismiss a currently displayed user interface in response to detecting an input of a first type on the home button (A)

1304 While displaying the first user interface, detect a first input of the first type directed to the first user interface 1306 In response to detecting the first input of the first type directed to the first user interface:

in accordance with a determination that user interface tactile outputs are enabled at the electronic device, perform a first operation and provide, via the one or more tactile output generators, a first tactile output that corresponds to the first operation; and in accordance with a determination that user interface tactile outputs are disabled, perform the first operation, and forgo providing at least a portion of the first tactile output that corresponds to the first operation 1308 After performing the first operation, detect a second input of the first type on the home button 1310 In response to detecting the second input of the first type on the home button:

perform a second operation that is associated with the home button; and provide, via the one or more tactile output generators, tactile output that is associated with activation of the home button, without regard to whether or not user interface tactile outputs are enabled at the device

1312 The first user interface is a user interface of a first application, the first operation is an operation of the first application, and the second operation includes dismissing the first application 1314 After performing the first operation, detect a first input of a second type, distinct from the first type, on the home button; and
in response to detecting the first input of the second type on the home button:
    perform a third operation, distinct from the second operation, that is associated with the home button; and
    provide, via the one or more tactile output generators, tactile output that is associated with activation of the home button, without regard to whether or not user interface tactile outputs are enabled at the electronic device 1316 After performing the first operation, detect a first input of a third type, distinct from the first type, on the home button; and
in response to detecting the first input of the third type on the home button:
    perform a fourth operation, distinct from the second operation, that is associated with the home button; and
    provide, via the one or more tactile output generators, tactile output that is associated with activation of the home button, without regard to whether or not user interface tactile outputs are enabled at the electronic device 1318 The first tactile output and the tactile output that is associated with activation of the home button are provided by the same one or more actuators of the one or more tactile output generators 1320 A tactile output pattern of a corresponding tactile output that is provided in response to a respective input of the first type on the home button is user-adjustable

1322 In response to detecting the second input of the first type on the home button, provide an audio output with the tactile output that is associated with activation of the home button, without regard to whether or not user interface tactile outputs are enabled, and without regard to whether or not audio outputs are muted at the device 1324 In response to detecting the second input of the first type on the home button, provide an audio output with the tactile output that is associated with activation of the home button, without regard to whether or not user interface tactile outputs are enabled, wherein a volume of the audio output is independent of a current volume setting at the device 1326 In response to detecting the first input of the first type directed to the first user interface:
    in accordance with a determination that user interface tactile outputs are enabled:
        in accordance with a determination that audio outputs are not muted at the device, provide an audio output with the first tactile output; and
        in accordance with a determination that audio outputs are muted at the device, forgo providing the audio output with the first tactile output.

1328 In response to detecting the first input of the first type directed to the first user interface:
    in accordance with a determination that user interface tactile outputs are enabled:
        in accordance with a determination that audio outputs are set to a first level at the device, providing an audio output with the first tactile output at a first volume and that is determined based on the first level of the audio outputs at the device; and
        in accordance with a determination that audio outputs are set to a second level at the device, providing the audio output with the first tactile output at a second volume that is different from the first volume and is determined based on the second level of the audio outputs at the device

1330 In response to detecting the first input of the first type directed to the first user interface:
    in accordance with a determination that user interface tactile outputs are disabled, forgo providing the audio output with the first tactile output, without regard to whether or not audio outputs are muted at the device 1332 In response to detecting the first input of the first type directed to the first user interface:
    in accordance with a determination that user interface tactile outputs are disabled and in accordance with a determination that the first operation is a predefined exempted operation, provide the first tactile output that corresponds to the first operation with the one or more tactile output generators 1334 In response to detecting the first input of the first type directed to the first user interface:
    in accordance with a determination that user interface tactile outputs are disabled:
        in accordance with a determination that the first operation is a first type of predefined operation, provide the first tactile output that corresponds to the first operation with the one or more tactile output generators; and
        in accordance with a determination that the first operation is a second type of predefined operation, perform the first operation and without providing tactile output that corresponds to the first operation with the one or more tactile output generators; and
    in accordance with a determination that user interface tactile outputs are enabled, perform the first operation and provide the first tactile output that corresponds to the first operation with the one or more tactile output generators, without regard to whether the first operation is of the first type of predefined operation or the second type of predefined operation

1502 At an electronic device with a touch-sensitive surface, a display, one or more tactile output generators, and one or more sensors to detect intensities of contacts with a home button of the device, display, on the display, a user interface

1504 While displaying the user interface, detect an input sequence on the home button that includes detecting a first press input on the home button, wherein detecting the first press input includes detecting an increase in a characteristic intensity of a contact on the home button

1506 In response to detecting the first press input on the home button:
    in accordance with a determination that the first press input includes an increase in the characteristic intensity of the contact above a first intensity threshold, and that a change in the characteristic intensity of the contact proximate to a time when the characteristic intensity of the contact increases above the first intensity threshold has a first value for an intensity-change metric:
        performing a first operation that changes the user interface displayed on the display; and
        generating, via the one or more tactile output generators, a first discrete tactile output that corresponds to the increase in the characteristic intensity of the contact above the first intensity threshold; and
    in accordance with a determination that the first press input includes an increase in the characteristic intensity of the contact above the first intensity threshold, and that the change in the characteristic intensity of the contact proximate to the time when the characteristic intensity of the contact increases above the first intensity threshold has a second value for the intensity-change metric, different from the first value of the intensity-change metric:
        performing the first operation that changes the user interface displayed on the display; and
        generating, via the one or more tactile output generators, a second discrete tactile output that corresponds to the increase in the characteristic intensity of the contact above the first intensity threshold and is different from the first discrete tactile output (A)

1508 The first discrete tactile output and the second discrete tactile output have a same waveform; and the first discrete tactile output and the second discrete tactile output have different amplitudes 1510 The first discrete tactile output stops while the characteristic intensity of the contact is maintained above the first intensity threshold 1512 The second tactile output stops while the characteristic intensity of the contact is maintained above the first intensity threshold 1514 The first tactile output is generated for a first range of values of the intensity-change metric 1516 The second tactile output is generated for a second range of values of the intensity-change metric

1518 Detecting the input sequence on the home button further includes detecting a first release input on the home button, following the first press input on the home button, wherein detecting the first release input includes detecting a decrease in the characteristic intensity of the contact on the home button; and
the method includes:

in response to detecting the first release input on the home button:

in accordance with a determination that the first release input includes a decrease in the characteristic intensity of the contact below a second intensity threshold, and that a change in the characteristic intensity of the contact proximate to a time when the characteristic intensity of the contact decreases below the second intensity threshold has a third value for the intensity-change metric:

generate, via the one or more tactile output generators, a third discrete tactile output that corresponds to the decrease in the characteristic intensity of the contact below the second intensity threshold; and in accordance with a determination that the first release input includes a decrease in the characteristic intensity of the contact below the second intensity threshold, and that the change in the characteristic intensity of the contact proximate to the time when the characteristic intensity of the contact decreases below the second intensity threshold has a fourth value for the intensity-change metric, different from the third value of the intensity-change metric:

generate, via the one or more tactile output generators, a fourth discrete tactile output that corresponds to the decrease in the characteristic intensity of the contact below the second intensity threshold and is different from the third discrete tactile output

---

1520 Generating the first and second tactile outputs includes applying a first modification to a base tactile output pattern in accordance with the first and second values of the intensity-change metric, respectively; and generating the third and fourth tactile outputs includes applying a second modification, distinct from the first modification, to the base tactile output pattern in accordance with the third and fourth values of the intensity-change metric, respectively

---

1522 The second intensity threshold is different from the first intensity threshold

1524 The first discrete tactile output and the second discrete tactile output are generated from a base haptic output pattern that is associated with a currently selected tactile output setting from a plurality of different tactile output settings for the home button

---

1526 The home button is persistently displayed at a respective location or located at a persistent location on the device that is separate from the display

---

1528 The intensity-change metric is based on a rate of change of the characteristic intensity of the contact over time

---

1530 The intensity-change metric is based on a rate of change of the characteristic intensity of the contact measured at a time that the characteristic intensity of the contact reaches a relevant threshold intensity

---

1532 Detecting the input sequence includes detecting a second press input on the home button, wherein detecting the second press input includes detecting a second increase in the characteristic intensity of the contact on the home button;

the method includes, in response to detecting the second press input:
in accordance with a determination, based on an amount of time between a first point in time that corresponds to the first press input and a second point in time that corresponds to the second press input, that the first press input and the second press input are part of a predefined input pattern:
    perform a second operation associated with the predefined input pattern, wherein the second operation is different from the first operation; and
    provide, via the one or more tactile output generators, a fifth discrete tactile output, distinct from the first and second tactile outputs

1534 Detecting the input sequence includes detecting a second press input on the home button, wherein detecting the second press input includes detecting a second increase in the characteristic intensity of the contact on the home button; the method includes:
    in response to detecting the first press input, provide a first audio output concurrently with a respective one of the first and second tactile outputs that was generated in response to the first press input; and
    in response to detecting the second press input:
        in accordance with a determination, based on an amount of time between a first point in time that corresponds to the first press input and a second point in time that corresponds to the second press input, that the first press input and the second press input are part of a predefined input pattern:
            perform a second operation associated with the input pattern, wherein the second operation is different from the first operation;
            provide, via the one or more tactile output generators, a fifth discrete tactile output, wherein the fifth tactile output is identical to the respective one of the first and second tactile outputs that was generated for the first press input; and
            provide a second audio output concurrently with the fifth discrete tactile output, wherein the second audio output and the first audio output have different audio output patterns 1536 In response to detecting the first press input on the home button:
    change the user interface from a first user interface to a second user interface, without regard to the value of the intensity-change metric that corresponds to the first press input

1702 At an electronic device with a touch-sensitive surface, a display, one or more tactile output generators for generating tactile outputs, and one or more sensors to detect intensities of contacts with a home button of the device: display a first user interface 1704 While displaying the first user interface, detect:
    a first press input on the home button; and
    a second press input on the home button that is detected after the first press input 1706 In response to detecting the first press input and before detecting the second press input, provide a first non-visual output with a first non-visual output profile, wherein the first non-visual output provides feedback indicating that the first press input was detected and the first non-visual output includes tactile output provided by the one or more tactile output generators 1708 In response to detecting an input sequence including the first press input and the second press input on the home button:
    in accordance with a determination, based on an amount of time between a first point in time that corresponds to the first press input and a second point in time that corresponds to the second press input, that the first press input and the second press input are separate inputs:
        perform a first operation associated with the first press input; and
        provide a second non-visual output with the first non-visual output profile, wherein the second non-visual output provides feedback indicating that the second press input was detected and the second non-visual output includes tactile output provided by the one or more tactile output generators; and,
    in accordance with a determination, based on the amount of time between the first point in time and the second point in time, that the first press input and the second press input are part of an input pattern:
        perform a second operation associated with the input pattern, wherein the second operation is different from the first operation; and
        provide a third non-visual output with a second non-visual output profile that is distinct from the first non-visual output profile, wherein the third non-visual output provides feedback indicating that the second press input was detected and the third non-visual output includes tactile output provided by the one or more tactile output generators (A)

1710 The first point in time is one of: a time at which a characteristic intensity of the first press input increased above a press intensity threshold, and a time at which the characteristic intensity of the first press input decreased below a release intensity threshold 1712 The second point in time is one of: a time at which a characteristic intensity of the second press input increased above a press intensity threshold, and a time at which the characteristic intensity of the second press input decreased below a release intensity threshold 1714 In response to detecting the input sequence including the first press input and the second press input on the home button:
    in accordance with a determination that the first press input and the second press input are separate inputs:
        perform a third operation associated with the second press input 1716 Performing the first operation associated with the first press input includes performing the first operation in response to a release event of the first press input 1718 The tactile output of the third non-visual output is different from the tactile output of the first non-visual output 1720 A first audio output of the first non-visual output is different from a second audio output of the third non-visual output 1722 The first press input on the home button is a first press event that corresponds to an increase in a characteristic intensity of a first contact on the home button above a press intensity threshold followed by a first release event that corresponds to a decrease in the characteristic intensity of the first contact below a release intensity threshold, and the second press input on the home button is a second press event that corresponds to an increase in a characteristic intensity of a second contact on the home button above the press intensity threshold

1724 The first press input on the home button is a first press event that corresponds to an increase in a characteristic intensity of a first contact on the home button above a press intensity threshold followed by a first release event that corresponds to a decrease in the characteristic intensity of the first contact below a release intensity threshold, and the second press input on the home button is a second press event that corresponds to an increase in a characteristic intensity of a second contact on the home button above the press intensity threshold followed by a second release event that corresponds to a decrease in the characteristic intensity of the second contact below the release intensity threshold

---

1726 In response to detecting the first press input on the home button:
    in accordance with a determination that an intensity-change metric of the first press input has a first value, provide the first non-visual output with a first amplitude that corresponds to the first value for the intensity-change metric; and
    in accordance with a determination that the intensity-change metric of the first press input has a second value different from the first value, provide the first non-visual output with a second amplitude that corresponds to the second value for the intensity-change metric, wherein the second amplitude is different from the first amplitude

---

1728 in response to detecting the second press input on the home button:
    in accordance with a determination that the first press input and the second press input are separate inputs:
        in accordance with a determination that an intensity-change metric of the second press input has a third value, providing the second non-visual output with a third amplitude that corresponds to the third value for the intensity-change metric; and
        in accordance with a determination that the intensity-change metric of the second press input has a fourth value different from the third value, providing the second non-visual output with a fourth amplitude that corresponds to the fourth value for the intensity-change metric, wherein the fourth amplitude is different from the third amplitude; and
    in accordance with a determination that the first press input and the second press input are part of the input pattern:
        in accordance with a determination that the intensity-change metric of the second press input has the third value, providing the third non-visual output with a fifth amplitude that corresponds to the third value for the intensity change metric; and
        in accordance with a determination that the intensity-change metric of the second press input has a fourth value, providing the third non-visual output with a sixth amplitude that corresponds to the fourth value for the intensity-change metric, wherein the sixth amplitude is different from the fifth amplitude

1730 In response to detecting the first press input, wherein the first press input is consistent with a request to transition to a second user interface and a request to transition to a third user interface, starting to display a first animated transition from the first user interface to the second user interface;
in response to detecting the second press input, wherein the second press input is detected while the first animated transition is being displayed:
    in accordance with a determination that the second press input is received at a first time:
        interrupt the first animated transition from the first user interface to the second user interface at a first point in the first animated transition, and
        display a second animated transition from the first point in the first animated transition to the third user interface; and
    in accordance with a determination that the second press input is received at a second time that is after the first time:
        interrupt the first animated transition from the first user interface to the second user interface at a second point in the first animated transition that is after the first point in the first animated transition, and
        display a third animation transition from the second point in the first animated transition to the third user interface, wherein the third animated transition is different from the second animated transition

1902 At an electronic device with a touch-sensitive surface, a display, one or more tactile output generators for generating tactile outputs, and one or more sensors to detect intensities of contacts with a respective button of the device:
detect an input on the respective button, wherein the one or more tactile output generators are used to generate tactile outputs indicating that the respective button has been activated in place of a mechanical switch that detects activation of the respective button when the respective button is mechanically compressed

1904 In response to detecting the input on the respective button:
    in accordance with a determination that the input meets activation criteria, wherein the activation criteria include a requirement that the input includes an intensity above a respective intensity threshold in order for the activation criteria to be met, provide a first tactile output with a first tactile output pattern that includes:
        between 0.5 and 4 cycles of an oscillation of the one or more tactile output generators relative to one or more corresponding neutral positions of the one or more tactile output generators, wherein the oscillation of the one or more tactile output generators occurs at a frequency between 80Hz and 400Hz; and
    in accordance with a determination that the input does not meet the activation criteria, forgo providing the first tactile output > 1906 The first tactile output pattern includes between 0.5 and 2 cycles of oscillation of the one or more tactile output generators relative to the one or more corresponding neutral positions of the one or more tactile output generators > 1908 The first tactile output pattern includes between 1 and 2 cycles of oscillation of the one or more tactile output generators relative to the one or more corresponding neutral positions of the one or more tactile output generators > 1910 The oscillation of the one or more tactile output generators occurs at a frequency between 200Hz and 350Hz > 1912 The oscillation of the one or more tactile output generators occurs at the frequency between 225Hz and 335Hz > 1914 The oscillation of the one or more tactile output generators occurs at a variable frequency selected from two or more frequencies between 150 Hz and 400Hz

1916 In response to detecting the input on the home button:
  in accordance with a determination that the input meets the activation criteria and that a change in a characteristic intensity of the input proximate to a time when the characteristic intensity of the input increases above the respective intensity threshold has a first value for an intensity-change metric, provide the first tactile output with a first amplitude that corresponds to the first value of the intensity-change metric; and
  in accordance with a determination that the input meets the activation criteria and that the change in the characteristic intensity of the input proximate to a time when the characteristic intensity of the input increases above the respective intensity threshold has a second value for the intensity-change metric different from the first value of the intensity-change metric, provide the first tactile output with a second amplitude that corresponds to the second value for the intensity-change metric, wherein the second amplitude is different from the first amplitude

1918 After detecting the input on the home button, detecting a second input on the home button;
in response to detecting the first input and before detecting the second input, provide the first tactile output with a third amplitude;
in response to detecting an input sequence including the input and the second input:
  in accordance with a determination, based on an amount of time between a first point in time that corresponds to the input and a second point in time that corresponds to the second input, that the input and the second input are separate inputs:
    provide a second tactile output with the third amplitude, wherein the second tactile output provides feedback indicating that the second input was detected; and
  in accordance with a determination, based on the amount of time between the first point in time and the second point in time, that the input and the second input are part of an input pattern:
    provide a third tactile output with a fourth amplitude that is distinct from the third amplitude, wherein the third tactile output provides feedback indicating that the second input was detected

1920 The input on the home button was detected while a first user interface is displayed on the display;
the method includes:
    in response to detecting the input on the home button:
        in accordance with a determination that the input meets the activation criteria:
            cease to display the first user interface; and
            display a second user interface on the display; and
        in accordance with a determination that the input does not meet the activation criteria, maintain display of the first user interface on the display 1922 The second user interface is a system user interface

Figure 19C

DEVICES, METHODS, AND GRAPHICAL USER INTERFACES FOR PROVIDING FEEDBACK DURING INTERACTION WITH AN INTENSITY-SENSITIVE BUTTON

RELATED APPLICATION

This is a continuation of U.S. application Ser. No. 15/271,194, filed Sep. 20, 2016, which claims priority to U.S. Provisional Application Ser. No. 62/384,180, filed Sep. 6, 2016, entitled "Devices, Methods, and Graphical User Interfaces for Providing Feedback During Interaction with an Intensity-Sensitive Button," both of which are incorporated by reference herein in their entirety.

TECHNICAL FIELD

This relates generally to electronic devices with displays and intensity-sensitive buttons, including but not limited to electronic devices with displays and an intensity-sensitive home button.

BACKGROUND

Many electronic devices with displays include mechanical buttons, such as mechanical home buttons, to navigate between different user interfaces displayed on the electronic devices. But mechanical buttons provide little, if any, feedback to a user beyond a fixed down click and a fixed up click.

SUMMARY

Accordingly, there is a need for electronic devices with improved methods and interfaces for providing visual, haptic, and/or audio feedback during interaction with a button, which make manipulation of user interfaces more efficient and intuitive for a user. Such methods and interfaces optionally complement or replace conventional methods for providing feedback during interaction with a button. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for electronic devices with buttons are reduced or eliminated by the disclosed devices, which include one or more intensity-sensitive buttons. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display, a touch-sensitive surface, and one or more sensors to detect intensities of contacts with a home button of the device. The method includes: displaying, on the display, a first user interface and, while displaying the first user interface, detecting an input directed to the first user interface. In response to detecting the input directed to the first user interface, the method includes: ceasing to displaying the first user interface, and displaying a second user interface, distinct from the first user interface. While displaying the second user interface, the method includes: detecting a contact on the home button. While continuously detecting the contact on the home button, the method includes: (i) detecting an increase in a characteristic intensity of the contact above a first intensity threshold; (ii) in response to detecting the increase in the characteristic intensity of the contact to the first intensity threshold, displaying a beginning of a transition from the second user interface back to the first user interface; and (iii) while displaying the beginning of the transition from the second user interface back to the first user interface, detecting an input sequence that includes detecting a press input that includes an increase in the characteristic intensity of the contact above the first intensity threshold. In response to detecting the input sequence, the method includes: (i) in accordance with a determination that the input sequence meets first criteria (e.g., the first criteria require that the characteristic intensity of the contact increases above a second intensity threshold before an end of the press input is detected): (A) ceasing to display the second user interface, and (B) redisplaying the first user interface on the display; and (ii) in accordance with a determination that the input sequence meets second criteria, (e.g., the second criteria require that the characteristic intensity of the contact remains below the second intensity threshold before the end of the press input is detected): (A) reversing the beginning of the transition from the second user interface back to the first user interface, and (B) redisplaying the second user interface on the display.

In accordance with some embodiments, an electronic device includes a display unit configured to display a user interface, a touch-sensitive surface unit to receive contacts, one or more sensor units to detect intensities of contacts with a home button of the device; and a processing unit coupled with the display unit, the touch-sensitive surface unit, and the one or more sensor units. The processing unit is configured to: display, on the display, a first user interface; while displaying the first user interface, detect an input directed to the first user interface; in response to detecting the input directed to the first user interface: (i) cease to display the first user interface, and (ii) display a second user interface, distinct from the first user interface; while displaying the second user interface, detect a contact on the home button; while continuously detecting the contact on the home button: (i) detect an increase in a characteristic intensity of the contact above a first intensity threshold; (ii) in response to detecting the increase in the characteristic intensity of the contact to the first intensity threshold, display a beginning of a transition from the second user interface back to the first user interface; (iii) while displaying the beginning of the transition from the second user interface back to the first user interface, detect an input sequence that includes detecting a press input that includes an increase in the characteristic intensity of the contact above the first intensity threshold; in response to detecting the input sequence: (i) in accordance with a determination that the input sequence meets first criteria, wherein the first criteria require that the characteristic intensity of the contact increases above a second intensity threshold before an end of the press input is detected: (A) cease to display the second user interface, and (B) redisplay the first user interface on the display; and (ii) in accordance with a determination that the input sequence meets second criteria, wherein the second criteria require that the characteristic intensity of the contact remains below the second intensity threshold before the end of the press input is detected: (A) reverse the beginning of the transition from the second user interface back to the first user interface, and (B) redisplay the second user interface on the display.

In accordance with some embodiments, a method is performed at an electronic device with a display and a touch-sensitive surface. The method includes: displaying a first user interface and, while displaying the first user interface, detecting a first input (e.g., the first input is consistent with a request to display a second user interface and a request to display a third user interface). In response to detecting the first input, the method includes: starting to display a first animated transition from the first user interface to the second user interface. While the first animated transition is being displayed, the method includes: detecting a second input. In response to detecting the second input, the method includes: (i) in accordance with a determination that the second input is consistent with the request to display the third user interface, and that the second input is received at a first time: (A) interrupting the first animated transition from the first user interface to the second user interface at a first point in the first animated transition, and (B) displaying a second animated transition from the first point in the first animated transition to the third user interface; and (ii) in accordance with a determination that the second input is consistent with the request to display the third user interface, and that the second input is received at a second time that is after the first time: (A) interrupting the first animated transition from the first user interface to the second user interface at a second point in the first animated transition that is after the first point in the first animated transition, and (B) displaying a third animated transition from the second point in the first animated transition to the third user interface, and the third animated transition is different from the second animated transition.

In accordance with some embodiments, an electronic device includes a display unit configured to display a user interface and a touch-sensitive surface unit to receive contacts; and a processing unit coupled with the display unit and the touch-sensitive surface unit. The processing unit is configured to: display a first user interface; while displaying the first user interface, detect a first input, wherein the first input is consistent with a request to display a second user interface and a request to display a third user interface; in response to detecting the first input, start to display a first animated transition from the first user interface to a second user interface; while the first animated transition is being displayed, detect a second input; and in response to detecting the second input: (i) in accordance with a determination that the second input is consistent with the request to display the third user interface, and that the second input is received at a first time: (A) interrupt the first animated transition from the first user interface to the second user interface at a first point in the first animated transition, and (B) display a second animated transition from the first point in the first animated transition to the third user interface; and (ii) in accordance with a determination that the second input is consistent with the request to display the third user interface, and that the second input is received at a second time that is after the first time: (A) interrupt the first animated transition from the first user interface to the second user interface at a second point in the first animated transition that is after the first point in the first animated transition, and (B) display a third animated transition from the second point in the first animated transition to the third user interface, wherein the third animated transition is different from the second animated transition.

In accordance with some embodiments, a method is performed at an electronic device with a display, a touch-sensitive surface, and one or more tactile output generators for generating tactile outputs. The method includes: displaying, on the display, a home button configuration user interface that includes displaying a plurality of different tactile output settings for the home button, and the home button is available on the device in a plurality of different contexts to dismiss a currently displayed user interface in response to detecting an input of a first type on the home button. While displaying the home button configuration user interface, the method includes: detecting selection of a respective tactile output setting of the home button of the plurality of different tactile output settings. While the respective tactile output setting for the home button is selected, the method includes: detecting a first input of the first type on the home button. In response to detecting the first input of the first type on the home button, the method includes: (i) in accordance with a determination that the respective tactile output setting is a first tactile output setting for the home button, providing, via the one or more tactile output generators, a first tactile output that corresponds to the first tactile output setting for the home button without dismissing the home button configuration user interface; and,(ii) in accordance with a determination that the respective tactile output setting is a second tactile output setting, different from the first tactile output setting, for the home button, providing, via the one or more tactile output generators, a second tactile output that corresponds to the second tactile output setting for the home button without dismissing the home button configuration user interface.

In accordance with some embodiments, an electronic device includes a display unit configured to display a user interface, a touch-sensitive surface unit to receive contacts, one or more tactile output generating units to generate tactile outputs; and a processing unit coupled with the display unit, the touch-sensitive surface unit, and the one or more tactile output generating units. The processing unit is configured to: display, on the display, a home button configuration user interface that includes displaying a plurality of different tactile output settings for the home button, wherein the home button is available on the device in a plurality of different contexts to dismiss a currently displayed user interface in response to detecting an input of a first type on the home button; while displaying the home button configuration user interface, detect selection of a respective tactile output setting of the home button of the plurality of different tactile output settings; while the respective tactile output setting for the home button is selected, detect a first input of the first type on the home button; and, in response to detecting the first input of the first type on the home button: (i) in accordance with a determination that the respective tactile output setting is a first tactile output setting for the home button, provide, via the one or more tactile output generators, a first tactile output that corresponds to the first tactile output setting for the home button without dismissing the home button configuration user interface; and, (ii) in accordance with a determination that the respective tactile output setting is a second tactile output setting, different from the first tactile output setting, for the home button, provide, via the one or more tactile output generators, a second tactile output that corresponds to the second tactile output setting for the home button without dismissing the home button configuration user interface.

In accordance with some embodiments, a method is performed at an electronic device with a display, a touch-sensitive surface, and one or more tactile output generators for generating tactile outputs. The method includes: displaying, on the display, a first user interface, and a home button is available on the device in a plurality of different contexts to dismiss a currently displayed user interface in response to detecting an input of a first type on the home button. While displaying the first user interface, the method includes: detecting a first input of the first type directed to the first user interface. In response to detecting the first input of the first type directed to the first user interface, the method includes: (i) in accordance with a determination that user interface tactile outputs are enabled at the electronic device, performing a first operation and providing, via the one or more tactile output generators, a first tactile output that corresponds to the first operation; and (ii) in accordance with a determination that user interface tactile outputs are disabled, performing the first operation, and forgoing providing at least a portion of the first tactile output that corresponds to the first operation. After performing the first operation, the method includes: detecting a second input of the first type on the home button. In response to detecting the second input of the first type on the home button: (i) performing a second operation that is associated with the home button; and (ii) providing, via the one or more tactile output generators, tactile output that is associated with activation of the home button, without regard to whether or not user interface tactile outputs are enabled at the device.

In accordance with some embodiments, an electronic device includes a display unit configured to display a user interface, a touch-sensitive surface unit to receive contacts, one or more tactile output generating units to generate tactile outputs; and a processing unit coupled with the display unit, the touch-sensitive surface unit, and the one or more tactile output generating units. The processing unit is configured to: display, on the display, a first user interface, wherein a home button is available on the device in a plurality of different contexts to dismiss a currently displayed user interface in response to detecting an input of a first type on the home button; while displaying the first user interface, detect a first input of the first type directed to the first user interface; in response to detecting the first input of the first type directed to the first user interface: (i) in accordance with a determination that user interface tactile outputs are enabled at the electronic device, perform a first operation and provide via the one or more tactile output generators, a first tactile output that corresponds to the first operation; (ii) in accordance with a determination that user interface tactile outputs are disabled, perform the first operation, and forgo providing at least a portion of the first tactile output that corresponds to the first operation; after performing the first operation, detect a second input of the first type on the home button; and in response to detecting the second input of the first type on the home button: (i) perform a second operation that is associated with the home button; and (ii) provide, via the one or more tactile output generators, tactile output that is associated with activation of the home button, without regard to whether or not user interface tactile outputs are enabled at the device.

In accordance with some embodiments, a method is performed at an electronic device with a display, a touch-sensitive surface, one or more tactile output generators for generating tactile outputs, and one or more sensors to detect intensities of contacts with a home button of the device. The method includes: displaying a user interface on the display and, while displaying the user interface, detecting an input sequence on the home button that includes detecting a first press input on the home button. Detecting the first press input includes detecting an increase in a characteristic intensity of a contact on the home button. In response to detecting the first press input on the home button: (i) in accordance with a determination that the first press input includes an increase in the characteristic intensity of the contact above a first intensity threshold, and that a change in the characteristic intensity of the contact proximate to a time when the characteristic intensity of the contact increases above the first intensity threshold has a first value for an intensity-change metric: (A) performing a first operation that changes the user interface displayed on the display; and (B) generating, via the one or more tactile output generators, a first discrete tactile output that corresponds to the increase in the characteristic intensity of the contact above the first intensity threshold; and (ii) in accordance with a determination that the first press input includes an increase in the characteristic intensity of the contact above the first intensity threshold, and that the change in the characteristic intensity of the contact proximate to the time when the characteristic intensity of the contact increases above the first intensity threshold has a second value for the intensity-change metric, different from the first value of the intensity-change metric: (A) performing the first operation that changes the user interface displayed on the display; and (B) generating, via the one or more tactile output generators, a second discrete tactile output that corresponds to the increase in the characteristic intensity of the contact above the first intensity threshold and is different from the first discrete tactile output.

In accordance with some embodiments, an electronic device includes a display unit configured to display a user interface, a touch-sensitive surface unit to receive contacts, one or more tactile output generating units to generate tactile outputs, and one or more sensor units to detect intensities of contacts with a home button of the device; and a processing unit coupled with the display unit, the touch-sensitive surface unit, the one or more tactile output generating units, and the one or more sensor units. The processing unit is configured to: display a user interface on the display; while displaying the user interface, detect an input sequence on the home button that includes detecting a first press input on the home button, wherein detecting the first press input includes detecting an increase in a characteristic intensity of a contact on the home button; and in response to detecting the first press input on the home button: (i) in accordance with a determination that the first press input includes an increase in the characteristic intensity of the contact above a first intensity threshold, and that a change in the characteristic intensity of the contact proximate to a time when the characteristic intensity of the contact increases above the first intensity threshold has a first value for an intensity-change metric: (A) perform a first operation that changes the user interface displayed on the display; and (B) generate, via the one or more tactile output generators, a first discrete tactile output that corresponds to the increase in the characteristic intensity of the contact above the first intensity threshold; and (ii) in accordance with a determination that the first press input includes an increase in the characteristic intensity of the contact above the first intensity threshold, and that the change in the characteristic intensity of the contact proximate to the time when the characteristic intensity of the contact increases above the first intensity threshold has a second value for the intensity-change metric, different from the first value of the intensity-change metric: (A) perform the first operation that changes the user interface displayed on the display; and (B) generate, via the one or more tactile output generators, a second discrete tactile output that corresponds to the increase in the characteristic intensity of the contact above the first intensity threshold and is different from the first discrete tactile output.

In accordance with some embodiments, a method is performed at an electronic device with a display, a touch-sensitive surface, one or more tactile output generators for generating tactile outputs, and one or more sensors to detect intensities of contacts with a home button of the device. The method includes: displaying a first user interface. While displaying the first user interface, the method includes detecting: (i) a first press input on the home button; and (ii) a second press input on the home button that is detected after the first press input. In response to detecting the first press input and before detecting the second press input, providing a first non-visual output with a first non-visual output profile. The first non-visual output provides feedback indicating that the first press input was detected and the first non-visual output includes tactile output provided by the one or more tactile output generators. In response to detecting an input sequence including the first press input and the second press input on the home button, the method includes: (i) in accordance with a determination, based on an amount of time between a first point in time that corresponds to the first press input and a second point in time that corresponds to the second press input, that the first press input and the second press input are separate inputs: (A) performing a first operation associated with the first press input; and (B) providing a second non-visual output with the first non-visual output profile, the second non-visual output providing feedback indicating that the second press input was detected and the second non-visual output including tactile output provided by the one or more tactile output generators; and, (ii) in accordance with a determination, based on the amount of time between the first point in time and the second point in time, that the first press input and the second press input are part of an input pattern: (A) performing a second operation associated with the input pattern, and the second operation is different from the first operation; and (B) providing a third non-visual output with a second non-visual output profile that is distinct from the first non-visual output profile, and the third non-visual output provides feedback indicating that the second press input was detected and the third non-visual output includes tactile output provided by the one or more tactile output generators.

In accordance with some embodiments, an electronic device includes a display unit configured to display a user interface, a touch-sensitive surface unit to receive contacts, one or more tactile output generating units to generate tactile outputs, one or more sensor units to detect intensities of contacts with a home button of the device; and a processing unit coupled with the display unit, the touch-sensitive surface unit, the one or more tactile output generating units, and the one or more sensor units. The processing unit is configured to: display a first user interface; while displaying the first user interface, detect: (i) a first press input on the home button; and (ii) a second press input on the home button that is detected after the first press input; in response to detecting the first press input and before detecting the second press input, provide a first non-visual output with a first non-visual output profile, wherein the first non-visual output provides feedback indicating that the first press input was detected and the first non-visual output includes tactile output provided by the one or more tactile output generators; in response to detecting an input sequence including the first press input and the second press input on the home button: (i) in accordance with a determination, based on an amount of time between a first point in time that corresponds to the first press input and a second point in time that corresponds to the second press input, that the first press input and the second press input are separate inputs: (A) perform a first operation associated with the first press input; and (B) provide a second non-visual output with the first non-visual output profile, wherein the second non-visual output provides feedback indicating that the second press input was detected and the second non-visual output includes tactile output provided by the one or more tactile output generators; and, (ii) in accordance with a determination, based on the amount of time between the first point in time and the second point in time, that the first press input and the second press input are part of an input pattern: (A) perform a second operation associated with the input pattern, wherein the second operation is different from the first operation; and (B) provide a third non-visual output with a second non-visual output profile that is distinct from the first non-visual output profile, wherein the third non-visual output provides feedback indicating that the second press input was detected and the third non-visual output includes tactile output provided by the one or more tactile output generators.

In accordance with some embodiments, a method is performed at an electronic device with a display, a touch-sensitive surface, one or more tactile output generators for generating tactile outputs, and one or more sensors to detect intensities of contacts with a respective button of the device. The method includes: detecting an input on the respective button, and the one or more tactile output generators are used to generate tactile outputs indicating that the respective button has been activated in place of a mechanical switch that detects activation of the respective button when the respective button is mechanically compressed. In response to detecting the input on the respective button, the method includes: (i) in accordance with a determination that the input meets activation criteria, the activation criteria including a requirement that the input includes an intensity above a respective intensity threshold in order for the activation criteria to be met, providing a first tactile output with a first tactile output pattern that includes: (A) between 0.5 and 4 cycles of an oscillation of the one or more tactile output generators relative to one or more corresponding neutral positions of the one or more tactile output generators, and the oscillation of the one or more tactile output generators occurs at a frequency between 80 Hz and 400 Hz; and (ii) in accordance with a determination that the input does not meet the activation criteria, forgoing providing the first tactile output.

In accordance with some embodiments, an electronic device includes a display unit configured to display a user interface, a touch-sensitive surface unit to receive contacts, one or more tactile output generating units to generate tactile outputs, one or more sensor units to detect intensities of contacts with a home button of the device; and a processing unit coupled with the display unit, the touch-sensitive surface unit, the one or more tactile output generating units, and the one or more sensor units. The processing unit is configured to: detect an input on the respective button, wherein the one or more tactile output generators are used to generate tactile outputs indicating that the respective button has been activated in place of a mechanical switch that detects activation of the respective button when the respective button is mechanically compressed; in response to detecting the input on the respective button: (i) in accordance with a determination that the input meets activation criteria, wherein the activation criteria include a requirement that the input includes an intensity above a respective intensity threshold in order for the activation criteria to be met, provide a first tactile output with a first tactile output pattern that includes: between 0.5 and 4 cycles of an oscillation of the one or more tactile output generators relative to one or more corresponding neutral positions of the one or more tactile output generators, wherein the oscillation of the one or more tactile output generators occurs at a frequency between 80 Hz and 400 Hz; and (ii) in accordance with a determination that the input does not meet the activation criteria, forgo providing the first tactile output.

In accordance with some embodiments, an electronic device includes a display, a touch-sensitive surface, optionally one or more sensors to detect intensities of contacts with the touch-sensitive surface, an intensity-sensitive button (e.g., a virtual or physical home button), one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, an intensity-sensitive button (e.g., a virtual or physical home button), and optionally one or more sensors to detect intensities of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, an intensity-sensitive button (e.g., a virtual or physical home button), a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, an intensity-sensitive button (e.g., a virtual or physical home button), and optionally one or more sensors to detect intensities of contacts with the touch-sensitive surface; and means for performing or causing performance of the operations of any of the methods described herein. In accordance with some embodiments, an information processing apparatus, for use in an electronic device with a display and a touch-sensitive surface, an intensity-sensitive button (e.g., a virtual or physical home button), and optionally one or more sensors to detect intensities of contacts with the touch-sensitive surface, includes means for performing or causing performance of the operations of any of the methods described herein.

Thus, electronic devices with displays, touch-sensitive surfaces, one or more sensors to detect intensities of contacts with a button of the device (e.g., a virtual or physical home button), optionally one or more sensors to detect intensities of contacts with the touch-sensitive surface, one or more tactile output generators, optionally one or more device orientation sensors, and optionally an audio system, are provided with improved methods and interfaces for providing feedback to a user during interaction with a button, thereby increasing the effectiveness, efficiency, and user satisfaction with such devices. Such methods and interfaces may complement or replace conventional methods for providing haptic feedback to a user.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4B illustrates an example user interface for a multifunction device with a touch-sensitive surface that is separate from the display in accordance with some embodiments.

FIGS. 4L-4Q enlarge the combinations shown in FIG. 4K for clarity.

FIGS. 5A1-5A18 illustrate exemplary user interfaces for providing haptic and visual feedback for button interaction in accordance with some embodiments.

FIGS. 5B1-5B75 illustrate exemplary user interfaces for providing haptic and visual feedback for button interaction in accordance with some embodiments.

FIGS. 5C1-5C19 illustrate exemplary user interfaces for a home button configuration process in accordance with some embodiments.

FIGS. 6A1-6B26 illustrate exemplary user interfaces for controlling user interface haptics and home button haptics in accordance with some embodiments.

FIGS. 7A-7G are flow diagrams illustrating a method of providing visual feedback regarding activation of a user input device in accordance with some embodiments.

FIGS. 9A-9D are flow diagrams illustrating a method of providing visual feedback and tactile outputs in response to multiple types of inputs on a home button of a device in accordance with some embodiments.

FIGS. 11A-11E are flow diagrams illustrating a method of home button configuration in accordance with some embodiments.

FIGS. 13A-13D are flow diagrams illustrating a method of controlling user interface haptics and home button haptics in accordance with some embodiments.

FIGS. 15A-15E are flow diagrams illustrating a method of generating tactile outputs with different tactile output patterns depending on an input-based metric or a user interface-based metric in accordance with some embodiments.

FIGS. 17A-17D are flow diagrams illustrating a method of providing a different tactile output for a second click of a double click input than for a first click of the double click input in accordance with some embodiments.

FIG. 18 is a functional block diagram of an electronic device in accordance with some embodiments.

FIGS. 19A-19C are flow diagrams illustrating a method of providing discrete tactile outputs to indicate activation of a persistent non-mechanical button on a device in accordance with some embodiments.

DESCRIPTION OF EMBODIMENTS

Figure 1A:
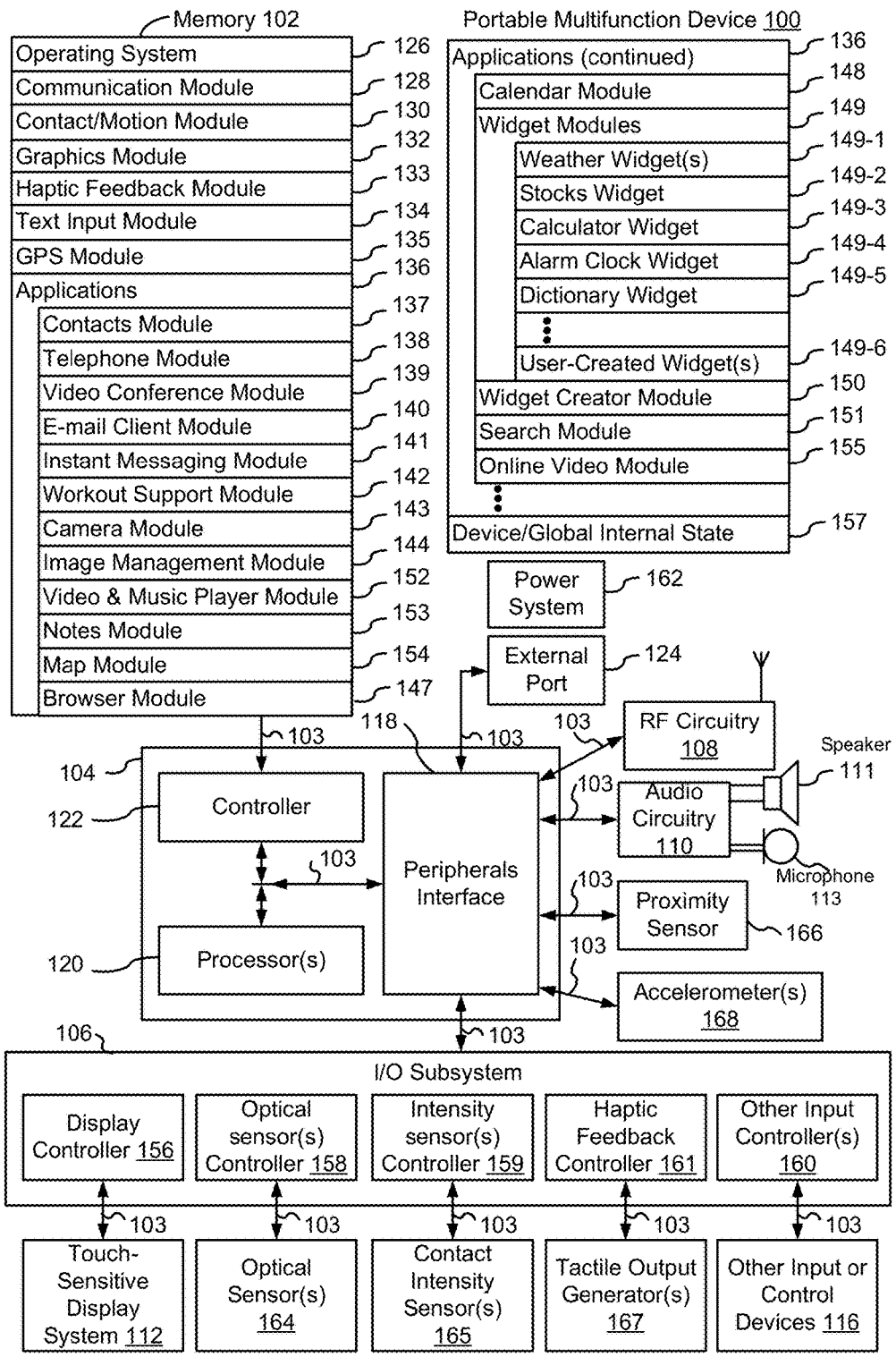
FIG. 1A is a block diagram illustrating a portable multifunction device with a touch-sensitive display in accordance with some embodiments.

Many electronic devices with displays include mechanical buttons, such as mechanical home buttons, to navigate between different user interfaces displayed on the electronic devices. But mechanical buttons provide little, if any, feedback to a user beyond a fixed down click and a fixed up click. Methods described herein provide visual, haptic, and/or audio feedback during interaction with a button (e.g., a virtual or physical home button) that make manipulation of user interfaces more efficient and intuitive for a user.

The methods, devices, and GUIs described herein use feedback to improve device-user interactions in multiple ways, including by:
 providing visual feedback regarding activation of a user input device (e.g., a virtual or physical home button);
 providing visual feedback and tactile outputs in response to multiple types of inputs on a home button of a device;
 configuring the feedback provided by a home button;
 controlling user interface haptics and home button haptics;
 generating tactile outputs with different tactile output patterns depending on an input-based metric or a user interface-based metric;
 providing a different tactile output for a second click of a double click input than for a first click of the double click input; and
 providing discrete tactile outputs to indicate activation of a persistent non-mechanical button on a device.

EXAMPLE DEVICES

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

Figure 4A:
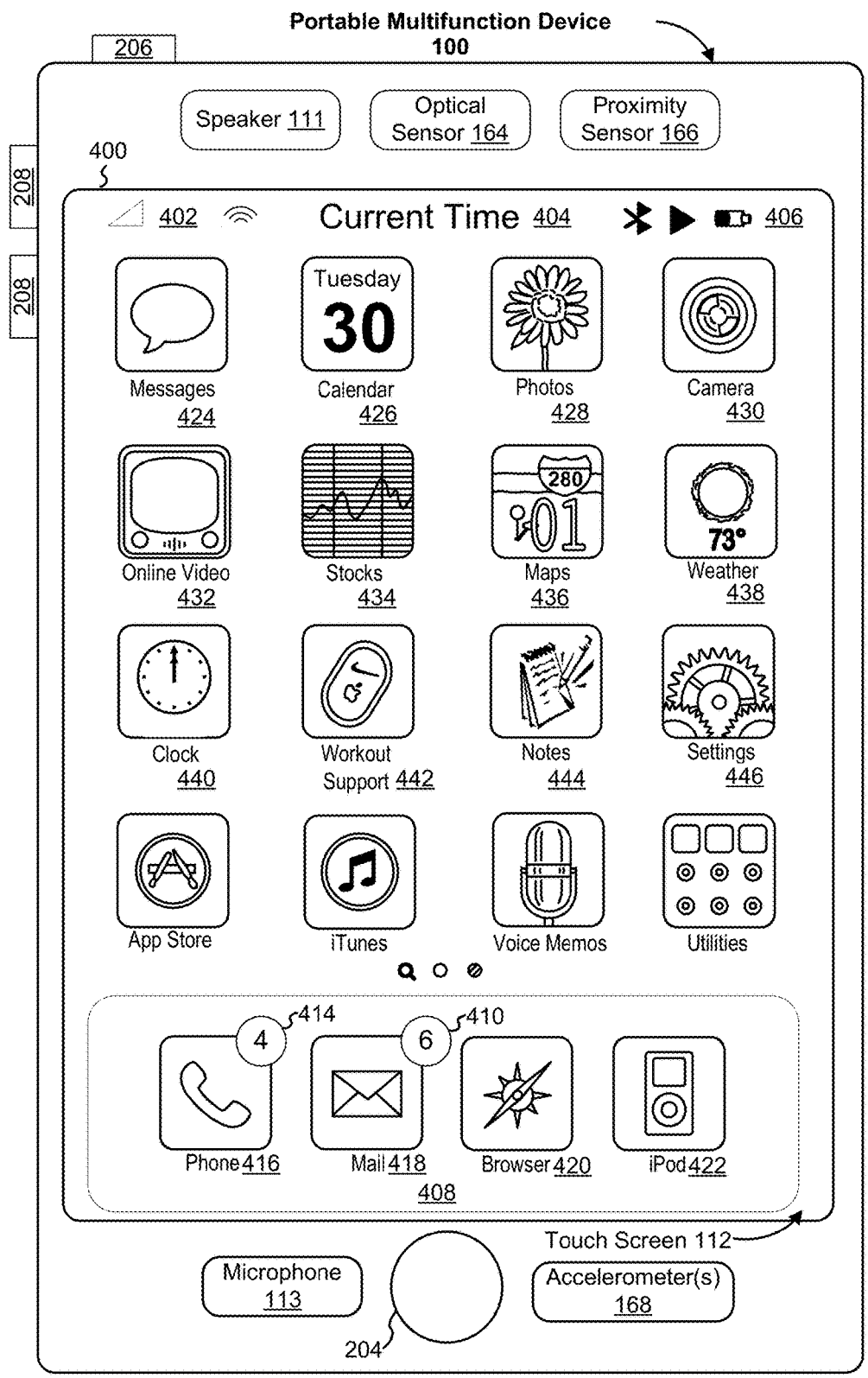
FIG. 4A illustrates an example user interface for a menu of applications on a portable multifunction device in accordance with some embodiments.
Figure 4C:
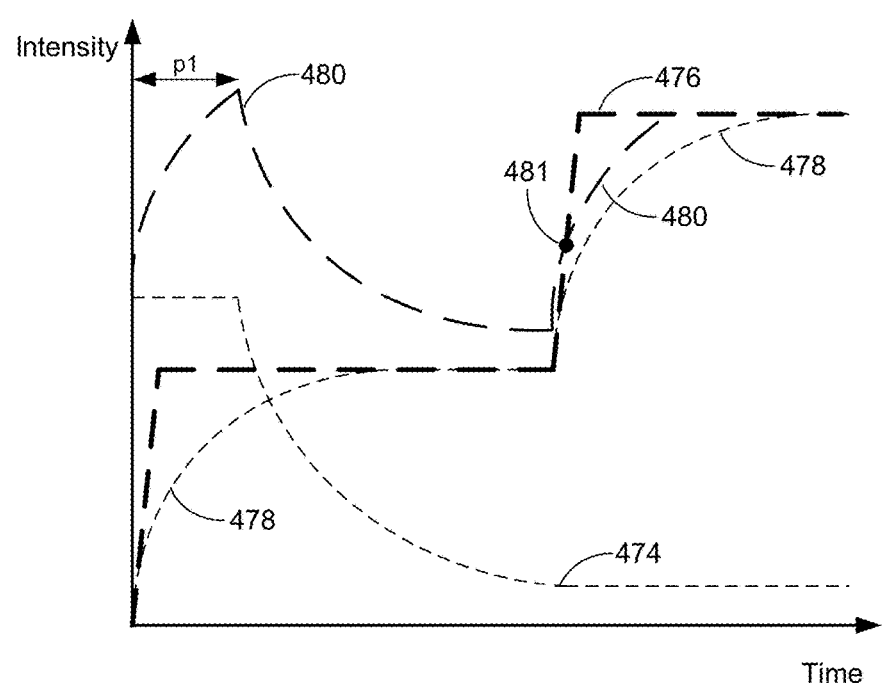
FIGS. 4C-4E illustrate examples of dynamic intensity thresholds in accordance with some embodiments.
Figure 4D:
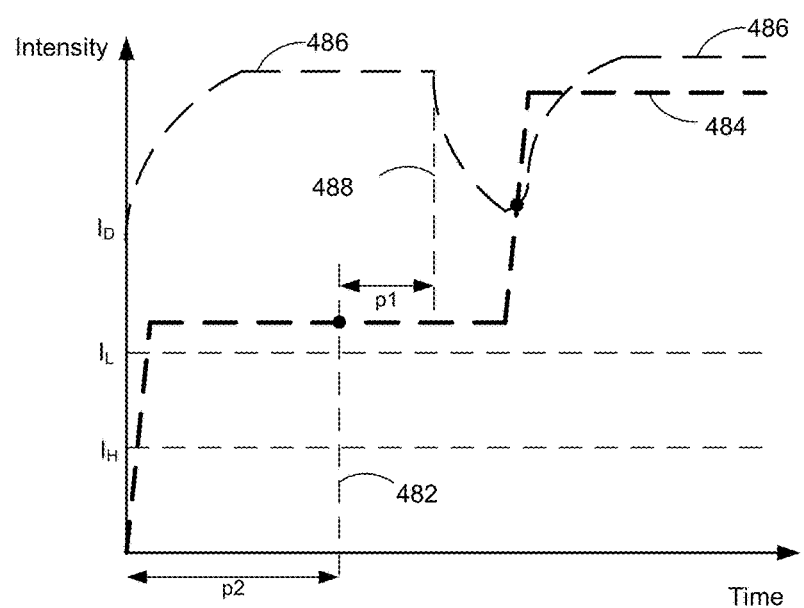
Figure 4E:
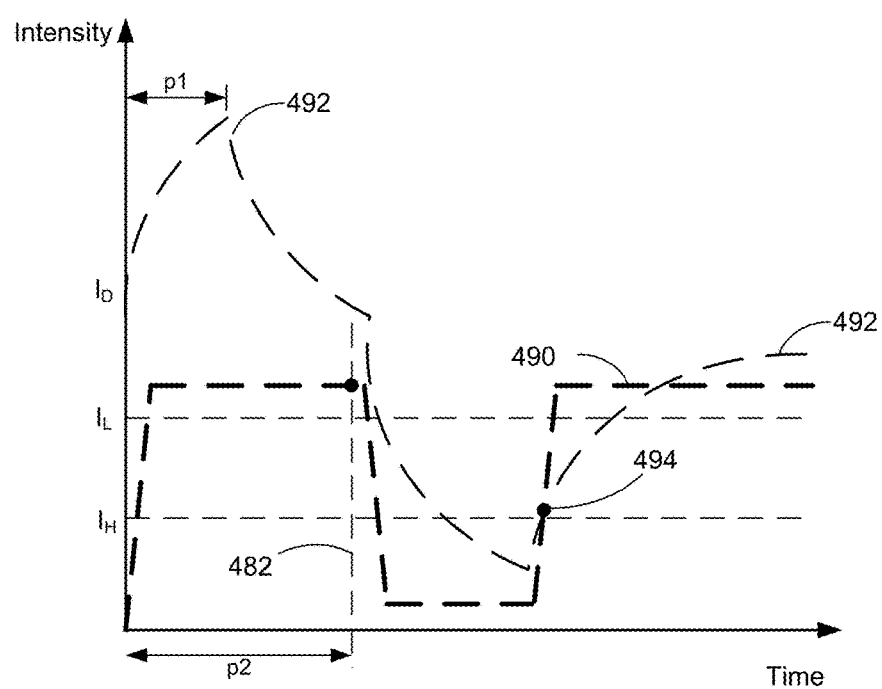
Figure 4F:
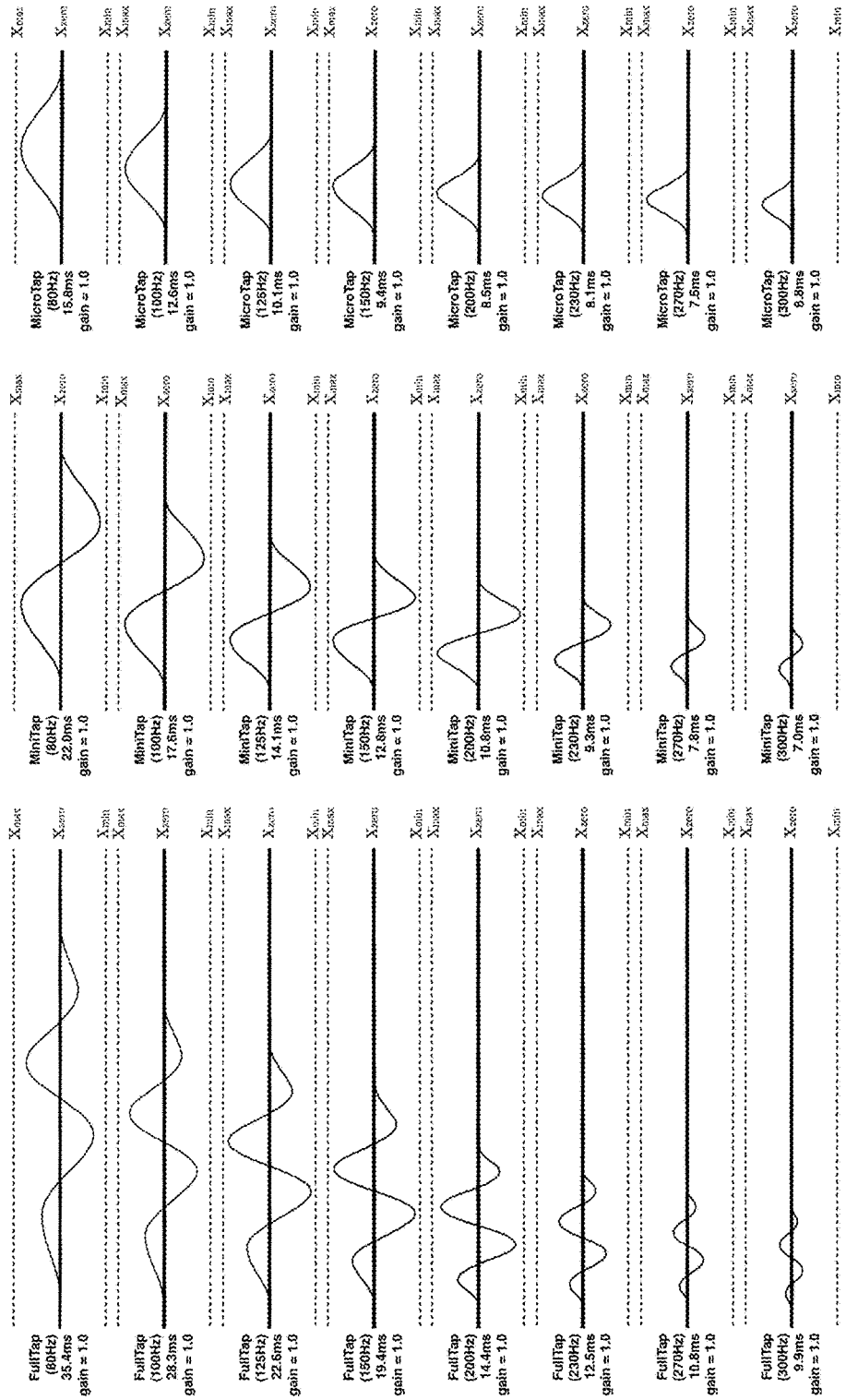
FIGS. 4F-4G illustrate a set of sample tactile output patterns in accordance with some embodiments.
Figure 4G:
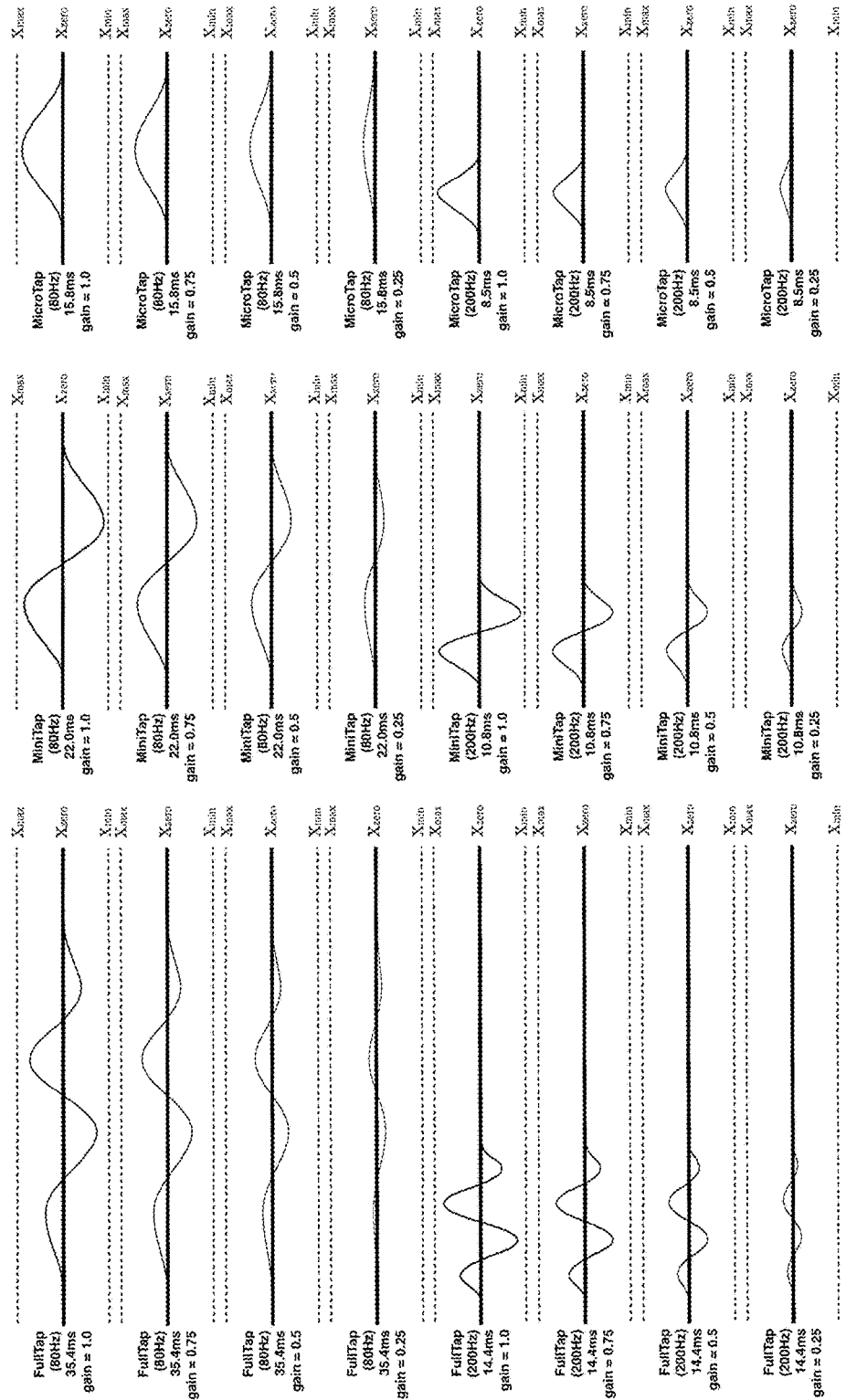

FIG. 4F provides a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in this figure, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIG. 4G, which are each shown with variants having a gain of 1.0, 0.75, 0.5, and 0.25. As shown in FIG. 4G, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Hz, and 200 Hz).

In FIG. 4F, each column shows tactile output patterns that have a particular waveform. The waveform of a tactile output pattern represents the pattern of physical displacements relative to a neutral position (e.g., $x_{zero}$) versus time that an moveable mass goes through to generate a tactile output with that tactile output pattern. For example, a first set of tactile output patterns shown in the left column in FIG. 4F (e.g., tactile output patterns of a "FullTap") each have a waveform that includes an oscillation with two complete cycles (e.g., an oscillation that starts and ends in a neutral position and crosses the neutral position three times). A second set of tactile output patterns shown in the middle column in FIG. 4F (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in the right column in FIG. 4F (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIG. 4F-4G include $x_{min}$ and $x_{max}$ values which represent the maximum and minimum extent of movement of the moveable mass. For larger electronic devices with larger moveable masses, there may be larger or smaller minimum and maximum extents of movement of the mass. The example shown in FIGS. 4F-4G describes movement of a mass in 1 dimension, however similar principles would also apply to movement of a moveable mass in two or three dimensions.

As shown in FIG. 4F, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIG. 4F, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 4F). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIG. 4F, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific frequencies, amplitudes, and waveforms are represented in the sample tactile output patterns in FIG. 4F for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well. Table 1 provides examples of particular haptic feedback behaviors, configurations, and examples of their use.

TABLE 1

| Behavior Configuration | Feedback Configuration | Examples |
|---|---|---|
| User Interface Haptics | | |
| Retarget Default | MicroTap High (270 Hz) Gain: 0.4 Minimum Interval: 0.05 | Drag calendar event across day boundary Retarget in force press quick action menu Sliding over origin point in a scrubber Reaching 0 degrees when cropping/straightening Rearranging a list when items snap together |
| Retarget Strong | MicroTap High (270 Hz) Gain: 0.5 Minimum Interval: 0.05 | Retarget in A-Z scrubber |
| Retarget Picker | MicroTap High (270 Hz) Gain: 0.4 Minimum Interval: 0.05 | Spinning a wheel in the wheels of time user interface |
| Impact Default | MicroTap Medium (150 Hz) Gain max: 0.8 Gain min: 0.0 | Changing scrubbing speed when adjusting a slider Creating a new calendar event by tapping and holding Activating a toggle switch (changing the switch from on to off or off to on) Reaching a predefined orientation on a compass (e.g., every 45 degrees from North) Reaching a level state (e.g., 0 degrees tilt in any axis for 0.5 seconds) Dropping a pin in a map Sending or receiving a message with an emphasis animation (e.g., "slam" effect) Sending or receiving an acknowledgment of a message Snapping a ruler to different orientations (e.g., every 45 degrees) Crossing over a suggested photo while scrubbing through a burst of photos Crossing over a detent in a scrubber (e.g., text size, haptic strength, display brightness, display color temperature) Transaction failure notification (ApplePay Failure) |
| Impact Light | MicroTap Medium (150 Hz) Gain max: 0.6 Gain min: 0.0 | Picking up an existing item (e.g., a calendar event, a favorite in web browser) Moving a time selector over a minor division of time (e.g., 15 min) in sleep alarm |
| Impact Strong | MicroTap Medium (150 Hz) Gain max: 1.0 Gain min: 0.0 | Moving a time selector over a major division of time (e.g., 1 hour) in sleep alarm |
| Edge Scrubber | MicroTap Medium (150 Hz) Gain max: 0.6 Gain min: 0.3 | Dragging a brightness scrubber to an edge of the scrubber Dragging a volume scrubber to an edge of the scrubber |
| Edge Zoom | MicroTap High (270 Hz) Gain: 0.6 | Reaching maximum zoom level when zooming into a photo Re-centering a map |
| Drag Default | MicroTap High (270 Hz) Gain Pickup: 1.0 Gain Drop: 0.6 | Pickup and drop an event in calendar |
| Drag Snapping | MicroTap High (270 Hz) Gain Pickup: 1.0 Gain Drop: 0.6 Gain Snap: 1.0 | Rearrange lists in weather, contacts, music, etc. |
| States Swipe Action | Swipe in: MiniTap High (270 Hz) Gain: 1.0 Swipe out: MicroTap High (270 Hz) Gain: 0.55 | Swipe to delete a mail message or conversation Swipe to mark a mail message as read/unread in mail Swipe to delete a table row (e.g., a document in a document creation/viewing application, a note in a notes application, a location in a weather application, a podcast in a podcast application, a song in a playlist in a music application, a voice memo in a voice recording application Swipe to delete a message while displaying a pressure-triggered preview Swipe to mark a message as read/unread while displaying a pressure-triggered preview Swipe to delete a news article Swipe to favorite/love a news article |
| Button Default | MicroTap High (270 Hz) Gain: 0.9 | Reply to message/conversation Adding a bookmark in an electronic book reader application Activating a virtual assistant Starting to record a voice memo Stopping recording a voice memo |

TABLE 1-continued

| Behavior Configuration | Feedback Configuration | Examples |
|---|---|---|
| Button Destructive | MiniTap Low (100 Hz) Feedback Intensity: 0.8 | Delete message/conversation |
| Event Success | FullTap Medium (200 Hz) Gain: 0.7 MiniTap High (270 Hz) Gain: 1.0 | Confirmation that a payment has been made Alert that authentication is needed to make a payment (e.g., biometric authentication or passcode authentication) Adding a payment account to an electronic wallet application |
| Event Error | MiniTap High (270 Hz) Gain: 0.85 Gain: 0.75 FullTap Medium (200 Hz) Gain: 0.65 FullTap Low (150 Hz) Gain: 0.75 | Failure to process a payment transaction Failure to authenticate a fingerprint detected on a fingerprint sensor Incorrect passcode/password entered in a passcode/password entry UI |
| Event Warning | FullTap High (300 Hz) Gain: 0.9 FullTap Custom (270 Hz) Gain: 0.9 | Shake to undo |
| Force Press | | |
| States Preview | MicroTap Custom (200 Hz) Gain: 1.0 | Peek/Preview (e.g., peek at a mail message) |
| States Preview | FullTap Custom (150 Hz) Gain: 1.0 | Pop/Commit (e.g., pop into full mail message) |
| States Preview | MicroTap Custom (200 Hz) Gain: 1.0 | Unavailable (e.g., press hard on an app icon that doesn't have any associated quick actions) |
| System Haptics | | |
| Device Locked | MicroTap Medium (150 Hz) Gain: 1.0 MiniTap Medium (150 Hz) Gain: 1.0 | Press power button once to lock device |
| Vibe on Attach | Vibe at 150 Hz that gradually increases or decreases in amplitude over time | Attach device to power source |
| Ringtones & Alerts | Custom tactile output using one or more of: Vibe 150 Hz MicroTap 150 Hz MiniTap 150 Hz FullTap 150 Hz | Receive phone call or text message |
| Solid-State Home Button | | |
| 1 ("Tick") | MiniTap 230 Hz Gain: 1.0 | Press home button with click option 1 selected |
| 2 ("Tak") | MiniTap 270 Hz Gain: 1.0 | Press home button with click option 2 selected |
| 3 ("Tock") | MiniTap 300 Hz Gain: 1.0 | Press home button with click option 3 selected |

The examples shown above in Table 1 are intended to illustrate a range of circumstances in which tactile outputs can be generated for different inputs and events. Table 1 should not be taken as a requirement that a device respond to each of the listed inputs or events with the indicated tactile output. Rather, Table 1 is intended to illustrate how tactile outputs vary and/or are similar for different inputs and/or events (e.g., based on the tactile output pattern, frequency, gain, etc.). For example Table 1 shows how an "event success" tactile output varies from an "event failure" tactile output and how a retarget tactile output differs from an impact tactile output.

Figure 4H:
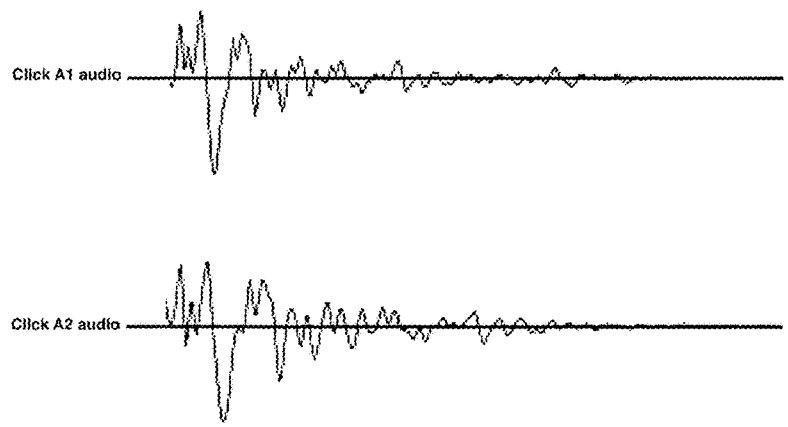
FIGS. 4H-4J illustrate example haptic audio output patterns versus time that are used in conjunction with tactile outputs to simulate button clicks in accordance with some embodiments.
Figure 4I:
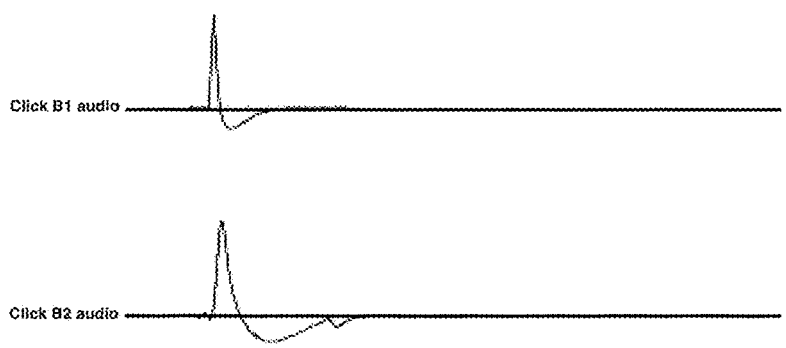
Figure 4J:
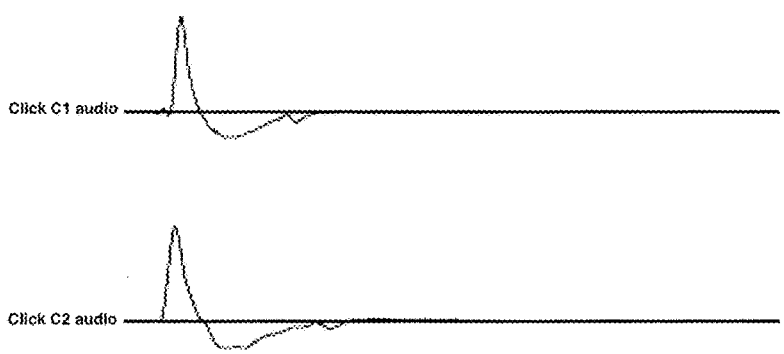

FIGS. 4H-4J illustrate example haptic audio output patterns versus time that are used in conjunction with tactile outputs to simulate button clicks in accordance with some embodiments.

Figure 4K:
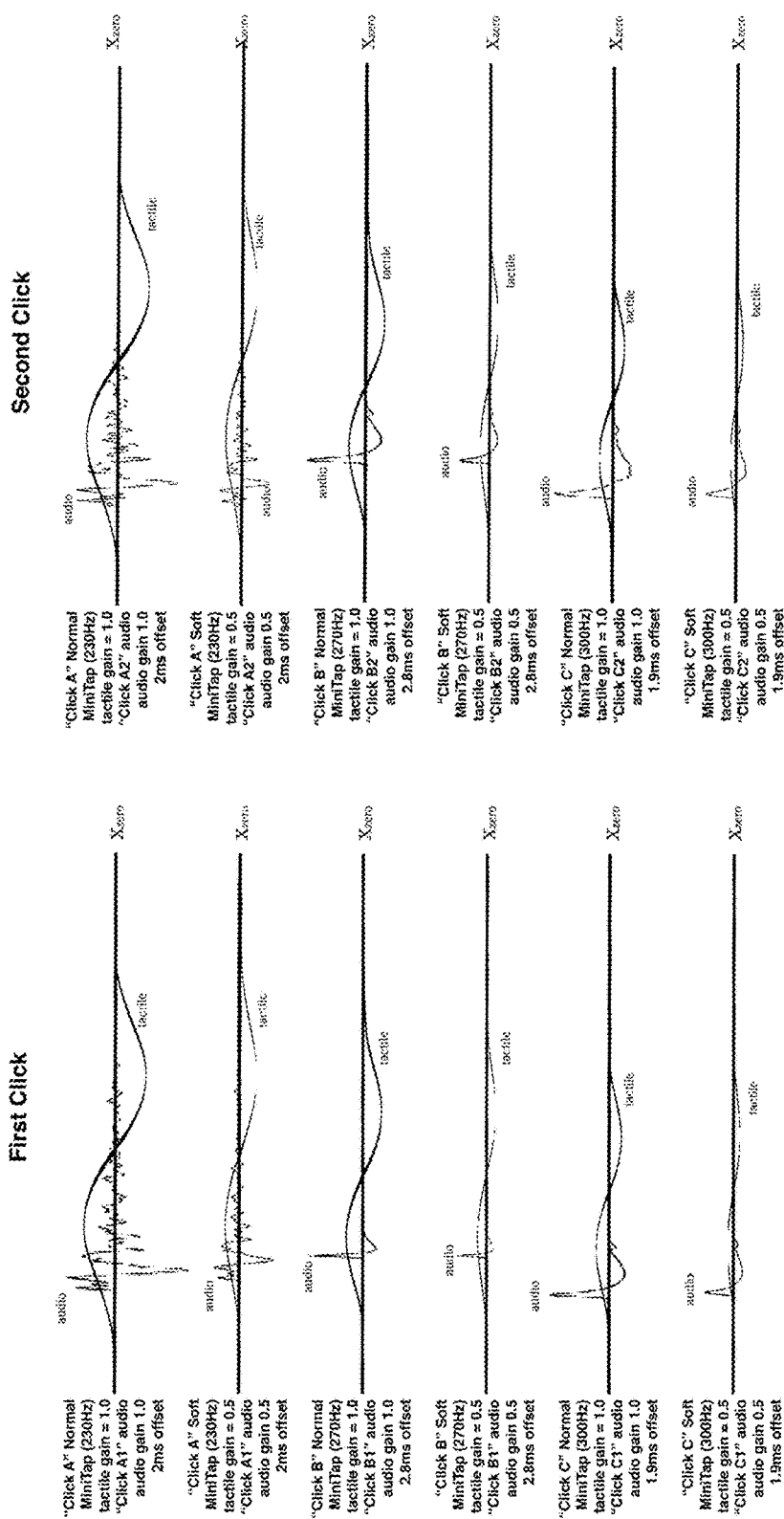
FIG. 4K illustrates example combinations of tactile output patterns and haptic audio output patterns versus time in accordance with some embodiments.

FIG. 4K illustrates example combinations of tactile output patterns and haptic audio output patterns versus time in accordance with some embodiments. FIGS. 4L-4Q enlarge the combinations shown in FIG. 4K for clarity.

Figure 4L:
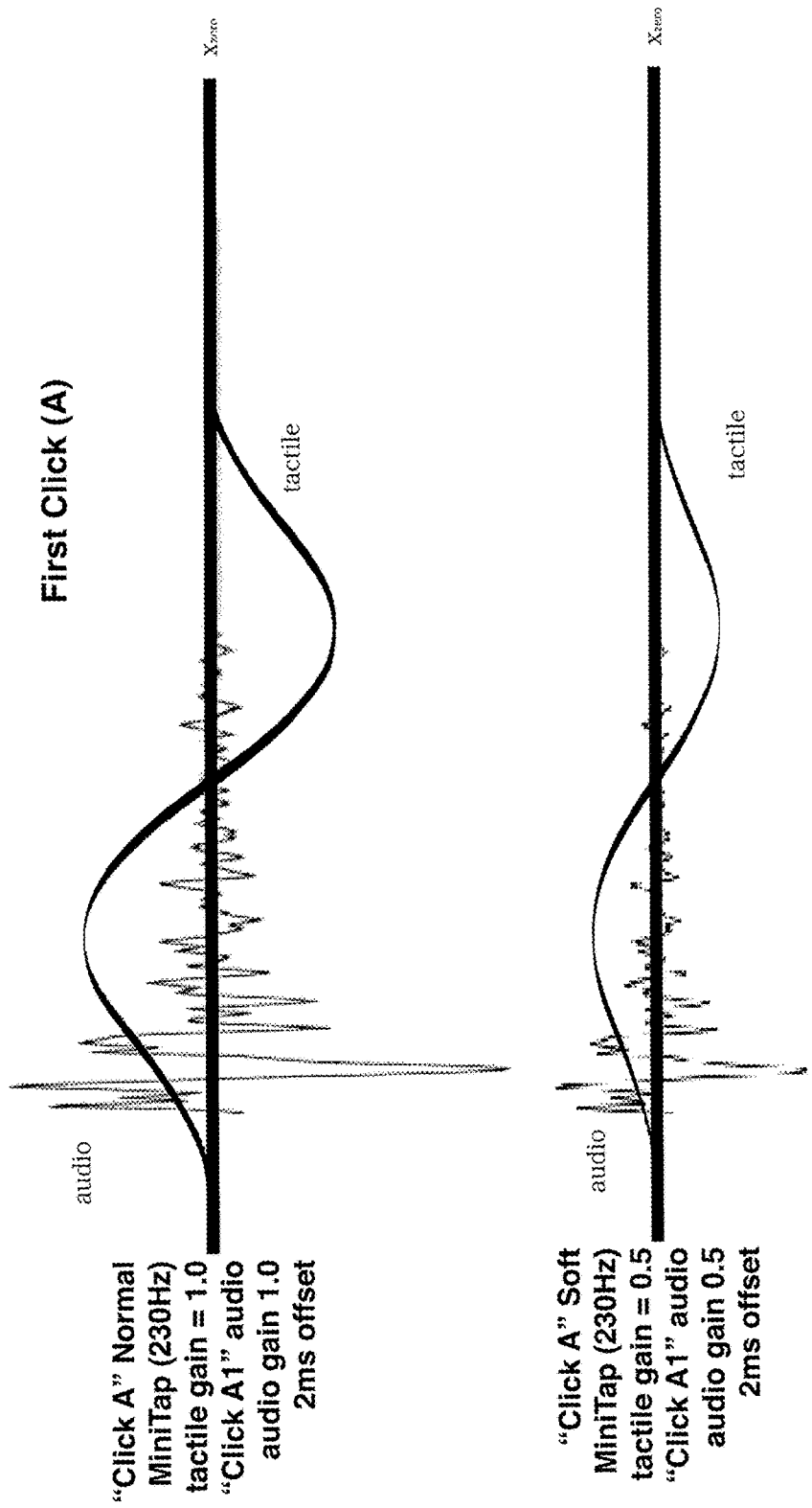

In FIG. 4H, the top haptic audio pattern "Click A1 audio" is audio output that is played conjunction with "Click A" Normal MiniTap (230 Hz) to simulate a first down-click in a "normal" first click, as shown in FIG. 4K (first row in the First Click column) and the upper portion of FIG. 4L, where the rate of change of intensity of a contact at a control activation threshold is above a threshold rate of change (e.g., the contact is making a "normal" hard/fast press). In this example, "Click A1 audio" is offset from the start of the "Click A" Normal MiniTap (230 Hz) tactile output by 2 ms. In some cases, the same "Click A1 audio" and "Click A" Normal MiniTap (230 Hz) are played to simulate the first up-click that follows the first down-click. In some cases, the gain of the "Click A1 audio" and/or "Click A" Normal MiniTap (230 Hz) are reduced (e.g., by 50%) in the up-click relative to the preceding down-click.

The top haptic audio pattern "Click A1 audio" is also played in conjunction with "Click A" Soft MiniTap (230 Hz) to simulate a first down-click in a "soft" first click, as shown in FIG. 4K (second row in the First Click column) and the lower portion of FIG. 4L, where the rate of change of intensity of a contact at a control activation threshold is below a threshold rate of change (e.g., the contact is making a "soft" and/or slow press). To simulate a "soft" down-click, the gain of the "Click A1 audio" and "Click A" Soft MiniTap (230 Hz) are reduced (e.g., by 50%) in the "soft" down-click relative to the "normal" down-click. In this example, "Click A1 audio" is offset from the start of the "Click A" Soft MiniTap (230 Hz) tactile output by 2 ms. In some cases, the same "Click A1 audio" and "Click A" Soft MiniTap (230 Hz) are played to simulate the first up-click that follows the first down-click. In some cases, the gain of the "Click A1 audio" and/or "Click A" Soft MiniTap (230 Hz) are reduced (e.g., by 50%) in the up-click relative to the preceding down-click.

Figure 4M:
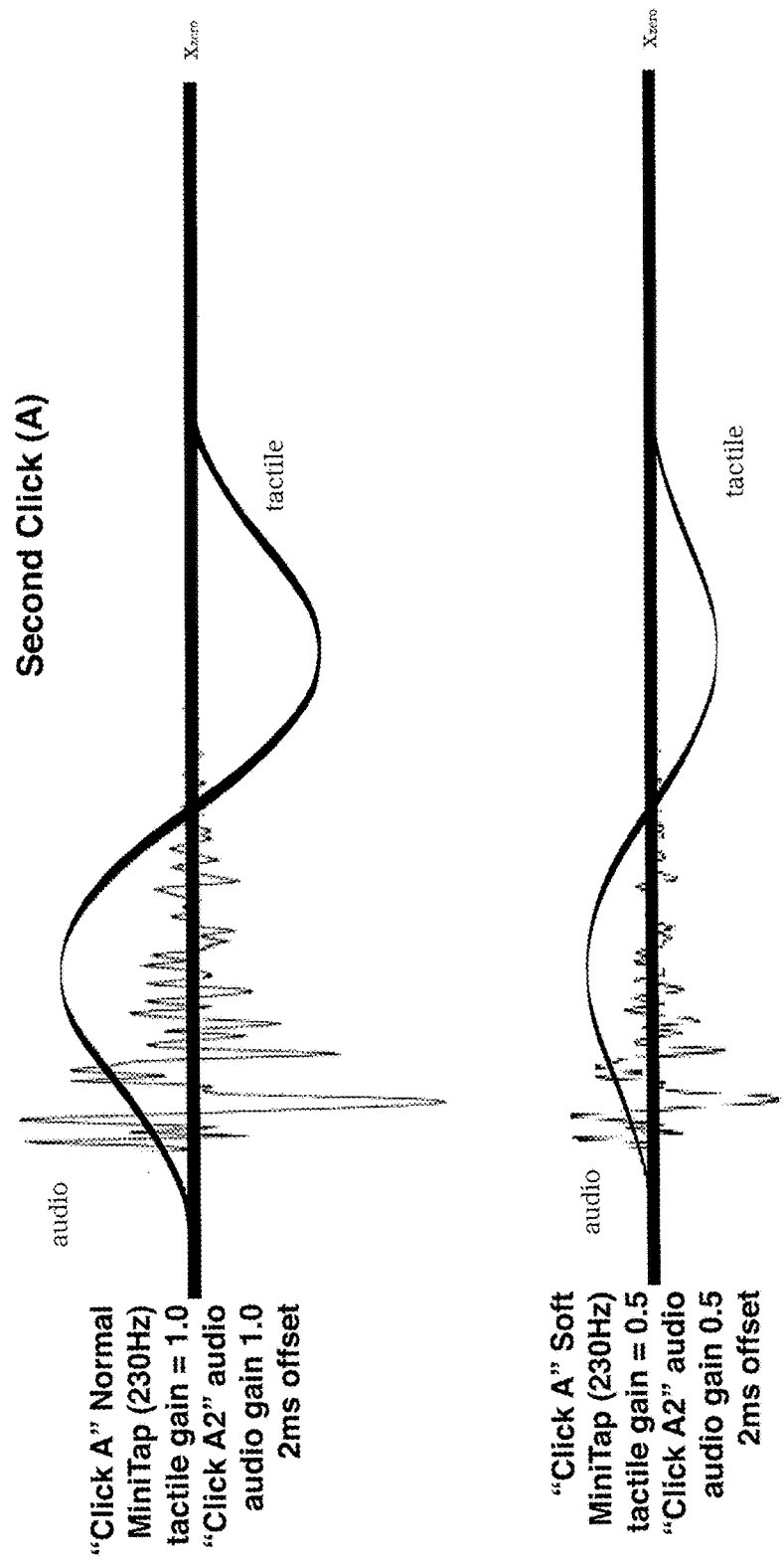

In FIG. 4H, the bottom haptic audio pattern "Click A2 audio" is audio output that is played conjunction with "Click A" Normal MiniTap (230 Hz) to simulate a second down-click in a "normal" second click that follows the first click within a predetermined period of time (e.g., as the second click in a double click input), as shown in FIG. 4K (first row in the Second Click column) and the upper portion of FIG. 4M, where the rate of change of intensity of a contact at a control activation threshold is above a threshold rate of change (e.g., the contact in the second click is making a "normal" hard/fast press). In this example, "Click A2 audio" is offset from the start of the "Click A" Normal MiniTap (230 Hz) tactile output by 2 ms. In some cases, the same "Click A2 audio" and "Click A" Normal MiniTap (230 Hz) are played to simulate the second up-click that follows the second down-click. In some cases, the gain of the "Click A2 audio" and/or "Click A" Normal MiniTap (230 Hz) are reduced (e.g., by 50%) in the second up-click relative to the preceding second down-click.

The bottom haptic audio pattern "Click A2 audio" is also played in conjunction with "Click A" Soft MiniTap (230 Hz) to simulate a second down-click in a "soft" second click that follows the first click within a predetermined period of time (e.g., as the second click in a double click input), as shown in FIG. 4K (second row in the Second Click column) and the lower portion of FIG. 4M, where the rate of change of intensity of a contact at a control activation threshold is below a threshold rate of change (e.g., the contact is making a "soft" and/or slow press). To simulate a "soft" down-click, the gain of the "Click A2 audio" and "Click A" Soft MiniTap (230 Hz) are reduced (e.g., by 50%) in the "soft" down-click relative to the "normal" down-click. In this example, "Click A2 audio" is offset from the start of the "Click A" Soft MiniTap (230 Hz) tactile output by 2 ms. In some cases, the same "Click A2 audio" and "Click A" Soft MiniTap (230 Hz) are played to simulate the second up-click that follows the second down-click. In some cases, the gain of the "Click A2 audio" and/or "Click A" Soft MiniTap (230 Hz) are reduced (e.g., by 50%) in the second up-click relative to the preceding second down-click.

In FIG. 4I, the top haptic audio pattern "Click B1 audio" is audio output that is played conjunction with "Click B" Normal MiniTap (270 Hz) to simulate a first down-click in a "normal" first click, as shown in FIG. 4K (third row in the First Click column) and the upper portion of FIG. 4N, where the rate of change of intensity of a contact at a control activation threshold is above a threshold rate of change (e.g., the contact is making a "normal" hard/fast press). In this example, "Click B1 audio" is offset from the start of the "Click B" Normal MiniTap (270 Hz) tactile output by 2.8 ms. In some cases, the same "Click B1 audio" and "Click B" Normal MiniTap (270 Hz) are played to simulate the first up-click that follows the first down-click. In some cases, the gain of the "Click B1 audio" and/or "Click B" Normal MiniTap (270 Hz) are reduced (e.g., by 50%) in the up-click relative to the preceding down-click.

The top haptic audio pattern "Click B1 audio" is also played in conjunction with "Click B" Soft MiniTap (270 Hz) to simulate a first down-click in a "soft" first click, as shown in FIG. 4K (fourth row in the First Click column) and the lower portion of FIG. 4N, where the rate of change of intensity of a contact at a control activation threshold is below a threshold rate of change (e.g., the contact is making a "soft" and/or slow press). To simulate a "soft" down-click, the gain of the "Click B1 audio" and "Click B" Soft MiniTap (270 Hz) are reduced (e.g., by 50%) in the "soft" down-click relative to the "normal" down-click. In this example, "Click B1 audio" is offset from the start of the "Click B" Soft MiniTap (270 Hz) tactile output by 2.8 ms. In some cases, the same "Click B1 audio" and "Click B" Soft MiniTap (270 Hz) are played to simulate the first up-click that follows the first down-click. In some cases, the gain of the "Click B1 audio" and/or "Click B" Soft MiniTap (230 Hz) are reduced (e.g., by 50%) in the up-click relative to the preceding down-click.

Figure 4O:
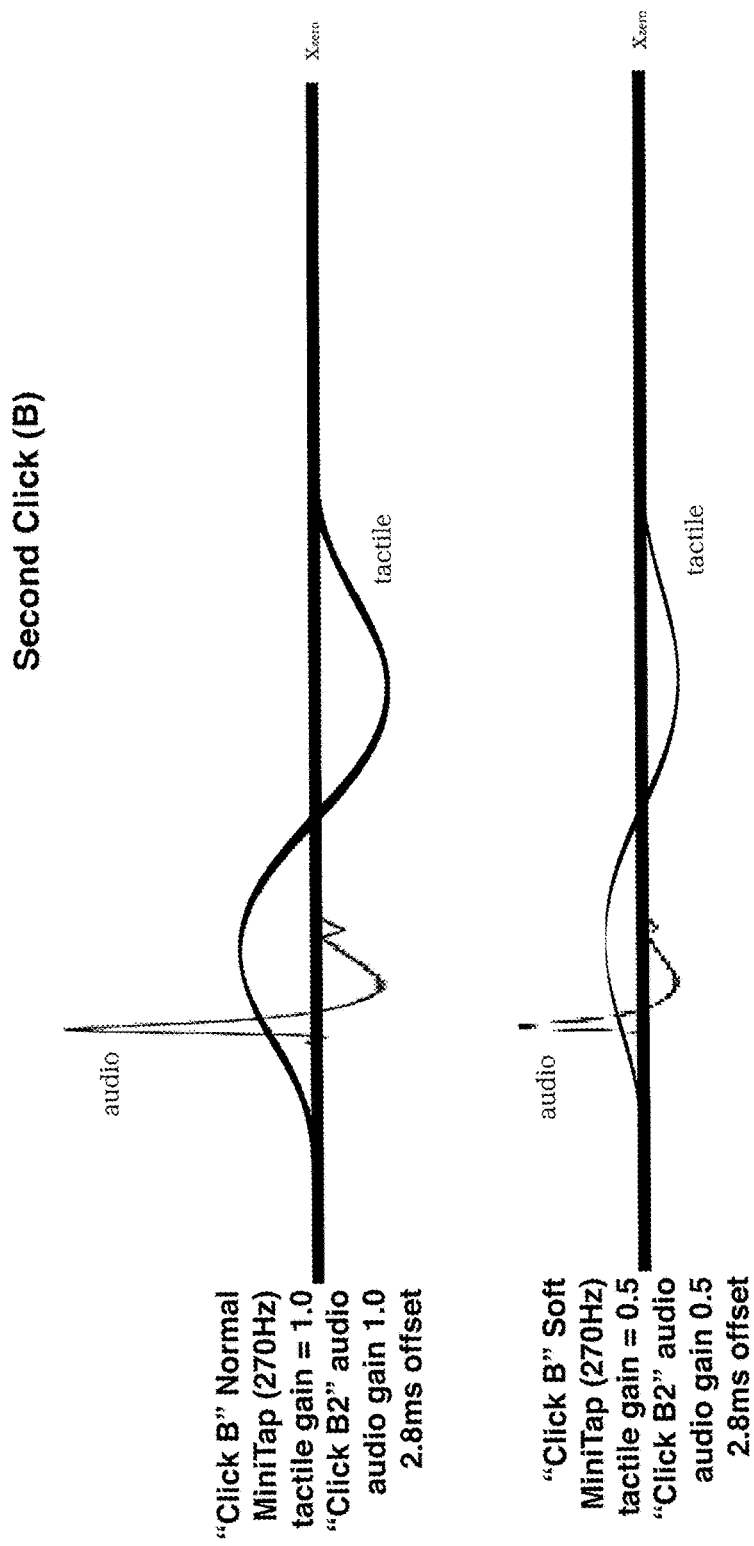

In FIG. 4I, the bottom haptic audio pattern "Click B2 audio" is audio output that is played conjunction with "Click B" Normal MiniTap (270 Hz) to simulate a second down-click in a "normal" second click that follows the first click within a predetermined period of time (e.g., as the second click in a double click input), as shown in FIG. 4K (third row in the Second Click column) and the upper portion of FIG. 4O, where the rate of change of intensity of a contact at a control activation threshold is above a threshold rate of change (e.g., the contact in the second click is making a "normal" hard/fast press). In this example, "Click B2 audio" is offset from the start of the "Click B" Normal MiniTap (270 Hz) tactile output by 2.8 ms. In some cases, the same "Click B2 audio" and "Click B" Normal MiniTap (230 Hz) are played to simulate the second up-click that follows the second down-click. In some cases, the gain of the "Click B2 audio" and/or "Click B" Normal MiniTap (270 Hz) are reduced (e.g., by 50%) in the second up-click relative to the preceding second down-click.

The bottom haptic audio pattern "Click B2 audio" is also played in conjunction with "Click B" Soft MiniTap (270 Hz) to simulate a second down-click in a "soft" second click that follows the first click within a predetermined period of time (e.g., as the second click in a double click input), as shown in FIG. 4K (fourth row in the Second Click column) and the lower portion of FIG. 4O, where the rate of change of intensity of a contact at a control activation threshold is below a threshold rate of change (e.g., the contact is making a "soft" and/or slow press). To simulate a "soft" down-click, the gain of the "Click B2 audio" and "Click B" Soft MiniTap (270 Hz) are reduced (e.g., by 50%) in the "soft" down-click relative to the "normal" down-click. In this example, "Click B2 audio" is offset from the start of the "Click B" Soft MiniTap (270 Hz) tactile output by 2.8 ms. In some cases, the same "Click B2 audio" and "Click B" Soft MiniTap (270 Hz) are played to simulate the second up-click that follows the second down-click. In some cases, the gain of the "Click B2 audio" and/or "Click B" Soft MiniTap (270 Hz) are reduced (e.g., by 50%) in the second up-click relative to the preceding second down-click.

Figure 4P:
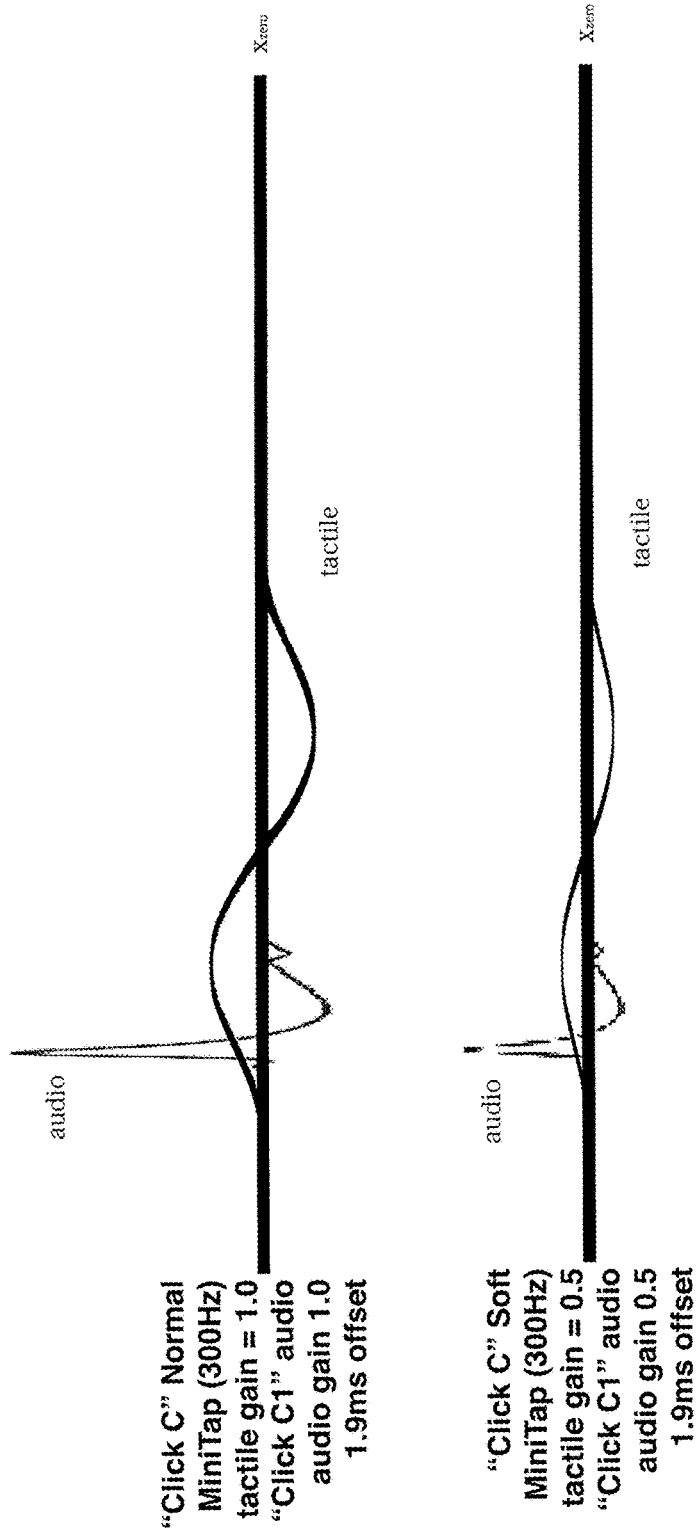

In FIG. 4J, the top haptic audio pattern "Click C1 audio" is audio output that is played conjunction with "Click C" Normal MiniTap (300 Hz) to simulate a first down-click in a "normal" first click, as shown in FIG. 4K (fifth row in the First Click column) and the upper portion of FIG. 4P, where the rate of change of intensity of a contact at a control activation threshold is above a threshold rate of change (e.g., the contact is making a "normal" hard/fast press). In this example, "Click C1 audio" is offset from the start of the "Click C" Normal MiniTap (300 Hz) tactile output by 1.9 ms. In some cases, the same "Click C1 audio" and "Click C" Normal MiniTap (300 Hz) are played to simulate the first up-click that follows the first down-click. In some cases, the gain of the "Click C1 audio" and/or "Click C" Normal MiniTap (300 Hz) are reduced (e.g., by 50%) in the up-click relative to the preceding down-click.

The top haptic audio pattern "Click C1 audio" is also played in conjunction with "Click C" Soft MiniTap (300 Hz) to simulate a first down-click in a "soft" first click, as shown in FIG. 4K (sixth row in the First Click column) and the lower portion of FIG. 4P, where the rate of change of intensity of a contact at a control activation threshold is below a threshold rate of change (e.g., the contact is making a "soft" and/or slow press). To simulate a "soft" down-click, the gain of the "Click C1 audio" and "Click C" Soft MiniTap (300 Hz) are reduced (e.g., by 50%) in the "soft" down-click relative to the "normal" down-click. In this example, "Click C1 audio" is offset from the start of the "Click C" Soft MiniTap (300 Hz) tactile output by 1.9 ms. In some cases, the same "Click C1 audio" and "Click C" Soft MiniTap (270 Hz) are played to simulate the first up-click that follows the first down-click. In some cases, the gain of the "Click C1 audio" and/or "Click C" Soft MiniTap (300 Hz) are reduced (e.g., by 50%) in the up-click relative to the preceding down-click.

Figure 4Q:
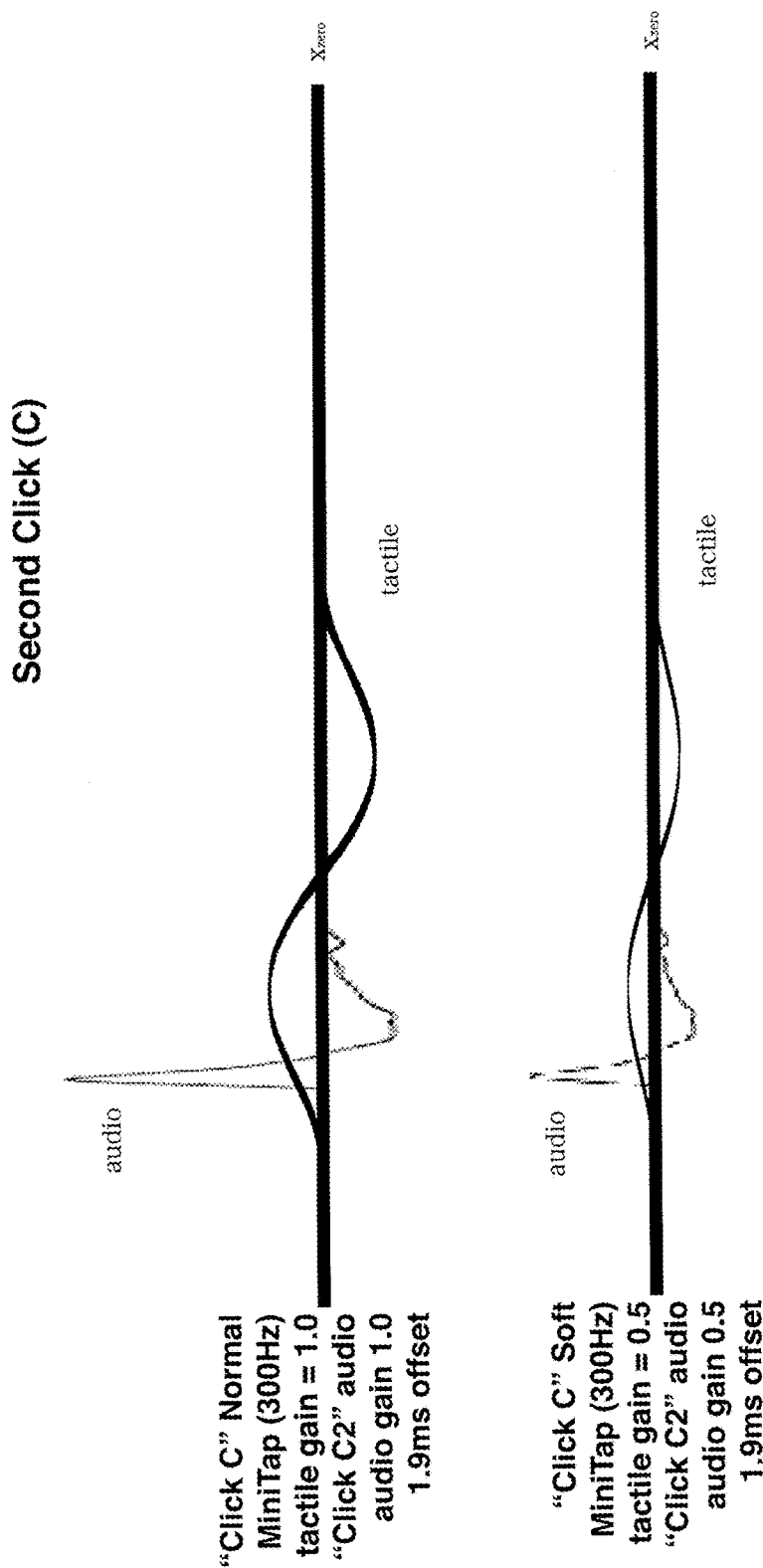

In FIG. 4J, the bottom haptic audio pattern "Click C2 audio" is audio output that is played conjunction with "Click C" Normal MiniTap (300 Hz) to simulate a second down-click in a "normal" second click that follows the first click within a predetermined period of time (e.g., as the second click in a double click input), as shown in FIG. 4K (fifth row in the Second Click column) and the upper portion of FIG. 4Q, where the rate of change of intensity of a contact at a control activation threshold is above a threshold rate of change (e.g., the contact in the second click is making a "normal" hard/fast press). In this example, "Click C2 audio" is offset from the start of the "Click C" Normal MiniTap (300 Hz) tactile output by 1.9 ms. In some cases, the same "Click C2 audio" and "Click C" Normal MiniTap (300 Hz) are played to simulate the second up-click that follows the second down-click. In some cases, the gain of the "Click C2 audio" and/or "Click C" Normal MiniTap (300 Hz) are reduced (e.g., by 50%) in the second up-click relative to the preceding second down-click.

The bottom haptic audio pattern "Click C2 audio" is also played in conjunction with "Click C" Soft MiniTap (300 Hz) to simulate a second down-click in a "soft" second click that follows the first click within a predetermined period of time (e.g., as the second click in a double click input), as shown in FIG. 4K (sixth row in the Second Click column) and the lower portion of FIG. 4Q, where the rate of change of intensity of a contact at a control activation threshold is below a threshold rate of change (e.g., the contact is making a "soft" and/or slow press). To simulate a "soft" down-click, the gain of the "Click C2 audio" and "Click C" Soft MiniTap (300 Hz) are reduced (e.g., by 50%) in the "soft" down-click relative to the "normal" down-click. In this example, "Click C2 audio" is offset from the start of the "Click C" Soft MiniTap (300 Hz) tactile output by 1.9 ms. In some cases, the same "Click C2 audio" and "Click C" Soft MiniTap (300 Hz) are played to simulate the second up-click that follows the second down-click. In some cases, the gain of the "Click C2 audio" and/or "Click C" Soft MiniTap (300 Hz) are reduced (e.g., by 50%) in the second up-click relative to the preceding second down-click.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2A). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2A) optionally include an up/down button for volume control of speaker 111 and/or microphone 113. The one or more buttons optionally include a push button (e.g., 206, FIG. 2A).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" is a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
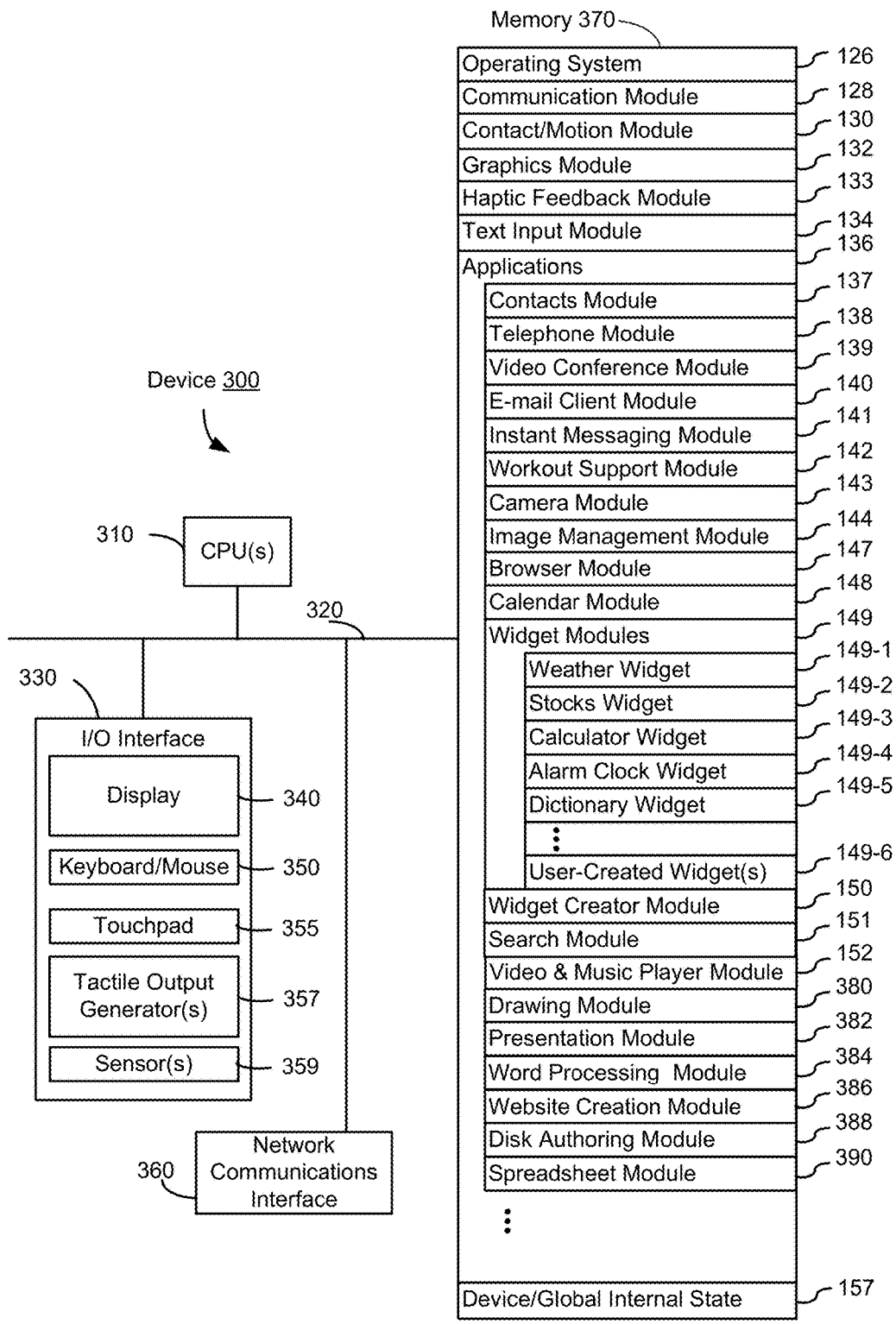
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example., a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensities of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XIVIPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
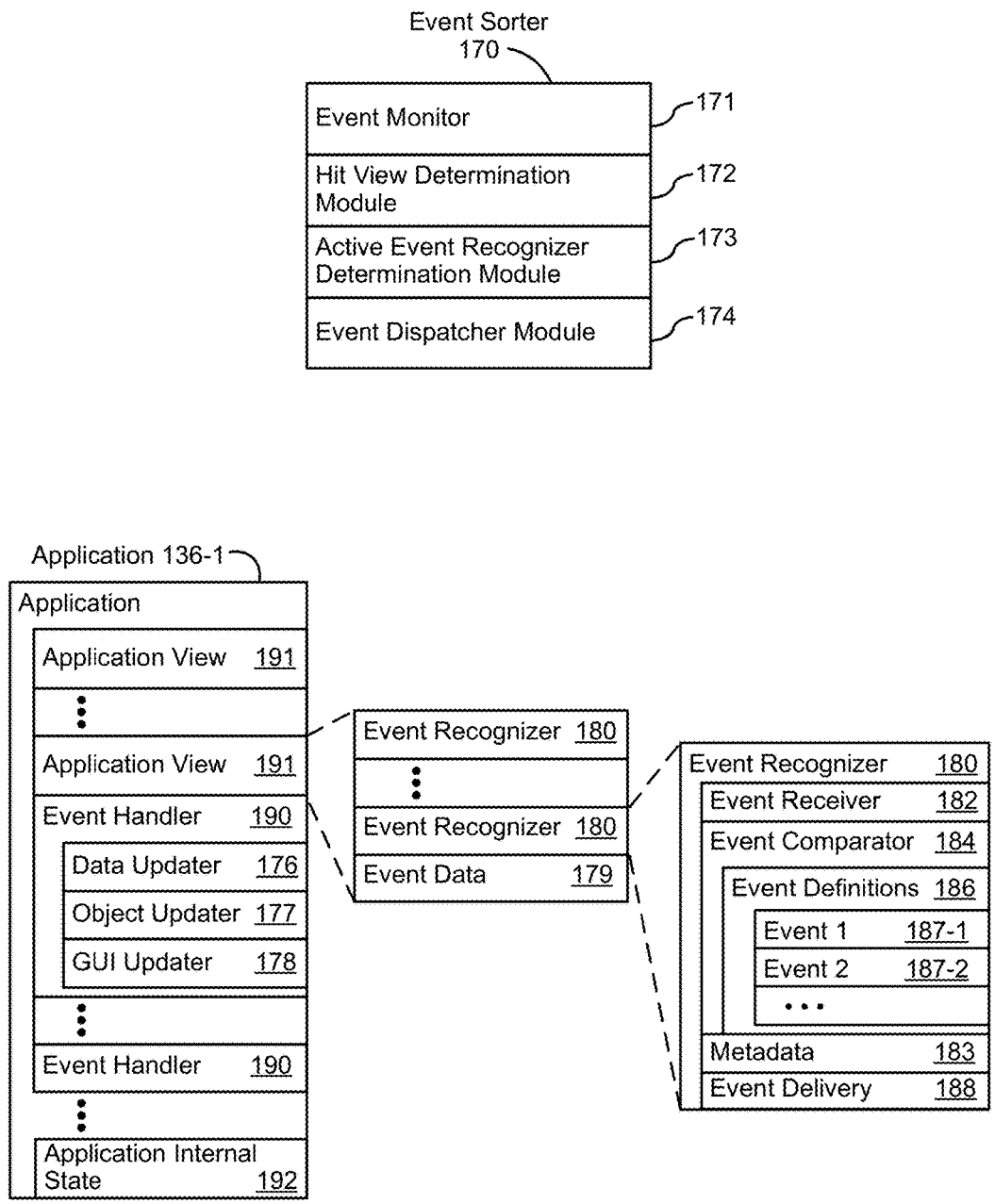
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 1C:
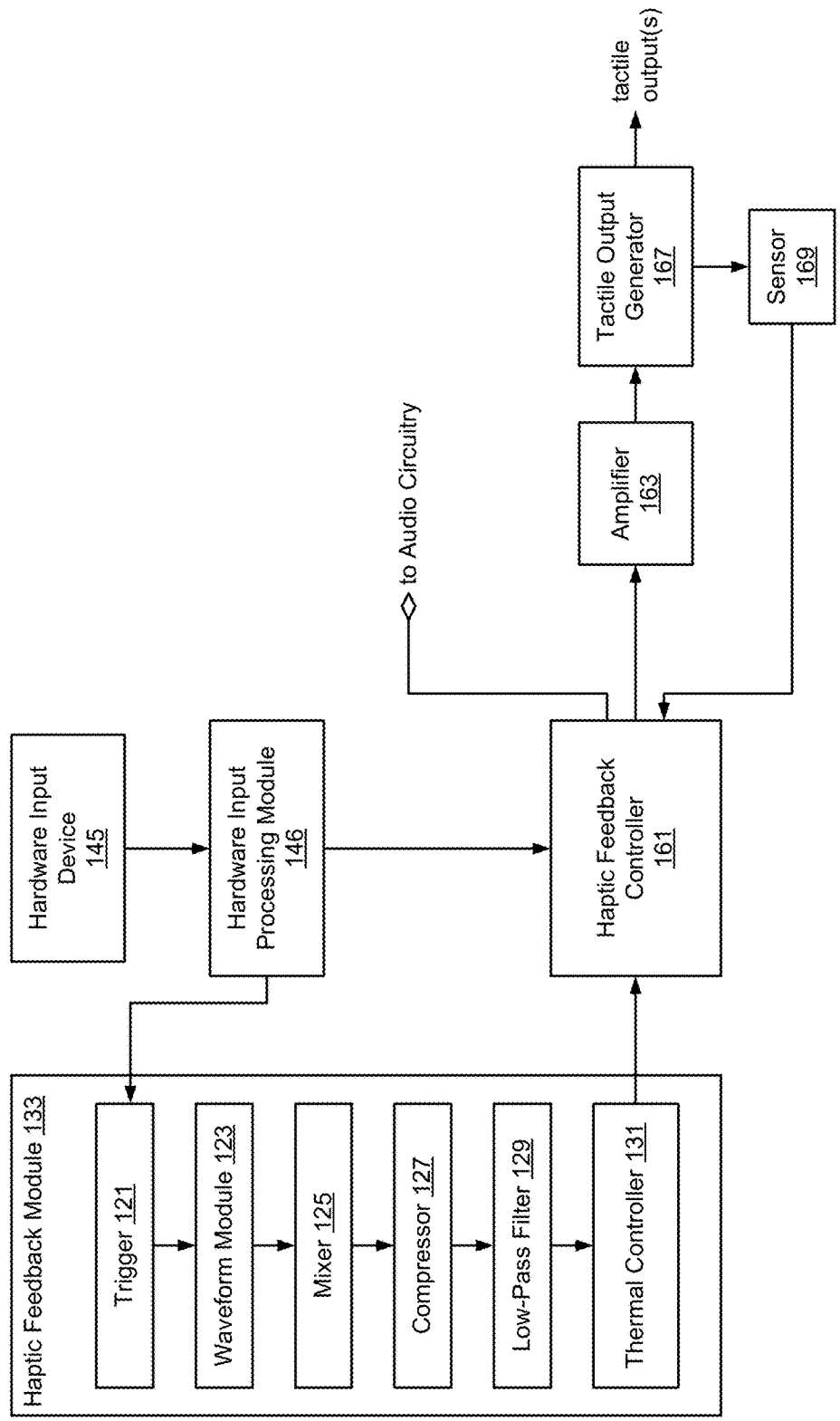
FIG. 1C is a block diagram illustrating a tactile output module in accordance with some embodiments.

FIG. 1C is a block diagram illustrating a tactile output module in accordance with some embodiments. In some embodiments, I/O subsystem 106 (e.g., haptic feedback controller 161 (FIG. 1A) and/or other input controller(s) 160 (FIG. 1A)) includes at least some of the example components shown in FIG. 1C. In some embodiments, peripherals interface 118 includes at least some of the example components shown in FIG. 1C.

In some embodiments, the tactile output module includes haptic feedback module 133. In some embodiments, haptic feedback module 133 aggregates and combines tactile outputs for user interface feedback from software applications on the electronic device (e.g., feedback that is responsive to user inputs that correspond to displayed user interfaces and alerts and other notifications that indicate the performance of operations or occurrence of events in user interfaces of the electronic device). Haptic feedback module 133 includes one or more of: waveform module 123 (for providing waveforms used for generating tactile outputs), mixer 125 (for mixing waveforms, such as waveforms in different channels), compressor 127 (for reducing or compressing a dynamic range of the waveforms), low-pass filter 129 (for filtering out high frequency signal components in the waveforms), and thermal controller 131 (for adjusting the waveforms in accordance with thermal conditions). In some embodiments, haptic feedback module 133 is included in haptic feedback controller 161 (FIG. 1A). In some embodiments, a separate unit of haptic feedback module 133 (or a separate implementation of haptic feedback module 133) is also included in an audio controller (e.g., audio circuitry 110, FIG. 1A) and used for generating audio signals. In some embodiments, a single haptic feedback module 133 is used for generating audio signals and generating waveforms for tactile outputs.

In some embodiments, haptic feedback module 133 also includes trigger module 121 (e.g., a software application, operating system, or other software module that determines a tactile output is to be generated and initiates the process for generating the corresponding tactile output). In some embodiments, trigger module 121 generates trigger signals for initiating generation of waveforms (e.g., by waveform module 123). For example, trigger module 121 generates trigger signals based on preset timing criteria. In some embodiments, trigger module 121 receives trigger signals from outside haptic feedback module 133 (e.g., in some embodiments, haptic feedback module 133 receives trigger signals from hardware input processing module 146 located outside haptic feedback module 133) and relays the trigger signals to other components within haptic feedback module 133 (e.g., waveform module 123) or software applications that trigger operations (e.g., with trigger module 121) based on activation of the hardware input device (e.g., a home button). In some embodiments, trigger module 121 also receives tactile feedback generation instructions (e.g., from haptic feedback module 133, FIGS. 1A and 3). In some embodiments, trigger module 121 generates trigger signals in response to haptic feedback module 133 (or trigger module 121 in haptic feedback module 133) receiving tactile feedback instructions (e.g., from haptic feedback module 133, FIGS. 1A and 3).

Waveform module 123 receives trigger signals (e.g., from trigger module 121) as an input, and in response to receiving trigger signals, provides waveforms for generation of one or more tactile outputs (e.g., waveforms selected from a predefined set of waveforms designated for use by waveform module 123, such as the waveforms described in greater detail below with reference to FIGS. 4F-4G).

Mixer 125 receives waveforms (e.g., from waveform module 123) as an input, and mixes together the waveforms. For example, when mixer 125 receives two or more waveforms (e.g., a first waveform in a first channel and a second waveform that at least partially overlaps with the first waveform in a second channel) mixer 125 outputs a combined waveform that corresponds to a sum of the two or more waveforms. In some embodiments, mixer 125 also modifies one or more waveforms of the two or more waveforms to emphasize particular waveform(s) over the rest of the two or more waveforms (e.g., by increasing a scale of the particular waveform(s) and/or decreasing a scale of the rest of the waveforms). In some circumstances, mixer 125 selects one or more waveforms to remove from the combined waveform (e.g., the waveform from the oldest source is dropped when there are waveforms from more than three sources that have been requested to be output concurrently by tactile output generator 167)

Compressor 127 receives waveforms (e.g., a combined waveform from mixer 125) as an input, and modifies the waveforms. In some embodiments, compressor 127 reduces the waveforms (e.g., in accordance with physical specifications of tactile output generators 167 (FIG. 1A) or 357 (FIG. 3)) so that tactile outputs corresponding to the waveforms are reduced. In some embodiments, compressor 127 limits the waveforms, such as by enforcing a predefined maximum amplitude for the waveforms. For example, compressor 127 reduces amplitudes of portions of waveforms that exceed a predefined amplitude threshold while maintaining amplitudes of portions of waveforms that do not exceed the predefined amplitude threshold. In some embodiments, compressor 127 reduces a dynamic range of the waveforms. In some embodiments, compressor 127 dynamically reduces the dynamic range of the waveforms so that the combined waveforms remain within performance specifications of the tactile output generator 167 (e.g., force and/or moveable mass displacement limits).

Low-pass filter 129 receives waveforms (e.g., compressed waveforms from compressor 127) as an input, and filters (e.g., smooths) the waveforms (e.g., removes or reduces high frequency signal components in the waveforms). For example, in some instances, compressor 127 includes, in compressed waveforms, extraneous signals (e.g., high frequency signal components) that interfere with the generation of tactile outputs and/or exceed performance specifications of tactile output generator 167 when the tactile outputs are generated in accordance with the compressed waveforms. Low-pass filter 129 reduces or removes such extraneous signals in the waveforms.

Thermal controller 131 receives waveforms (e.g., filtered waveforms from low-pass filter 129) as an input, and adjusts the waveforms in accordance with thermal conditions of device 100 (e.g., based on internal temperatures detected within device 100, such as the temperature of haptic feedback controller 161, and/or external temperatures detected by device 100). For example, in some cases, the output of haptic feedback controller 161 varies depending on the temperature (e.g. haptic feedback controller 161, in response to receiving same waveforms, generates a first tactile output when haptic feedback controller 161 is at a first temperature and generates a second tactile output when haptic feedback controller 161 is at a second temperature that is distinct from the first temperature). For example, the magnitude (or the amplitude) of the tactile outputs may vary depending on the temperature. To reduce the effect of the temperature variations, the waveforms are modified (e.g., an amplitude of the waveforms is increased or decreased based on the temperature).

In some embodiments, haptic feedback module 133 (e.g., trigger module 121) is coupled to hardware input processing module 146. In some embodiments, other input controller(s) 160 in FIG. 1A includes hardware input processing module 146. In some embodiments, hardware input processing module 146 receives inputs from hardware input device 145 (e.g., other input or control devices 116 in FIG. 1A, such as a home button). In some embodiments, hardware input device 145 is any input device described herein, such as touch-sensitive display system 112 (FIG. 1A), keyboard/mouse 350 (FIG. 3), touchpad 355 (FIG. 3), one of other input or control devices 116 (FIG. 1A), or an intensity-sensitive home button (e.g., as shown in FIG. 2B or a home button with a mechanical actuator as illustrated in FIG. 2C). In some embodiments, hardware input device 145 consists of an intensity-sensitive home button (e.g., as shown in FIG. 2B or a home button with a mechanical actuator as illustrated in FIG. 2C), and not touch-sensitive display system 112 (FIG. 1A), keyboard/mouse 350 (FIG. 3), or touchpad 355 (FIG. 3). In some embodiments, in response to inputs from hardware input device 145, hardware input processing module 146 provides one or more trigger signals to haptic feedback module 133 to indicate that a user input satisfying predefined input criteria, such as an input corresponding to a "click" of a home button (e.g., a "down click" or an "up click"), has been detected. In some embodiments, haptic feedback module 133 provides waveforms that correspond to the "click" of a home button in response to the input corresponding to the "click" of a home button, simulating a haptic feedback of pressing a physical home button.

In some embodiments, the tactile output module includes haptic feedback controller 161 (e.g., haptic feedback controller 161 in FIG. 1A), which controls the generation of tactile outputs. In some embodiments, haptic feedback controller 161 is coupled to a plurality of tactile output generators, and selects one or more tactile output generators of the plurality of tactile output generators and sends waveforms to the selected one or more tactile output generators for generating tactile outputs. In some embodiments, haptic feedback controller 161 coordinates tactile output requests that correspond to activation of hardware input device 145 and tactile output requests that correspond to software events (e.g., tactile output requests from haptic feedback module 133) and modifies one or more waveforms of the two or more waveforms to emphasize particular waveform(s) over the rest of the two or more waveforms (e.g., by increasing a scale of the particular waveform(s) and/or decreasing a scale of the rest of the waveforms, such as to prioritize tactile outputs that correspond to activations of hardware input device 145 over tactile outputs that correspond to software events).

In some embodiments, as shown in FIG. 1C, an output of haptic feedback controller 161 is coupled to audio circuitry of device 100 (e.g., audio circuitry 110, FIG. 1A), and provides audio signals to audio circuitry of device 100. In some embodiments, haptic feedback controller 161 provides both waveforms used for generating tactile outputs and audio signals used for providing audio outputs in conjunction with generation of the tactile outputs. In some embodiments, haptic feedback controller 161 modifies audio signals and/or waveforms (used for generating tactile outputs) so that the audio outputs and the tactile outputs are synchronized (e.g., by delaying the audio signals and/or waveforms). In some embodiments, haptic feedback controller 161 includes a digital-to-analog converter used for converting digital waveforms into analog signals, which are received by amplifier 163 and/or tactile output generator 167.

In some embodiments, the tactile output module includes amplifier 163. In some embodiments, amplifier 163 receives waveforms (e.g., from haptic feedback controller 161) and amplifies the waveforms prior to sending the amplified waveforms to tactile output generator 167 (e.g., any of tactile output generators 167 (FIG. 1A) or 357 (FIG. 3)). For example, amplifier 163 amplifies the received waveforms to signal levels that are in accordance with physical specifications of tactile output generator 167 (e.g., to a voltage and/or a current required by tactile output generator 167 for generating tactile outputs so that the signals sent to tactile output generator 167 produce tactile outputs that correspond to the waveforms received from haptic feedback controller 161) and sends the amplified waveforms to tactile output generator 167. In response, tactile output generator 167 generates tactile outputs (e.g., by shifting a moveable mass back and forth in one or more dimensions relative to a neutral position of the moveable mass).

In some embodiments, the tactile output module includes sensor 169, which is coupled to tactile output generator 167. Sensor 169 detects states or state changes (e.g., mechanical position, physical displacement, and/or movement) of tactile output generator 167 or one or more components of tactile output generator 167 (e.g., one or more moving parts, such as a membrane, used to generate tactile outputs). In some embodiments, sensor 169 is a magnetic field sensor (e.g., a Hall effect sensor) or other displacement and/or movement sensor. In some embodiments, sensor 169 provides information (e.g., a position, a displacement, and/or a movement of one or more parts in tactile output generator 167) to haptic feedback controller 161 and, in accordance with the information provided by sensor 169 about the state of tactile output generator 167, haptic feedback controller 161 adjusts the waveforms output from haptic feedback controller 161 (e.g., waveforms sent to tactile output generator 167, optionally via amplifier 163).

Figure 2A:
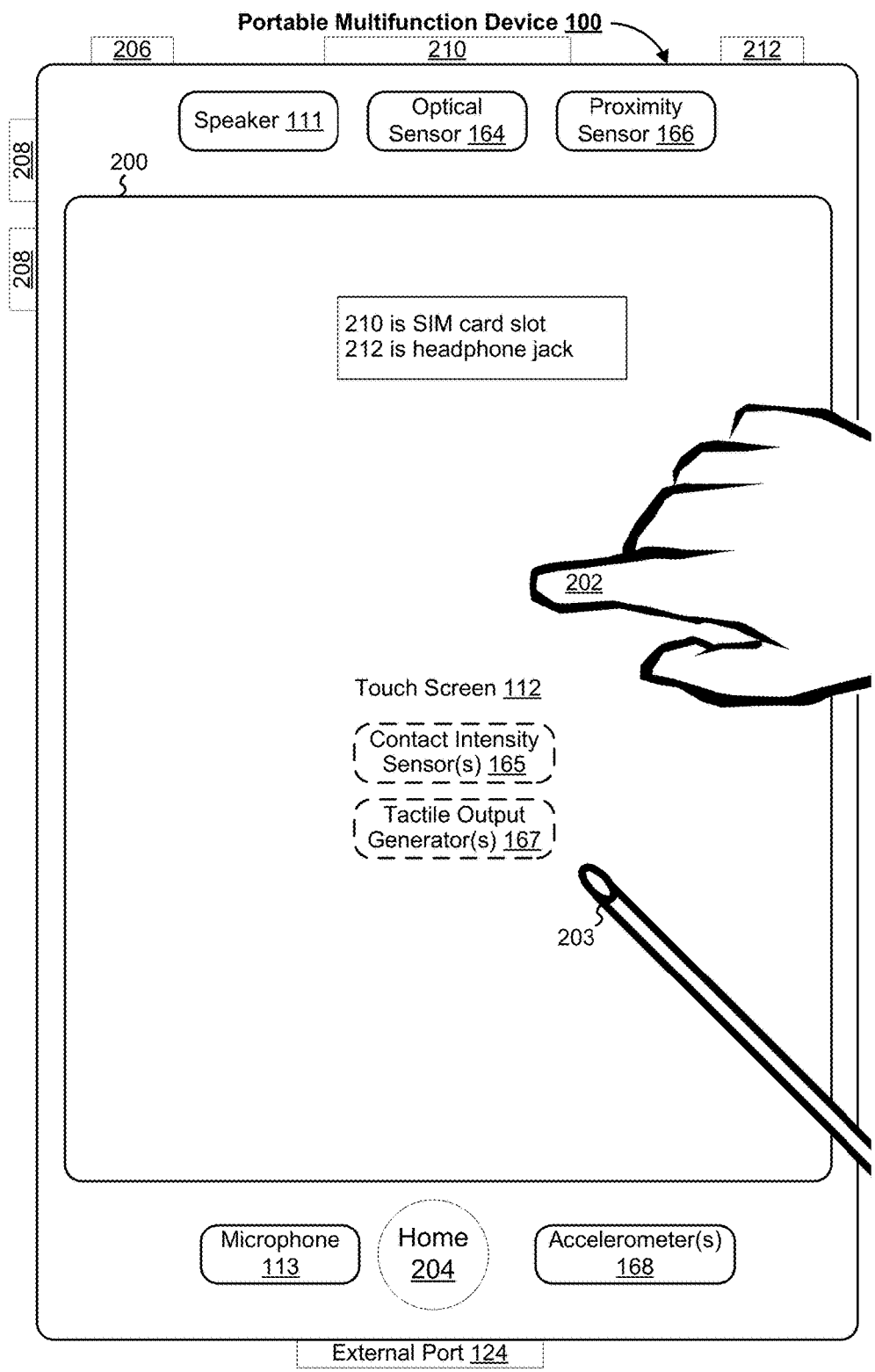
FIG. 2A illustrates a portable multifunction device having a touch screen in accordance with some embodiments.
Figure 2B:
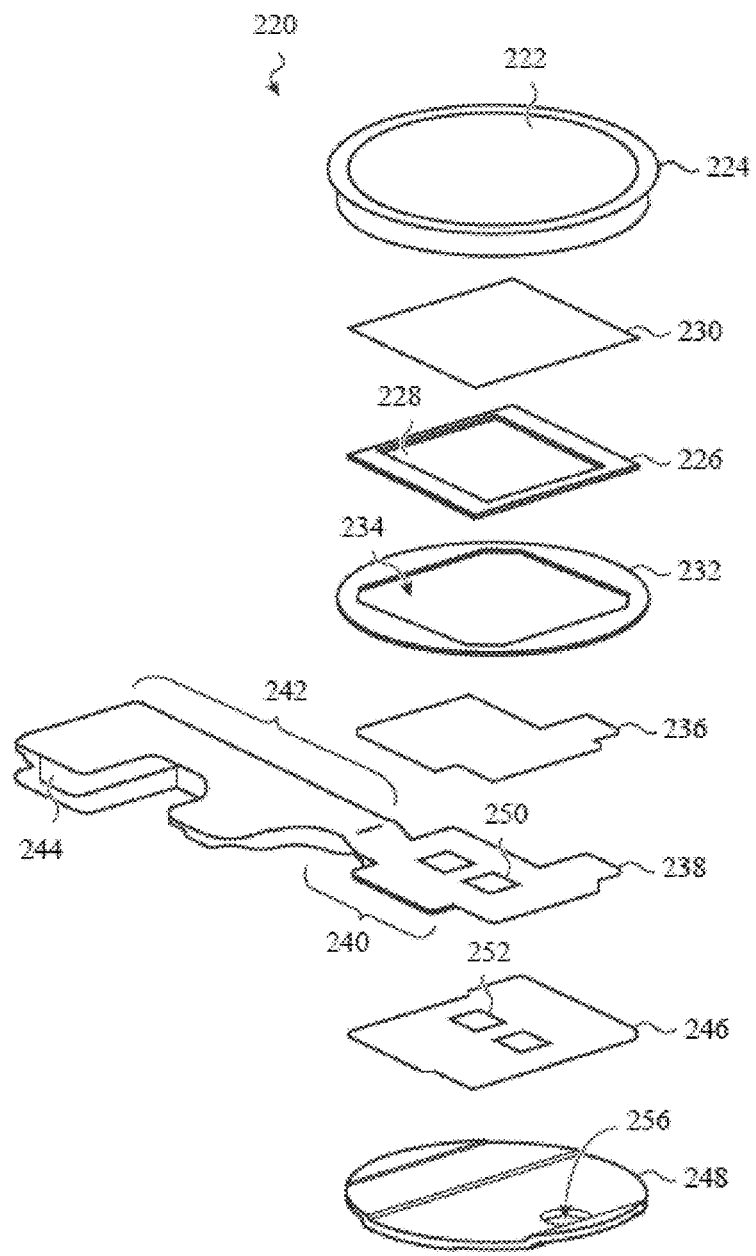
FIGS. 2B-2C show exploded views of a force-sensitive input device in accordance with some embodiments.
Figure 2C:
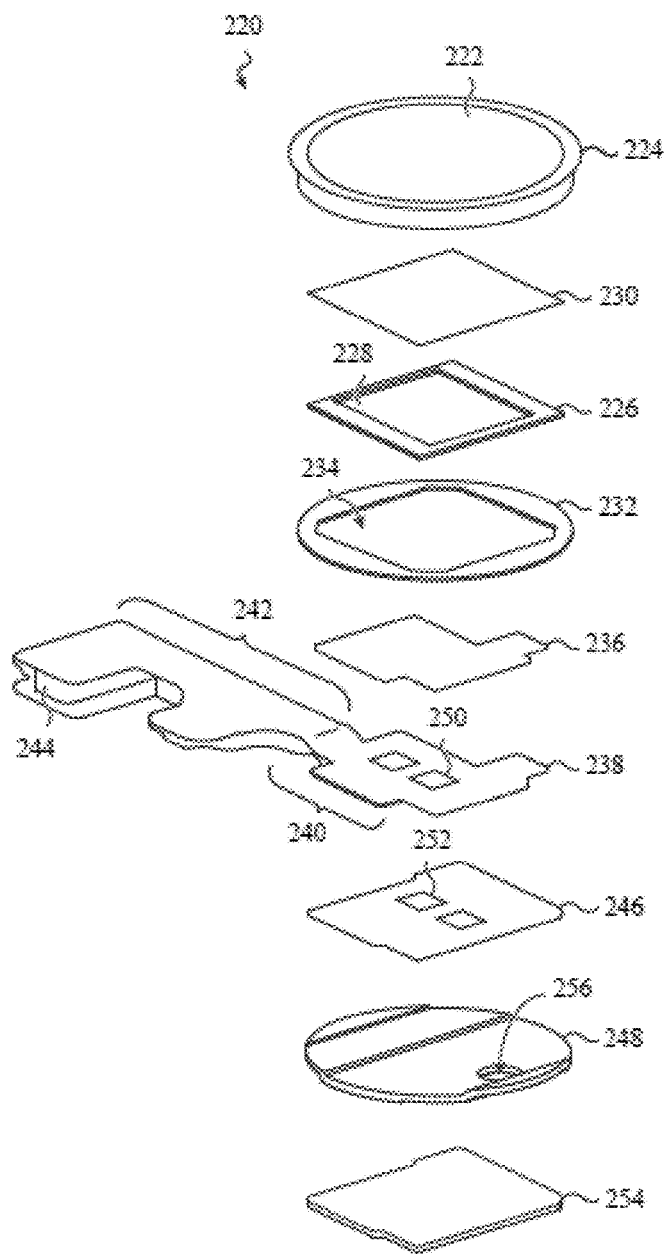

FIG. 2A illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIGS. 2B-2C show exploded views of a first input device suitable for use in the electronic devices shown in FIGS. 1A, 2A, 3, and/or 4A (e.g., as home button 204). FIG. 2B shows an example of an intensity-sensitive home button with capacitive sensors used to determine a range of intensity values that correspond to force applied to the intensity-sensitive home button. FIG. 2C shows an example of a home button with a mechanical switch element. With reference to FIG. 2B, the input device stack 220 includes a cover element 222 and a trim 224. In the illustrated embodiment, the trim 224 completely surrounds the sides of the cover element 222 and the perimeter of the top surface of the cover element 222. Other embodiments are not limited to this configuration. For example, in one embodiment the sides and/or top surface of the cover element 222 can be partially surrounded by the trim 224. Alternatively, the trim 224 can be omitted in other embodiments.

Both the cover element 222 and the trim 224 can be formed with any suitable opaque, transparent, and/or translucent material. For example, the cover element 222 can be made of glass, plastic, or sapphire and the trim 224 may be made of a metal or plastic. In some embodiments, one or more additional layers (not shown) can be positioned below the cover element 222. For example, an opaque ink layer can be disposed below the cover element 222 when the cover element 222 is made of a transparent material. The opaque ink layer can conceal the other components in the input device stack 220 so that the other components are not visible through the transparent cover element 222.

A first circuit layer 226 can be disposed below the cover element 222. Any suitable circuit layer may be used. For example, the first circuit layer 226 may be a circuit board or a flexible circuit. The first circuit layer 226 can include one or more circuits, signal lines, and/or integrated circuits. In one embodiment, the first circuit layer 226 includes a biometric sensor 228. Any suitable type of biometric sensor can be used. For example, in one embodiment the biometric sensor is a capacitive fingerprint sensor that captures at least one fingerprint when a user's finger (or fingers) approaches and/or contacts the cover element 222.

The first circuit layer 226 may be attached to the bottom surface of the cover element 222 with an adhesive layer 230. Any suitable adhesive can be used for the adhesive layer. For example, a pressure sensitive adhesive layer may be used as the adhesive layer 230.

A compliant layer 232 is disposed below the first circuit layer 226. In one embodiment, the compliant layer 232 includes an opening 234 formed in the compliant layer 232. The opening 234 exposes the top surface of the first circuit layer 226 and/or the biometric sensor 228 when the device stack 220 is assembled. In the illustrated embodiment, the compliant layer 232 is positioned around an interior perimeter of the trim 224 and/or around a peripheral edge of the cover element 222. Although depicted in a circular shape, the compliant layer 232 can have any given shape and/or dimensions, such as a square or oval. The compliant layer 232 is shown as a continuous compliant layer in FIGS. 2B and 2C, but other embodiments are not limited to this configuration. In some embodiments, multiple discrete compliant layers may be used in the device stack 220. Additionally, in some embodiments, the compliant layer 232 does not include the opening 234 and the compliant layer 232 extends across at least a portion of the input device stack 220. For example, the compliant layer 232 may extend across the bottom surface of the cover element 222, the bottom surface of the first circuit layer 226, or a portion of the bottom surface of the cover element 222 (e.g., around the peripheral edge of the cover element) and the bottom surface of the first circuit layer 226.

A second circuit layer 238 is positioned below the first circuit layer 226. A flexible circuit and a circuit board are examples of a circuit layer that can be used in the second circuit layer 238. In some embodiments, the second circuit layer 238 can include a first circuit section 240 and a second circuit section 242. The first and second circuit sections 240, 242 can be electrically connected one another other.

The first circuit section 240 can include a first set of one or more intensity sensor components that are included in an intensity sensor. In some embodiments, the first circuit section 240 can be electrically connected to the first circuit layer 226. For example, when the first circuit layer 226 includes a biometric sensor 228, the biometric sensor 228 may be electrically connected to the first circuit section 240 of the second circuit layer 238.

The second circuit section 242 can include additional circuitry, such as signal lines, circuit components, integrated circuits, and the like. In one embodiment, the second circuit section 242 may include a board-to-board connector 244 to electrically connect the second circuit layer 238 to other circuitry in the electronic device. For example, the second circuit layer 238 can be operably connected to a processing device using the board-to-board connector 244. Additionally or alternatively, the second circuit layer 238 may be operably connected to circuitry that transmits signals (e.g., sense signals) received from the intensity sensor component(s) in the first circuit section 240 to a processing device. Additionally or alternatively, the second circuit layer 238 may be operably connected to circuitry that provides signals (e.g., drive signals, a reference signal) to the one or more intensity sensor components in the first circuit section 240.

In some embodiments, the first circuit section 240 of the second circuit layer 238 may be attached to the bottom surface of the first circuit layer 226 using an adhesive layer 236. In a non-limiting example, a die attach film may be used to attach the first circuit section 240 to the bottom surface of the first circuit layer 226.

A third circuit layer 246 is disposed below the first circuit section 240 of the second circuit layer 238. The third circuit layer 246 may include a second set of one or more intensity sensor components that are included in an intensity sensor. The third circuit layer 246 is supported by and/or attached to a support element 248. In one embodiment, the support element 248 is attached to the trim 224 to produce an enclosure for the other components in the device stack 220.

The support element 248 may be attached to the trim 224 using any suitable attachment mechanism.

The first set of one or more intensity sensor components in the first circuit section 240 and the second set of one or more intensity sensor components in the third circuit layer 246 together form an intensity sensor. The intensity sensor can use any suitable intensity sensing technology. Example sensing technologies include, but are not limited to, capacitive, piezoelectric, piezoresistive, ultrasonic, and magnetic.

In the examples shown in FIGS. 2B and 2C, the intensity sensor is a capacitive force sensor. With a capacitive force sensor, the first set of one or more intensity sensor components can include a first set of one or more electrodes 250 and the second set of one or more force sensor components a second set of one or more electrodes 252. Although shown in a square shape in FIGS. 2B and 2C each electrode in the first and second sets of one or more electrodes 250, 252 can have any given shape (e.g., rectangles, circles). Additionally, the one or more electrodes in the first and second sets 250, 252 may be arranged in any given pattern (e.g., one or more rows and one or more columns).

FIGS. 2B and 2C show two electrodes in the first and second sets of one or more electrodes 250, 252. However, other embodiments are not limited to this configuration. The first and second sets of one or more electrodes 250, 252 may each be a single electrode or multiple discrete electrodes. For example, if the first set of one or more electrodes is a single electrode, the second set of one or more electrodes comprises multiple discrete electrodes. In some embodiments, the second set of one or more electrodes can be a single electrode and the first set includes multiple discrete electrodes. Alternatively, both the first and second sets of one or more electrodes may each include multiple discrete electrodes.

Each electrode in the first set of one or more electrodes 250 is aligned in at least one direction (e.g., vertically) with a respective electrode in the second set of one or more electrodes 252 to produce one or more capacitors. When a force input is applied to the cover element 222 (e.g., the input surface of the input device), at least one electrode in the first set 250 moves closer to a respective electrode in the second set 252, which varies the capacitance of the capacitor(s). A capacitance signal sensed from each capacitor represents a capacitance measurement of that capacitor. A processing device (not shown) is configured to receive the capacitance signal(s) and correlate the capacitance signal(s) to an amount of intensity applied to the cover element 222. In some embodiments the force sensor can replace a switch element and different intensity thresholds can be used to determine activation events.

In some embodiments, such as the embodiment shown in FIG. 2C, a switch element 254 can be positioned below the support element 248. The switch element 254 registers a user input when a force input applied to the cover element 222 exceeds a given amount of force (e.g., a force threshold associated with closing the distance between the first circuit section 240 and the third circuit layer 246). Any suitable switch element can be used. For example, the switch element 254 may be a dome switch that collapses when the force input applied to the cover element 222 exceeds the force threshold. When collapsed, the dome switch completes a circuit that is detected by a processing device and recognized as a user input (e.g., a selection of an icon, function, or application). In one embodiment, the dome switch is arranged such that the apex of the collapsible dome is proximate to the bottom surface of the support plate 248. In another embodiment, the base of the collapsible dome can be proximate to the bottom surface of the support plate 248.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, web site creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- a Bluetooth indicator;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensities of contacts on touch-sensitive surface 451 and/or one or more tactile output generators 359 for generating tactile outputs for a user of device 300.

Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" is an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface is the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact is a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $I_L$), and/or one or more other intensity thresholds (e.g., an intensity threshold $I_H$ that is lower than $I_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, one or more tactile output generators for generating tactile outputs, one or more sensors to detect intensities of contacts with a button of the device (e.g., a virtual or physical home button), and (optionally) one or more sensors to detect intensities of contacts with the touch-sensitive surface.

FIGS. 5A1-5C19 illustrate exemplary user interfaces for providing tactile outputs and visual feedback in response to multiple types of inputs on a button of the device (e.g., a physical home button or a virtual home button) in accordance with some embodiments. The user interfaces in these figures are used to illustrate the processes described below, including the processes in FIGS. 7A-7G, 9A-9D, 11A-11E, 13A-13D, 15A-15E, 17A-17D, and 19A-19C. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

Figure 18:
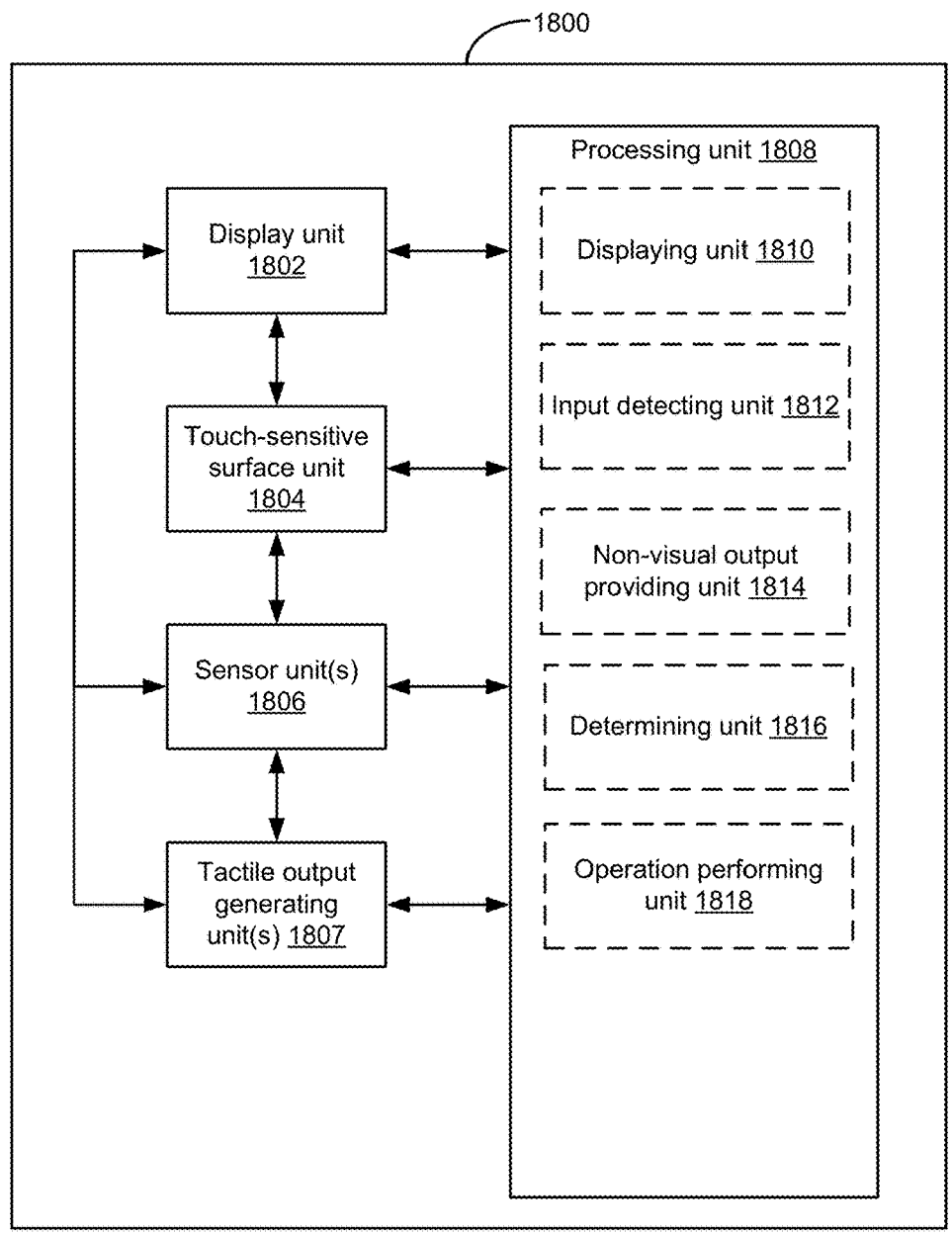

FIGS. 5A1-5A18 illustrate exemplary user interfaces for providing haptic and visual feedback for button interaction in accordance with some embodiments. FIGS. 5A1-5A18 illustrate opening an application from a home screen and providing visual feedback and tactile outputs in response to multiple types of inputs on the home button (e.g., button 204).

FIG. 5A1 illustrates a user interface 510 for a menu of applications on device 100 (e.g., a primary page of a multi-page home screen) in accordance with some embodiments. User interface 510 includes similar elements as user interface 400, as described above with respect to FIG. 4A, and for the sake of brevity, an exhaustive description of the elements of user interface 510 is not provided here.

FIGS. 5A2-5A3 illustrate an example of detecting an input (e.g., a tap gesture by contact 502, FIG. 5A2) on the Clock icon and displaying a user interface 512 of the Clock application (in FIG. 5A3).

Figure 7C:
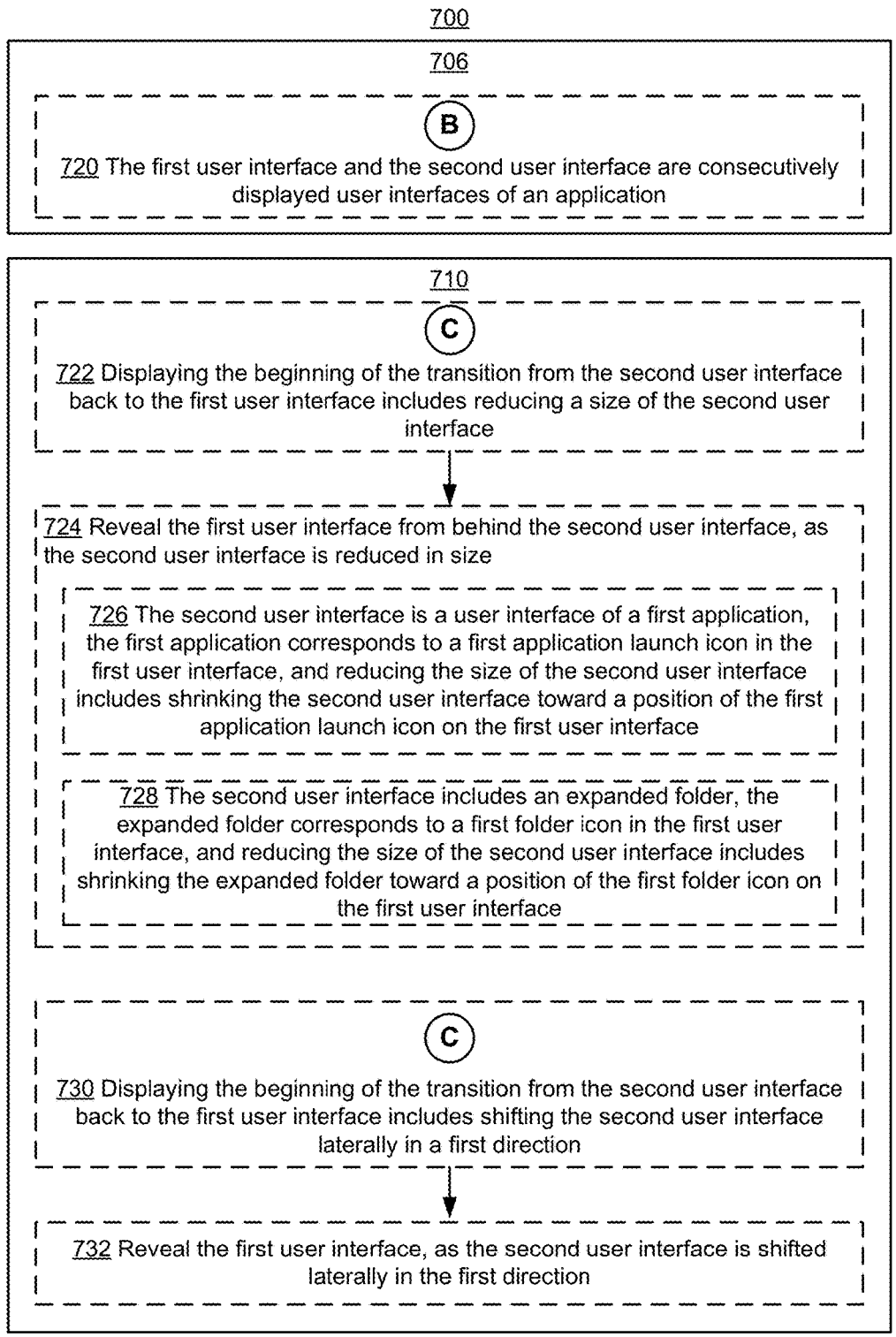
Figure 7F:
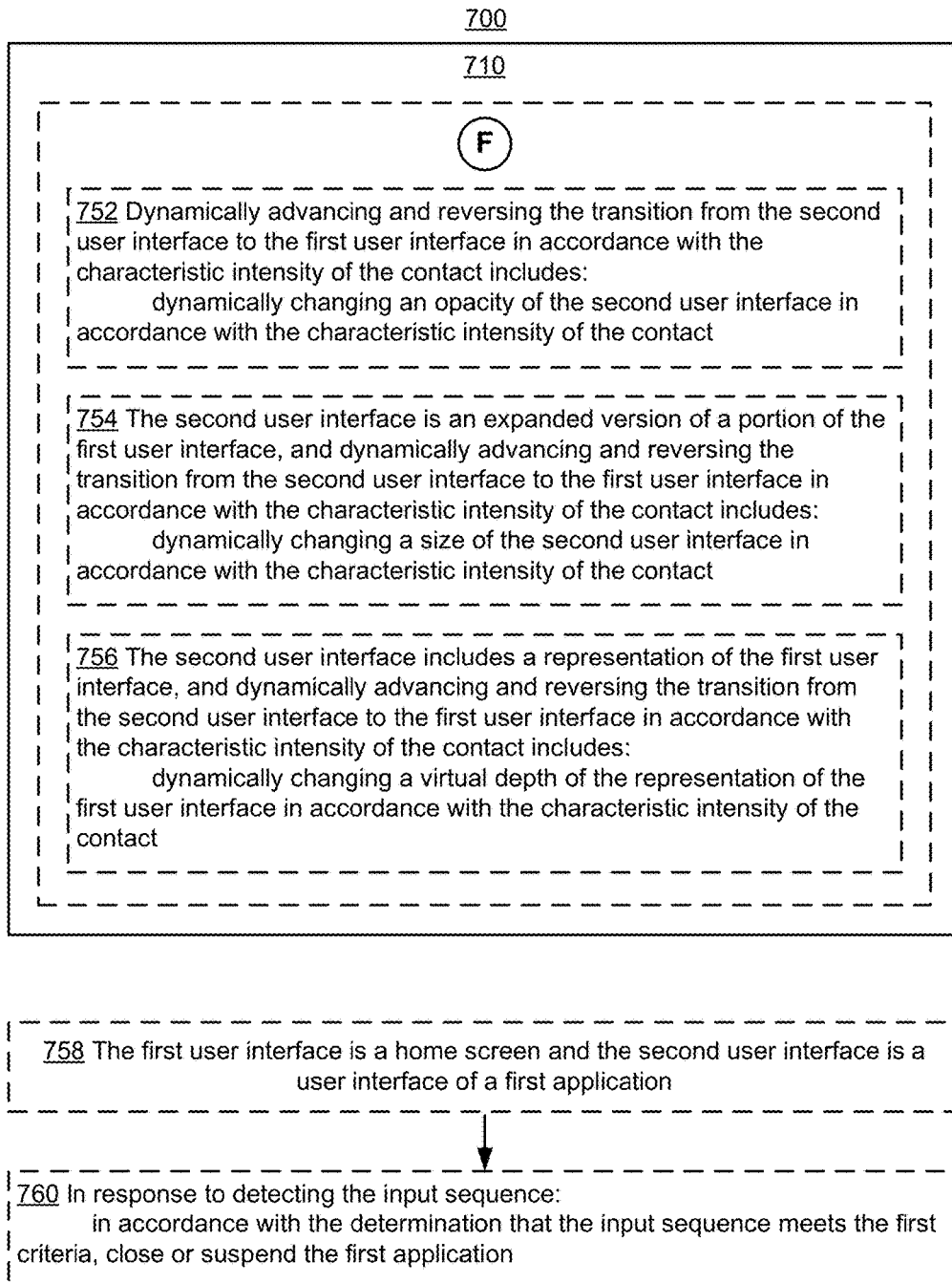
Figure 8:
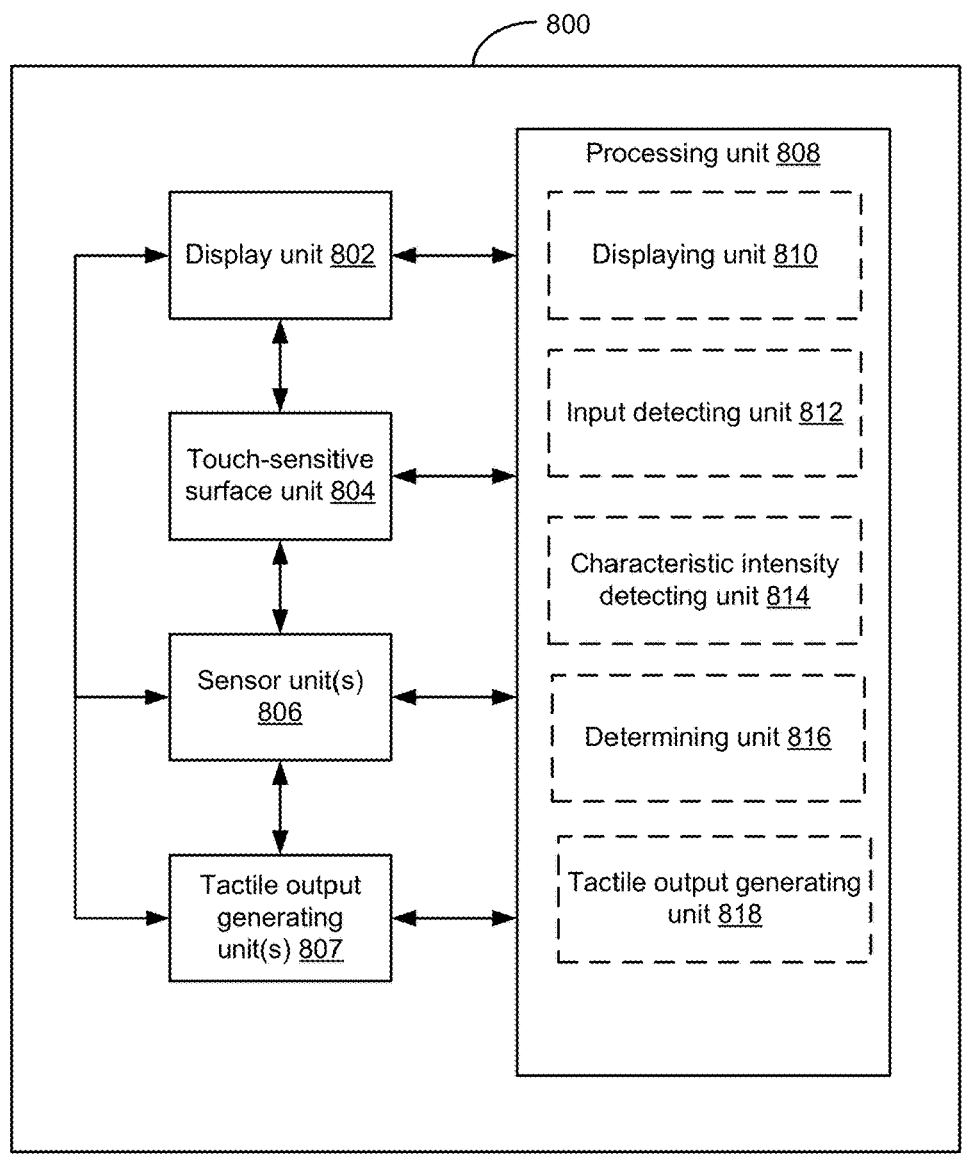
FIG. 8 is a functional block diagram of an electronic device in accordance with some embodiments.

FIGS. 5A4-5A8 illustrate an example of detecting changes in intensity of the contact (e.g., contact 504) on the home button (e.g., button 204) and providing visual feedback regarding activation of the home button (e.g., displaying a beginning of a transition from user interface 512 back to user interface 510) in accordance with the intensity. In FIG. 5A4, the intensity of contact 504-a has not yet reached the "hint" intensity threshold $IT_H$, so no visual feedback is displayed. In FIGS. 5A5-5A7, when the intensity of contact 504 increases above the hint intensity threshold $IT_H$, the visual feedback dynamically changes in accordance with the intensity of the contact. For example, as the intensity of contact increases from FIG. 5A5 to 5A6, the transition from user interface 512 to user interface 510 is advanced (e.g., from user interface 513-1 to user interface 513-2), and as the intensity of contact decreases from FIG. 5A6 to 5A7, the transition from user interface 512 to user interface 510 is reversed (e.g., from user interface 513-2 to user interface 513-1). Since the intensity of contact 504 does not increase above the light press intensity threshold $IT_L$, when the end of the input by contact 504 is detected, user interface 512 of the Clock application is redisplayed on the display (in FIG. 5A8).

Figure 14:
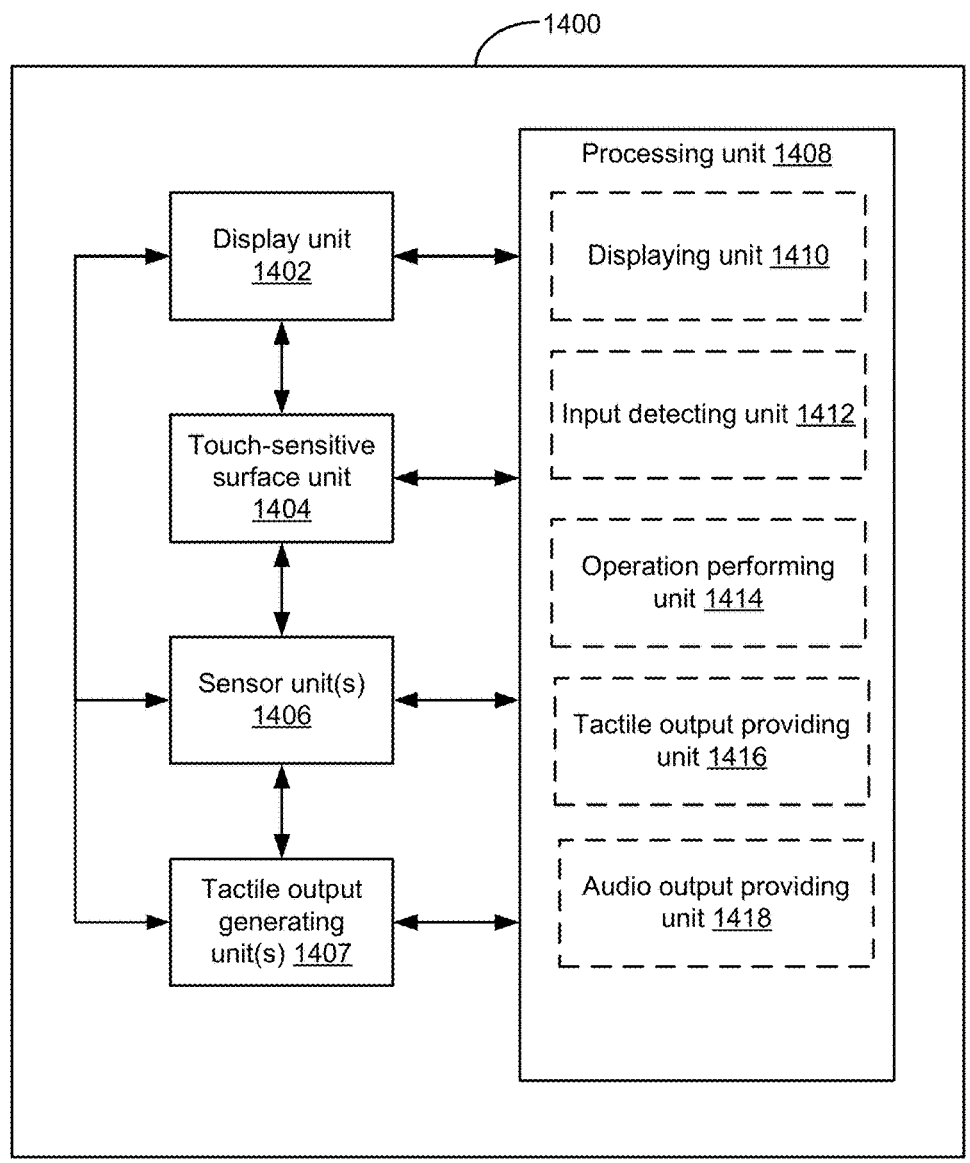
FIG. 14 is a functional block diagram of an electronic device in accordance with some embodiments.

FIGS. 5A9-5A14 illustrate an example of detecting changes in intensity of the contact (e.g., contact 508) on the home button (e.g., button 204) and providing visual feedback regarding activation of the home button (e.g., displaying a beginning of a transition from user interface 512 back to user interface 510) in accordance with the intensity and providing tactile outputs in response to inputs on the home button (e.g., button 204). In FIGS. 5A9-5A11, the transition from user interface 512 to user interface 510 is advanced (e.g., from user interface 513-1 to user interface 513-2 to user interface 513-3) as the intensity of contact increases (e.g., from contact 508-a to contact 508-b to contact 508-c). In FIG. 5A11, when the intensity of contact 508-c increases to the "light press" intensity threshold $IT_L$ on the home button (e.g., a down-click of button 204, or sometimes referred to as a "press event"), device 100 provides a tactile output 503 (e.g., MiniTap 270 Hz with a gain of 0.5). In FIG. 5A13, when the intensity of contact 508-e decreases to the "light press release" intensity threshold $IT_{LR}$ (e.g., an up-click of button 204, or sometimes referred to as a "release event"), device 100 provides a different tactile output, such as tactile output 505 (e.g., MiniTap 270 Hz with a gain of 0.3). Since the intensity of contact 508 increases to the light press intensity threshold $IT_L$ (e.g., in FIG. 5A11) and the end of the input by contact 508 is detected (e.g., by the release event in FIG. 5A13), the transition from user interface 512 to user interface 510 continues to completion, as shown in FIGS. 5A11-5A14 (e.g., from user interface 513-3 in FIG. 5A11 to user interface 513-4 in FIG. 5A12 to user interface 513-5 in FIG. 5A13 to user interface 510 in FIG. 5A14). The tactile outputs shown in FIGS. 5A11 and 5A13 correspond to a first range of values of the intensity-change metric (e.g., a "soft" intensity), as described below with respect to method 1500.

Figure 12:
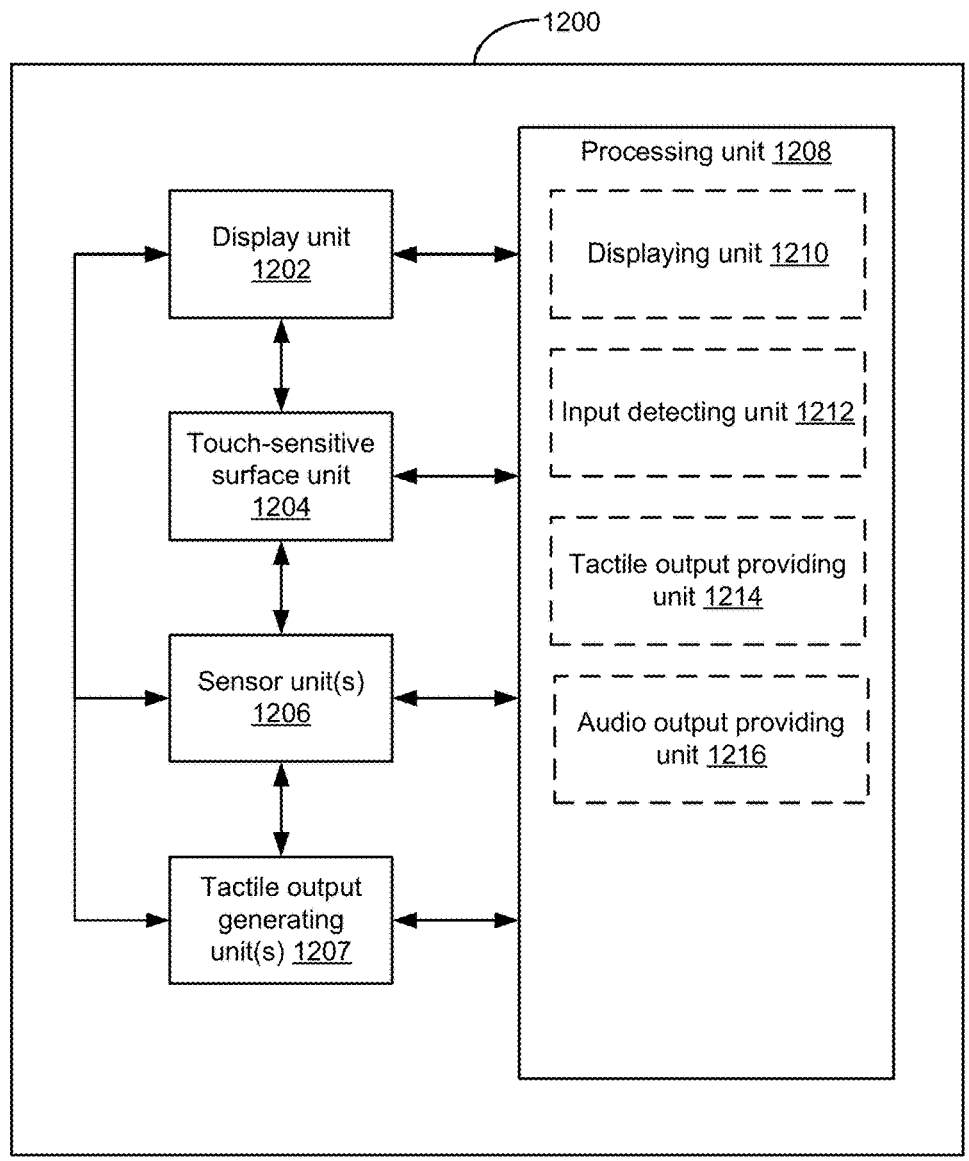
FIG. 12 is a functional block diagram of an electronic device in accordance with some embodiments.
Figure 16:
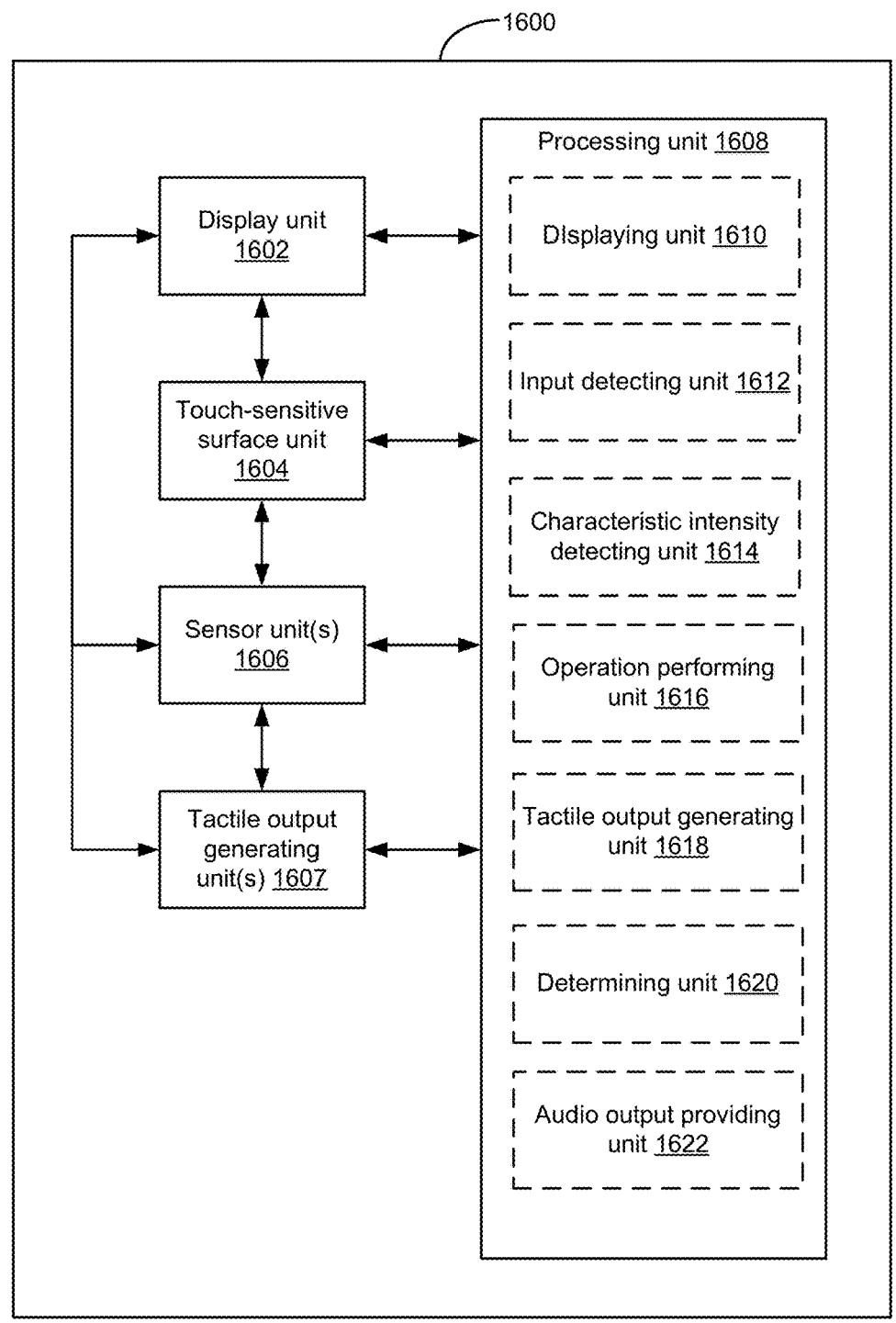
FIG. 16 is a functional block diagram of an electronic device in accordance with some embodiments.

FIGS. 5A15-5A16 illustrate an alternative sequence from FIG. 5A12 if the press input by contact 508 does not lift off until more than a threshold amount of time (e.g., a long press time $T_{LP}$) has elapsed. In this case, the animated transition from user interface 512 to user interface 510 is interrupted (e.g., at user interface 513-6 in FIG. 5A16) and user interface 515 (e.g., an automated assistant user interface) is displayed. In some embodiments, when the animated transition from user interface 512 to user interface 510 is interrupted, another animated transition is displayed (e.g., from the point of interruption to user interface 515), as shown by user interface 514-1 in FIG. 5A17. In some embodiments, as shown in FIG. 5A16, when the intensity of contact 508-f is held above the light press intensity threshold $IT_L$ for the threshold amount of time (e.g., $T_{LP}$), device 100 provides a tactile output 507 (e.g., a double MiniTap 270 Hz or MicroTap 270 Hz with a gain of 0.9). In some embodiments, as shown in FIG. 5A18, when the transition to the automated assistant user interface (e.g., user interface 515, FIG. 5A18) is complete, device 100 provides a tactile output 509 (e.g., a double MiniTap 270 Hz or MicroTap 270 Hz with a gain of 0.9). In some embodiments, device 100 either provides a tactile output when a contact is held above the light press intensity threshold $IT_L$ for the $T_{LP}$ threshold amount of time (e.g., tactile output 507, FIG. 5A16) or provides a tactile output when the transition to the automated assistance user interface is complete (e.g., tactile output 509, FIG. 5A18), but not both.

In the examples of FIGS. 5A1-5A18, the tactile outputs for press events (e.g., when the intensity of contact increases to the light press intensity threshold $IT_L$) and release events (e.g., when the intensity of contact decreases to the light press release intensity threshold $IT_{LR}$) on the home button (e.g., button 204) are shown as MiniTaps at 270 Hz (e.g., when a second tactile output setting is selected, as described below with respect to FIGS. 5C1-5C9). In some embodiments, when a first tactile output setting is selected (e.g., as described below with respect to FIGS. 5C13-5C19), the tactile outputs in these examples would be MiniTaps at 230 Hz. In some embodiments, when a third tactile output setting is selected (e.g., as described below with respect to FIGS. 5C10-5C12), the tactile outputs in these examples would be MiniTaps at 300 Hz. Similarly, in FIGS. 5B1-5B75, the tactile outputs for press events and release events are shown as MiniTaps at 270 Hz (e.g., when the second tactile output setting is selected), but if the first tactile output setting or the third tactile output setting is selected, the tactile outputs would be MiniTaps at 230 Hz or 300 Hz, respectively.

FIGS. 5B1-5B75 illustrate exemplary user interfaces for providing haptic and visual feedback for button interaction in accordance with some embodiments. FIGS. 5B1-5B75 illustrate opening an application from a folder of a secondary page of a multi-page home screen and providing visual feedback and tactile outputs in response to multiple types of inputs on the home button (e.g., button 204).

FIG. 5B1 illustrates a user interface 520 for a menu of applications on device 100 (e.g., a secondary page of a multi-page home screen) in accordance with some embodiments. User interface 520 includes similar elements as user interface 400, as described above with respect to FIG. 4A, and for the sake of brevity, an exhaustive description of the elements of user interface 520 is not provided here.

FIGS. 5B2-5B3 illustrate an example of detecting an input (e.g., a tap gesture by contact 530, FIG. 5B2) on the Photography folder and displaying a user interface 522 of the Photography folder (in FIG. 5B3).

FIGS. 5B4-5B5 illustrate an example of detecting an input (e.g., a tap gesture by contact 531, FIG. 5B4) on the Pages icon (e.g., for a word processor application, such as the Pages application by Apple Inc. of Cupertino, Calif.) of user interface 522 and displaying a user interface 524 of the Pages application (e.g., in FIG. 5B5).

FIGS. 5B6-5B14 illustrate an example of detecting a double click (e.g., with a first press event, followed by a first release event, followed by a second press event, where the first and second press events are detected within a threshold amount of time of each other, such as a double click time threshold $T_{DC}$) close in time, where both the first and second press events occur before a threshold amount of time, such as an interrupt time threshold $T_I$. Since both the first and second press events occur before the interrupt time threshold $T_I$, the animated transition from user interface 524 (e.g., the Pages application) to user interface 522 (e.g., the Photography folder) is interrupted (e.g., at a first point when the second press event is detected, as shown in FIG. 5B10).

Figure 10:
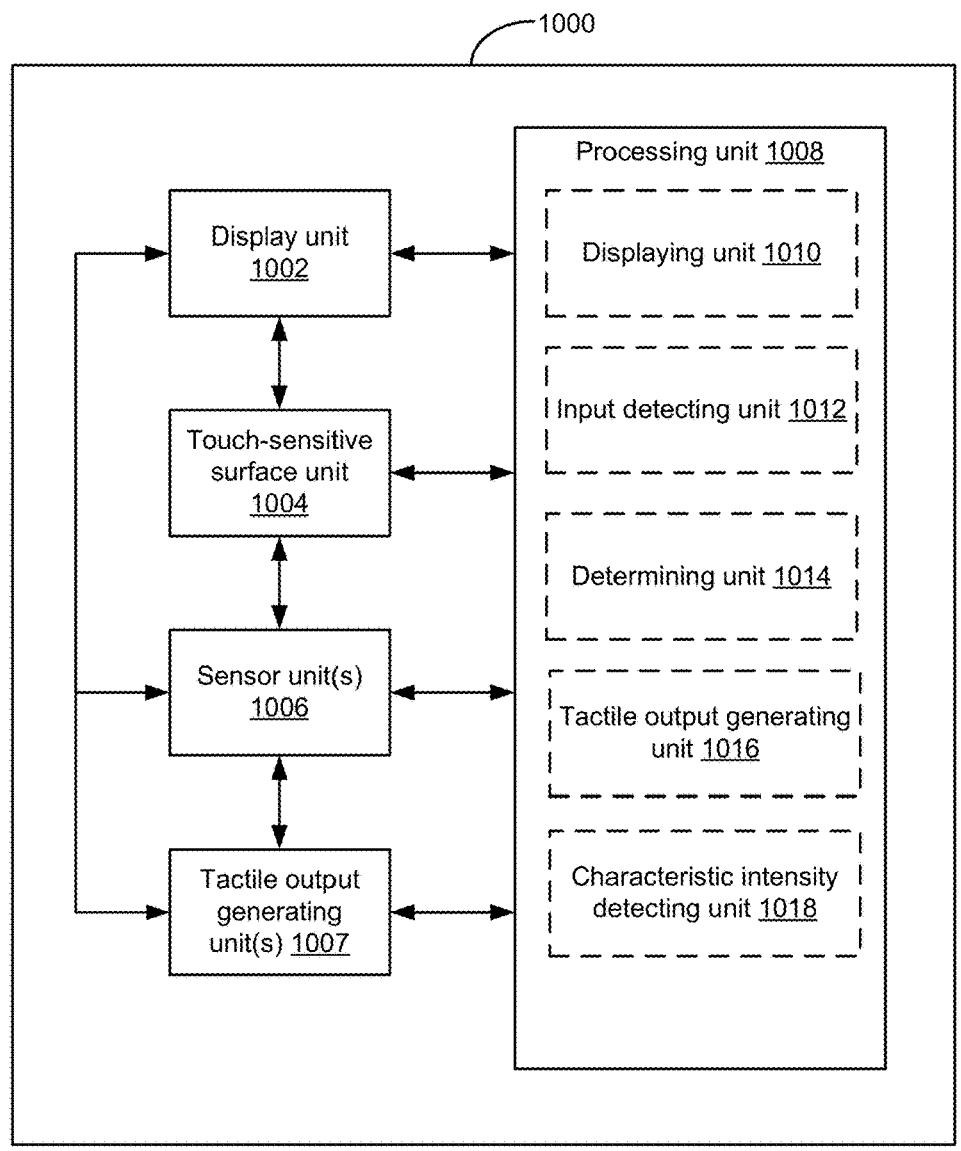
FIG. 10 is a functional block diagram of an electronic device in accordance with some embodiments.

FIGS. 5B6-5B10 illustrate a beginning of an animated transition from user interface 524 (e.g., the Pages application) to user interface 522 (e.g., the Photography folder). In FIG. 5B6, when the intensity of contact 532-*a* increases to the light press intensity threshold $IT_L$ on the home button (e.g., a first down-click of button 204, or sometimes referred to as a "first press event"), device 100 provides a tactile output 571 (e.g., MiniTap 270 Hz with a gain of 1). In FIG. 5B8, when the intensity of contact 532-*c* decreases to the light press release intensity threshold $IT_{LR}$ (e.g., a first up-click of button 204, or sometimes referred to as a "first release event"), device 100 provides a different tactile output, such as tactile output 572 (e.g., MiniTap 270 Hz with a gain of 0.5). In FIG. 5B10, when the intensity of contact 532-*e* increases to the light press intensity threshold $IT_L$ on the home button for a second time within the double click time threshold $T_{DC}$ (e.g., a second down-click of button 204, or sometimes referred to as a "second press event"), device 100 provides another tactile output, such as tactile output 573 (e.g., MiniTap 270 Hz with a gain of 0.8). The tactile outputs shown in FIGS. 5B6, 5B8, and 5B10 correspond to a second range of values of the intensity-change metric (e.g., a "normal" intensity), as described below with respect to method 1500.

In FIG. 5B10, when the second press event is detected, the animated transition from user interface 524 (e.g., the Pages application) to user interface 522 (e.g., the Photography folder) is interrupted at a first point (e.g., at user interface 525-5) and an animated transition to user interface 528 (e.g., a multi-tasking user interface) begins from the point of interruption. FIGS. 5B11-5B13 illustrate the animated transition from the point of interruption to user interface 528 (e.g., from user interface 526-1 in FIG. 5B11 to user interface 526-2 in FIG. 5B12 to user interface 526-3 in FIG. 5B13). FIG. 5B14 illustrates user interface 528 (e.g., a multi-tasking user interface) with the Pages application (e.g., user interface 524) on top.

FIGS. 5B15-5B16 illustrate an example of detecting an input (e.g., a press input by contact 533, FIG. 5B15) on the home button (e.g., button 204) and displaying user interface 524 of the Pages application (in FIG. 5B16). FIG. 5B16 is the same starting point as FIG. 5B5. The tactile output shown in FIG. 5B15 corresponds to a first range of values of the intensity-change metric (e.g., a "soft" intensity), as described below with respect to method 1500.

FIGS. 5B17-5B25 illustrate an alternative sequence to FIGS. 5B6-5B14, starting from user interface 524 of the Pages application in FIG. 5B5. FIGS. 5B17-5B25 illustrate an example of detecting a double click (e.g., with a first press event, followed by a first release event, followed by a second press event, where the first and second press events are detected within a threshold amount of time of each other, such as double click time threshold $T_{DC}$) further apart in time (as compared to FIGS. 5B5-5B14), where both the first and second press events occur before a threshold amount of time, such as interrupt time threshold $T_I$. Since both the first and second press events occur before the interrupt time threshold $T_I$, the animated transition from user interface 524 (e.g., the Pages application) to user interface 522 (e.g., the Photography folder) is interrupted (e.g., at a second point when the second press event is detected, as shown in FIG. 5B21).

FIGS. 5B17-5B21 illustrate a beginning of an animated transition from user interface 524 (e.g., the Pages application) to user interface 522 (e.g., the Photography folder). In FIG. 5B17, when the intensity of contact 534-*a* increases to the light press intensity threshold $IT_L$ on the home button (e.g., a first down-click of button 204, or a first press event), device 100 provides a tactile output 575 (e.g., MiniTap 270 Hz with a gain of 1). In FIG. 5B19, when the intensity of contact 534-*c* decreases to the light press release intensity threshold $IT_{LR}$ (e.g., a first up-click of button 204, or a first release event), device 100 provides a different tactile output, such as tactile output 576 (e.g., MiniTap 270 Hz with a gain of 0.5). In FIG. 5B21, when the intensity of contact 534-*e* on the home button for a second time within the double click time threshold $T_{DC}$ (e.g., a second down-click of button 204, or a second press event), device 100 provides another tactile output, such as tactile output 577 (e.g., MiniTap 270 Hz with a gain of 0.8). The tactile outputs shown in FIGS. 5B17, 5B19, and 5B21 correspond to a second range of values of the intensity-change metric (e.g., a "normal" intensity), as described below with respect to method 1500.

In FIG. 5B21, when the second press event is detected, the animated transition from user interface 524 (e.g., the Pages application) to user interface 522 (e.g., the Photography folder) is interrupted at a second point (e.g., at user interface 525-6), later than the first point (e.g., at user interface 525-5 in FIG. 5B10), and an animated transition to user interface 528 (e.g., a multi-tasking user interface) begins from the second point of interruption. FIGS. 5B22-5B24 illustrate the animated transition from the second point of interruption to user interface 528 (e.g., from user interface 527-1 in FIG. 5B22 to user interface 527-2 in FIG. 5B23 to user interface 527-3 in FIG. 5B24). FIG. 5B25 illustrates user interface 528 (e.g., a multi-tasking user interface) with the Pages application (e.g., user interface 524) on top.

FIGS. 5B26-5B27 illustrate an example of detecting an input (e.g., a press input by contact 535, FIG. 5B26) on the home button (e.g., button 204) and displaying user interface 524 of the Pages application (in FIG. 5B27). FIG. 5B27 is the same starting point as FIG. 5B5. The tactile output shown in FIG. 5B26 corresponds to a first range of values of the intensity-change metric (e.g., a "soft" intensity), as described below with respect to method 1500.

FIGS. 5B28-5B38 illustrate an alternative sequence to FIGS. 5B6-5B14 and FIGS. 5B17-5B25, starting from user interface 524 of the Pages application in FIG. 5B5. FIGS. 5B28-5B38 illustrate an example of detecting a double click (e.g., with a first press event, followed by a first release event, followed by a second press event, where the first and second press events are detected within a threshold amount of time of each other, such as double click time threshold $T_{DC}$) even further apart in time (as compared to FIGS. 5B5-5B14 and FIGS. 5B16-5B25), where the first press event occurs before a threshold amount of time, such as interrupt time threshold $T_I$, and the second press event occurs after the interrupt time threshold $T_I$. Since the second press event occurs after the interrupt time threshold $T_I$, the animated transition from user interface 524 (e.g., the Pages application) to user interface 522 (e.g., the Photography folder) is not interrupted before the animated transition to the multi-tasking user interface (e.g., user interface 529, FIG. 5B38).

FIGS. 5B28-5B34 illustrate an animated transition from user interface 524 (e.g., the Pages application) to user interface 522 (e.g., the Photography folder). In FIG. 5B28, when the intensity of contact 536-*a* increases to the light press intensity threshold $IT_L$ on the home button (e.g., a first down-click of button 204, or a first press event), device 100 provides a tactile output 579 (e.g., MiniTap 270 Hz with a gain of 1). In FIG. 5B30, when the intensity of contact 536-*c* decreases to the light press release intensity threshold $IT_{LR}$ (e.g., a first up-click of button 204, or a first release event), device 100 provides a different tactile output, such as tactile output 580 (e.g., MiniTap 270 Hz with a gain of 0.5). In FIG. 5B32, when the intensity of contact 536-*e* increases to the light press intensity threshold $IT_L$ on the home button for a second time within the double click time threshold $T_{DC}$ (e.g., a second down-click of button 204, or a second press event), device 100 provides another tactile output, such as tactile output 581 (e.g., MiniTap 270 Hz with a gain of 0.8). The tactile outputs shown in FIGS. 5B28, 5B30, and 5B32 correspond to a second range of values of the intensity-change metric (e.g., a "normal" intensity), as described below with respect to method 1500.

In FIG. 5B32, when the second press event is detected, the animated transition from user interface 524 (e.g., the Pages application) to user interface 522 (e.g., the Photography folder) is not interrupted since the second press event occurs after the interrupt time threshold $T_I$. FIGS. 5B33-5B34 illustrate a continuation of the animated transition from user interface 524 (e.g., the Pages application) to user interface 522 (e.g., the Photography folder) and FIG. 5B35 illustrates user interface 522. FIGS. 5B36-5B37 illustrate an animated transition from user interface 522 (e.g., the Photography folder) to user interface 529. FIG. 5B38 illustrates user interface 529 (e.g., a multi-tasking user interface) with the Photography folder (e.g., user interface 522) on top.

FIGS. 5B40-5B48 illustrate an alternative sequence to FIGS. 5B6-5B14, FIGS. 5B17-5B25, and FIGS. 5B28-5B38, starting from user interface 524 of the Pages application in FIG. 5B5. FIGS. 5B40-5B48 illustrate an example of detecting two single clicks, where the second press event occurs after the double click time threshold $T_{DC}$. Since the second press event occurs after the double click time threshold $T_{DC}$, the two press events are treated as two single clicks (as opposed to a double click).

FIGS. 5B40-5B46 illustrate an animated transition from user interface 524 (e.g., the Pages application) to user interface 522 (e.g., the Photography folder). In FIG. 5B40, when the intensity of contact 537-a increases to the light press intensity threshold $IT_L$ on the home button (e.g., a down-click of button 204, or a first press event), device 100 provides a tactile output 582 (e.g., MiniTap 270 Hz with a gain of 1). In FIG. 5B42, when the intensity of contact 537-c decreases to the light press release intensity threshold $IT_{LR}$ (e.g., an up-click of button 204, or a first release event), device 100 provides a different tactile output, such as tactile output 583 (e.g., MiniTap 270 Hz with a gain of 0.5). In FIG. 5B45, when the intensity of contact 538-a increases to the light press intensity threshold $IT_L$ on the home button after the double click time threshold $T_{DC}$ has elapsed (e.g., a down-click of button 204, or a second press event), device 100 provides a tactile output 584 (e.g., MiniTap 270 Hz with a gain of 1). In some embodiments, tactile output 584 (in FIG. 5B45) has the same characteristics (e.g., MiniTap 270 Hz with a gain of 1) as tactile output 582 (in FIG. 5B50) because they are both down-clicks of a single click input. The tactile outputs shown in FIGS. 5B40, 5B42, and 5B45 correspond to a second range of values of the intensity-change metric (e.g., a "normal" intensity), as described below with respect to method 1500.

In FIG. 5B45, when the second press event is detected, the animated transition from user interface 524 (e.g., the Pages application) to user interface 522 (e.g., the Photography folder) is not interrupted since the second press event is a separate single click. FIG. 5B46 illustrates a continuation of the animated transition from user interface 524 (e.g., the Pages application) to user interface 522 (e.g., the Photography folder) and FIG. 5B47 illustrates user interface 522. Although not shown, in some embodiments, device 100 displays an animated transition from user interface 522 (in FIG. 5B47) to user interface 520 (in FIG. 5B48).

FIG. 5B49 illustrates a comparison of the alternative sequences from user interface 524 (e.g., the Pages application), as explained above in detail. The top row of FIG. 5B49 illustrates the sequence of FIGS. 5B5-5B14, where there is a double click close in time and both the first and second press events occur before $T_I$. The second row of FIG. 5B49 illustrates the sequence of FIGS. 5B16-5B25, where there is a double click with the first press event and the second press event further apart in time, but both the first and second press events occur before $T_I$. The third row of FIG. 5B49 illustrates the sequence of FIGS. 5B27-5B38, where there is a double click with the first press event and the second press event even further apart in time, and the first press event occurs before $T_I$ and the second press event occurs after $T_I$. The fourth row of FIG. 5B49 illustrates the sequence of FIGS. 5B39-5B48, where there are two single clicks, with the first press event occurring before $T_I$ and the second press event occurring after $T_{DC}$.

FIGS. 5B50-5B59 illustrate yet another alternative sequence to FIGS. 5B5-5B15. In FIGS. 5B50-5B59, the animated transition from user interface 524 (e.g., the Pages application) to user interface 522 (e.g., the Photography folder) does not begin until after the first release event (e.g., in FIG. 5B53). Although not shown, in some embodiments, the sequences of FIGS. 5B16-5B25, FIGS. 5B27-5B38, and/or FIGS. 5B39-5B48 have alternative sequences where the animated transition from user interface 524 (e.g., the Pages application) to user interface 522 (e.g., the Photography folder) does not begin until after the first release event (e.g., in FIG. 5B19, FIG. 5B30, and FIG. 5B42, respectively).

FIGS. 5B60-5B61 illustrate an example of detecting an input (e.g., a press input by contact 540, FIG. 5B60) on the home button (e.g., button 204) and displaying user interface 524 of the Pages application (in FIG. 5B61). The tactile output shown in FIG. 5B60 corresponds to a first range of values of the intensity-change metric (e.g., a "soft" intensity), as described below with respect to method 1500.

FIGS. 5B62-5B65 illustrate a "soft" intensity down-click and a "soft" intensity up-click. In FIG. 5B63, when the intensity of contact 541-b increases to the light press intensity threshold $IT_L$ on the home button with a "soft" intensity (e.g., for an intensity-change metric value range up to a predefined number of units of intensity per second, such as 1250 grams per second), device 100 provides a tactile output 590 (e.g., MiniTap 270 Hz with a gain of 0.5). In FIG. 5B65, when the intensity of contact 541-d decreases to the light press release intensity threshold $IT_{LR}$ with a "soft" intensity (e.g., for an intensity-change metric value range up to a predefined number of units of intensity per second, such as 1250 grams per second), device 100 provides a tactile output 591 (e.g., MiniTap 270 Hz with a gain of 0.25). In some embodiments, the tactile outputs of "soft" up-click events are 50% of the tactile outputs of "soft" down-click events. In some embodiments, the audio outputs of "soft" up-click events are 50% of the audio outputs of "soft" down-click events.

FIGS. 5B66-5B69 illustrate a "normal" intensity down-click and a "normal" intensity up-click. In FIG. 5B66, when the intensity of contact 542-b increases to the light press intensity threshold $IT_L$ on the home button with a "normal" intensity (e.g., for an intensity-change metric value range greater than a predefined number of units of intensity per second, such as 1250 grams per second), device 100 provides a tactile output 592 (e.g., MiniTap 270 Hz with a gain of 1). In FIG. 5B69, when the intensity of contact 542-d decreases to the light press release intensity threshold $IT_{LR}$ with a "normal" intensity (e.g., for an intensity-change metric value range greater than a predefined number of units of intensity per second, such as 1250 grams per second), device 100 provides a tactile output 593 (e.g., MiniTap 270 Hz with a gain of 0.5). In some embodiments, the tactile outputs of "normal" up-click events are 50% of the tactile outputs of "normal" down-click events. In some embodiments, the audio outputs of "normal" up-click events are 50% of the audio outputs of "normal" down-click events.

FIGS. 5B70-5B75 illustrate using the home button (e.g., button 204) as a "back" button. FIGS. 5B71-5B72 illustrate an example of detecting an input (e.g., a press input by contact 543, FIG. 5B71) on the home button (e.g., button 204) while displaying user interface 522 (e.g., the Photography folder), and in response, displaying user interface 520 (e.g., a secondary page of a multi-page home screen with the Photography folder). FIGS. 5B73-5B74 illustrate an example of detecting an input (e.g., press input by contact 544, FIG. 5B73) on the home button (e.g., button 204) while displaying user interface 520 (e.g., the secondary page of a multi-page home screen), and in response, displaying user interface 510 (e.g., a primary page of a multi-page home screen). In some embodiments, as shown in FIG. 5B75, when an input (e.g., a press input by contact 545) is detected on the home button while displaying the primary page of a multi-page home screen (e.g., user interface 510), device 100 provides a tactile output 596 (e.g., MiniTap 270 Hz with a gain of 1), but does not change the displayed user interface.

FIGS. 5C1-5C19 illustrate exemplary user interfaces for a home button configuration process in accordance with some embodiments. FIGS. 5C1-5C19 illustrate an example of a home button configuration process during which a user selects and tries out a plurality of tactile output settings for a home button before selecting a tactile output setting for the home button on the device.

FIGS. 5C1-5C5 illustrate an example of selecting "Settings" then "General" then "Home Button." FIGS. 5C6-5C7 illustrate an example of an animated transition to user interface 564 (e.g., a home button configuration user interface with option 2 selected). In FIG. 5C8, option 2 is currently selected as the tactile output setting. In some embodiments, option 2 is selected as the default tactile output setting. In some embodiments, option 2 corresponds to a second tactile output pattern such as MiniTap 270 Hz. In FIG. 5C9, when the intensity of contact 553 increases to the light press intensity threshold $IT_L$ on the home button, device 100 provides a tactile output 561 (e.g., MiniTap 270 Hz) that corresponds to the selected tactile output setting (e.g., option 2).

FIGS. 5C10-5C11 illustrate an example of selecting option 3 (e.g., with a press input by contact 554 on option 3, FIG. 5C10) and displaying user interface 566 (e.g., a home button configuration user interface with option 3 selected). Although not shown, in some embodiments, an animated transition is displayed between user interface 564 (in FIG. 5C10) and user interface 566 (in FIG. 5C11) where option 2 moves back in place and where option 3 moves toward the home button (e.g., button 204).

In FIG. 5C11, option 3 is currently selected as the tactile output setting. In some embodiments, option 3 corresponds to a third tactile output pattern such as MiniTap 300 Hz. In FIG. 5C12, when the intensity of contact 555 increases to the light press intensity threshold $IT_L$ on the home button, device 100 provides a tactile output 565 (e.g., MiniTap 300 Hz) that corresponds to the selected tactile output setting (e.g., option 3).

FIGS. 5C13-5C14 illustrate an example of selecting option 1 (e.g., with a press input by contact 556 on option 1, FIG. 5C13) and displaying user interface 568 (e.g., a home button configuration user interface with option 1 selected). Although not shown, in some embodiments, an animated transition is displayed between user interface 566 (in FIG. 5C13) and user interface 568 (in FIG. 5C14) where option 3 moves back in place and where option 1 moves toward the home button (e.g., button 204).

In FIG. 5C14, option 1 is currently selected as the tactile output setting. In some embodiments, option 1 corresponds to a first tactile output pattern such as MiniTap 230 Hz. In FIG. 5C15, when the intensity of contact 557 increases to the light press intensity threshold $IT_L$ on the home button (e.g., button 204), device 100 provides a tactile output 567 (e.g., MiniTap 230 Hz) that corresponds to the selected tactile output setting (e.g., option 1).

FIGS. 5C16-5C17 illustrate an example of selecting "Done" (e.g., with a press input by contact 558 on the "Done" icon, FIG. 5C16) with option 1 selected and in response, displaying user interface 562 (e.g., the General Settings user interface, FIG. 5C17).

In FIG. 5C18, when the intensity of contact 559 increases to the light press intensity threshold $IT_L$ on the home button (e.g., button 204), device 100 provides a tactile output 569 (e.g., MiniTap 230 Hz) that corresponds to the selected tactile output setting (e.g., option 1). In response to the input on the home button (e.g., button 204), user interface 510 (e.g., the primary page of a multi-page home screen) is displayed (in FIG. 5C19). Note that FIGS. 5A1-5A18 and 5B1-5B75 were illustrated with the tactile output setting on option 2, so the tactile outputs in these figures corresponded to the selected tactile output setting of option 2 (e.g., MiniTap 270 Hz). If a user had selected option 1 for the tactile output setting (e.g., as shown in FIG. 5C16), the tactile outputs in FIGS. 5A1-5A18 and 5B1-5B75 would correspond to the selected tactile output setting of option 1 (e.g., MiniTap 230 Hz). Similarly, if the user had selected option 3 for the tactile output setting, the tactile outputs in FIGS. 5A1-5A18 and 5B1-5B75 would correspond to the selected tactile output setting of option 3 (e.g., MiniTap 300 Hz).

FIGS. 6A1-6B26 illustrate example user interfaces for controlling generation of user interface haptic feedback and generation of home button haptic feedback in accordance with some embodiments. The user interfaces in these figures are used to illustrate the processes described below, including the processes in FIGS. 13A-13D. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

In some embodiments, the device provides a tactile output control setting (e.g., Sounds and Haptics Setting) that allows the user to turn on and turn off user interface tactile output generation at the device.

In general, the device generates user interface tactile output of various types in response to direct interactions with a user interface element, e.g., selection, manipulation, drag/drop, and/or activation of the user interface element through a focus selector (e.g., a pointer or a contact) that is placed in proximity to the user interface element when a user input is detected. The user interface tactile outputs are generally accompanied by visual changes in the user interface. For example, in some embodiments, the device provides a tactile output (e.g., MicroTap (150 Hz)) in response to an input that picks up an item in a user interface (e.g., a long press input by a sustained contact at a location that corresponds to the item), and the user interface shows that the object is lifted up toward the surface of the display and the tactile output is timed to coincide with the end of the movement of the object. In addition to user interface tactile outputs, the device also generates tactile outputs in response to activation of a persistent button (e.g., a virtual home button or a non-mechanical home or back button) on the device. The activation of the button may or may not be accompanied with corresponding visual changes in the user interface. For example, in response to a press input on a home button, the device generates a tactile output and dismisses a currently displayed user interface and displays the home screen. In response to another press input on the home button, the device generates a tactile output for the button press, but continues to display the home screen (e.g., when the currently displayed home screen is the only home screen or the primary page of a multi-page home screen). Therefore, in some contexts, the device allows the user to turn off user interface tactile outputs, e.g., to conserve power or reduce distraction. However, the device also prevents the user from inadvertently turning off the tactile output generation for the persistent button when the user merely wishes to turn off the user interface tactile outputs.

In some embodiments, the device provides non-visual feedback that includes both an audio output component and a tactile output component. Certain types of audio outputs are paired with visual changes in the user interface or exist independent of any visual changes in the user interface. For example, audio alerts, ringtones, music clips, can be played independent of tactile outputs, and serve to alert the user of some changes in the user interface or in the state of the device. In some embodiments, the device generates certain audio outputs that are specifically tied to and enhance or supplement a tactile output. These types of audio outputs are referred to as "haptic audio outputs" herein. In some embodiments, a non-visual feedback profile includes a tactile output pattern for a tactile output and a haptic audio output pattern for a haptic audio output that accompanies the tactile output to invoke certain haptic sensations in a user. The interplay between the frequencies, amplitudes, waveforms, and/or timings of the haptic audio output and the corresponding tactile output creates a richer and more nuanced haptic sensation in the user, and makes the non-visual feedback more salient to the user. In some contexts, the device allows the user to control the generation of haptic audio output (e.g., the haptic audio outputs that correspond to user interface tactile outputs, and/or the haptic audio outputs that correspond to the device/system tactile outputs (e.g., home button tactile outputs)) using the general volume control and/or mute control, e.g., to conserve power and/or to reduce distraction. However, the device also prevents the user from inadvertently turning off the haptic audio for device/system tactile outputs (e.g., the audio that accompanies the tactile outputs for activation of the persistent button).

FIGS. 6A1-6A26 illustrate generation of tactile outputs when the user interface tactile outputs are turned on at the device. FIGS. 6A1-6A26 illustrate that, when the user interface tactile outputs are turned on at the device, the device generates both user interface tactile outputs and system tactile outputs (e.g., tactile outputs for activation of hardware or persistent buttons on the device). FIGS. 6B1-6B26 illustrate that, when the user interface tactile outputs are turned off at the device, the device generates system tactile outputs (e.g., tactile outputs for activation of hardware or persistent buttons on the device), but forgoes generation of at least some of the user interface tactile outputs.

As shown in FIG. 6A1, a control user interface (e.g., sounds and haptics control user interface 680) includes a number of toggle settings for controlling sounds and haptic outputs at the device. For example, vibrate on ring setting 670 is set to "OFF" via toggle control 671; vibrate on silent setting 672 is set to "OFF" via toggle control 673; and user interface tactile output setting 674 is set to "ON" via toggle control 675. Sounds and haptics control interface 680 further includes volume control 676 for setting a current volume for ringer and alert audio outputs (e.g., by moving volume indicator 677 along volume control 676). In addition, change with buttons setting 678 is set to "OFF" via toggle control 679.

While user interface haptic outputs are turned on via toggle control 675 at device 100, user interface tactile outputs as well as system tactile outputs are generated. In FIG. 6A2-6A4, an input by a contact (e.g., contact 604) is detected on touch screen 112 at a location that corresponds to an application launch icon (e.g., icon 606 for launching the Mail application) on a home screen user interface (e.g., home screen 602). As shown in FIGS. 6A3-6A4, when a characteristic intensity of contact 604 increases above a light press intensity threshold $IT_L$ (as indicated by intensity meter 610 in FIG. 6A4), home screen 602 (except for icon 606) is blurred and a menu (e.g., quick action menu 608) is presented over the blurred home screen 602 (as shown in FIG. 6A4). In addition, as shown in FIG. 6A4, in response to detecting the increase in the characteristic intensity of contact 604 above the light press intensity threshold $IT_L$, device 100 generates tactile output 612 (e.g., MicroTap (200 Hz), Gain: 1.0) in conjunction with presenting quick action menu 608.

FIGS. 6A5-6A8 illustrate that, while contact 604 is maintained on touch screen 112, the device detects movement of contact 604 from a location that corresponds to application launch icon 606 to respective locations that correspond menu options 614, 616, 618, and 620. As contact 604 moves to the location that corresponds to each of menu options 614, 616, 618, and 620, device 100 generates a respective tactile output (e.g., tactile outputs 622, 624, 628, and 630) (e.g., MicroTap (270 Hz), Gain: 0.4, minimum interval: 0.05 s) to indicate that contact 604 has move to a different menu option.

FIGS. 6A8-6A9 illustrate that, lift-off of contact 604 is detected when contact 604 is over menu option 620. In response to detecting lift-off of contact 604, device 100 launches the Mail application and displays a user interface of the Mail application (e.g., email listing user interface 622) that corresponds to menu option 620, as shown in FIG. 6A10.

In FIGS. 6A11-6A13, an input by another contact (e.g., contact 624) is detected on touch screen 112 at a location that corresponds to an email item (e.g., item 626) in a listing of email items. As shown in FIGS. 6A11-6A13, when a characteristic intensity of contact 624 increases above the light press intensity threshold $IT_L$ (as indicated by intensity meter 610 in FIG. 6A13), email listing user interface 622 (except for item 626) is blurred and a preview of item 626 (e.g., preview 628) is presented over the blurred email listing user interface 622 (as shown in FIG. 6A13). In addition, as shown in FIG. 6A13, in response to detecting the increase in the characteristic intensity of contact 624 above the light press intensity threshold $IT_L$, device 100 generates tactile output 630 (e.g., MicroTap (200 Hz), Gain: 1.0) in conjunction with presenting preview 628.

FIGS. 6A13-6A16 illustrate that, while contact 624 is maintained on touch screen 112, the device detects leftward movement of contact 624 from its touch-down location. The leftward movement of contact 624 drags preview 628 toward the left side of touch screen 112. While preview 628 is dragged toward the left side of touch screen 112, hidden menu option 632 (e.g., "Archive") is gradually revealed from behind preview 628. In FIG. 6A16, as contact 624 moves across a threshold position (e.g., a hidden threshold position to the left of the center line of touch screen 112) in the user interface for triggering an operation associated with hidden menu option 632 (e.g., archiving the email item and removing it from the email listing), device 100 changes the color of menu option 632 to indicate that the threshold for triggering the archive operation is met by the movement of preview 628. In addition, device 100 generates tactile output 634 (e.g., MicroTap (270 Hz), Gain: 1.0) in conjunction with the visual changes in the user interface to indicate that the threshold for triggering the archive operation is met by the movement of preview 628.

FIGS. 6A17-6A19 illustrate that, lift-off of contact 624 is detected after contact 624 has crossed (or has dragged preview 628 past) the threshold position for triggering the archive operation. In response to detecting lift-off of contact 624, device 100 performs the archive operation on the email that correspond to item 626, and item 626 is removed from the listing of email items, as shown in FIG. 6A19.

Figure 20:
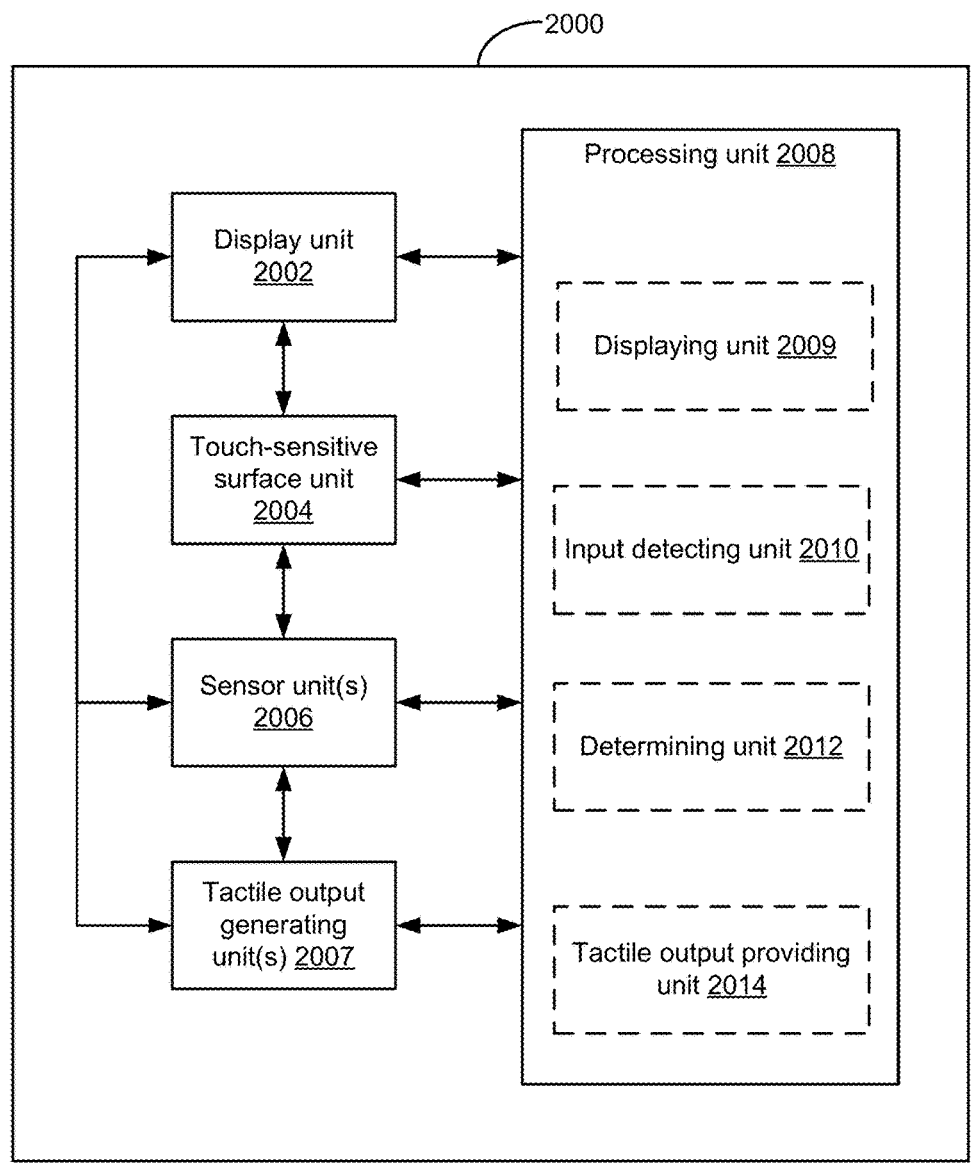
FIG. 20 is a functional block diagram of an electronic device in accordance with some embodiments.

In FIGS. 6A20-6A22, an input by another contact (e.g., contact 636) is detected on touch screen 112 at a location that corresponds to another email item (e.g., item 638) in the listing of email items. As shown in FIGS. 6A20-6A22, when a characteristic intensity of contact 636 increases above the light press intensity threshold $IT_L$ (as indicated by intensity meter 610 in FIG. 6A22), email listing user interface 622 (except for item 638) is blurred and a preview of item 638 (e.g., preview 640) is presented over the blurred email listing user interface 622 (as shown in FIG. 6A22). In addition, as shown in FIG. 6A22, in response to detecting the increase in the characteristic intensity of contact 636 above the light press intensity threshold $IT_L$, device 100 generates tactile output 642 (e.g., MicroTap (200 Hz), Gain: 1.0) in conjunction with presenting preview 640.

FIG. 6A23 illustrates that, while contact 636 is maintained on touch screen 112 (e.g., over preview 640), the device detects an increase in the characteristic intensity of contact 636 above a deep press intensity threshold $IT_D$. In response to detecting the increase in the characteristic intensity of contact 636 above the deep press intensity threshold, device 100 ceases to display preview 640 and displays content display user interface 644 (e.g., a user interface that displays the content of email item 638) in placed of the blurred email listing user interface. In addition, device 100 generates tactile output 646 (e.g., FullTap (150 Hz), Gain: 1.0) in conjunction with the display of user interface 644.

In FIG. 6A24, lift-off of contact 636 is detected, and user interface 644 is maintained after lift-off of contact 636 is detected.

FIG. 6A25 illustrates that, while user interface 644 is displayed on touch screen 112, a press input by a contact (e.g., contact 646) is detected on a home button (e.g., home button 650) on device 100. In response to detecting the press input (e.g., an increase in the characteristic intensity of contact 646 above the light press intensity threshold $IT_L$), device 100 generates tactile output 648 (e.g., MiniTap (230 Hz), Gain: 1.0) to indicate that home button 650 is activated by the press input. FIG. 6A26 illustrates that, in response to activation of home button 650 by the press input, user interface 644 is dismissed, and home screen 602 is displayed in placed of user interface 644 on touch screen 112.

FIGS. 6B1-6B26 illustrate generation of tactile outputs when the user interface tactile outputs are turned off at the device. In particular, FIGS. 6B1-6B26 illustrate that, when the user interface tactile outputs are turned off at the device, the device continues to generate system tactile outputs (e.g., tactile outputs for activation of hardware or persistent buttons on the device), but forgoes generation of user interface tactile outputs, except when generation of a particular user interface tactile output is exempt from control by the user tactile output setting.

As shown in FIG. 6B1, user interface tactile output setting 674 is set to "OFF" via toggle control 675 in sounds and haptics control interface 680.

While user interface haptic outputs are turned off via toggle control 675 at device 100, at least some user interface tactile outputs are no longer generated. In FIG. 6B2-6B4, an input by a contact (e.g., contact 605) is detected on touch screen 112 at a location that corresponds to icon 606 for launching the Mail application on home screen 602. As shown in FIGS. 6B3-6B4, when a characteristic intensity of contact 605 increases above the light press intensity threshold $IT_L$ (as indicated by intensity meter 610 in FIG. 6B4), home screen 602 (except for icon 606) is blurred and quick action menu 608 is presented over the blurred home screen 602 (as shown in FIG. 6B4). In addition, as shown in FIG. 6B4, in response to detecting the increase in the characteristic intensity of contact 605 above the light press intensity threshold $IT_L$, device 100 generates tactile output 613 (e.g., MicroTap (200 Hz), Gain: 1.0) in conjunction with presenting quick action menu 608. In this example, even though tactile output 613 is a user interface tactile output, tactile output for presenting a quick action menu in response to a press input is exempted from the control of the user interface tactile output setting. In other words, a tactile output (e.g., MicroTap (200 Hz), Gain: 1.0) that accompanies the presentation of a quick action menu in response to a press input on an application launch icon is always generated regardless of the current tactile output setting for user interface tactile outputs, in accordance with some embodiments.

FIGS. 6B5-6B8 illustrate that, while contact 605 is maintained on touch screen 112, the device detects movement of contact 605 from a location that corresponds to application launch icon 606 to respective locations that correspond menu options 614, 616, 618, and 620. As contact 605 moves to the location that corresponds to each of menu options 614, 616, 618, and 620, device 100 highlights that menu option to indicate that contact 605 has moved to a different menu option, but does not generates any tactile output to accompany the visual changes that are occurring in the user interface (e.g., in contrast to the scenarios shown in FIGS. 6A5-6A8 where tactile outputs 622, 624, 628, and 630 were generated to indicate that contact 604 has move to a different menu option). In other words, in some embodiments, device 100 forgoes generation of tactile outputs for some portions of an input (e.g., the movement across individual menu options by contact 605) when user interface tactile outputs are turned off, while continues to generate tactile outputs for other portions of the input (e.g., the increase in intensity of contact 605 above the light press intensity threshold to cause display of quick action menu 608) regardless of whether the user interface tactile outputs are turned on or turned off.

FIGS. 6B8-6B9 illustrate that, lift-off of contact 605 is detected when contact 605 is over menu option 620. In response to detecting lift-off of contact 605, device 100 launches the Mail application and displays email listing user interface 622 that corresponds to menu option 620, as shown in FIG. 6B10.

In FIGS. 6B11-6B13, an input by another contact (e.g., contact 625) is detected on touch screen 112 at a location that corresponds to item 626 in a listing of email items. As shown in FIGS. 6B11-6B13, when a characteristic intensity of contact 625 increases above the light press intensity threshold $IT_L$ (as indicated by intensity meter 610 in FIG. 6B13), email listing user interface 622 (except for item 626) is blurred and preview 628 is presented over the blurred email listing user interface 622 (as shown in FIG. 6B13). In addition, as shown in FIG. 6B13, in response to detecting the increase in the characteristic intensity of contact 625 above the light press intensity threshold $IT_L$, device 100 generates tactile output 631 (e.g., MicroTap (200 Hz), Gain: 1.0) in conjunction with presenting preview 628. In other words, a tactile output (e.g., MicroTap (200 Hz), Gain: 1.0) that accompanies the presentation of a preview in response to a press input on an item is always generated regardless of the current tactile output setting for user interface tactile outputs, in accordance with some embodiments.

FIGS. 6B13-6B16 illustrate that, while contact 625 is maintained on touch screen 112, the device detects leftward movement of contact 625 from its touch-down location. The leftward movement of contact 625 drags preview 628 toward the left side of touch screen 112. While preview 628 is dragged toward the left side of touch screen 112, hidden menu option 632 (e.g., "Archive") is gradually revealed from behind preview 628. In FIG. 6B16, as contact 625 moves across a threshold position (e.g., a hidden threshold position to the left of the center line of touch screen 112) in the user interface for triggering an operation associated with hidden menu option 632 (e.g., archiving the email item and removing it from the email listing), device 100 changes the color of menu option 632 to indicate that the threshold for triggering the archive operation is met by the movement of preview 628. However, in contrast to the scenario shown in FIG. 6A16, device 100 does not generate any tactile output in conjunction with the visual changes in the user interface. In other words, device 100 has forgone generation of the user interface tactile output in accordance with the current tactile output setting which is in the "OFF" state.

FIGS. 6B17-6B19 illustrate that, lift-off of contact 625 is detected after contact 625 has crossed (or has dragged preview 628 past) the threshold position for triggering the archive operation. In response to detecting lift-off of contact 625, device 100 performs the archive operation on the email that correspond to item 626, and item 626 is removed from the listing of email items, as shown in FIG. 6B19.

In FIGS. 6B20-6B22, an input by another contact (e.g., contact 637) is detected on touch screen 112 at a location that corresponds to item 638 in the listing of email items. As shown in FIGS. 6B20-6B22, when a characteristic intensity of contact 637 increases above the light press intensity threshold $IT_L$ (as indicated by intensity meter 610 in FIG. 6B22), email listing user interface 622 (except for item 638) is blurred and preview 640 is presented over the blurred email listing user interface 622 (as shown in FIG. 6B22). In addition, as shown in FIG. 6B22, in response to detecting the increase in the characteristic intensity of contact 637 above the light press intensity threshold $IT_L$, device 100 generates tactile output 643 (e.g., MicroTap (200 Hz), Gain: 1.0) in conjunction with presenting preview 640, because tactile output 643 is exempted from control by the current tactile output setting for turning off user interface tactile outputs.

FIG. 6B23 illustrates that, while contact 637 is maintained on touch screen 112 (e.g., over preview 640), the device detects an increase in the characteristic intensity of contact 637 above the deep press intensity threshold $IT_D$. In response to detecting the increase in the characteristic intensity of contact 637 above the deep press intensity threshold, device 100 ceases to display preview 640 and displays content display user interface 644 in placed of the blurred email listing user interface. In addition, device 100 generates tactile output 647 (e.g., FullTap (150 Hz), Gain: 1.0) in conjunction with the display of user interface 644, because tactile output 647 is exempted from control by the current tactile output setting for turning off user interface tactile outputs.

In FIG. 6B24, lift-off of contact 637 is detected, and user interface 644 is maintained after lift-off of contact 637 is detected.

FIG. 6B25 illustrates that, while user interface 644 is displayed on touch screen 112, a press input by a contact (e.g., contact 647) is detected on home button 650 on device 100. In response to detecting the press input (e.g., an increase in the characteristic intensity of contact 647 above the light press intensity threshold $IT_L$), device 100 generates tactile output 649 (e.g., MiniTap (230 Hz), Gain: 1.0) to indicate that home button 650 is activated by the press input. FIG. 6B26 illustrates that, in response to activation of home button 650 by the press input, user interface 644 is dismissed, and home screen 602 is displayed in placed of user interface 644 on touch screen 112.

Although not shown in FIGS. 6A1-6B26, haptic audio outputs may accompany some or all of the tactile outputs that are generated in the above example, depending on the particular prioritization of different considerations in various usage contexts and device power saving configurations. For example, in some embodiments, haptic audio outputs are controlled by the general device audio volume control and/or mute control.

In some embodiments, haptic audio outputs are always generated when tactile outputs are generated, irrespective of whether the device is muted.

In some embodiments, haptic audio outputs are always generated when system tactile outputs are generated, irrespective of whether the device is muted.

In some embodiments, haptic audio outputs are always generated when user interface tactile outputs are generated, irrespective of whether the device is muted.

In some embodiments, when tactile outputs are generated, haptic audio outputs are muted when the device is muted, and haptic audio outputs are generated when the device is not muted.

In some embodiments, when system tactile outputs are generated, haptic audio outputs that accompany system tactile outputs are muted when the device is muted, and haptic audio outputs that accompany system tactile outputs are generated when the device is not muted.

In some embodiments, when user interface tactile outputs are generated, haptic audio outputs that accompany the user interface tactile outputs are muted when the device is muted, and haptic audio outputs that accompany the user interface tactile outputs are generated when the device is not muted.

In some embodiments, when the device generates haptic audio with tactile outputs, the device generates haptic audio outputs in accordance with characteristics of the tactile outputs that are also generated. For example, the amplitude of the audio output is increased when the amplitude of the corresponding tactile output is increased. For example, the frequency of the audio output is increased when the frequency of the corresponding tactile output is increased. In some embodiments, the amount of change for a property (e.g., amplitude or frequency) in the audio output is greater than the amount of change for the property in the corresponding tactile output.

In some embodiments, when the device generates haptic audio with tactile outputs (e.g., user interface tactile outputs that are controlled by user interface tactile output setting), the device generates haptic audio outputs with amplitudes that are adjusted based on a volume setting of the device. In some embodiments, when the device generates haptic audio with tactile outputs (e.g., user interface tactile outputs that are exempt from being controlled by user interface tactile output setting), the device generates haptic audio outputs with amplitudes that are not adjusted based on a volume setting of the device.

In some embodiments, the device continues to generate haptic audio outputs when user interface tactile outputs are turned off, irrespective of the mute/unmute setting of the device. For example, for tactile outputs that are not exempted from control by the user interface tactile output setting, when the tactile outputs are not generated, the device may generate audio outputs in place of the tactile outputs to provide non-visual feedback to the user.

In some embodiments, the device only turns off haptic audio outputs (e.g., haptic audio outputs for user interface tactile outputs) in accordance with a mute setting of the device, if user interface tactile outputs are turned on.

Other variations of the haptic output control and tactile output control are possible, and are not exhaustively listed herein.

FIGS. 7A-7G are flow diagrams illustrating a method 700 of providing visual feedback regarding activation of a user input device (e.g., a virtual or physical home button) in accordance with some embodiments. The method 700 is performed at an electronic device (e.g., device 300, FIG. 3, or portable multifunction device 100, FIG. 1A) with a display, a touch-sensitive surface, one or more sensors to detect intensities of contacts with the touch-sensitive surface and/or a respective button of the device (e.g., a virtual or physical home button), and one or more tactile output generators for generating tactile outputs. In some embodiments, the display is a touch-screen display and the touch-sensitive surface is on or integrated with the display. In some embodiments, the display is separate from the touch-sensitive surface. In some embodiments, the method 700 is governed by instructions that are stored in a computer-readable storage medium (e.g., a non-transitory computer readable storage medium) and that are executed by one or more processors of the electronic device, such as the one or more processors 122 of device 100 (FIG. 1A). For ease of explanation, the following describes method 700 as performed by the device 100. Some operations in method 700 are, optionally, combined and/or the order of some operations is, optionally, changed.

Method 700 relates to displaying a beginning of visual feedback regarding activation of a user input device (e.g., a virtual or physical home button) in response to detecting a precursor input (e.g., a light touch) that is consistent with an input (e.g., a press input) that activates the user input device. In some embodiments, a user interface change that corresponds to the activation of the user input device is presented as a continuation of the visual feedback that is already presented, when the input that activates the user input device is detected. If the input for activating the user input device is not detected before the termination of the precursor input, the visual feedback ceases to be displayed and the original state of the user interface is restored. Displaying the beginning of the visual feedback regarding activation of the user input device before the actual activation of the user input device provides information to the user regarding the effect of the input (e.g., activation of the home button to go back to a home screen), and allows the user an opportunity to make a decision regarding whether to proceed with completing the input based on the information. Thus, the visual feedback enhances the operability of the device by helping the user to provide proper inputs and reducing user mistakes when operating/interacting with the device, and additionally, reduces power usage and improves battery life of the device by enabling the user to use the device more quickly and efficiently.

In some embodiments, the home button of the device is a physical home button or a virtual home button (e.g., button 204, FIG. 5A1). In some embodiments, the device includes one or more sensors to detect intensities of contacts with the touch-sensitive surface. In some embodiments, the display is a touch-sensitive display. In some embodiments, the device includes one or more tactile output generators for generating tactile outputs. In some embodiments, the home button is available on the device (e.g., persistently displayed at a respective location or located at a persistent location on the device that is separate from the display) in a plurality of different contexts to dismiss a currently displayed user interface in response to detecting an input of a first type (e.g., a press input or a press and release input that is detected via the depression of a mechanical switch or by comparing an intensity of a contact on the home button to activation criteria that are based on one or more intensity thresholds as described in greater detail with reference to methods 900, 1300, 1500, and 1700) on the home button (e.g., and, optionally, to redisplay a previously displayed user interface such as a previous view of an application or a system user interface such as a home screen of the device, a multitasking user interface, or a virtual assistant user interface). Other aspects of configuring the haptics for home button activation are described in greater detail with reference to methods 1100 and 1900.

In some embodiments, the home button responds to multiple types of inputs, including: an input of the first type (e.g., a single click (e.g., with one press event, or one press event followed by one release event)), an input of a second type (e.g., a double click (e.g., with a first press event, followed by a first release event, followed by a second press event, or with a first press event, followed by a first release event, followed by a second press event, followed by a second release event, wherein the first and second press events are detected within a threshold amount of time of each other)), an input of a third type (e.g., a long press (e.g., with a first press event that does not lift-off until more than a threshold amount of time has elapsed)), and an input of a fourth type (e.g., a deep press (e.g., with a first press event that includes an increase in intensity of a contact above a deep press intensity threshold within a threshold amount of time after initial touch-down of the contact)). In some embodiments, each type of input is associated with dismissing a currently displayed user interface, and performing a corresponding operation, and, optionally, displaying a corresponding user interface associated with the operation.

In accordance with method 700 and with reference to FIG. 7A, the device (e.g., device 100, FIG. 5A1) displays (702), on the display, a first user interface (e.g., a home screen or a primary page of a multi-page home screen, such as user interface 510 in FIG. 5A1). While displaying the first user interface (e.g., user interface 510, FIG. 5A1), the device detects (704) an input directed to the first user interface (e.g., a tap gesture by contact 502 on the Clock icon, FIG. 5A2). For example, the input directed to the first user interface is a touch input on the touch-sensitive surface at a location that corresponds to an activatable object in the first user interface or the entire user interface (and not on the home button). As another example, the input directed to the first user interface is a touch input directed to an application launch icon, a folder icon, a notification, a menu option, a control affordance (e.g., to display a control user interface), or the user interface as a whole (e.g., a swipe input on the home screen or the primary page of a multi-page home screen).

In response to detecting the input directed to the first user interface (706), the device ceases to display the first user interface (e.g., user interface 510, FIG. 5A2), and displays a second user interface (e.g., user interface 512 of the Clock application, FIG. 5A3) (e.g., a user interface of a first application, an expanded folder overlaid on a darkened home screen, an expanded notification overlaid on a darkened home screen, a control panel overlaid on a darkened home screen, a multitasking user interface that concurrently presents respective representations of multiple user interfaces, a secondary page of a multi-page home screen, a notification screen, a widget screen, etc.), distinct from the first user interface.

While displaying the second user interface, the device detects (708) a contact on the home button (e.g., contact 504-a, as shown in FIG. 5A4). While continuously detecting the contact on the home button, the device performs at least three operations (710). First, the device detects an increase in a characteristic intensity of the contact above a first intensity threshold (e.g., a hint intensity threshold $IT_H$) (e.g., as shown in FIG. 5A5). Second, in response to detecting the increase in the characteristic intensity of the contact to the first intensity threshold, the device displays a beginning of a transition from the second user interface back to the first user interface (e.g., as shown in FIGS. 5A5-5A6 and FIGS. 5A9-5A10). Third, while displaying the beginning of the transition from the second user interface back to the first user interface, the device detects an input sequence that includes detecting a press input (e.g., input sequence 504-a through 504-d by contact 504, FIGS. 5A4-5A7, or input sequence 508-a through 508-e by contact 508, FIGS. 5A9-5A13) that includes an increase in the characteristic intensity of the contact above the first intensity threshold (e.g., a hint intensity threshold $IT_H$) (e.g., the intensity of the contact continues to increase after reaching the first intensity threshold, and after the beginning of the transition from the second user interface back to the first user interface is displayed).

Turning now to FIG. 7B, in response to detecting the input sequence (712), the device determines whether the input sequence meets first criteria and/or determines whether the input sequence meets second criteria. In accordance with a determination that the input sequence meets the first criteria, the first criteria requiring that the characteristic intensity of the contact increases above a second intensity threshold (e.g., as shown in FIG. 5A11) (e.g., the second intensity threshold is the light press intensity threshold $IT_L$, and the second intensity threshold is higher than the first intensity threshold) before an end of the press input is detected (e.g., detecting an end of the press input includes detecting a release input such as a liftoff of the contact from the touch-sensitive surface or a decrease in the characteristic intensity of the contact below a release intensity threshold (e.g., as shown in FIG. 5A13) (e.g., the release intensity threshold may be preconfigured to be above, below, or the same as the light press intensity threshold, or is dynamically determined based on an input metric of the press input (e.g., rate of increase in the intensity of the contact))), the device: ceases to display the second user interface, and redisplays the first user interface on the display (e.g., at the end of the transition from the second user interface back to the first user interface, the first user interface is redisplayed and the second user interface is no longer displayed). For example, in FIGS. 5A8-5A14, the input sequence meets the first criteria and device 100 ceases to display user interface 512 (in FIG. 5A8) and redisplays user interface 510 (in FIG. 5A14) at the end of the transition (e.g., user interfaces 513-1 through 513-5, FIGS. 5A9-5A13) from user interface 510 back to user interface 510.

In accordance with a determination that the input sequence meets second criteria, the second criteria requiring that the characteristic intensity of the contact remains below the second intensity threshold before the end of the press input is detected, the device: reverses the beginning of the transition from the second user interface back to the first user interface, and redisplays the second user interface on the display. For example, in FIGS. 5A4-5A8, the input sequence meets the second criteria and device 100 reverses the beginning of the transition (e.g., from user interface 513-2 to user interface 513-1, FIGS. 5A6-5A7) and redisplays the second user interface on the display (e.g., user interface 512, FIG. 5A8).

In some embodiments, ceasing to display the second user interface and redisplaying the first user interface includes (714) displaying a continuation of the beginning of the transition from the second user interface back to the first user interface (e.g., as shown in FIGS. 5A9-5A13). In some embodiments, by displaying a continuation of the visual feedback that is displayed in response to the precursor input, the complete transition from the second user interface back to the first user interface is performed seamlessly according to the expectation of the user, without distracting the user with unexpected visual changes and makes the user interface more efficient (e.g., by helping the user to provide proper inputs and reducing user mistakes when operating/interacting with the device) which, additionally, reduces power usage and improves battery life of the device by enabling the user to use the device more quickly and efficiently. In addition, the transition from the second user interface to the first user interface is not unnecessarily delayed due to presentation of the visual feedback in response to the precursor input.

In some embodiments, displaying the beginning of the transition from the second user interface back to the first user interface includes (716) concurrently displaying at least a portion of the second user interface with at least a portion of the first user interface. For example, in FIG. 5A9, user interface 513-1 includes a portion of user interface 512 and a portion of user interface 510. In some embodiments, as the transition advances, more of user interface 510 is displayed and less of user interface 512 is displayed (e.g., as shown in FIGS. 5A10-5A13).

In some embodiments, the first user interface is a home screen (e.g., user interface 510, FIG. 5A1) that includes a plurality of application launch icons that correspond to different applications on the electronic device (718).

Turning now to FIG. 7C, in some embodiments, the first user interface and the second user interface are consecutively displayed user interfaces of an application (720). For example, the home button serves as a back button in some contexts.

In some embodiments, displaying the beginning of the transition from the second user interface back to the first user interface includes (722) reducing a size of the second user interface (e.g., in accordance with increasing intensity of the contact). For example, as shown in FIGS. 5A5-5A6, as the characteristic intensity of contact 504 increases, a displayed size of second user interface 512 is reduced. In some embodiments, the device reveals (724) the first user interface from behind the second user interface, as the second user interface is reduced in size (e.g., with increasing intensity of the contact). For example, the second user interface is displayed in full screen size before the contact reaches the first intensity threshold (e.g., as shown in FIG. 5A4), and with increasing intensity of the contact above the first intensity threshold, the second user interface shrinks to reveal the home screen in the background (e.g., as shown in FIGS. 5A5-5A6).

In some embodiments, the second user interface is a user interface of a first application (e.g., user interface 512 of the Clock application, FIG. 5A8), the first application corresponds to a first application launch icon in the first user interface (e.g., the Clock icon on user interface 510, FIG. 5A14), and reducing the size of the second user interface includes shrinking the second user interface toward a position of the first application launch icon on the first user interface (726) (e.g., as shown in FIGS. 5A9-5A13).

In some embodiments, the second user interface includes an expanded folder (e.g., overlaid on a blurred and expanded version of the first user interface) (e.g., user interface 522, FIG. 5B70), the expanded folder corresponds to a first folder icon in the first user interface (e.g., the Photography folder icon in user interface 520, FIG. 5B72), and reducing the size of the second user interface includes shrinking the expanded folder toward a position of the first folder icon on the first user interface (and, optionally, shrinking and clarifying the expanded version of the first user interface at the same time) (728).

In some embodiments, displaying the beginning of the transition from the second user interface back to the first user interface includes (730) shifting the second user interface laterally in a first direction (e.g., in accordance with increasing intensity of the contact). For example, the secondary page of the home screen (e.g., user interface 520, FIG. 5B72) shifts leftward or rightward to make room for the primary page of the home screen (e.g., user interface 510, FIG. 5B74). In some embodiments, the device reveals (732) the first user interface, as the second user interface is shifted laterally in the first direction (e.g., the home screen is revealed from behind the second user interface, or the home screen slides in next to the moving second user interface).

Turning now to FIG. 7D, in some embodiments, displaying the beginning of the transition from the second user interface back to the first user interface includes (734) fading (or decreasing the opacity of) the second user interface (e.g., in accordance with increasing intensity of the contact). For example, a widget screen next to the home screen fades away, as the primary page of the home screen slides in from the side. In some embodiments, the device shifts (736) the first user interface laterally in a first direction to cover the second user interface (e.g., sliding the home screen in), as the second user interface fades out.

In some embodiments, displaying the beginning of the transition from the second user interface back to the first user interface includes (738) changing a virtual depth of at least one of the first user interface and the second user interface (e.g., in accordance with increasing intensity of the contact). For example, starting from a stacked state with the second user interface closer to the surface of the display, the second user interface shifts left and then right while receding away from the surface of the display with increasing contact intensity, while the first user interface shifts right and then left while coming toward the surface of the display.

In some embodiments, the second user interface (e.g., a multi-tasking user interface 528, FIG. 5B15) includes a representation of the first user interface (e.g., a Pages application user interface 524, FIG. 5B16), and displaying the beginning of the transition from the second user interface back to the first user interface includes expanding the representation of the first user interface included in the second user interface and reducing a virtual depth of the representation of the first user interface (742). In FIGS. 5B15-5B16, the representation of the Pages application pops out from the multi-tasking user interface 528 in response to the press input by contact 533 on the home button. As another example, if the second user interface (e.g., a multi-tasking user interface) included a representation of the home screen in the top position, the representation of the home screen would pop out from the multi-tasking user interface.

Turning now to FIG. 7E, in some embodiments, detecting the input sequence further includes (744) detecting that the characteristic intensity of the contact varies between the first intensity threshold and the second intensity threshold (e.g., greater than the first intensity threshold) before the first criteria are met by the input sequence (e.g., before a home button action (e.g., dismissing a current user interface and restoring the home screen) is activated by an input of the first type (e.g., a single click)). In some embodiments, the device, in response to detecting that the characteristic intensity of the contact varies between the first intensity threshold and the second intensity threshold before the first criteria are met by the input sequence, dynamically advances and reverses the transition from the second user interface to the first user interface in accordance with the characteristic intensity of the contact (e.g., as shown in FIGS. 5A9-5A10). In some embodiments, dynamically advancing and reversing the transition from the second user interface to the first user interface in accordance with the characteristic intensity of the contact educates the user regarding how to complete the input (e.g., by pressing harder) versus how to cancel the input (e.g., by lifting off without pressing harder). In addition, the user is allowed more time to consider whether or not to complete the input, which enhances the operability of the device and makes the user interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, dynamically advancing and reversing the transition from the second user interface to the first user interface in accordance with the characteristic intensity of the contact includes (746) dynamically changing a blur radius applied to the first user interface in accordance with the characteristic intensity of the contact.

In some embodiments, dynamically advancing and reversing the transition from the second user interface to the first user interface in accordance with the characteristic intensity of the contact includes (748) dynamically revealing at least a portion of the first user interface in accordance with the characteristic intensity of the contact. (e.g., progressively revealing more of the first user interface as the characteristic intensity of the contact increases and progressively hiding more of the first user interface as the characteristic intensity of the contact decreases) (e.g., as shown in FIGS. 5A5-5A7).

In some embodiments, dynamically advancing and reversing the transition from the second user interface to the first user interface in accordance with the characteristic intensity of the contact includes (750): dynamically shifting a position of the second user interface on the display (e.g., laterally in a first direction (e.g., horizontally)) in accordance with the characteristic intensity of the contact, and a corresponding amount of the first user interface is revealed as the position of the second user interface is dynamically shifted (e.g., shifted back and forth laterally in the first direction) in accordance with the characteristic intensity of the contact. For example, the second user interface is progressively shifted in a first direction to reveal a portion of the first user interface as the characteristic intensity of the contact increases and the second user interface is progressively shifted in a second direction that is opposite to the first direction to hide the portion of the first user interface as the characteristic intensity of the contact decreases (e.g., as shown in FIGS. 5A5-5A7).

With reference to FIG. 7F, in some embodiments, dynamically advancing and reversing the transition from the second user interface to the first user interface in accordance with the characteristic intensity of the contact includes (752): dynamically changing an opacity of the second user interface in accordance with the characteristic intensity of the contact. For example, the opacity used to render the second user interface is progressively decreased to reveal the first user interface as the characteristic intensity of the contact increases and the opacity used to render the second user interface is progressively increased to obscure the first user interface as the characteristic intensity of the contact decreases.

In some embodiments, the second user interface is an expanded version of a portion of the first user interface (e.g., the expanded folder UI looks like a portion of an expanded version of the home screen). In some embodiments, dynamically advancing and reversing the transition from the second user interface to the first user interface in accordance with the characteristic intensity of the contact includes: dynamically changing a size of the second user interface in accordance with the characteristic intensity of the contact (754). For example, as intensity of the contact increases, the expanded folder UI shrinks, pulling part of the first user interface surrounding the folder into the viewable area of the display, and with decreasing intensity of the contact, the shrunken folder re-expands, pushing out the part of the first user interface surrounding the folder out of the viewable area of the display.

In some embodiments, the second user interface includes a representation of the first user interface. In some embodiments, dynamically advancing and reversing the transition from the second user interface to the first user interface in accordance with the characteristic intensity of the contact includes (756) dynamically changing a virtual depth of the representation of the first user interface in accordance with the characteristic intensity of the contact (e.g., with increasing contact intensity, the representation of the first user interface expands in size and advances toward the surface of the display in the z-direction, and the representations of other user interfaces remains at the same depth as before and becomes covered by the expanding and advancing representation of the first user interface; with decreasing contact intensity, the process reverses).

In some embodiments, the first user interface is a home screen (e.g., user interface 510, FIG. 5A14) and the second user interface is a user interface of a first application (e.g., user interface 512, FIG. 5A8) (758). In some embodiments, in response to detecting the input sequence and in accordance with the determination that the input sequence meets the first criteria (e.g., as shown in FIGS. 5A9-5A13), the device closes or suspends the first application (760).

In some embodiments, the first user interface is a primary page of a multi-page home screen (e.g., user interface 510, FIG. 5B74), and the second user interface is a secondary page of a multi-page home screen (e.g., user interface 520, FIG. 5B72) (762).

In some embodiments, the first user interface (e.g., user interface 520, FIG. 5B72) is a home screen (the home screen including a first folder icon that corresponds to a first folder that includes one or more folder items) and the second user interface (e.g., user interface 522, FIG. 5B70) includes an expanded view of the first folder (e.g., an expanded folder including one or more application launch icons, overlaid on a de-emphasized version of the home screen) that includes larger (e.g., full size) representations of the one or more folder items (764).

With reference now to FIG. 7G, in some embodiments, the device includes one or more tactile output generators (766), as discussed above. In some embodiments, in response to detecting the input sequence and in accordance with the determination that the input sequence meets the first criteria, the device generates a first tactile output using the one or more tactile output generators (768), as shown in FIG. 5A11. In some embodiments, the first intensity threshold is a pre-click threshold (e.g., a hint intensity threshold $IT_H$) and no tactile output is generated upon detecting an increase in the characteristic intensity of the contact above the first intensity threshold, as shown in FIGS. 5A9-5A10.

In some embodiments, the device generates (770) a tactile output upon detecting the increase in the characteristic intensity of the contact above the first intensity threshold. In some embodiments, the tactile output generated upon detecting the increase in the characteristic intensity of the contact above the first intensity threshold is different (e.g., in amplitude, duration, frequency, and/or waveform) than the tactile output generated in response to determining that the input sequence meets the first criteria. In some embodiments, the tactile output generated upon detecting the increase in the characteristic intensity of the contact above the first intensity threshold is the same as the tactile output generated in response to determining that the input sequence meets the first criteria.

In some embodiments, the device forgoes generating (772) a tactile output in response to detecting the increase in the characteristic intensity of the contact above the first intensity threshold, as shown in FIGS. 5A9-5A10.

In some embodiments, in accordance with a determination that the input sequence includes an increase in the characteristic intensity of the contact above the second intensity threshold and satisfaction of long press criteria (e.g., a minimum duration, such as $T_{LP}$ in FIG. 5A16, of a press input that starts with an increase in the characteristic intensity of the contact above the second intensity threshold), the device interrupts (774) an animated transition from the second user interface to the first user interface to display an animated transition (e.g., including user interface 514-1, FIG. 5A17) to a third user interface (e.g., an automated assistant user interface, such as user interface 515, FIG. 5A18) that is associated with the long press criteria, as shown in FIGS. 5A15-5A18.

For example, after the characteristic intensity of the contact has increased above the second intensity threshold, the device will no longer reverse the transition back to the second user interface with decreasing contact intensity. Instead, the transition progresses toward redisplaying the first user interface. If the contact is maintained for more than a threshold amount of time after the characteristic intensity of the contact has increased above the second intensity threshold, however, the device interrupts the transition toward the first user interface, and redirects to displaying a third user interface (e.g., the digital assistant user interface, such as user interface 515, FIG. 5A18). Additional examples are provided below with reference to method 900.

Displaying visual feedback in accordance with an initial portion of an input, and allowing a bifurcation and/or interruption of a user interface transition that is already in progress based on how the input continues, makes the user interface more responsive and efficient. For example, the device does not have to wait until termination of the input to determine its type, and thus shortens or eliminates a delay in starting a suitable user interface transition that corresponds to the determined input type. Providing the improved visual feedback to the user enhances the operability of the device and makes the user-device interface more efficient (e.g., by helping the user to provide proper inputs and reducing user mistakes when operating/interacting with the device) which additionally, reduces power usage and improves battery life of the device by enabling the user to use the device more quickly and efficiently.

In some embodiments, in accordance with a determination that the input sequence includes an increase in the characteristic intensity of the contact above the second intensity threshold and satisfaction of multiple-click criteria (e.g., a minimum duration between repeated clicks which is optionally measured from first up-click to second up-click, first down-click to second up-click, or first up-click to second down-click, or first down-click to second down-click of two sequential click inputs that correspond to an increase and subsequent decrease of the characteristic intensity of a contact on the home button), the device interrupts (776) an animated transition from the second user interface to the first user interface to display an animated transition to a fourth user interface (e.g., a multitasking user interface) that is associated with the multiple-click criteria (e.g., as described in greater detail below with reference to method 900). As one non-limiting example, after the characteristic intensity of the contact has increased above the second intensity threshold (e.g., in FIG. 5B6), the device will no longer reverse the transition back to the second user interface with decreasing contact intensity. Instead, the transition progresses toward redisplaying the first user interface (e.g., as shown in FIGS. 5B7-5B10). However, if a second press input by the contact is detected within a threshold amount of time (e.g., as shown in FIG. 5B10), a double click input is registered; and the device interrupts the redisplaying of the first user interface and transitions (e.g., as shown in FIGS. 5B11-5B13) to displaying a fourth user interface (e.g., the multitasking user interface, such as user interface 528, FIG. 5B14).

It should be understood that the particular order in which the operations in FIGS. 7A-7G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 1300, 1500, 1700, and 1900) are also applicable in an analogous manner to method 700 described above with respect to FIGS. 7A-7G. For example, the contacts, gestures, user interface objects, tactile outputs, audio outputs, intensity thresholds, time thresholds, focus selectors, and animations described above with reference to method 700 optionally have one or more of the characteristics of the contacts, gestures, user interface objects, tactile outputs, audio outputs, intensity thresholds, time thresholds, focus selectors, and animations described herein with reference to other methods described herein (e.g., methods 900, 1100, 1300, 1500, 1700, and 1900). For brevity, these details are not repeated here.

In accordance with some embodiments, FIG. 8 shows a functional block diagram of an electronic device 800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 8 are, optionally, combined or separated into sub-blocks to implement the principles of the various described embodiments. Therefore, the description herein optionally supports any possible combination or separation or further definition of the functional blocks described herein.

As shown in FIG. 8, the electronic device 800, includes a display unit 801 configured to display information (e.g., touch-sensitive display system 112 (also referred to as a touch screen and touch screen display), FIG. 1A), a touch-sensitive surface unit 804 (e.g., display controller 156 and touch-sensitive display system 112, FIG. 1A) configured to receive contacts, gestures, and other user inputs on the touch screen display, one or more sensor units 806 configured to detect intensities of contacts with the touch-sensitive surface unit and/or a respective button of the device (e.g., a home button), optionally one or more tactile output generating units 807 for generating tactile outputs, and a processing unit 808 coupled with the display unit 802, the touch-sensitive surface unit 804, the one or more sensor units 806, and the optional one or more tactile output generating units 807. For ease of illustration, FIG. 8 shows display unit 802 and touch-sensitive surface unit 804 as integrated with electronic device 800, however, in some embodiments one or both of these units are in communication with the electronic device, although the units remain physically separate from the electronic device (e.g., as shown and explained in reference to FIG. 3). In some embodiments, the processing unit includes a displaying unit (e.g., displaying unit 810), an input detecting unit (e.g., input detecting unit 812), a characteristic intensity detecting unit (e.g., characteristic intensity detecting unit 814), a determining unit (e.g., determining unit 816), and a tactile output generating unit (e.g., tactile output generating unit 818).

In some embodiments, the processing unit (or one or more components thereof, such as the units 810-818) is configured to: display, on the display, a first user interface (e.g., with the displaying unit 810); while displaying the first user interface, detect an input directed to the first user interface (e.g., with the input detecting unit 812); in response to detecting the input directed to the first user interface: cease to display the first user interface (e.g., with the displaying unit 810), and display a second user interface, distinct from the first user interface (e.g., with the displaying unit 810); while displaying the second user interface, detect a contact on the home button; while continuously detecting the contact on the home button: detect an increase in a characteristic intensity of the contact above a first intensity threshold (e.g., with the input detecting unit 812); in response to detecting the increase in the characteristic intensity of the contact to the first intensity threshold, display a beginning of a transition from the second user interface back to the first user interface (e.g., with the displaying unit 810); while displaying the beginning of the transition from the second user interface back to the first user interface, detect an input sequence that includes detecting a press input that includes an increase in the characteristic intensity of the contact above the first intensity threshold (e.g., with the input detecting unit 812); in response to detecting the input sequence: in accordance with a determination that the input sequence meets first criteria, the first criteria requiring that the characteristic intensity of the contact increases above a second intensity threshold before an end of the press input is detected: cease to display the second user interface (e.g., with the displaying unit 810), and redisplay the first user interface on the display (e.g., with the displaying unit 810); and in accordance with a determination that the input sequence meets second criteria, the second criteria requiring that the characteristic intensity of the contact remains below the second intensity threshold before the end of the press input is detected: reverse the beginning of the transition from the second user interface back to the first user interface (e.g., with the displaying unit 810), and redisplay the second user interface on the display (e.g., with the displaying unit 810).

In some embodiments, ceasing to display the second user interface and redisplaying the first user interface includes displaying a continuation of the beginning of the transition from the second user interface back to the first user interface.

In some embodiments, displaying the beginning of the transition from the second user interface back to the first user interface includes concurrently displaying at least a portion of the second user interface with at least a portion of the first user interface.

In some embodiments, the first user interface is a home screen that includes a plurality of application launch icons that corresponds to different applications on the electronic device.

In some embodiments, the first user interface and the second user interface are consecutively displayed user interfaces of an application.

In some embodiments, displaying the beginning of the transition from the second user interface back to the first user interface includes reducing a size of the second user interface.

In some embodiments, the processing unit is configured to: reveal the first user interface from behind the second user interface, as the second user interface is reduced in size (e.g., with the displaying unit 810).

In some embodiments, the second user interface is a user interface of a first application, the first application corresponds to a first application launch icon in the first user interface, and reducing the size of the second user interface includes shrinking the second user interface toward a position of the first application launch icon on the first user interface.

In some embodiments, the second user interface includes an expanded folder, the expanded folder corresponds to a first folder icon in the first user interface, and reducing the size of the second user interface includes shrinking the expanded folder toward a position of the first folder icon on the first user interface.

In some embodiments, displaying the beginning of the transition from the second user interface back to the first user interface includes shifting the second user interface laterally in a first direction.

In some embodiments, the processing unit is configured to: reveal the first user interface, as the second user interface is shifted laterally in the first direction (e.g., with the displaying unit 810).

In some embodiments, displaying the beginning of the transition from the second user interface back to the first user interface includes fading the second user interface.

In some embodiments, the processing unit is configured to: shift the first user interface laterally in a first direction to cover the second user interface, as the second user interface fades out (e.g., with the displaying unit 810).

In some embodiments, displaying the beginning of the transition from the second user interface back to the first user interface includes changing a virtual depth of at least one of the first user interface and the second user interface.

In some embodiments, the second user interface includes a representation of the first user interface, and displaying the beginning of the transition from the second user interface back to the first user interface includes expanding the representation of the first user interface included in the second user interface and reducing a virtual depth of the representation of the first user interface.

In some embodiments, detecting the input sequence further includes detecting that the characteristic intensity of the contact varies between the first intensity threshold and the second intensity threshold before the first criteria are met by the input sequence; and, the processing unit is configured to, in response to detecting that the characteristic intensity of the contact varies between the first intensity threshold and the second intensity threshold before the first criteria are met by the input sequence (e.g., with the characteristic intensity detecting unit 814), dynamically advance and reverse the transition from the second user interface to the first user interface in accordance with the characteristic intensity of the contact (e.g., with the displaying unit 810).

In some embodiments, dynamically advancing and reversing the transition from the second user interface to the first user interface in accordance with the characteristic intensity of the contact includes: dynamically changing a blur radius applied to the first user interface in accordance with the characteristic intensity of the contact.

In some embodiments, dynamically advancing and reversing the transition from the second user interface to the first user interface in accordance with the characteristic intensity of the contact includes: dynamically revealing at least a portion of the first user interface in accordance with the characteristic intensity of the contact.

In some embodiments, dynamically advancing and reversing the transition from the second user interface to the first user interface in accordance with the characteristic intensity of the contact includes: dynamically shifting a position of the second user interface on the display in accordance with the characteristic intensity of the contact, wherein a corresponding amount of the first user interface is revealed as the position of the second user interface is dynamically shifted in accordance with the characteristic intensity of the contact.

In some embodiments, dynamically advancing and reversing the transition from the second user interface to the first user interface in accordance with the characteristic intensity of the contact includes: dynamically changing an opacity of the second user interface in accordance with the characteristic intensity of the contact.

In some embodiments, the second user interface is an expanded version of a portion of the first user interface; and dynamically advancing and reversing the transition from the second user interface to the first user interface in accordance with the characteristic intensity of the contact includes: dynamically changing a size of the second user interface in accordance with the characteristic intensity of the contact.

In some embodiments, the second user interface includes a representation of the first user interface, and dynamically advancing and reversing the transition from the second user interface to the first user interface in accordance with the characteristic intensity of the contact includes: dynamically changing a virtual depth of the representation of the first user interface in accordance with the characteristic intensity of the contact.

In some embodiments, the first user interface is a home screen, the second user interface is a user interface of a first application, and the processing unit is configured to: in response to detecting the input sequence: in accordance with the determination that the input sequence meets the first criteria, close or suspend the first application.

In some embodiments, the first user interface is a primary page of a multi-page home screen, and the second user interface is a secondary page of a multi-page home screen.

In some embodiments, the first user interface is a home screen, wherein the home screen includes a first folder icon that corresponds to a first folder that includes one or more folder items; and the second user interface includes an expanded view of the first folder that includes larger representations of the one or more folder items.

In some embodiments, the device includes one or more tactile output generators, and the processing unit is configured to: in response to detecting the input sequence: in accordance with the determination that the input sequence meets the first criteria, generate a first tactile output (e.g., with the tactile output generating unit 818).

In some embodiments, the processing unit is configured to: generate a tactile output upon detecting the increase in the characteristic intensity of the contact above the first intensity threshold (e.g., with the tactile output generating unit 818).

In some embodiments, the processing unit is configured to: forgo generating a tactile output in response to detecting the increase in the characteristic intensity of the contact above the first intensity threshold.

In some embodiments, the processing unit is configured to, in accordance with a determination that the input sequence includes an increase in the characteristic intensity of the contact above the second intensity threshold and satisfaction of long press criteria (e.g., with the characteristic intensity detecting unit 814), interrupt an animated transition from the second user interface to the first user interface to display an animated transition to a third user interface that is associated with the long press criteria (e.g., with the displaying unit 810).

In some embodiments, the processing unit is configured to, in accordance with a determination that the input sequence includes an increase in the characteristic intensity of the contact above the second intensity threshold and satisfaction of multiple-click criteria, interrupt an animated transition from the second user interface to the first user interface to display an animated transition to a fourth user interface that is associated with the multiple-click criteria.

The operations in the information processing methods described above are, optionally implemented by running one or more functional modules in information processing apparatus such as general purpose processors (e.g., as described above with respect to FIGS. 1A and 3) or application-specific chips.

The operations described above with reference to FIGS. 7A-7G are, optionally, implemented by components depicted in FIGS. 1A-1B or FIG. 8. For example, displaying operation 702, detection operation 704, responding operation 706, detection operation 708, detection operation 710, and responding operation 712 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 9A-9D are flow diagrams illustrating a method 900 of providing visual feedback and tactile outputs in response to multiple types of inputs on a home button of a device in accordance with some embodiments. The method 900 is performed at an electronic device (e.g., device 300, FIG. 3, or portable multifunction device 100, FIG. 1A) with a display, a touch-sensitive surface, and one or more sensors to detect intensities of contacts with the touch-sensitive surface and/or a respective button of the device (e.g., a virtual or physical home button). In some embodiments, the display is a touch-screen display and the touch-sensitive surface is on or integrated with the display. In some embodiments, the display is separate from the touch-sensitive surface. In some embodiments, the method 900 is governed by instructions that are stored in a computer-readable storage medium (e.g., a non-transitory computer readable storage medium) and that are executed by one or more processors of the electronic device, such as the one or more processors 122 of device 100 (FIG. 1A). For ease of explanation, the following describes method 900 as performed by the device 100. Some operations in method 900 are, optionally, combined and/or the order of some operations is, optionally, changed.

Method 900 relates to starting an animation transition from a first user interface to a second user interface in response to an initial portion of an input, where the animated transition can be interrupted at different points to progress toward a third user interface depending on if and when the criteria for transitioning to the third user interface are met by a subsequent portion of the input. Starting the animated transition before the input type of the input is completely ascertained improves the responsiveness of the user interface. Matching the timing of the interruption to the timing of when the input type is ascertained improves the visual feedback provided to the user (e.g., by making the device appear more responsive to user input), and enhances the operability of the device (e.g., by helping the user to provide proper inputs and reducing user mistakes when operating/interacting with the device). Furthermore, in many cases, the transition toward the second user interface is completed without interruption (e.g., the subsequent portion of the input turns out to be consistent with the request to transition to the second user interface). In such cases, by having started the user interface transition toward the second user interface as soon as the initial portion of the input is detected, the outcome that is intended by the user is achieved without unnecessary delay. Thus, the improved visual feedback is compatible with the user's expectation, while making the user interface more efficient (e.g., by helping the user to provide proper inputs and reducing user mistakes when operating/interacting with the device) which additionally, reduces power usage and improves battery life of the device by enabling the user to use the device more quickly and efficiently.

In some embodiments, the device includes one or more tactile output generators. In some embodiments, the device includes one or more sensors to detect intensities of contacts with a button of the device (e.g., a physical or virtual button, such as a physical home button or a virtual home button, such as button 204, FIG. 5B1). In some embodiments, the home button is available on the device (e.g., persistently displayed at a respective location or located at a persistent location on the device that is separate from the display) in a plurality of different contexts to dismiss a currently displayed user interface in response to detecting an input of a first type (e.g., a single click input with a press event, or with a press event and release event, that is detected via the depression of a mechanical switch or by comparing an intensity of a contact on the home button to activation criteria that are based on one or more intensity thresholds as described in greater detail with reference to methods 700, 1300, 1500, and 1700) on the home button (e.g., and, optionally, redisplay a previously displayed user interface such as a previous view of an application or a system user interface such as a home screen of the device, a multitasking user interface, or a virtual assistant user interface). Other aspects of configuring the haptics for home button activation are described in greater detail with reference to methods 1100 and 1900.

In some embodiments, the home button responds to multiple types of inputs, including: an input of the first type (e.g., a single click (e.g., with one press event, or one press event followed by one release event)), an input of a second type (e.g., a double click (e.g., with a first press event, followed by a first release event, followed by a second press event, or with a first press event, followed by a first release event, followed by a second press event, followed by a second release event, wherein the first and second press events are detected within a threshold amount of time of each other)), an input of a third type (e.g., a long press (e.g., with a first press event that does not lift-off until more than a threshold amount of time has elapsed)), and an input of a fourth type (e.g., a deep press (e.g., with a first press event that includes an increase in intensity of a contact above a deep press intensity threshold within a threshold amount of time after initial touch-down of the contact)). In some embodiments, each type of input is associated with dismissing a currently displayed user interface, and performing a corresponding operation, and, optionally, displaying a corresponding user interface associated with the operation.

Figure 9A:
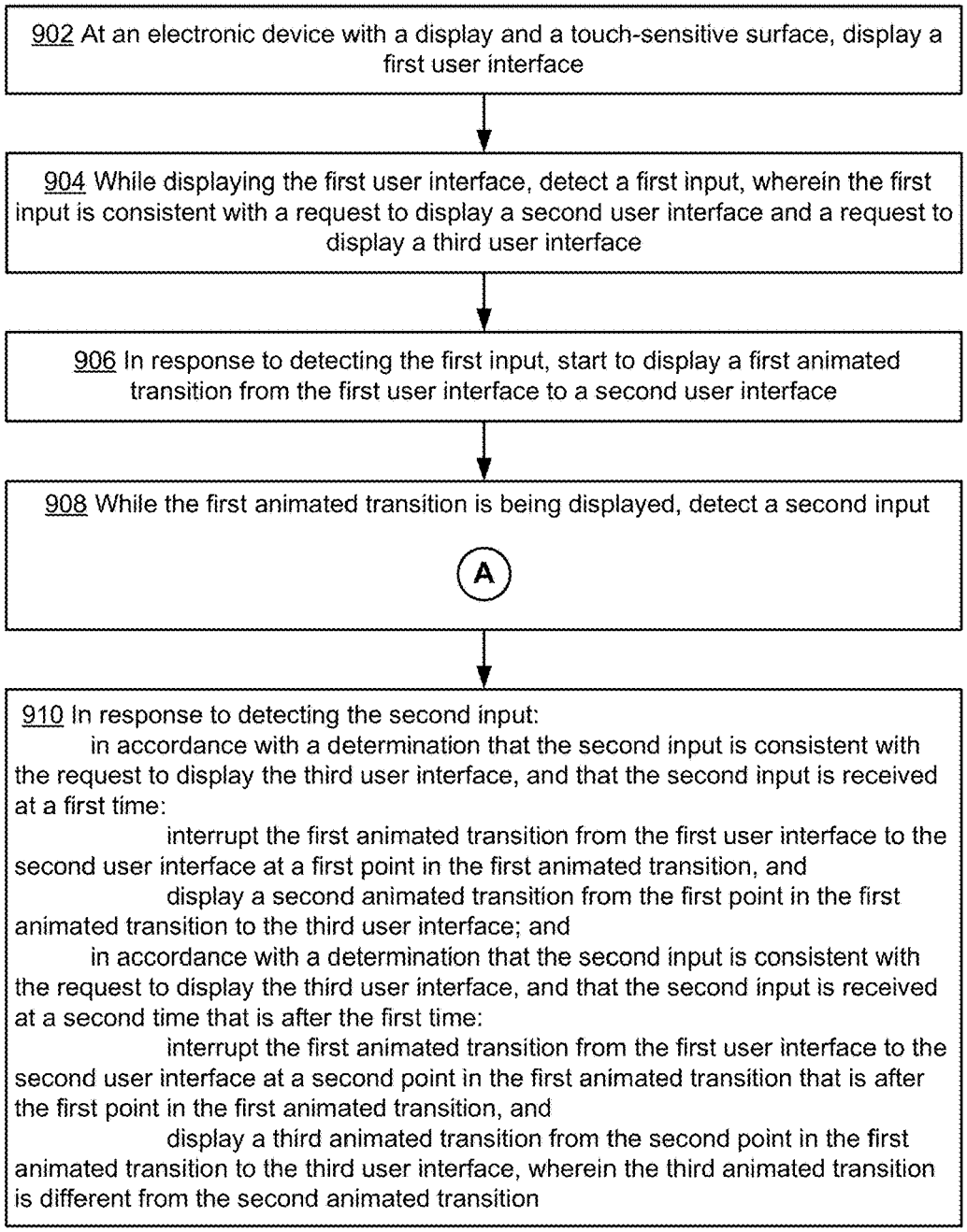

With reference to FIG. 9A, the device displays (920) a first user interface (e.g., a user interface of a first application, such as user interface 524, FIG. 5B5). While displaying the first user interface, the device detects (904) a first input, and the first input is consistent with a request to display a second user interface and a request to display a third user interface (e.g., a first press input by a first contact on a home button, such as the first press input by contact 532-*a*, FIG. 5B6). In some embodiments, a press input is defined as an increase in the characteristic intensity of the contact above a light press intensity threshold $IT_L$ (e.g., as shown in FIG. 5B6), followed by a reduction of the contact intensity below a predefined up-click intensity threshold (e.g., a light press release intensity threshold $IT_{LR}$, as shown in FIG. 5B8) or followed by lift-off of the contact that is consistent with a request to transition to a second user interface (e.g., a single click input to transition to the home screen or to transition to an expanded folder overlaid on the home screen, such as user interface 522, FIG. 5B3) and a request to transition to a third user interface (e.g., a double click input to transition to the multi-tasking user interface, such as user interface 528, FIG. 5B14).

In response to detecting the first input, the device starts (906) to display a first animated transition from the first user interface (e.g., the user interface of a first application, such as user interface 524, FIG. 5B5) to the second user interface (e.g., the home screen or an expanded folder overlaid on the home screen, such as user interface 522, FIG. 5B3). In some embodiments, the first animation starts to be displayed in response to detecting an up-click portion of the first input (e.g., a decrease in intensity of the contact from an intensity above an up-click intensity threshold to an intensity below the up-click intensity threshold), as shown in FIGS. 5B50-5B54). In some embodiments, the first animation starts to be displayed in response to detecting an increase in intensity of the contact above a hint intensity threshold $IT_H$ (e.g., as shown in FIGS. 5A8-5A11, 5B6, 5B17, 5B28, and 5B40).

While the first animated transition is being displayed (e.g., the first animated transition has started but has not yet finished, such that an intermediate state between an beginning and an end of the first animated transition is currently displayed on the display, such as user interface 525-5, FIG. 5B10), the device detects (908) a second input (e.g., a second press input by contact 532-*e*, FIG. 5B10) (e.g., a second press input, either by the same continuous contact or by a second contact after lift-off of the first contact is detected).

In response to detecting the second input, the device determines whether the second input is consistent with the request to display the third user interface, and whether the second input is received at a first time. In accordance with a determination that the second input is consistent with the request to display the third user interface, and that the second input is received at a first time (e.g., a second click input is detected at a first time, before a threshold amount of time for detecting a double click input has elapsed), the device interrupts (910) the first animated transition from the first user interface to the second user interface at a first point in the first animated transition (e.g., the first point in the first animated transition corresponds to the first time), and displays a second animated transition from the first point in the first animated transition to the third user interface (e.g., the first animated transition is interrupted by the detection of the second click of the double-click input at the first point in the first animated transition). For example, as shown in FIGS. 5B10-5B14, the second input (e.g., the second press input by contact 532-*e*, FIG. 5B10) is detected at a first time, before the double click time threshold $T_{DC}$, and the first animated transition from the first user interface (e.g., user interface 524, FIG. 5B5) to the second user interface (e.g., user interface 522, FIG. 5B3) is interrupted at the first point in the first animated transition (e.g., at user interface 525-5, FIG. 5B10) and a second animated transition from the first point in the first animated transition (e.g., the second animated transition including user interfaces 526-1, 526-2, and 526-3, FIG. 5B11-5B13) to the third user interface (e.g., user interface 528, FIG. 5B14) is displayed.

In accordance with a determination that the second input is consistent with the request to display the third user interface, and that the second input is received at a second time that is after the first time (e.g., a second click input is detected at a second time, before a threshold amount of time for detecting a double click input has elapsed), the device interrupts the first animated transition from the first user interface to the second user interface at a second point in the first animated transition that is after the first point in the first animated transition (e.g., the first point in the first animated transition corresponds to the first time), and displays a third animated transition from the second point in the first animated transition to the third user interface, wherein the third animated transition is different from the second animated transition (e.g., the first animated transition is interrupted by the detection of the second click of the double-click input at the second point in the first animated transition, and thus, the transition to the third user interface starts from there). For example, as shown in FIGS. 5B21-5B25, the second input (e.g., the second press input by contact 534-e, FIG. 5B21) is detected at a second time, before the double click time threshold $T_{DC}$, but after the first time (e.g., in FIG. 5B10) and the first animated transition from the first user interface (e.g., user interface 524, FIG. 5B5) to the second user interface (e.g., user interface 522, FIG. 5B3) is interrupted at the second point in the first animated transition (e.g., at user interface 525-6, FIG. 5B21) that is after the first point in the first animated transition (e.g., at user interface 525-5, FIG. 5B10) and a third animated transition from the second point in the first animated transition (e.g., the third animated transition including user interfaces 527-1, 527-2, and 527-3, FIG. 5B22-5B24) to the third user interface (e.g., user interface 528, FIG. 5B25) is displayed.

Turning now to FIG. 9B, in some embodiments, in response to detecting the second input: in accordance with a determination that the second input meets first criteria (e.g., the first criteria requiring that the second input is not detected after the long press input is detected (e.g., the contact is not maintained for more than a threshold amount of time after the first click event is registered and before the second click event is registered)), and that the second input is received at a third time that is after the second time (e.g., a click that is detected after a threshold amount of time for detecting a double click input has elapsed or a click that is detected before the threshold amount of time for detecting a double click but after a threshold amount of time for interrupting the first animated transition, $T_I$), the device continues to display (912) the first animated transition (e.g., the home screen will be displayed at the end of the first animated transition). In FIGS. 5B27-5B38 and FIGS. 5B39-5B48, for example, the first animated transition is displayed to completion and the second user interface (e.g., user interface 522) is displayed at the end of the transition (e.g., in FIGS. 5B35 and 5B47, respectively). For example, in cases where the input turns out to be a single click which is a request to go to the second user interface (e.g., in FIGS. 5B39-5B48), the animated transition from the first user interface to the second user interface is completed sooner than if the device had waited until the double-click time threshold had elapsed without detecting a second click before starting the animated transition from the first user interface to the second user interface. As a result, the user interface is more responsive and efficient, and enables the user to use the device more quickly and efficiently.

In some embodiments, the first time and the second time occur before a threshold time for detecting a double-click input (e.g., in FIGS. 5B5-5B14, FIGS. 5B16-5B25, and FIGS. 5B27-5B38) that includes the first input (914). In some embodiments, the third time occurs after the threshold time for detecting a double-click input (e.g., in FIGS. 5B39-5B48) that includes the first input (916).

In some embodiments, the second input is a repetition of the first input (918) (e.g., as shown in FIGS. 5B39-5B48).

In some embodiments, the first animated transition from the first user interface to the second user interface includes (920) movement of the first user interface in a first direction (e.g., downward or upward), and the second animated transition includes movement of the first user interface in a second direction (e.g., leftward or rightward) that is distinct from the first direction (e.g., perpendicular to the first direction). For example, in some embodiments, during the first animated transition, the user interface of a first application moves downward toward the bottom of the display (or upward toward the top of the display, as shown in FIGS. 5B6-5B10), and upon detection of the second input, the user interface of the first application moves back up (or down) and to the side of the display (e.g., as shown in FIGS. 5B11-5B14). In some embodiments, the user interface is responsive to each click of a double click input, and the user receives visual feedback for each press input he/she enters. The user interface is fluid and dynamically adaptive to the user's inputs. This improved visual feedback gives the user a better sense of control without requiring any change on the user's part to alter the way that he/she interacts with the device. This enhances the operability of the device and makes the user-device interface more efficient (e.g., by helping the user to provide proper inputs and reducing user mistakes when operating/interacting with the device) which, additionally, reduces power usage and improves battery life of the device by enabling the user to user the device more quickly and efficiently.

In some embodiments, in response to detecting the second input: in accordance with a determination that the second input is consistent with a request to display a fourth user interface (e.g., the digital assistant user interface), distinct from the first, second, and third user interface, (e.g., the contact is maintained for a threshold amount of time after the first input (e.g., the first click) is detected, and before any second click is detected, so that a long click is registered), the device interrupts (922) the first animated transition from the first user interface to the second user interface at a third point in the first animated transition, distinct from the first and second points in the first animated transition (e.g., the third point corresponds to a third time that is a first threshold amount of time (e.g., the long-press time threshold) after the detection of the first input (e.g., the first click)), and displays a fourth animated transition from the third point in the first animated transition to the fourth user interface, and the fourth animated transition is different from the first, second and third animated transitions. For example, after the first click is detected, the first animated transition to the home screen is started, and if the contact is maintained for a threshold amount of time without an increase in intensity to register a second click, a long press input is registered, and the first animated transition is interrupted and the fourth animated transition to the fourth user interface is stated from there (e.g., as shown in FIGS. 5A15-5A18). In some embodiments, the timer for detecting a long click is started when the down-click of a press input is detected (e.g., as shown in FIG. 5A15). In some embodiments, the timer for detecting a double click is started when the up-click of a press input is detected.

In some embodiments, the animated transition toward the second user interface (e.g., the home screen or an expanded folder overlaid on the home screen, such as user interface 522, FIG. 5B3) is started upon detecting the down-click of the press input. In some embodiments, the animated transition toward the second user interface (e.g., the home screen or an expanded folder overlaid on the home screen, such as user interface 522, FIG. 5B3) is started upon detecting the up-click of the press input (e.g., as shown in FIGS. 5B50-5B59). In embodiments, where the animated transition toward the second user interface (e.g., the home screen or an expanded folder overlaid on the home screen, such as user interface 522, FIG. 5B3) is started upon detecting the up-click of the press input, and the timer for detecting the long click is started upon detecting the down-click, the likelihood of confusion of the user as to whether a long click or a single click was detected is reduced. In such embodiments, once an up-click is detected and the animated transition to the second user interface is started, the animated transition to the second user interface will not be interrupted by an animation toward the fourth user interface (e.g., the digital assistant user interface) in such embodiments.

In some embodiments, the first animated transition from the first user interface to the second user interface includes (924) movement of the first user interface in a first direction (e.g., downward), the fourth animated transition includes movement of the first user interface in a second direction (e.g., upward) that is opposite the first direction, and the third animated transition is in a third direction that is orthogonal to the first and second directions (e.g., leftward and rightward).

With reference to FIG. 9C, in some embodiments, in response to detecting the second input: in accordance with a determination that the second input is consistent with a request to transition to a fifth user interface (e.g., a deep press input to transition to a user interface) (e.g., the second input includes a continued increase of the characteristic intensity of the contact above a second threshold higher than the first intensity threshold after the first input without first decreasing the characteristic intensity of the contact), the device interrupts (926) the first animated transition from the first user interface to the second user interface at a fourth point in the first animated transition (e.g., the fourth point corresponds to a time that the characteristic intensity increases above the second intensity threshold), and displays a fifth animated transition from the fourth point in the first animated transition to the fifth user interface, wherein the fifth animated transition is different from the first, second and third (and fourth) animated transitions. In some embodiments, when an initial portion of an input is detected and the initial portion of the input is consistent with multiple input types and thus corresponds to multiple different operations that would result in multiple different final user interfaces (e.g., first final user interface, second final user interface, third final user interface, fourth final user interface, etc.), the device starts the animated transition toward the first final user interface; while the animated transition toward the first final user interface is in progress, if a subsequent portion of the input eliminates the possibility that the input is a request to go to the first final user interface, the device redirects the current animated transition toward the second final user interface; while the animated transition toward the second final user interface is in progress, if a subsequent portion of the input eliminates the possibility that the input is a request to go to the second final user interface, the device redirects the current animated transition toward the third final user interface. In some embodiments, with suitable designs for the timing and criteria for detecting the different input types, for the matching between the input types and operations, and for the animated transitions that correspond to the final user interfaces, the user interface can be made very smooth and efficient, leading to improved operability and efficiency of the device.

In some embodiments, while displaying the first user interface, prior to detecting the first input, the device: detects (928) a precursor input (e.g., detecting the touch-down of the contact and an increase in the characteristic intensity of the contact above a hint intensity threshold $IT_H$) for the first input and, in response to detecting the precursor input, the device displays a hint animation that includes a start of the first animated transition from the first user interface to the second user interface (e.g., as shown in FIGS. 5A5-5A6 and described in more detail with respect to method 700 above).

In some embodiments, the first user interface is a user interface of a first application (930) (e.g., user interface 524, FIG. 5B5), and the device generates the first animated transition (and/or the second animated transition, and/or the third animated transition) in accordance with a location of a first application launch icon on the second user interface (e.g., in accordance with a location of the Pages icon on user interface 522, FIG. 5B3). In some embodiments, the second user interface is an application launching user interface (e.g., user interface 522, FIG. 5B3) that includes a plurality of application launch icons including a first application launch icon that corresponds to the first application (e.g., the Pages icon that corresponds to the Pages application). For example, in some embodiments, the first animated transitions shows that the user interface of the first application shrinks toward the first application icon on the home screen (or an expanded folder overlaid on the home screen, such as user interface 522, FIG. 5B3), as shown in FIGS. 5B17-5B21).

In some embodiments, detecting the first input includes (932) detecting a first press input by a first contact on a home button, the first press input including an increase in a characteristic intensity of the first contact above a first intensity threshold (e.g., a light press intensity threshold $IT_L$) (e.g., as shown in FIG. 5B17) followed by a decrease in the characteristic intensity of the first contact below a second intensity threshold (e.g., the second intensity threshold is a release intensity threshold that is the same, greater, or smaller than the press intensity threshold) (e.g., as shown in FIG. 5B19).

In some embodiments, the device generates (934) a first tactile output in response to detecting the increase in the characteristic intensity of the first contact above the first intensity threshold (e.g., a down-click tactile output is generated in response to detecting the increase in the characteristic intensity of the first contact above the light press intensity threshold $IT_L$), as shown in FIG. 5B17 (e.g., MiniTap 270 Hz with a gain of 1).

In some embodiments, the device generates (936) a second tactile output in response to detecting the decrease in the characteristic intensity of the first contact below the second intensity threshold (e.g., an up-click tactile output is generated in response to detecting the decrease in the characteristic intensity of the first contact below the light press release intensity threshold $IT_{LR}$), as shown in FIG. 5B19 (e.g., MiniTap 270 Hz with a gain of 0.5). In some embodiments, the second tactile output is different from the first tactile output (e.g., with a different amplitude (e.g., a lower amplitude), duration (e.g., a shorter duration), frequency (e.g., a lower frequency), and/or waveform (e.g., a waveform with fewer cycles)). In some embodiments, the second tactile output is 50% of the first tactile output (e.g., 50% of the amplitude). In some embodiments, the second tactile output is the same as the first tactile output. In some embodiments, the tactile outputs for the down-click and up-click are the same, but with different corresponding tactile audio outputs (e.g., audio outputs with different amplitudes, and/or frequencies).

Turning now to FIG. 9D, in some embodiments, in response to detecting the second input: in accordance with a determination that the second input is consistent with the request to display the third user interface, and that the second input is received at a fourth time that is after the second time (e.g., a second click input is detected at a fourth time, before a threshold amount of time for detecting a double click input has elapsed), the device continues (938) to display the first animated transition from the first user interface to the second user interface, and the device displays a fifth animated transition from an end of the first animated transition to the third user interface (e.g., as shown in FIGS. 5B27-5B38). In some embodiments, the fifth animated transition is different from the second animated transition and the third animated transition.

For example, the first animated transition is not interrupted by the detection of the second click of the double-click input at the second point in the first animated transition, and thus, the transition to the third user interface starts from the end of the first animated transition (e.g., as shown in FIGS. 5B35-5B38). In some embodiments, when a substantial portion of the transition from the first user interface to the second user interface has already been completed by the time that the second click of double click input is detected, it is more natural to complete the transition to the second user interface and starts the transition toward the third user interface from second user interface. One advantage in such a design is that the starting point of the third animated transition is a stable user interface and needs not be customized for each different timing of when the second click of the double click is detected. Another advantage in such designs in which interruption is allowed to happen early on but not after a certain point, is that the animation can start earlier without waiting to see if the second click of a double click is going to be detected, thereby improving the responsiveness of the user interface and reducing user confusion and accidental inputs caused by user confusion. In some embodiments, using a canned animation from the second user interface to the third user interface simplifies the design of the software and improves battery life of the device.

In some embodiments, in response to detecting the second input: in accordance with a determination that the second input is not consistent with the request to display the third user interface (e.g., because the second input is received at a fourth time that is after the third time and does not meet a multiple-click time threshold), the device forgoes transitioning (940) to the third user interface (e.g., if the second click input is detected after a multiple-click time threshold has elapsed, the clicks are treated as separate clicks and a multitasking user interface that is associated with multiple sequential clicks that meet the multiple-click time threshold is not displayed). For example, the first input turns out to be a single click which is a request to go to the second user interface (e.g., a secondary home screen or an expanded folder overlaid on the home screen, such as user interface 522, FIG. 5B3), and the second input turns out to be another single click which is a request to go from the second user interface (e.g., a secondary home screen or an expanded folder overlaid on the home screen, such as user interface 522, FIG. 5B3) to a fifth user interface (e.g., a primary home screen or a secondary home screen with the folder, such as user interface 520, FIG. 5B1) distinct from the first user interface (e.g., an app UI), the second user interface (e.g., the secondary home screen or an expanded folder overlaid on the home screen, such as user interface 522, FIG. 5B3), the third user interface (e.g., the multitasking user interface), and the fourth user interface (e.g., the digital assistant user interface), the animated transition from the first user interface to the second user interface is completed, and then an animated transition from the second user interface to the fifth user interface is displayed. In the end, the fifth user interface is displayed. An example of this embodiment is illustrated in FIGS. 5B39-5B48.

It should be understood that the particular order in which the operations in FIGS. 9A-9D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, 1300, 1500, 1700, and 1900) are also applicable in an analogous manner to method 900 described above with respect to FIGS. 9A-9D. For example, the contacts, gestures, user interface objects, tactile outputs, audio outputs, intensity thresholds, time thresholds, focus selectors, and animations described above with reference to method 900 optionally have one or more of the characteristics of the contacts, gestures, user interface objects, tactile outputs, audio outputs, intensity thresholds, time thresholds, focus selectors, and animations described herein with reference to other methods described herein (e.g., methods 700, 1100, 1300, 1500, 1700, and 1900). For brevity, these details are not repeated here.

In accordance with some embodiments, FIG. 10 shows a functional block diagram of an electronic device 1000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, the electronic device 1000, includes a display unit 1001 configured to display information (e.g., touch-sensitive display system 112 (also referred to as a touch screen and touch screen display), FIG. 1A), a touch-sensitive surface unit 1004 (e.g., display controller 156 and touch-sensitive display system 112, FIG. 1A) configured to receive contacts, gestures, and other user inputs on the touch screen display, optionally one or more sensor units 1006 configured to detect intensities of contacts with the touch-sensitive surface unit and/or a respective button of the device (e.g., a home button), optionally one or more tactile output generating units 1007 for generating tactile outputs, and a processing unit 1008 coupled with the display unit 1002, the touch-sensitive surface unit 1004, the optional one or more sensor units 1006, and the optional one or more tactile output generating units 1007. For ease of illustration, FIG. 10 shows display unit 1002 and touch-sensitive surface unit 1004 as integrated with electronic device 1000, however, in some embodiments one or both of these units are in communication with the electronic device, although the units remain physically separate from the electronic device (e.g., as shown and explained in reference to FIG. 3). In some embodiments, the processing unit includes a displaying unit (e.g., displaying unit 1010), an input detecting unit (e.g., input detecting unit 1012), a determining unit (e.g., determining unit 1014), a tactile output providing unit (e.g., tactile output providing unit 1016), and a characteristic intensity detecting unit 1018).

In some embodiments, the processing unit (or one or more components thereof, such as the units 1010-1018) is configured to: display a first user interface (e.g., with the displaying unit 1010); while displaying the first user interface, detect a first input (e.g., with the input detecting unit 1012), the first input being consistent with a request to display a second user interface and a request to display a third user interface; in response to detecting the first input, start to display a first animated transition from the first user interface to a second user interface (e.g., with the displaying unit 1010); while the first animated transition is being displayed, detect a second input (e.g., with the input detecting unit 1012); and in response to detecting the second input: in accordance with a determination that the second input is consistent with the request to display the third user interface, and that the second input is received at a first time: interrupt the first animated transition from the first user interface to the second user interface at a first point in the first animated transition (e.g., with the displaying unit 1010), and display a second animated transition from the first point in the first animated transition to the third user interface (e.g., with the displaying unit 1010); and in accordance with a determination that the second input is consistent with the request to display the third user interface, and that the second input is received at a second time that is after the first time: interrupt the first animated transition from the first user interface to the second user interface at a second point in the first animated transition that is after the first point in the first animated transition (e.g., with the displaying unit 1010), and display a third animated transition from the second point in the first animated transition to the third user interface, wherein the third animated transition is different from the second animated transition (e.g., with the displaying unit 1010).

In some embodiments, the processing unit is configured to: in response to detecting the second input: in accordance with a determination that the second input meets first criteria, and that that the second input is received at a third time that is after the second time, continue to display the first animated transition (e.g., with the displaying unit 1010).

In some embodiments, the first time and the second time occur before a threshold time for detecting a double-click input that includes the first input.

In some embodiments, the third time occurs after the threshold time for detecting a double-click input that includes the first input.

In some embodiments, the second input is a repetition of the first input.

In some embodiments, the first animated transition from the first user interface to the second user interface includes movement of the first user interface in a first direction, and the second animated transition includes movement of the first user interface in a second direction that is distinct from the first direction.

In some embodiments, the processing unit is configured to: in response to detecting the second input: in accordance with a determination that the second input is consistent with a request to display a fourth user interface, distinct from the first, second, and third user interfaces: interrupt the first animated transition from the first user interface to the second user interface at a third point in the first animated transition, distinct from the first and second points in the first animated transition (e.g., with the displaying unit 1010), and display a fourth animated transition from the third point in the first animated transition to the fourth user interface, wherein the fourth animated transition is different from the first, second and third animated transitions (e.g., with the displaying unit 1010).

In some embodiments, the first animated transition from the first user interface to the second user interface includes movement of the first user interface in a first direction, the fourth animated transition includes movement of the first user interface in a second direction that is opposite the first direction, and the third animated transition is in a third direction that is orthogonal to the first and second directions.

In some embodiments, the processing unit is configured to: in response to detecting the second input: in accordance with a determination that the second input is consistent with a request to transition to a fifth user interface: interrupt the first animated transition from the first user interface to the second user interface at a fourth point in the first animated transition (e.g., with the displaying unit 1010), and display a fifth animated transition from the fourth point in the first animated transition to the fifth user interface (e.g., with the displaying unit 1010), the fifth animated transition being different from the first, second and third animated transitions.

In some embodiments, the processing unit is configured to: while displaying the first user interface, prior to detecting the first input: detect a precursor input for the first input (e.g., with the input detecting unit 1012); in response to detecting the precursor input, display a hint animation wherein the hint animation includes a start of the first animated transition from the first user interface to the second user interface (e.g., with the displaying unit 1010).

In some embodiments, the first user interface is a user interface of a first application, the processing unit is configured to generate the first animated transition in accordance with a location of a first application launch icon on the second user interface.

In some embodiments, detecting the first input includes detecting a first press input by a first contact on a home button, wherein the first press input includes an increase in a characteristic intensity of the first contact above a first intensity threshold followed by a decrease in the characteristic intensity of the first contact below a second intensity threshold.

In some embodiments, the processing unit is configured to: generate a first tactile output in response to detecting the increase in the characteristic intensity of the first contact above the first intensity threshold (e.g., with the tactile output generating unit 1016).

In some embodiments, the processing unit is configured to: generate a second tactile output in response to detecting the decrease in the characteristic intensity of the first contact below the second intensity threshold (e.g., with the tactile output generating unit 1016).

In some embodiments, the processing unit is configured to, in response to detecting the second input: in accordance with a determination that the second input is consistent with the request to display the third user interface, and that the second input is received at a fourth time that is after the second time: continue to display the first animated transition from the first user interface to the second user interface (e.g., with the displaying unit 1010), and display a fifth animated transition from an end of the first animated transition to the third user interface, wherein the fifth animated transition is different from the second animated transition and the third animated transition (e.g., with the displaying unit 1010).

In some embodiments, the processing unit is configured to, in response to detecting the second input: in accordance with a determination that the second input is not consistent with the request to display the third user interface, forgo transitioning to the third user interface.

The operations in the information processing methods described above are, optionally implemented by running one or more functional modules in information processing apparatus such as general purpose processors (e.g., as described above with respect to FIGS. 1A and 3) or application-specific chips.

The operations described above with reference to FIGS. 9A-9D are, optionally, implemented by components depicted in FIGS. 1A-1B or FIG. 10. For example, displaying operation 902, detection operation 904, responding operation 906, detection operation 908, and responding operation 910 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 11A-11E are flow diagrams illustrating a method 1100 of home button configuration in accordance with some embodiments. The method 1100 is performed at an electronic device (e.g., device 300, FIG. 3, or portable multi-function device 100, FIG. 1A) with a display, a touch-sensitive surface, and one or more sensors to detect intensities of contacts with the touch-sensitive surface and/or a respective button of the device (e.g., a virtual or physical home button). In some embodiments, the display is a touch-screen display and the touch-sensitive surface is on or integrated with the display. In some embodiments, the display is separate from the touch-sensitive surface. In some embodiments, the device includes one or more sensors to detect intensities of contacts with a home button of the device (e.g., a physical home button or a virtual home button). In some embodiments, the method 1100 is governed by instructions that are stored in a computer-readable storage medium (e.g., a non-transitory computer readable storage medium) and that are executed by one or more processors of the electronic device, such as the one or more processors 122 of device 100 (FIG. 1A). For ease of explanation, the following describes method 1100 as performed by the device 100. Some operations in method 1100 are, optionally, combined and/or the order of some operations is, optionally, changed.

Method 1100 relates to a home button configuration process during which a user selects and tries out a plurality of tactile output settings for a home button before selecting a tactile output setting for the home button on the device. During the home button configuration process, the normal functions of the home button are suspended, while the tactile output corresponding to the currently selected tactile output setting for the home button is generated in response to a press input detected on the home button. Allowing the user to try out different tactile output settings for a button press in a home button configuration user interface before committing to a most favored setting makes the home button better conform to the user's particular preference and expectation of how a button press should feel. The home button configuration user interface makes the user-device interface more efficient (e.g., by helping the user to provide proper inputs and reducing user mistakes when operating/interacting with the device) which additionally, reduces power usage and improves battery life of the device by enabling the user to use the device more quickly and efficiently.

In some embodiments, the device includes one or more sensors to detect intensities of contacts with a home button of the device (e.g., a physical home button or a virtual home button). In some embodiments, the device includes one or more sensors to detect intensities of contacts with the touch-sensitive surface. In some embodiments, the display is a touch-sensitive display.

With reference to FIG. 11A, the device displays (1102), on the display, a home button configuration user interface (e.g., user interface 564, FIG. 5C8) that includes displaying a plurality of different tactile output settings for the home button (e.g., a first tactile output pattern such as MiniTap 230 Hz, a second tactile output pattern such as MiniTap 270 Hz, and a third tactile output pattern such as MiniTap 300 Hz), and the home button is available on the device (e.g., persistently displayed at a respective location or located at a persistent location on the device that is separate from the display) in a plurality of different contexts to dismiss a currently displayed user interface in response to detecting an input of a first type (e.g., a press input or a press and release input that is detected via the depression of a mechanical switch or by comparing an intensity of a contact on the home button to activation criteria that are based on one or more intensity thresholds as described in greater detail with reference to methods 700, 900, 1300, 1500, and 1700) on the home button (e.g., and, optionally, redisplay a previously displayed user interface such as a previous view of an application or a system user interface such as a home screen of the device, a multitasking user interface, or a virtual assistant user interface). Other aspects of configuring the haptics for home button activation are described in greater detail with reference to method 1900.

While displaying the home button configuration user interface, the device detects (1104) selection of a respective tactile output setting of the home button of the plurality of different tactile output settings (e.g., as shown in FIG. 5C13). While the respective tactile output setting for the home button is selected, the device detects (1105) a first input of the first type on the home button (e.g., as shown in FIG. 5C15).

In response to detecting the first input of the first type on the home button, the device determines whether the respective tactile output setting is a first or a second tactile output setting for the home button. In accordance with a determination that the respective tactile output setting is the first tactile output setting for the home button, the device provides (1106), via the one or more tactile output generators, a first tactile output that corresponds to the first tactile output setting (e.g., a first tactile output pattern such as MiniTap 230 Hz, as shown in FIG. 4L) for the home button without dismissing the home button configuration user interface (e.g., foregoing display of the home screen), as shown in FIG. 5C15. In accordance with a determination that the respective tactile output setting is the second tactile output setting, different from the first tactile output setting, for the home button, the device provides (1106), via the one or more tactile output generators, a second tactile output (distinct from the first tactile output (e.g., a second tactile output pattern such as MiniTap 270 Hz, as shown in FIG. 4N)) that corresponds to the second tactile output setting for the home button without dismissing the home button configuration user interface (e.g., foregoing display of the home screen), as shown in FIG. 5C9. In some embodiments, when the home button configuration user interface is displayed, the device suppresses operations that normally occur when the home button is activated (e.g., by a touch input), such as replacing display of the currently displayed screen with display of a home screen.

In some embodiments, in response to detecting the first input of the first type on the home button, the device also determines whether the respective tactile output setting is a third tactile output setting (different from the first and second tactile output settings). In accordance with a determination that the respective tactile output setting is the third tactile output setting, different from the first tactile output setting and the second tactile output setting, for the home button, the device provides (1108), via the one or more tactile output generators, a third tactile output (distinct from the first tactile output and the second tactile output (e.g., a third tactile output pattern such as MiniTap 300 Hz, as shown in FIG. 4P)) that corresponds to the third tactile output setting for the home button without dismissing the home button configuration user interface (e.g., foregoing display of the home screen), as shown in FIG. 5C12. In some embodiments, when the home button configuration user interface is displayed, the device suppresses operations that normally occur when the home button is activated (e.g., by a touch input), such as replacing display of the currently displayed screen with display of a home screen.

Turning now to FIG. 11B, in some embodiments, in response to detecting selection of the respective tactile output setting of the home button, the device presents (1110) a prompt requesting a user to provide an input of the first type on the home button (e.g., display a prompt to press the home button with displayed text such as "try it out"). For example, in FIG. 5C14, user interface 568 includes a prompt: "Press the Home button to try it."

In some embodiments, the first tactile output and the second tactile output have different frequencies and the same waveform (1112) (e.g., both the first and the second tactile outputs are MiniTaps, but with different frequencies (e.g., 230 Hz and 270 Hz, respectively, as shown in FIGS. 4L and 4N, respectively)).

In some embodiments, in response to detecting the first input of the first type on the home button: in accordance with a determination that the respective tactile output setting is the first tactile output setting for the home button, the device provides (1114) a first audio output concurrently with the first tactile output (e.g., as shown in FIGS. 5C15 and 4L); and, in accordance with a determination that the respective tactile output setting is the second tactile output setting for the home button, the device provides (1114) a second audio output concurrently with the second tactile output (e.g., as shown in FIGS. 5C9 and 4N). In some embodiments, the second audio output is distinct from the first audio output, and the second tactile output is different from the first tactile output (e.g., as shown in FIGS. 4N and 4L). In some embodiments, a specific tactile output is paired with a corresponding audio output, so when the tactile output is generated in a different context, the same corresponding audio output is generated with the tactile output (e.g., as shown in FIG. 4K).

In some embodiments, providing the first tactile output that corresponds to the first tactile output setting for the home button includes (1118) providing the first tactile output (e.g., a tactile output with the first tactile output pattern such as MiniTap 230 Hz with a gain of 1) in response to detecting a first portion of the first input of the first type (e.g., a down-click that corresponds to an increase of a characteristic intensity of a contact above a down-click intensity threshold (e.g., $IT_L$), as shown in FIG. 5C18 and the upper portion of FIG. 4L); and the device, in response to detecting the first input of the first type on the home button, in accordance with a determination that the respective tactile output setting is the first tactile output setting for the home button, provides, via the one or more tactile output generators, a first additional tactile output (e.g., an additional tactile output with a tactile output pattern such as MiniTap 230 Hz with a gain of 0.5, as shown in the bottom portion of FIG. 4L) in response to detecting a second portion of the first input of the first type (e.g., an up-click that corresponds to a decrease of the characteristic intensity of the contact below an up-click intensity threshold (e.g., $IT_L$ or another threshold intensity value (e.g., $IT_{LR}$) at a lower intensity than $IT_L$)). In some embodiments, the first tactile output and the first additional tactile output have different amplitudes and the same waveform (e.g., the haptic for the down-click is stronger than the haptic for the up-click, but both are MiniTaps). In some embodiments, the first additional tactile output (e.g., the haptic for the up-click, as shown in the bottom portion of FIG. 4L, for example) is 50% of the tactile gain and 50% of the audio gain of the first tactile output (e.g., the haptic for the down-click, as shown in the upper portion of FIG. 4L, for example).

In some embodiments, the device provides (1118) a first audio output concurrently with the first tactile output, in response to detecting the first portion of the first input of the first type; and the device provides (1118) a first additional audio output concurrently with the first additional tactile output, in response to detecting the second portion of the first input of the first type (e.g., as shown in FIG. 4L). In some embodiments, the first audio output and the first additional audio output have different amplitudes and the same waveform. In some embodiments, the amplitudes of the first audio output and the first additional audio output differ by a first amount, the amplitudes of the first tactile output and the first additional tactile output differ by a second amount, distinct from the first amount (1120). For example, in some embodiments, if the amplitude of the additional tactile output for the up-click of a click input is 90% of the amplitude of the tactile output for the down-click of the click input, the amplitude for the additional audio output for the up-click of the click input is 80% of the amplitude of the audio output for the down-click of the click input).

Turning now to FIG. 11C, in some embodiments, providing the second tactile output that corresponds to the second tactile output setting for the home button includes providing the second tactile output (e.g., a tactile output with a second tactile output pattern such as MiniTap 270 Hz with a gain of 1) in response to detecting a first portion of the first input of the first type (e.g., a down-click that corresponds to an increase of a characteristic intensity of a contact above a down-click intensity threshold (e.g., $IT_L$), as shown in FIG. 5C9 and the upper portion of FIG. 4N). In some embodiments, the device, in response to detecting the first input of the first type on the home button, in accordance with a determination that the respective tactile output setting is the second tactile output setting for the home button, provides (1122), via the one or more tactile output generators, a second additional tactile output (e.g., a tactile output with a tactile output pattern such as MiniTap 270 Hz with a gain of 0.5, as shown in the bottom portion of FIG. 4N) in response to detecting a second portion of the first input of the first type (e.g., an up-click that corresponds to a decrease of the characteristic intensity of the contact below an up-click intensity threshold (e.g., $IT_L$ or another threshold intensity value (e.g., $IT_{LR}$) at a lower intensity than $IT_L$)). In some embodiments, the second tactile output and the second additional tactile output have different amplitudes and the same waveform (e.g., the tactile output for the down-click is stronger than the tactile output for the up-click, but both are MiniTaps). In some embodiments, the second additional tactile output (e.g., the haptic for the up-click, as shown in the bottom portion of FIG. 4N, for example) is 50% of the tactile gain and 50% of the audio gain of the second tactile output (e.g., the haptic for the down-click, as shown in the upper portion of FIG. 4N, for example).

In some embodiments, in response to detecting selection of the respective tactile output setting of the home button: in accordance with a determination that the respective tactile output setting is the first tactile output setting for the home button, the device displays (1124) a first animated indication that includes movement of a representation of the first tactile output setting toward the home button, and in accordance with a determination that the respective tactile output setting is the second tactile output setting for the home button, the device displays (1124) a second animated indication that includes movement of a representation of the second tactile output setting toward the home button.

In some embodiments, the representation of the first tactile output setting and the representation of the second tactile output setting have the same shape as the home button (1126) (e.g., the representations of the tactile output settings and the home button are both circular). In some embodiments, the representations of the tactile output settings include a tip that points to the home button (e.g., as shown in FIG. 5C8).

In some embodiments, the first animated indication includes (1128) an animated representation of a first tactile output characteristic (e.g., first amplitude, frequency, waveform, number of cycles, and/or a combination of two or more of the above) associated with the first tactile output setting, and the second animated indication includes an animated representation of a second tactile output characteristic (e.g., second amplitude, frequency, waveform, number of cycles, and/or a combination of two or more of the above) associated with the second tactile output setting.

With reference now to FIG. 11D, in response to detecting the first input of the first type on the home button: in accordance with a determination that the respective tactile output setting is the first tactile output setting for the home button, the device changes (1130) an appearance of a representation of the first tactile output setting in the home button configuration user interface (e.g., show a flickering or a color change of the representation of the first tactile output setting (e.g., the button-shaped icon that represents the first tactile output setting)), and in accordance with a determination that the respective tactile output setting is the second tactile output setting for the home button, the device changes (1130) an appearance of a representation of the second tactile output setting in the home button configuration user interface (e.g., show a flickering or a color change of the representation of the second tactile output setting (e.g., the button-shaped icon that represents the second tactile output setting)).

In some embodiments, while displaying the home button configuration user interface, the device displays (1132) a first affordance (e.g., a "Done" icon, FIG. 5C16) that, when activated, causes dismissal of the home button configuration user interface (e.g., user interface 568, FIG. 5C16), and causes display of another user interface (e.g., the user interface that was displayed prior to displaying the home button configuration user interface) in place of the home button configuration user interface (e.g., user interface 562, FIG. 5C17).

In some embodiments, while displaying the home button configuration user interface and the first affordance, the device detects (1134) activation of the first affordance (e.g., as shown in FIG. 5C16). In response to detecting the activation of the first affordance, the device (1134): ceases to display the home button configuration user interface; and displays (1134) a respective user interface that is distinct from the home button configuration user interface (e.g., as shown in FIG. 5C17) (e.g., redisplaying a first user interface that was displayed immediate prior to displaying the home button configuration user interface such as a device settings user interface, or displaying a next user interface in a device set-up user interface sequence). While displaying the respective user interface, the device detects (1134) a second input of the first type on the home button (e.g., as shown in FIG. 5C18); and, in response to detecting the second input of the first type on the home button, the device (1134): ceases to display the respective user interface (e.g., the device settings user interface, or the next user interface in a device set up user interface sequence); displays (1134) a third user interface (e.g., the home screen, such as user interface 510, FIG. 5C19) that is distinct from the respective user interface; and provides (1134), via the one or more tactile output generators, a respective tactile output that corresponds to the respective tactile output setting for the home button that was selected at the time when the affordance was activated (e.g., providing the first tactile output (and, optionally, the first additional tactile output) if the first tactile output setting was selected (e.g., as shown in FIG. 5C18), providing the second tactile output (and, optionally, the second additional tactile output) if the second tactile output setting was selected, and providing the third tactile output (and, optionally, the third additional tactile output) if the third tactile output setting was selected).

In some embodiments, while the respective tactile output setting for the home button is selected, the device detects (1136) a first input of a second type on the home button (e.g., the first type is a single click input, and the second type is a double click input, a hard click input, or a long click input), the second type is distinct from the first type. In response to detecting the first input of the second type on the home button: in accordance with a determination that the respective tactile output setting is the first tactile output setting for the home button, the device provides (1136), via the one or more tactile output generators, the first tactile output that corresponds to the first tactile output setting for the home button without dismissing the home button configuration user interface (e.g., foregoing display of the home screen); and in accordance with a determination that the respective tactile output setting is the second tactile output setting for the home button, the device provides (1136), via the one or more tactile output generators, the second tactile output that corresponds to the second tactile output setting for the home button without dismissing the home button configuration user interface.

It should be understood that the particular order in which the operations in FIGS. 11A-11E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1300, 1500, 1700, and 1900) are also applicable in an analogous manner to method 1100 described above with respect to FIGS. 11A-11E. For example, the contacts, gestures, user interface objects, tactile outputs, audio outputs, intensity thresholds, time thresholds, focus selectors, and animations described above with reference to method 1100 optionally have one or more of the characteristics of the contacts, gestures, user interface objects, tactile outputs, audio outputs, intensity thresholds, time thresholds, focus selectors, and animations described herein with reference to other methods described herein (e.g., methods 700, 900, 1300, 1500, 1700, and 1900). For brevity, these details are not repeated here.

In accordance with some embodiments, FIG. 12 shows a functional block diagram of an electronic device 1200 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, the electronic device 1200, includes a display unit 1201 configured to display information (e.g., touch-sensitive display system 112 (also referred to as a touch screen and touch screen display), FIG. 1A), a touch-sensitive surface unit 1204 (e.g., display controller 156 and touch-sensitive display system 112, FIG. 1A) configured to receive contacts, gestures, and other user inputs on the touch screen display, optionally one or more sensor units 1206 configured to detect intensities of contacts with the touch-sensitive surface unit and/or a respective button of the device (e.g., a home button), one or more tactile output generating units 1207 for generating tactile outputs, and a processing unit 1208 coupled with the display unit 1202, the touch-sensitive surface unit 1204, and the optional one or more sensor units, and the one or more tactile output generating units. For ease of illustration, FIG. 12 shows display unit 1202 and touch-sensitive surface unit 1204 as integrated with electronic device 1200, however, in some embodiments one or both of these units are in communication with the electronic device, although the units remain physically separate from the electronic device (e.g., as shown and explained in reference to FIG. 3). In some embodiments, the processing unit includes a displaying unit (e.g., displaying unit 1210), an input detecting unit (e.g., input detecting unit 1212), a tactile output providing unit (e.g., tactile output providing unit 1214), and an audio output providing unit (e.g., audio output providing unit 1216).

In some embodiments, the processing unit (or one or more components thereof, such as the units 1210-1216) is configured to: display, on the display, a home button configuration user interface that includes displaying a plurality of different tactile output settings for the home button (e.g., with the displaying unit 1210), the home button being available on the device in a plurality of different contexts to dismiss a currently displayed user interface in response to detecting an input of a first type on the home button; while displaying the home button configuration user interface, detect selection of a respective tactile output setting of the home button of the plurality of different tactile output settings (e.g., with the input detecting unit 1212); while the respective tactile output setting for the home button is selected, detect a first input of the first type on the home button (e.g., with the input detecting unit 1212); and, in response to detecting the first input of the first type on the home button: in accordance with a determination that the respective tactile output setting is a first tactile output setting for the home button, provide, via the one or more tactile output generators, a first tactile output that corresponds to the first tactile output setting for the home button without dismissing the home button configuration user interface (e.g., with the tactile output providing unit 1214); and, in accordance with a determination that the respective tactile output setting is a second tactile output setting, different from the first tactile output setting, for the home button, provide, via the one or more tactile output generators, a second tactile output that corresponds to the second tactile output setting for the home button without dismissing the home button configuration user interface (e.g., with the tactile output providing unit 1214).

In some embodiments, the processing unit is configured to: in response to detecting the first input of the first type on the home button: in accordance with a determination that the respective tactile output setting is a third tactile output setting, different from the first tactile output setting and the second tactile output setting, for the home button, provide, via the one or more tactile output generators, a third tactile output that corresponds to the third tactile output setting for the home button without dismissing the home button configuration user interface (e.g., with the tactile output providing unit 1214).

In some embodiments, the processing unit is configured to: in response to detecting selection of the respective tactile output setting of the home button, present a prompt requesting a user to provide an input of the first type on the home button (e.g., with the displaying unit 1210).

In some embodiments, the first tactile output and the second tactile output have different frequencies and the same waveform.

In some embodiments, the processing unit is configured to: in response to detecting the first input of the first type on the home button: in accordance with a determination that the respective tactile output setting is the first tactile output setting for the home button, provide a first audio output concurrently with the first tactile output (e.g., with the audio output providing unit 1216); and, in accordance with a determination that the respective tactile output setting is the second tactile output setting for the home button, provide a second audio output concurrently with the second tactile output (e.g., with the audio output providing unit 1216).

In some embodiments, providing the first tactile output that corresponds to the first tactile output setting for the home button includes providing the first tactile output in response to detecting a first portion of the first input of the first type; and the processing unit is configured to, in response to detecting the first input of the first type on the home button, in accordance with a determination that the respective tactile output setting is the first tactile output setting for the home button, provide, via the one or more tactile output generators, a first additional tactile output in response to detecting a second portion of the first input of the first type (e.g., with the tactile output providing unit 1214).

In some embodiments, the processing unit is configured to: provide a first audio output concurrently with the first tactile output, in response to detecting the first portion of the first input of the first type (e.g., with the audio output providing unit 1216); and provide a first additional audio output concurrently with the first additional tactile output, in response to detecting the second portion of the first input of the first type (e.g., with the audio output providing unit 1216).

In some embodiments, the amplitudes of the first audio output the first additional audio output differ by a first amount, the amplitudes of the first tactile output and the first additional tactile output differ by a second amount, distinct from the first amount.

In some embodiments, providing the second tactile output that corresponds to the second tactile output setting for the home button includes providing the second tactile output in response to detecting a first portion of the first input of the first type; and the processing unit is configured to, in response to detecting the first input of the first type on the home button, in accordance with a determination that the respective tactile output setting is the second tactile output setting for the home button, provide, via the one or more tactile output generators, a second additional tactile output in response to detecting a second portion of the first input of the first type (e.g., with the tactile output providing unit 1214).

In some embodiments, the processing unit is configured to: in response to detecting selection of the respective tactile output setting of the home button: in accordance with a determination that the respective tactile output setting is the first tactile output setting for the home button, display a first animated indication that includes movement of a representation of the first tactile output setting toward the home button (e.g., with the displaying unit 1210), and in accordance with a determination that the respective tactile output setting is the second tactile output setting for the home button, display a second animated indication that includes movement of a representation of the second tactile output setting toward the home button (e.g., with the displaying unit 1210).

In some embodiments, the representation of the first tactile output setting and the representation of the second tactile output setting have the same shape as the home button.

In some embodiments, the first animated indication includes an animated representation of a first tactile output characteristic associated with the first tactile output setting, and the second animated indication includes an animated representation of a second tactile output characteristic associated with the second tactile output setting.

In some embodiments, the processing unit is configured to: in response to detecting the first input of the first type on the home button: in accordance with a determination that the respective tactile output setting is the first tactile output setting for the home button, change an appearance of a representation of the first tactile output setting in the home button configuration user interface (e.g., with the displaying unit 1210), and in accordance with a determination that the respective tactile output setting is the second tactile output setting for the home button, change an appearance of a representation of the second tactile output setting in the home button configuration user interface (e.g., with the displaying unit 1210).

In some embodiments, the processing unit is configured to: while displaying the home button configuration user interface, display a first affordance that, when activated, causes dismissal of the home button configuration user interface, and causes display of another user interface in place of the home button configuration user interface (e.g., with the displaying unit 1210).

In some embodiments, the processing unit is configured to: while displaying the home button configuration user interface and the first affordance, detect activation of the first affordance; and in response to detecting the activation of the first affordance: cease to display the home button configuration user interface (e.g., with the displaying unit 1210); and display a respective user interface that is distinct from the home button configuration user interface (e.g., with the displaying unit 1210); while displaying the respective user interface, detect a second input of the first type on the home button (e.g., with the input detecting unit 1212); and, in response to detecting the second input of the first type on the home button: cease to display the respective user interface (e.g., with the displaying unit 1210); display a third user interface that is distinct from the respective user interface (e.g., with the displaying unit 1210); and provide, via the one or more tactile output generators, a respective tactile output that corresponds to the respective tactile output setting for the home button that was selected at the time when the affordance was activated (e.g., with the tactile output providing unit 1214).

In some embodiments, the processing unit is configured to: while the respective tactile output setting for the home button is selected, detect a first input of a second type on the home button, the second type is distinct from the first type; and, in response to detecting the first input of the second type on the home button: in accordance with a determination that the respective tactile output setting is the first tactile output setting for the home button, provide, via the one or more tactile output generators, the first tactile output that corresponds to the first tactile output setting for the home button without dismissing the home button configuration user interface (e.g., with the tactile output providing unit 1214); and in accordance with a determination that the respective tactile output setting is the second tactile output setting for the home button, provide, via the one or more tactile output generators, the second tactile output that corresponds to the second tactile output setting for the home button without dismissing the home button configuration user interface (e.g., with the tactile output providing unit 1214).

The operations in the information processing methods described above are, optionally implemented by running one or more functional modules in information processing apparatus such as general purpose processors (e.g., as described above with respect to FIGS. 1A and 3) or application-specific chips.

The operations described above with reference to FIGS. 11A-11E are, optionally, implemented by components depicted in FIGS. 1A-1B or FIG. 12. For example, displaying operation 1102, detection operation 1104, detection operation 1105, and responding operation 1106 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 13A-13D are flow diagrams illustrating a method 1300 of controlling user interface haptics and home button haptics in accordance with some embodiments. The method 1300 is performed at an electronic device (e.g., device 300, FIG. 3, or portable multifunction device 100, FIG. 1A) with a display, a touch-sensitive surface, and one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. In some embodiments, the device includes one or more sensors to detect intensities of contacts with a home button of the device (e.g., a physical home button or a virtual home button). In some embodiments, the method 1300 is governed by instructions that are stored in a computer-readable storage medium (e.g., a non-transitory computer readable storage medium) and that are executed by one or more processors of the electronic device, such as the one or more processors 122 of device 100 (FIG. 1A). For ease of explanation, the following describes method 1300 as performed by the device 100. Some operations in method 1300 are, optionally, combined and/or the order of some operations is, optionally, changed.

As described below, method 1300 relates to separately controlling haptic feedback generation for user interface events and haptic feedback generation for activation of a persistent button (e.g., a virtual home button or a non-mechanical home or back button) on a device, such that when haptic feedback generation is disabled for user interface events on the device via a tactile output setting (e.g., an on/off toggle for tactile output generation), the haptic feedback generation for activation of the persistent button remains enabled. By allowing such separate control, the haptic feedback for activation of the persistent button is not inadvertently disabled by a user when the user merely wishes to turn off the user interface haptic feedback, thus avoiding user confusion and avoiding reduction of the operability and efficiency of human-machine interface of the device due to the user confusion. Furthermore, this separate control also allows the user to freely disable general user interface haptic feedback in the interest of saving battery power and reduce distractions due to unnecessary haptics feedback in certain contexts, without the fear of compromising the useful haptic feedback associated with activation of the persistent button (which may or may not be accompanied by a visual change in the user interface).

In some embodiments, the device provides a tactile output control setting (e.g., Sounds and Haptics Setting) that allows the user to turn on and turn off user interface tactile output generation at the device.

In general, the device generates user interface tactile output of various types in response to direct interactions with a user interface element, e.g., selection, manipulation, drag/drop, and/or activation of the user interface element through a focus selector (e.g., a mouse pointer or contact) that is placed in proximity to the user interface element when a user input is detected. The user interface tactile outputs are generally accompanied by visual changes in the user interface. For example, in some embodiments, the device provides a tactile output (e.g., a MicroTap (150 Hz)) in response to an input that picks up an item in a user interface (e.g., a long press input by a sustained contact at a location that corresponds to the item), and the user interface shows the object jumping up toward the surface of the display and the tactile output is timed to coincide with the end of the movement of the object. In addition to user interface tactile outputs, the device also generates outputs in response to activation of a persistent button (e.g., a virtual home button or a non-mechanical home or back button) on the device. The activation of the button may or may not be accompanied with corresponding visual changes in the user interface. For example, in response to a press input on a home button, the device generates a tactile output and dismisses a currently displayed user interface and displays the home screen. In response to another press input on the home button, the device generates a tactile output for the button press, but continues to display the home screen. Therefore, in some contexts, the device allows the user to turn off user interface tactile outputs, e.g., to conserve power or reduce distraction. However, the device also prevents the user from inadvertently turning off the tactile output generation for the persistent button when the user merely wishes to turn off the user interface tactile outputs.

In some embodiments, the device provides non-visual feedback that includes both an audio output component and a tactile output component. Certain types of audio outputs are paired with visual changes in the user interface or exist independent of any visual changes in the user interface. For example, audio alerts, ringtones, music clips, can be played independent of tactile outputs, and serve to alert the user of some changes in the user interface or the state of the device. In some embodiments, the device generates certain audio outputs that are specifically tied to and enhance or supplement a tactile output. These types of audio outputs are referred to as "haptic audio outputs" herein. In some embodiments, a non-visual feedback profile includes a tactile output pattern for a tactile output and an audio output pattern for a haptic audio output that accompanies the tactile output to invoke certain haptic sensations in a user. The interplay between the frequencies, amplitudes, waveforms, and/or timings of the haptic audio output and the corresponding tactile output creates a richer and more nuanced haptic sensation in the user, and makes the non-visual feedback more salient to the user. In some contexts, the device allows the user to control the generation of haptic audio output (e.g., the haptic audio outputs that correspond to user interface tactile outputs, and/or the haptic audio outputs that correspond to the button tactile outputs) using the general volume control and/or mute control, e.g., to conserve power or reduce distraction. However, the device also prevents the user from inadvertently turning off the haptic audio for device tactile outputs (e.g., the audio that accompanies the tactile outputs for activation of the persistent button).

With reference to FIG. 13A, the device displays (1302), on the display, a first user interface. In some embodiments, while display of the first user interface is maintained, detection of inputs remains enabled for the first user interface and for a home button of the device. In some embodiments, the home button is available on the device (e.g., persistently displayed at a respective location or located at a persistent location on the device that is separate from the display) in a plurality of different contexts to dismiss a currently displayed user interface in response to detecting an input of a first type (e.g., a press input or a press and release input that is detected via the depression of a mechanical switch or by comparing an intensity of a contact on the home button to activation criteria that are based on one or more intensity thresholds as described above in greater detail with reference to methods 700, 900, 1500, and 1700) on the home button (e.g., and, optionally, redisplay a previously displayed user interface such as a previous view of an application, or a system user interface such as a home screen of the device, a multitasking user interface, or a virtual assistant user interface). Other aspects of configuring the haptics for home button activation are described in greater detail with reference to methods 1100 and 1900.

While displaying the first user interface, the device detects (1304) a first input of a first type directed to the first user interface (e.g., a press input by a contact at a location on the touch-sensitive display that corresponds to an activatable object or activatable portion in the first user interface).

In response to detecting the first input of the first type (e.g., a press input that includes a press down input followed by a release input) directed to the first user interface, the device determines whether user interface tactile outputs are enabled at the electronic device (e.g., based on tactile output toggle control setting 675 in FIGS. 6A1 and 6B1). In accordance with a determination that user interface tactile outputs are enabled at the electronic device (e.g., the haptics toggle setting or tactile output toggle setting for the electronic device is on, as shown in FIG. 6A1), the device performs (1306) a first operation and provides, via the one or more tactile output generator, a first tactile output that corresponds to the first operation. For example, as shown in FIGS. 6A4-6A8, tactile outputs are generated in conjunction with displaying quick action menu 608 and moving through each menu option in the quick action menu in response to an input by contact 604. In another example, in FIGS. 6A11-6A18, tactile outputs are generated in conjunction with displaying preview 628 and moving past a hidden threshold for archiving an e-mail message in response to an input by contact 624. In another example, in FIGS. 6A18-6A22, tactile outputs are generated in conjunction with displaying preview 640 and displaying content displaying user interface 644 in response to an input by contact 636.

In accordance with a determination that user interface tactile outputs are disabled (e.g., a haptics toggle setting or tactile output toggle setting for the electronic device is off), the device performs (1306) the first operation, and forgoes providing at least a portion of the first tactile output (e.g., the first tactile output optionally includes one or more discrete tactile outputs that are generated in conjunction with user interface changes that correspond to different portions of the input) that corresponds to the first operation. For example, as shown in FIGS. 6B4-6B8, device forgoes generation of tactile output in conjunction with moving through each menu option in the quick action menu 608 in response to an input by contact 605. In another example, in FIGS. 6B11-6B18, the device forgoes generation of tactile output in conjunction with moving past a hidden threshold for archiving an e-mail message in response to an input by contact 625.

After performing the first operation (and without altering the enabled/disabled status of user interface tactile outputs on the device), the device detects (1308) a second input of the first type (e.g., a single click that includes a press down input followed by a release input) on the home button (e.g., home button 650 in FIGS. 6A25 and 6B25). In response to detecting the second input of the first type on the home button, the device performs (1310) a second operation that is associated with the home button (e.g., dismissing the first application and displaying a home screen, multitasking user interface, or virtual assistant user interface) and provides, via the one or more tactile output generators, tactile output that is associated with activation of the home button (e.g., a down-click tactile output and/or an up-click tactile output), without regard to whether or not user interface tactile outputs are enabled at the device (e.g., the generation of the tactile output associated with pressing the home button is independent of the haptics toggle setting or tactile output toggle setting). For example, the device generates a tactile output in conjunction with activation of home button 650 in FIGS. 6A25-6A26 and FIGS. 6B25-6B26, regardless of the on/off status of the user interface tactile output setting 674 in FIGS. 6A1 and 6B1.

Turning now to FIG. 13B, in some embodiments, the first user interface is a user interface of a first application, the first operation is (1312) an operation of the first application, and the second operation includes dismissing the first application (e.g., suspending or exiting the first application, and displaying the home screen in place of the user interface of the first application or displaying a previously displayed user interface in place of the first application). For example, the first operation is for presenting preview 640 in the Mail application, and/or presenting content display user interface 644 in the Mail application, and the second operation is dismissing the user interface of the Mail application and displaying the home screen in place of the user interface of the Mail application, as shown in FIGS. 6A19-6A26 and FIGS. 6B19-6B26.

In some embodiments, after performing the first operation (and without altering the enabled/disabled status of user interface tactile outputs on the device), the device detects (1314) a first input of a second type (e.g., a double click (e.g., with at least two down-clicks separated by one up-click)), distinct from the first type, on the home button. In response to detecting the first input of the second type on the home button, the device performs a third operation (distinct from the second operation) that is associated with the home button (e.g., dismissing the currently displayed user interface, and displaying the multitasking user interface). In response to detecting the first input of the second type on the home button, the device also provides, via the one or more tactile output generators, tactile output that is associated with activation of the home button (e.g., a first down-click tactile output and/or a first up-click tactile output followed by a second down-click tactile output and/or a second up-click tactile output), without regard to whether or not user interface tactile outputs are enabled at the electronic device (e.g., the generation of the tactile output associated with pressing the home button is independent of the haptics toggle setting). In some embodiments, the tactile outputs for the inputs of the first type and the tactile outputs for inputs of the second type are different, e.g., have different tactile output patterns, or different numbers of discrete tactile outputs, etc.

In some embodiments, after performing the first operation (and without altering the enabled/disabled status of user interface tactile outputs on the device), the device detects (1316) a first input of a third type (e.g., a long click (e.g., with one down-click that is held for at least a threshold amount of time)), distinct from the first type (and the second type), on the home button. In response to detecting the first input of the third type on the home button, the device performs a fourth operation, distinct from the second operation (and the third operation), that is associated with the home button (e.g., dismissing the currently displayed user interface, and displaying the virtual assistant user interface). In response to detecting the first input of the third type on the home button, the device also provides, via the one or more tactile output generators, tactile output that is associated with activation of the home button (e.g., a first down-click tactile output), without regard to whether or not user interface tactile outputs are enabled at the electronic device (e.g., the generation of the tactile output associated with pressing the home button is independent of the haptics toggle setting or the tactile output toggle setting).

In some embodiments, the first tactile output (and other tactile outputs for user interface interactions) and the tactile output that is associated with activation of the home button (and other tactile outputs for home button interactions) are provided (1318) by the same one or more actuators of the one or more tactile output generators.

In some embodiments, a tactile output pattern of a corresponding tactile output that is provided in response to a respective input of the first type on the home button is user-adjustable (1320) (e.g., by software instructions in accordance with a home button tactile output setting selected in a home button configuration user interface).

With reference now to FIG. 13C, in some embodiments, in response to detecting the second input of the first type on the home button, the device provides (1322) an audio output with the tactile output that is associated with activation of the home button, without regard to whether or not user interface tactile outputs are enabled, and without regard to whether or not audio outputs are muted at the device. For example, in some embodiments, in the scenarios shown in FIGS. 6A25 and 6A26, the device generates haptic audio outputs to accompany the tactile outputs to indicate activation of the home button, without regard to the audio output mute/unmute setting of the device. In some embodiments, tactile outputs are accompanied by corresponding audio outputs to provide richer texture and differentiation between the feedback for different types of inputs and user interface responses. The audio outputs that correspond to the home button tactile outputs are optionally not controlled by the audio control setting (e.g., mute/unmute control, and/or volume control) on the device, such that the user would not inadvertently alter carefully designed pairings between the tactile outputs and corresponding audio outputs for the home button. By providing haptic feedback audio even when general device audio output has been disabled (e.g., simulating the audio feedback that the user would expect from activation of a hardware button), the operability and efficiency of the device is improved, e.g., through reduction of unintended results, and user mistakes when operating/interacting with the device, which additionally, reduces power usage and improves battery life of the device. Home button haptic audio output patterns and corresponding tactile output patterns are described in greater detail with reference to FIGS. 4H and 4Q, for example.

In some embodiments, in response to detecting the second input of the first type on the home button, the device provides (1324) an audio output with the tactile output that is associated with activation of the home button, without regard to whether or not user interface tactile outputs are enabled, and a volume of the audio output is independent of a current volume setting at the device. For example, in some embodiments, in the scenarios shown in FIGS. 6A25 and 6A26, the device generates haptic audio outputs to accompany the tactile outputs to indicate activation of the home button, without regard to the audio output volume setting of the device. In some embodiments, tactile outputs are accompanied by corresponding audio outputs to provide richer texture and differentiation between the feedback for different types of inputs and user interface responses. The volume of the audio outputs that correspond to tactile outputs are not controlled by the volume control on the device, such that the user would not inadvertently alter the carefully designed pairings between the tactile outputs and corresponding audio outputs with the appropriate amplitudes. By decoupling the control of the haptic feedback audio volume from the control of the volume of general device audio (e.g., simulating the audio feedback that the user would expect from activation of a hardware button), the operability and efficiency of the device is improved, e.g., through reduction of unintended results, and user mistakes when operating/interacting with the device, which additionally, reduces power usage and improves battery life of the device. Home button haptic audio output patterns and corresponding tactile output patterns are described in greater detail with reference to FIGS. 4H and 4Q, for example.

In some embodiments, in response to detecting the first input of the first type directed to the first user interface and in accordance with a determination that user interface tactile outputs are enabled (e.g., the haptics toggle setting or tactile output toggle setting for the electronic device is on), the device determines whether audio outputs are muted at the device. In accordance with a determination that audio outputs are not muted at the device, the device provides (1326) an audio output with the first tactile output. In accordance with a determination that audio outputs are muted at the device, the device forgoes providing the audio output with the first tactile output. For example, in some embodiments, in the scenarios shown in FIGS. 6A1-6A8 and 6A9-6A17, the device generates haptic audio outputs to accompany the tactile outputs to indicate activation of the home button only if the audio output is not muted at the device. In some embodiments, tactile outputs are accompanied by corresponding audio outputs to provide richer texture and differentiation between the feedback for different types of inputs and user interface responses. When the user interface tactile outputs are enabled, as audio outputs are not the only means for providing feedback for interactions with the user interface, allowing the user to turn off the haptics audio via the general audio mute toggle setting saves battery power without seriously impact performance and operability of the device.

In some embodiments, in response to detecting the first input of the first type directed to the first user interface and in accordance with a determination that user interface tactile outputs are enabled (e.g., the haptics toggle setting or tactile output toggle setting for the electronic device is on), the device determines a level at which audio outputs are currently set. In accordance with a determination that audio outputs set to a first level at the device, the device provides (1328) an audio output with the first tactile output at a first volume and is determined based on the first level of the audio outputs at the device. In accordance with a determination that audio outputs are set to a second level at the device, providing the audio output with the first tactile output at a second volume that is different from the first volume and is determined based on the second level of the audio outputs at the device. For example, in some embodiments, in the scenarios shown in FIGS. 6A1-6A8 and 6A9-6A17, the device generates haptic audio outputs to accompany the tactile outputs to indicate activation of the home button, and the amplitude of the haptic audio outputs are adjusted in accordance with a current volume setting at the device. In some embodiments, tactile outputs are accompanied by corresponding audio outputs to provide richer texture and differentiation between the feedback for different types of inputs and user interface responses. When the user interface tactile outputs are enabled, allowing the user some control over how loud or faint haptic audio outputs are played allow the user to tailor the feedback to his/her particular preference, thus improving the performance and operability of the device.

Turning now to FIG. 13D, in some embodiments, in response to detecting the first input of the first type directed to the first user interface and in accordance with a determination that user interface tactile outputs are disabled (e.g., the haptics toggle setting for the electronic device is off), the device forgoes providing (1330) the audio output with the first tactile output, without regard to whether or not audio outputs are muted at the device. For example, in some embodiments, in the scenarios shown in FIGS. 6B1-6B8, 6B9-6B17, and 6B20-6B23, the device does not generate haptic audio outputs to accompany the tactile outputs that are generated in conjunction with displaying quick action menu 608 (FIG. 6B4), preview 628 (FIG. 6B13), preview 640 (FIG. 6B22), and user interface 644 (FIG. 6B23) regardless of whether audio output is muted at the device.

In some embodiments, in response to detecting the first input of the first type directed to the first user interface and in accordance with a determination that user interface tactile outputs are disabled (e.g., the haptics toggle setting for the electronic device is off), the device providing (1330) the audio output with the first tactile output, without regard to whether or not audio outputs are muted at the device. For example, in some embodiments, in the scenarios shown in FIGS. 6B1-6B8, 6B9-6B17, and 6B20-6B23, the device generates haptic audio outputs to accompany the tactile outputs that are generated in conjunction with displaying quick action menu 608 (FIG. 6B4), preview 628 (FIG. 6B13), preview 640 (FIG. 6B22), and user interface 644 (FIG. 6B23) regardless of whether audio output is muted at the device.

In some embodiments, in response to detecting the first input of the first type directed to the first user interface: in accordance with a determination that user interface tactile outputs are disabled and in accordance with a determination that the first operation is a predefined exempted operation (e.g., a peek and pop operations, or quick action menu presentation on the home screen that are triggered based on intensity-dependent input criteria), the device provides (1332) the first tactile output that corresponds to the first operation with the one or more tactile output generators. For example, in some embodiments, in the scenarios shown in FIGS. 6B1-6B8, 6B9-6B17, and 6B20-6B23, the device generates tactile outputs in conjunction with displaying quick action menu 608 (FIG. 6B4), preview 628 (FIG. 6B13), preview 640 (FIG. 6B22), and user interface 644 (FIG. 6B23) even when user interface tactile outputs are disabled at the device, because displaying the quick action menus and previews and content user interface in response to a force press (e.g., a press input with contact intensity above the light press intensity threshold $IT_L$ or deep press intensity threshold $IT_D$ are exempted from control by the user interface tactile output setting).

In some embodiments, in response to detecting the first input of the first type directed to the first user interface and in accordance with a determination that user interface tactile outputs are disabled, the device determines whether the first operation is a first type of predefined operation and/or a second type of predefined operation. In accordance with a determination that the first operation is the first type of predefined operation (e.g., a peek and pop operations, or quick action menu presentation on the home screen that are triggered based on intensity-dependent input criteria), the device provides (1334) the first tactile output that corresponds to the first operation with the one or more tactile output generators. In accordance with a determination that the first operation is the second type of predefined operation (e.g., moving focus between different options in a quick action menu displayed in response to an increase in intensity of the contact on the touch-sensitive surface above a respective intensity threshold, or indicating the satisfaction of triggering criteria for triggering an operation associated with a content preview that was displayed in response to detecting an increase in intensity of a contact on the touch-sensitive surface above a respective intensity threshold), the device performs the first operation and without providing tactile output that corresponds to the first operation with the one or more tactile output generators. For example, in FIGS. 6B2-6B8, tactile output is provided in conjunction with displaying quick action menu 608 in response to a press input by contact 605, and tactile outputs are skipped in conjunction with moving through each menu option in the quick action menu in response to a swipe input by contact 605. In accordance with a determination that user interface tactile outputs are enabled, (e.g., the haptics toggle setting for the electronic device is on) the device performs the first operation and provides the first tactile output that corresponds to the first operation with the one or more tactile output generators, without regard to whether the first operation is of the first type of predefined operation or the second type of predefined operation. For example, in FIGS. 6A2-6A8, tactile output is provided in conjunction with displaying quick action menu 608 in response to a press input by contact 605, and tactile outputs are also generated in conjunction with moving through each menu option in the quick action menu in response to a swipe input by contact 605.

It should be understood that the particular order in which the operations in FIGS. 13A-13D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1500, 1700, and 1900) are also applicable in an analogous manner to method 1300 described above with respect to FIGS. 13A-13D. For example, the contacts, gestures, user interface objects, tactile outputs, haptic audio outputs, intensity thresholds, timing criteria, focus selector, animations, and configurations described above with reference to methods 700, 900, 1100, 1500, 1700, and 1900 optionally have one or more of the characteristics of the contacts, gestures, user interface objects, tactile outputs, haptic audio outputs, intensity thresholds, timing criteria, focus selector, animations, and configurations described herein with reference to other methods described herein (e.g., methods 1300). For brevity, these details are not repeated here.

In accordance with some embodiments, FIG. 14 shows a functional block diagram of an electronic device 1400 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein.

As shown in FIG. 14, the electronic device 1400, includes a display unit 1401 configured to display information (e.g., touch-sensitive display system 112 (also referred to as a touch screen and touch screen display), FIG. 1A), a touch-sensitive surface unit 1404 (e.g., display controller 156 and touch-sensitive display system 112, FIG. 1A) configured to receive contacts, gestures, and other user inputs on the touch screen display, optionally one or more sensor units 1406 configured to detect intensities of contacts with the touch-sensitive surface unit and/or a respective button of the device (e.g., a home button), one or more tactile output generating units 1407 for generating tactile outputs, and a processing unit 1408 coupled with the display unit 1402, the touch-sensitive surface unit 1404, the optional one or more sensor units 1406, and the one or more tactile output generating units 1407. For ease of illustration, FIG. 14 shows display unit 1402 and touch-sensitive surface unit 1404 as integrated with electronic device 1400, however, in some embodiments one or both of these units are in communication with the electronic device, although the units remain physically separate from the electronic device (e.g., as shown and explained in reference to FIG. 3). In some embodiments, the processing unit includes a displaying unit (e.g., displaying unit 1410), an input detecting unit (e.g., input detecting unit 1412), an operation performing unit (e.g., operation performing unit 1414), a tactile output providing unit (e.g., tactile output providing unit 1416), an audio output providing unit (e.g., audio output providing unit 1418).

In some embodiments, the processing unit (or one or more components thereof, such as the units 1410-1418) is configured to: display, on the display, a first user interface (e.g., with the displaying unit 1410), and a home button is available on the device in a plurality of different contexts to dismiss a currently displayed user interface in response to detecting an input of a first type on the home button; while displaying the first user interface, detect a first input of the first type directed to the first user interface (e.g., with the input detecting unit 1412); in response to detecting the first input of the first type directed to the first user interface: in accordance with a determination that user interface tactile outputs are enabled at the electronic device, perform a first operation (e.g., with the operation performing unit 1414) and provide via the one or more tactile output generators, a first tactile output that corresponds to the first operation (e.g., with the tactile output providing unit 1416); in accordance with a determination that user interface tactile outputs are disabled, perform the first operation (e.g., with the operation performing unit 1414), and forgo providing at least a portion of the first tactile output that corresponds to the first operation; after performing the first operation, detect a second input of the first type on the home button; and in response to detecting the second input of the first type on the home button: perform a second operation that is associated with the home button (e.g., with the operation performing unit 1414); and provide, via the one or more tactile output generators, tactile output that is associated with activation of the home button (e.g., with the tactile output providing unit 1416), without regard to whether or not user interface tactile outputs are enabled at the device.

In some embodiments, the first user interface is a user interface of a first application, the first operation is an operation of the first application, and the second operation includes dismissing the first application.

In some embodiments, the processing unit is configured to: after performing the first operation, detect a first input of a second type, distinct from the first type, on the home button (e.g., with the input detecting unit 1412); and in response to detecting the first input of the second type on the home button: perform a third operation, distinct from the second operation, that is associated with the home button (e.g., with the operation performing unit 1414); and provide, via the one or more tactile output generators, tactile output that is associated with activation of the home button (e.g., with the tactile output providing unit 1416), without regard to whether or not user interface tactile outputs are enabled at the electronic device.

In some embodiments, the processing unit is configured to: after performing the first operation, detect a first input of a third type, distinct from the first type, on the home button (e.g., with the input detecting unit 1412); and in response to detecting the first input of the third type on the home button: perform a fourth operation, distinct from the second operation, that is associated with the home button (e.g., with the operation performing unit 1414); and provide, via the one or more tactile output generators, tactile output that is associated with activation of the home button, without regard to whether or not user interface tactile outputs are enabled at the electronic device (e.g., with the tactile output providing unit 1416).

In some embodiments, the first tactile output and the tactile output that is associated with activation of the home button are provided by the same one or more actuators of the one or more tactile output generators.

In some embodiments, a tactile output pattern of a corresponding tactile output that is provided in response to a respective input of the first type on the home button is user-adjustable.

In some embodiments, the processing unit is configured to: in response to detecting the second input of the first type on the home button, provide an audio output with the tactile output that is associated with activation of the home button (e.g., with the audio output providing unit 1418), without regard to whether or not user interface tactile outputs are enabled, and without regard to whether or not audio outputs are muted at the device.

In some embodiments, the processing unit is configured to: in response to detecting the second input of the first type on the home button, provide an audio output with the tactile output that is associated with activation of the home button (e.g., with the audio output providing unit 1418), without regard to whether or not user interface tactile outputs are enabled, wherein a volume of the audio output is independent of a current volume setting at the device.

In some embodiments, the processing unit is configured to: in response to detecting the first input of the first type directed to the first user interface: in accordance with a determination that user interface tactile outputs are enabled: in accordance with a determination that audio outputs are not muted at the device, provide an audio output with the first tactile output (e.g., with the audio output providing unit 1418); and in accordance with a determination that audio outputs are muted at the device, forgo providing the audio output with the first tactile output.

In some embodiments, the processing unit is configured to: in response to detecting the first input of the first type directed to the first user interface: in accordance with a determination that user interface tactile outputs are enabled: in accordance with a determination that audio outputs are set to a first level at the device, provide an audio output with the first tactile output at a first volume that is determined based on the first level of the audio outputs at the device (e.g., with the audio output providing unit 1418); and in accordance with a determination that audio outputs are set to a second level at the device, provide the audio output with the first tactile output at a second volume that is different from the first volume and is determined based on the second level of the audio outputs at the device (e.g., with the audio output providing unit 1418).

In some embodiments, the processing unit is configured to: in response to detecting the first input of the first type directed to the first user interface: in accordance with a determination that user interface tactile outputs are disabled, forgo providing the audio output with the first tactile output, without regard to whether or not audio outputs are muted at the device.

In some embodiments, the processing unit is configured to: in response to detecting the first input of the first type directed to the first user interface: in accordance with a determination that user interface tactile outputs are disabled and in accordance with a determination that the first operation is a predefined exempted operation, provide the first tactile output that corresponds to the first operation with the one or more tactile output generators.

In some embodiments, the processing unit is configured to: in response to detecting the first input of the first type directed to the first user interface: in accordance with a determination that user interface tactile outputs are disabled: in accordance with a determination that the first operation is a first type of predefined operation, provide the first tactile output that corresponds to the first operation with the one or more tactile output generators (e.g., with the tactile output providing unit 1416); and in accordance with a determination that the first operation is a second type of predefined operation, perform the first operation and without providing tactile output that corresponds to the first operation with the one or more tactile output generators (e.g., with the operation performing unit 1414); and in accordance with a determination that user interface tactile outputs are enabled, perform the first operation (e.g., with the operation performing unit 1414) and provide the first tactile output that corresponds to the first operation with the one or more tactile output generators (e.g., with the tactile output providing unit 1416), without regard to whether the first operation is of the first type of predefined operation or the second type of predefined operation.

The operations in the information processing methods described above are, optionally implemented by running one or more functional modules in information processing apparatus such as general purpose processors (e.g., as described above with respect to FIGS. 1A and 3) or application-specific chips.

The operations described above with reference to FIGS. 13A-13D are, optionally, implemented by components depicted in FIGS. 1A-1B or FIG. 14. For example, displaying operation 1302, detection operation 1304, responding operation 1306, detection operation 1308, and responding operation 1310 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 15A-15E are flow diagrams illustrating a method 1500 of generating tactile outputs with different tactile output patterns depending on an input-based metric or a user interface-based metric in accordance with some embodiments. The method 1500 is performed at an electronic device (e.g., device 300, FIG. 3, or portable multifunction device 100, FIG. 1A) with a display, a touch-sensitive surface, and one or more sensors to detect intensities of contacts with the touch-sensitive surface and/or a respective button of the device (e.g., a virtual or physical home button). In some embodiments, the display is a touch-screen display and the touch-sensitive surface is on or integrated with the display. In some embodiments, the display is separate from the touch-sensitive surface. In some embodiments, the device includes one or more tactile output generators for generating tactile outputs. In some embodiments, the device includes one or more sensors to detect intensities of contacts with a home button of the device (e.g., a physical home button or a virtual home button). In some embodiments, the method 1500 is governed by instructions that are stored in a computer-readable storage medium (e.g., a non-transitory computer readable storage medium) and that are executed by one or more processors of the electronic device, such as the one or more processors 122 of device 100 (FIG. 1A). For ease of explanation, the following describes method 1500 as performed by the device 100. Some operations in method 1500 are, optionally, combined and/or the order of some operations is, optionally, changed.

Method 1500 relates to generating tactile outputs with different tactile output patterns depending on an input-based metric or a user interface-based metric. The tactile output pattern of a tactile output (e.g., amplitude, waveform, and/or frequency) is selected based on metrics such as a rate of change in intensity of a contact when crossing an intensity threshold, a speed of movement of a focus selector or user interface element, when the focus selector or user interface element crosses a threshold position in a user interface, etc.

By tying the tactile output pattern of a tactile output more closely to the characteristics of the user input and/or the visual changes in the user interface (as measured by the input-based and/or user interface-based metrics), the feedback provided by the device becomes more intuitive and conforms better to user expectation. The improved feedback to the user enhances the operability of the device (e.g., by conforming to user expectation and avoiding user confusion when interacting with the device) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

With reference to FIG. 15A, the device displays (1502) a user interface on the display (e.g., user interface 524, FIG. 5B62). While displaying the user interface, the device detects (1504) an input sequence (e.g., a press input or a press and hold input, or a press input followed by a release input) on the home button that includes detecting a first press input on the home button, and detecting the first press input includes detecting an increase in a characteristic intensity of a contact on the home button (e.g., as shown in FIGS. 5B62-5B63).

In response to detecting the first press input on the home button (1506): in accordance with a determination that the first press input includes an increase in the characteristic intensity of the contact above a first intensity threshold (e.g., $IT_L$, FIG. 5B63), and that a change in the characteristic intensity of the contact proximate to a time when the characteristic intensity of the contact increases above the first intensity threshold (e.g., an amount of change in the characteristic intensity of the contact that has occurred during a predetermined time window starting from, or ending at, or including the time when the characteristic intensity of the contact increases above the first intensity threshold) has a first value for an intensity-change metric (e.g., as shown in FIG. 5B63), the device: performs a first operation that changes the user interface displayed on the display (e.g., changes user interface 524 in FIG. 5B63 to user interface 522 in FIG. 5B70); and generates, via the one or more tactile output generators, a first discrete tactile output that corresponds to the increase in the characteristic intensity of the contact above the first intensity threshold (e.g., tactile output 590 (e.g., MiniTap 270 Hz with a gain of 0.5), FIG. 5B63).

In response to detecting the first press input on the home button (1506): in accordance with a determination that the first press input includes an increase in the characteristic intensity of the contact above the first intensity threshold (e.g., $IT_L$, FIG. 5B67), and that the change in the characteristic intensity of the contact proximate to the time when the characteristic intensity of the contact increases above the first intensity threshold has a second value for the intensity-change metric (e.g., as shown in FIG. 5B67), different from the first value of the intensity-change metric (e.g., as shown in FIG. 5B63), the device performs the first operation that changes the user interface displayed on the display (e.g., changes user interface 524 in FIG. 5B67 to user interface 522 in FIG. 5B70) and generates, via the one or more tactile output generators, a second discrete tactile output that corresponds to the increase in the characteristic intensity of the contact above the first intensity threshold (e.g., tactile output 592 (e.g., MiniTap 270 Hz with a gain of 1), FIG. 5B67) and is different from the first discrete tactile output.

Turning now to FIG. 15B, in some embodiments, the first discrete tactile output and the second discrete tactile output have (1508) a same waveform (e.g., MiniTap 230 Hz, MiniTap 270 Hz, or MiniTap 300 Hz) (e.g., tactile output 590 in FIG. 5B63 is a MiniTap 270 Hz and tactile output 592 in FIG. 5B67 is a MiniTap 270 Hz) and the first discrete tactile output and the second discrete tactile output have different amplitudes (e.g., MiniTap 270 Hz with a gain of 0.5 for the first discrete tactile output, as shown in FIG. 5B63, and MiniTap 270 Hz with a gain of 1 for the second discrete tactile output, as shown in FIG. 5B67).

In some embodiments, the first discrete tactile output stops while the characteristic intensity of the contact is maintained above the first intensity threshold (1510) (e.g., the first discrete tactile output is a short "tap" such as a FullTap, MiniTap, or MicroTap rather than a sustained vibration) (e.g., as shown in FIGS. 5B63-5B64).

In some embodiments, the second tactile output stops while the characteristic intensity of the contact is maintained above the first intensity threshold (1512) (e.g., the second discrete tactile output is a short "tap" such as a FullTap, MiniTap, or MicroTap rather than a sustained vibration) (e.g., as shown in FIGS. 5B67-5B68).

In some embodiments, the first tactile output is generated (1514) for a first range of values of the intensity-change metric (e.g., for an intensity-change metric value range up to a predefined number of units of intensity per second (e.g., 1250 grams per second), sometimes referred to as a "soft" intensity, a tactile output with a first tactile output pattern is generated (e.g., MiniTap 270 Hz with a gain of 0.5, as shown in FIG. 5B63)). In some embodiments, the second tactile output is generated (1516) for a second range of values of the intensity-change metric (e.g., for an intensity-change metric value range greater than the predefined number of units of intensity per second (e.g., 1250 grams per second), sometimes referred to as a "normal" intensity, a tactile output with a second tactile output pattern (e.g., MiniTap 270 Hz with a gain of 1.0, as shown in FIG. 5B67), distinct from the first tactile output pattern (e.g., MiniTap 270 Hz with a gain of 0.5, as shown in FIG. 5B63), is generated).

With reference now to FIG. 15C, in some embodiments, detecting the input sequence on the home button further includes (1518) detecting a first release input on the home button, following the first press input on the home button, and detecting the first release input includes detecting a decrease in the characteristic intensity of the contact on the home button (e.g., as shown in FIGS. 5B65 and 5B69). In some embodiments, in response to detecting the first release input on the home button (1518): in accordance with a determination that the first release input includes a decrease in the characteristic intensity of the contact below a second intensity threshold (e.g., a release intensity threshold that is the same or different from the press intensity threshold (e.g., the release intensity threshold $IT_{LR}$ is lower than the press intensity threshold $IT_L$)), and that a change in the characteristic intensity of the contact proximate to a time when the characteristic intensity of the contact decreases below the second intensity threshold has a third value for the intensity-change metric (e.g., for an intensity-change metric value range up to a predefined number of units of intensity per second (e.g., 1250 grams per second)), the device generates, via the one or more tactile output generators, a third discrete tactile output that corresponds to the decrease in the characteristic intensity of the contact below the second intensity threshold (e.g., tactile output 591 (e.g., MiniTap 270 Hz with a gain of 0.25), FIG. 5B65).

In some embodiments, in response to detecting the first release input on the home button (1518): in accordance with a determination that the first release input includes a decrease in the characteristic intensity of the contact below the second intensity threshold, and that the change in the characteristic intensity of the contact proximate to the time when the characteristic intensity of the contact decreases below the second intensity threshold has a fourth value for the intensity-change metric, different from the third value of the intensity-change metric (e.g., for an intensity-change metric value range greater than a predefined number of units of intensity per second (e.g., 1250 grams per second)), the device generates, via the one or more tactile output generators, a fourth discrete tactile output that corresponds to the decrease in the characteristic intensity of the contact below the second intensity threshold (e.g., tactile output 593 (e.g., MiniTap 270 Hz with a gain of 0.5), FIG. 5B69) and is different from the third discrete tactile output (e.g., tactile output 591 (e.g., MiniTap 270 Hz with a gain of 0.25), FIG. 5B65).

In some embodiments, generating the first and second tactile outputs includes (1520) applying a first modification (e.g., change the amplitude by a first multiplier or gain value) to a base tactile output pattern in accordance with the first and second values of the intensity-change metric, respectively and generating the third and fourth tactile outputs includes applying a second modification (e.g., change the amplitude by a second multiplier or gain value), distinct from the first modification, to the base tactile output pattern in accordance with the third and fourth values of the intensity-change metric, respectively.

In some embodiments, the second intensity threshold is (1522) different from (e.g., lower than) the first intensity threshold (e.g., the down-click intensity threshold is 350 mg and the up-click intensity threshold is 250 mg.). In some embodiments, the down-click and the up-click intensity thresholds are dynamically determined based on characteristics of the press input and/or release input. For example, in some embodiments, a press input with a faster increase in intensity (e.g., a fast and hard press) may lead to a higher down-click intensity threshold than a press input with a slower increase in intensity (e.g., a slower and more gentle press). Similarly, a release input with a slower decrease in intensity (e.g., a slower and gentler release) may lead to a lower up-click intensity threshold than a release input with a faster decrease in intensity (e.g., a quick release).

Turning now to FIG. 15D, in some embodiments, the first discrete tactile output and the second discrete tactile output are generated (1524) from a base haptic output pattern (e.g., different amount of modifications are applied to the base haptic output pattern (e.g., amplitude modulation, frequency modulation, delay, etc.) in accordance with the values of the intensity-change metric) that is associated with a currently selected tactile output setting from a plurality of different tactile output settings for the home button (e.g., MiniTap 230 Hz, MiniTap 270 Hz, or MiniTap 300 Hz). An example of changing tactile output settings for a home button is described above with reference to method 1100 and with respect to FIGS. 5C1-5C19.

In some embodiments, the home button is persistently displayed at a respective location or located at a persistent location on the device that is separate from the display (1526) (e.g., button 204, FIG. 5B52). In some embodiments, the intensity-change metric is based (1528) on a rate of change of the characteristic intensity of the contact over time (e.g., a rate of change over a time window of 50 ms).

In some embodiments, the intensity-change metric is based on (1530) a rate of change of the characteristic intensity of the contact measured at a time that the characteristic intensity of the contact reaches a relevant threshold intensity (e.g., the first intensity threshold, the second intensity threshold, etc.) (e.g., when reaching $IT_L$, as shown in FIGS. 5B63 and 5B67, or when reaching $IT_{LR}$, as shown in FIG. 5B65 and 5B69).

In some embodiments, detecting the input sequence includes (1532) detecting a second press input on the home button (e.g., following the initial press input and a release of the initial press input), and detecting the second press input includes detecting a second increase in the characteristic intensity of the contact on the home button. In response to detecting the second press input (1532): in accordance with a determination, based on an amount of time between a first point in time that corresponds to the first press input (e.g., a time at which the intensity of the contact increases above the first intensity threshold for the first time or a time at which the intensity of the contact decreases below a release intensity threshold that corresponds to the first intensity threshold for the first time) and a second point in time that corresponds to the second press input (e.g., a time at which the intensity of the contact increases above the first intensity threshold for the second time or a time at which the intensity of the contact decreases below the release intensity threshold for the second time), that the first press input and the second press input are part of a predefined input pattern (e.g., because the second point in time is less than a threshold amount of time after the first point in time (e.g., the duration between the first down-click and the second down-click is less than the time window for detecting a double click input or the duration between the first up-click and the second up-click is less than the time window for detecting a double click input, or the duration between the first up-click to the second down-click is less than the time window for detecting a double click input)), the device performs a second operation associated with the predefined input pattern (e.g., a double click input pattern) (e.g., displaying a multi-tasking user interface, as shown in FIGS. 5B5-5B14), and the second operation is different from the first operation; and the device provides, via the one or more tactile output generators, a fifth discrete tactile output, distinct from the first and second tactile outputs (e.g., tactile output 573 (e.g., MiniTap 270 Hz with a gain of 0.8), FIG. 5B10).

For example, in some embodiments, the tactile output for the second click of a double click input is different from the tactile output for a single click input or the tactile output for a first click of the double click input (e.g., in FIGS. 5B5-5B10, the second press input of the double click input (e.g., tactile output 573, FIG. 5B10) has a different tactile output than the first press input of the double click input (e.g., tactile output 571, FIG. 5B6)). In some embodiments, the tactile output for the second click of the double click input (e.g., tactile output 573 (e.g., MiniTap 270 Hz with a gain of 0.8), FIG. 5B10) has a lower amplitude than does the first click of the double click input (e.g., tactile output 571 (e.g., MiniTap 270 Hz with a gain of 1), FIG. 5B6). In some embodiments, the tactile output for the down-click of the first click of the double click input has a higher amplitude than the up-click of the first click, and has a higher amplitude than the down-click of the second click of the double click input (e.g., as shown in FIGS. 5B6, 5B8, and 5B10, respectively). In some embodiments, the up-click of the second click of the double click input is the same as the up-click of the first click of the double click input (e.g., the up-click is not modified). In some embodiments, the up-click of the second click of the double click input is modified in the same way as the down-click of the second click of the double click input.

With reference now to FIG. 15E, in some embodiments, detecting the input sequence includes (1534) detecting a second press input on the home button (e.g., following the initial press input and a release of the initial press input), and detecting the second press input includes detecting a second increase in the characteristic intensity of the contact on the home button (e.g., from an intensity below the first intensity threshold to an intensity above the first intensity threshold). In response to detecting the first press input, the device provides (1534) a first audio output concurrently with a respective one of the first and second tactile outputs that was generated in response to the first press input (e.g., as shown in FIG. 4O).

In response to detecting the second press input: in accordance with a determination, based on an amount of time between a first point in time that corresponds to the first press input (e.g., a time at which the intensity of the contact increases above the first intensity threshold for the first time or a time at which the intensity of the contact decreases below a second intensity threshold after increasing above the first intensity threshold for the first time) and a second point in time that corresponds to the second press input (e.g., a time at which the intensity of the contact increases above the first intensity threshold for the second time or a time at which the intensity of the contact decreases below a second intensity threshold after increasing above the first intensity threshold for the second time), that the first press input and the second press input are part of a predefined input pattern (e.g., because the second point in time is less than a threshold amount of time after the first point in time (e.g., the duration between the first down-click and the second down-click is less than the time window for detecting a double click input; or the duration between the first up-click and the second up-click is less than the time window for detecting a double click input, or the duration between the first up-click to the second down-click is less than the time window for detecting a double click input)), the device: (i) performs a second operation associated with the input pattern, wherein the second operation is different from the first operation; (ii) provides, via the one or more tactile output generators, a fifth discrete tactile output, the fifth tactile output being identical to the respective one of the first and second tactile outputs that was generated for the first press input; and (iii) provides a second audio output concurrently with the fifth discrete tactile output, and the second audio output and the first audio output have different audio output patterns (e.g., different amplitudes, frequencies, and/or waveforms) (e.g., as shown in FIGS. 5B5-5B14 and in the third row of FIG. 4K).

In some embodiments, in response to detecting the first press input on the home button (1536), the device changes the user interface from a first user interface to a second user interface, without regard to the value of the intensity-change metric that corresponds to the first press input (e.g., user interface 522, FIG. 5B70, is displayed after the sequence of FIG. 5B52-5B65 and also after the sequence of FIG. 5B66-5B69). In some embodiments, the change from the first user interface to the second user interface is displayed with the same animation. In some embodiments, the change from the first user interface to the second user interface is displayed with a different animation that is dependent upon the value of the intensity-change metric (e.g., a quicker transition for a faster press input and a slower transition for a slower press input).

It should be understood that the particular order in which the operations in FIGS. 15A-15E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1700, and 1900) are also applicable in an analogous manner to method 1500 described above with respect to FIGS. 15A-15E. For example, the contacts, gestures, user interface objects, tactile outputs, audio outputs, intensity thresholds, time thresholds, focus selectors, and animations described above with reference to method 1500 optionally have one or more of the characteristics of the contacts, gestures, user interface objects, tactile outputs, audio outputs, intensity thresholds, time thresholds, focus selectors, and animations described herein with reference to other methods described herein (e.g., methods 700, 900, 1100, 1300, 1700, and 1900). For brevity, these details are not repeated here.

In accordance with some embodiments, FIG. 16 shows a functional block diagram of an electronic device 1600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, the electronic device 1600, includes a display unit 1601 configured to display information (e.g., touch-sensitive display system 112 (also referred to as a touch screen and touch screen display), FIG. 1A), a touch-sensitive surface unit 1604 (e.g., display controller 156 and touch-sensitive display system 112, FIG. 1A) configured to receive contacts, gestures, and other user inputs on the touch screen display, one or more sensor units 1606 configured to detect intensities of contacts with the touch-sensitive surface unit and/or a respective button of the device (e.g., a home button), one or more tactile output generating units 1607 for generating tactile outputs, and a processing unit 1608 coupled with the display unit 1602, the touch-sensitive surface unit 1604, the one or more sensor units 1606, and the one or more tactile output generating units 1607. For ease of illustration, FIG. 16 shows display unit 1602 and touch-sensitive surface unit 1604 as integrated with electronic device 1600, however, in some embodiments one or both of these units are in communication with the electronic device, although the units remain physically separate from the electronic device (e.g., as shown and explained in reference to FIG. 3). In some embodiments, the processing unit includes a displaying unit (e.g., displaying unit 1610), an input detecting unit (e.g., input detecting unit 1612), a characteristic intensity detecting unit (e.g., characteristic intensity detecting unit 1614), an operation performing unit (e.g., operation performing unit 1616), a tactile output generating unit (e.g., tactile output generating unit 1618), a determining unit (e.g., determining unit 1620), and an audio output providing unit (e.g., audio output providing unit 1622).

In some embodiments, the processing unit (or one or more components thereof, such as the units 1610-1622) is configured to: display a user interface on the display (e.g., with the displaying unit 1610); while displaying the user interface, detect an input sequence on the home button that includes detecting a first press input on the home button (e.g., with the input detecting unit 1612), and detecting the first press input includes detecting an increase in a characteristic intensity of a contact on the home button; and in response to detecting the first press input on the home button: in accordance with a determination that the first press input includes an increase in the characteristic intensity of the contact above a first intensity threshold (e.g., using the determining unit 1620), and that a change in the characteristic intensity of the contact proximate to a time when the characteristic intensity of the contact increases above the first intensity threshold has a first value for an intensity-change metric (e.g., with the characteristic intensity detecting unit 1614): perform a first operation that changes the user interface displayed on the display (e.g., with the operation performing unit 1616); and generate, via the one or more tactile output generators, a first discrete tactile output that corresponds to the increase in the characteristic intensity of the contact above the first intensity threshold (e.g., with the tactile output generating unit 1618); and in accordance with a determination (e.g., using the determining unit 1620) that the first press input includes an increase in the characteristic intensity of the contact above the first intensity threshold (e.g., with the characteristic intensity detecting unit 1614), and that the change in the characteristic intensity of the contact proximate to the time when the characteristic intensity of the contact increases above the first intensity threshold has a second value for the intensity-change metric, different from the first value of the intensity-change metric (e.g., with the characteristic intensity detecting unit 1614): perform the first operation that changes the user interface displayed on the display (e.g., with the operation performing unit 1616); and generate, via the one or more tactile output generators, a second discrete tactile output that corresponds to the increase in the characteristic intensity of the contact above the first intensity threshold and is different from the first discrete tactile output (e.g., with the tactile output generating unit 1618).

In some embodiments, the first discrete tactile output and the second discrete tactile output have a same waveform; and the first discrete tactile output and the second discrete tactile output have different amplitudes.

In some embodiments, the first discrete tactile output stops while the characteristic intensity of the contact is maintained above the first intensity threshold.

In some embodiments, the second tactile output stops while the characteristic intensity of the contact is maintained above the first intensity threshold.

In some embodiments, the first tactile output is generated for a first range of values of the intensity-change metric.

In some embodiments, the second tactile output is generated for a second range of values of the intensity-change metric.

In some embodiments, detecting the input sequence on the home button further includes detecting a first release input on the home button, following the first press input on the home button, and detecting the first release input includes detecting a decrease in the characteristic intensity of the contact on the home button; and the processing unit is configured to: in response to detecting the first release input on the home button: in accordance with a determination that the first release input includes a decrease in the characteristic intensity of the contact below a second intensity threshold, and that a change in the characteristic intensity of the contact proximate to a time when the characteristic intensity of the contact decreases below the second intensity threshold has a third value for the intensity-change metric: generating, via the one or more tactile output generators, a third discrete tactile output that corresponds to the decrease in the characteristic intensity of the contact below the second intensity threshold (e.g., with the tactile output generating unit 1618); and in accordance with a determination that the first release input includes a decrease in the characteristic intensity of the contact below the second intensity threshold, and that the change in the characteristic intensity of the contact proximate to the time when the characteristic intensity of the contact decreases below the second intensity threshold has a fourth value for the intensity-change metric, different from the third value of the intensity-change metric: generating, via the one or more tactile output generators, a fourth discrete tactile output that corresponds to the decrease in the characteristic intensity of the contact below the second intensity threshold and is different from the third discrete tactile output (e.g., with the tactile output generating unit 1618).

In some embodiments, generating the first and second tactile outputs includes applying a first modification to a base tactile output pattern in accordance with the first and second values of the intensity-change metric, respectively; and generating the third and fourth tactile outputs includes applying a second modification, distinct from the first modification, to the base tactile output pattern in accordance with the third and fourth values of the intensity-change metric, respectively.

In some embodiments, the second intensity threshold is different from the first intensity threshold.

In some embodiments, the first discrete tactile output and the second discrete tactile output are generated from a base haptic output pattern that is associated with a currently selected tactile output setting from a plurality of different tactile output settings for the home button.

In some embodiments, the home button is persistently displayed at a respective location or located at a persistent location on the device that is separate from the display.

In some embodiments, the intensity-change metric is based on a rate of change of the characteristic intensity of the contact over time.

In some embodiments, the intensity-change metric is based on a rate of change of the characteristic intensity of the contact measured at a time that the characteristic intensity of the contact reaches a relevant threshold intensity.

In some embodiments, detecting the input sequence includes detecting a second press input on the home button, wherein detecting the second press input includes detecting a second increase in the characteristic intensity of the contact on the home button; and the processing unit is configured to, in response to detecting the second press input: in accordance with a determination, based on an amount of time between a first point in time that corresponds to the first press input and a second point in time that corresponds to the second press input, that the first press input and the second press input are part of a predefined input pattern: performing a second operation associated with the predefined input pattern (e.g., with the operation performing unit 1616), the second operation being different from the first operation; and providing, via the one or more tactile output generators, a fifth discrete tactile output, distinct from the first and second tactile outputs (e.g., with the tactile output generating unit 1618).

In some embodiments, detecting the input sequence includes detecting a second press input on the home button, wherein detecting the second press input includes detecting a second increase in the characteristic intensity of the contact on the home button; and the processing unit is configured to: in response to detecting the first press input, providing a first audio output concurrently with a respective one of the first and second tactile outputs that was generated in response to the first press input (e.g., with the audio output providing unit 1622); and in response to detecting the second press input: in accordance with a determination, based on an amount of time between a first point in time that corresponds to the first press input and a second point in time that corresponds to the second press input, that the first press input and the second press input are part of a predefined input pattern: performing a second operation associated with the input pattern, wherein the second operation is different from the first operation (e.g., with the operation performing unit 1616); providing, via the one or more tactile output generators, a fifth discrete tactile output, wherein the fifth tactile output is identical to the respective one of the first and second tactile outputs that was generated for the first press input (e.g., with the tactile output generating unit 1618); and providing a second audio output concurrently with the fifth discrete tactile output (e.g., with the audio output providing unit 1622), the second audio output and the first audio output having different audio output patterns.

In some embodiments, the processing unit is configured to: in response to detecting the first press input on the home button: change the user interface from a first user interface to a second user interface (e.g., with the displaying unit 1610), without regard to the value of the intensity-change metric that corresponds to the first press input.

The operations in the information processing methods described above are, optionally implemented by running one or more functional modules in information processing apparatus such as general purpose processors (e.g., as described above with respect to FIGS. 1A and 3) or application-specific chips.

The operations described above with reference to FIGS. 15A-15E are, optionally, implemented by components depicted in FIGS. 1A-1B or FIG. 16. For example, displaying operation 1502, detection operation 1504, and responding operation 1506 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 17A-17D are flow diagrams illustrating a method 1700 of providing a different tactile output for a second click of a double click input than for the first click of the double click input in accordance with some embodiments. The method 1700 is performed at an electronic device (e.g., device 300, FIG. 3, or portable multifunction device 100, FIG. 1A) with a display, a touch-sensitive surface, and one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. In some embodiments, the device includes one or more sensors to detect intensities of contacts with a home button of the device (e.g., a physical home button or a virtual home button). In some embodiments, the method 1700 is governed by instructions that are stored in a computer-readable storage medium (e.g., a non-transitory computer readable storage medium) and that are executed by one or more processors of the electronic device, such as the one or more processors 122 of device 100 (FIG. 1A). For ease of explanation, the following describes method 1700 as performed by the device 100. Some operations in method 1700 are, optionally, combined and/or the order of some operations is, optionally, changed.

Method 1700 relates to providing a different tactile output for a second click of a double click input than for the first click of the double click input. By providing different tactile outputs for the two clicks of a double click input, the device effectively and succinctly signals to the user, after detecting two consecutive press inputs provided by the user, whether a double click is registered by the device or two separate single clicks are registered by the device. The improved feedback to the user enhances the operability of the device (e.g., by providing clues to the user regarding how the current input is recognized by the device (e.g., as two single clicks or a double click) to avoid user confusion when seeing the device's response to the input) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

With reference to FIG. 17A, the device displays (1702) a first user interface (e.g., user interface 524, FIG. 5B5) (e.g., a user interface for an application that includes a plurality of activatable user interface objects). While displaying the first user interface, the device detects (1704): (i) a first press input on the home button (e.g., a down-click event that corresponds to an increase in intensity of the contact above a press intensity threshold followed by an up-click event that corresponds to a decrease in intensity of the contact below a release intensity threshold that is, optionally, lower than the press intensity threshold) (e.g., as shown in FIGS. 5B6-5B8 and in FIGS. 5B40-5B42) and (ii) a second press input on the home button (e.g., a down-click event that corresponds to an increase in intensity of the contact above the press intensity threshold optionally followed by an up-click event that corresponds to a decrease in intensity of the contact below the release intensity threshold that is, optionally, lower than the press intensity threshold) that is detected after the first press input (e.g., as shown in FIG. 5B10 and in FIG. 5B45).

In response to detecting the first press input and before detecting the second press input, the device provides (1706) a first non-visual output with a first non-visual output profile (e.g., the first non-visual output profile includes tactile output pattern(s) for one or more discrete tactile outputs, and optionally, corresponding audio output patterns for one or more audio outputs that are to accompany the one or more tactile outputs). The first non-visual output provides feedback indicating that the first press input was detected and the first non-visual output includes tactile output provided by the one or more tactile output generators (e.g., tactile output 571 (e.g., MiniTap 270 Hz with a gain of 1), FIG. 5B6, and tactile output 582 (e.g., MiniTap 270 Hz with a gain of 1), FIG. 5B40)

In response to detecting an input sequence including the first press input and the second press input on the home button (1708), the device determines, based at least in part on an amount of time between a first point in time that corresponds to the first press input (e.g., a time at which the down-click event for the first press input was detected or a time at which the up-click event for the first press input was detected) and a second point in time that corresponds to the second press input (e.g., a time at which the down-click event for the second press input was detected or a time at which the up-click event for the second press input was detected), whether the first and second press inputs are separate inputs or are part of an input pattern. In accordance with a determination, based on the amount of time between a first point in time that corresponds to the first press input and a second point in time that corresponds to the second press input, that the first press input and the second press input are separate inputs (e.g., in FIGS. 5B39-5B48), the device (i) performs a first operation associated with the first press input (e.g., the first operation includes ceasing to display the first user interface (e.g., user interface 524, FIG. 5B39) and displaying a second user interface on the display (e.g., user interface 522, FIG. 5B46) (e.g., an expanded folder overlaid on a darkened home screen, a home screen, a primary page of a multi-page home screen, etc.)); and (ii) provides a second non-visual output with the first non-visual output profile (e.g., tactile output 584 (e.g., MiniTap 270 Hz with a gain of 1), FIG. 5B45), wherein the second non-visual output provides feedback indicating that the second press input was detected and the second non-visual output includes tactile output provided by the one or more tactile output generators. For example, because the second point in time is greater than a threshold amount of time after the first point in time (e.g., the duration between the first down-click and the second down-click is greater than the time window for detecting a double click input; or the duration between the first up-click and the second up-click is greater than the time window for detecting a double click input, or the duration between the first up-click to the second down-click is greater than the time window for detecting a double click input), the device determines that the first and second press inputs are separate inputs (e.g., as shown in FIGS. 5B39-5B48). In some embodiments, the threshold amount of time for detecting a double click input is dynamically determined in accordance with the rate of intensity-change proximate to the time when the down-click event of the first click is detected. For example, a faster approach to the down-click intensity threshold leads to a shorter time window for detecting a double click input, and hence, faster confirmation of a single click input which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with a determination, based on the amount of time between the first point in time and the second point in time, that the first press input and the second press input are part of a (predefined) input pattern (e.g., in FIGS. 5B5-5B14), the device: (i) performs a second operation associated with the input pattern, and the second operation is different from the first operation (e.g., the second operation includes ceasing to display the first user interface (e.g., user interface 524, FIG. 5B5) and displaying a third user interface on the display (e.g., a multitasking user interface that concurrently presents multiple user interfaces, such as user interface 528, FIG. 5B14)); and (ii) provides a third non-visual output with a second non-visual output profile (e.g., tactile output 573 (e.g., MiniTap 270 Hz with a gain of 0.8), FIG. 5B10) (e.g., the second non-visual output profile includes tactile output pattern(s) for one or more discrete tactile outputs, and optionally, corresponding audio output patterns for one or more audio outputs that are to accompany the one or more tactile outputs) that is distinct from the first non-visual output profile, and the third non-visual output provides feedback indicating that the second press input was detected (and is different from the second non-visual output to indicate that the second press input was part of a predefined input pattern) and the third non-visual output includes tactile output provided by the one or more tactile output generators. For example, because the second point in time is less than a threshold amount of time after the first point in time (e.g., the duration between the first down-click and the second down-click is less than the time window for detecting a double click input; or the duration between the first up-click and the second up-click is less than the time window for detecting a double click input, or the duration between the first up-click to the second down-click is less than the time window for detecting a double click input)), the device determines that the first and second press inputs are part of the input pattern (e.g., as shown in FIGS. 5B5-5B14). In some embodiments, the threshold amount of time for detecting a double click input is dynamically determined in accordance with the rate of intensity-change proximate to the time when the down-click event of the first click is detected. For example, a faster approach to the down-click intensity threshold leads to a shorter time window for detecting a double click input, and hence, faster confirmation of a single click input which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

With reference now to FIG. 17B, in some embodiments, the first point in time is one of (1710): a time at which a characteristic intensity of the first press input increased above a press intensity threshold (e.g., $IT_L$) (e.g., as shown in FIG. 5B6 and FIG. 5B40), and a time at which the characteristic intensity of the first press input decreased below a release intensity threshold (e.g., $IT_{LR}$) (e.g., as shown in FIG. 5B8 and FIG. 5B42). In some embodiments, the second point in time is one of (1712): a time at which a characteristic intensity of the second press input increased above a press intensity threshold (e.g., $IT_L$) (e.g., as shown in FIG. 5B10 and FIG. 5B45), and a time at which the characteristic intensity of the second press input decreased below a release intensity threshold (e.g., $IT_{LR}$).

In some embodiments, in response to detecting the input sequence including the first press input and the second press input on the home button: in accordance with a determination that the first press input and the second press input are separate inputs (e.g., because the second point in time is greater than a threshold amount of time after the first point in time), the device (1714): performs a third operation associated with the second press input (e.g., as shown in FIGS. 5B39-5B48). In some embodiments, the third operation is different from the first operation associated with the first press input. In some embodiments, the third operation is different from the second operation associated with the input pattern. In some embodiments, the third operation includes ceasing to display the second user interface (e.g., an expanded folder overlaid on a darkened home screen, such as user interface 522, FIG. 5B47) and displaying a fourth user interface on the display (e.g., a home screen, such as user interface 520, FIG. 5B48). In some embodiments, if after performing the first operation associated with the first press input, a home screen is already displayed, the third operation has no effect.

In some embodiments, performing the first operation associated with the first press input includes (1716) performing the first operation in response to a release event (or up-click event) of the first press input (e.g., corresponding to a decrease in intensity of the contact below a release intensity threshold).

In some embodiments, the tactile output of the third non-visual output (e.g., tactile output 573 (e.g., MiniTap 270 Hz with a gain of 0.8), FIG. 5B10) is (1718) different from the tactile output of the first non-visual output (e.g., tactile output 571 (e.g., MiniTap 270 Hz with a gain of 1), FIG. 5B6).

In some embodiments, a first audio output of the first non-visual output is (1720) different from a second audio output of the third non-visual output (e.g., as shown in FIG. 4K). In some embodiments, when the first audio output of the first non-visual output is different from the second audio output of the third non-visual output, the tactile output of the first non-visual output is the same as the tactile output of the third non-visual output. In some embodiments, when the first audio output of the first non-visual output is different from the second audio output of the third non-visual output, the tactile output of the first non-visual output is different from the tactile output of the third non-visual output (e.g., as shown in FIG. 5B6, where tactile output 571 has a gain of 1, and in FIG. 5B10, where tactile output 573 has a gain of 0.8).

In some embodiments, the first press input on the home button is (1722) a first press event that corresponds to an increase in a characteristic intensity of a first contact on the home button above a press intensity threshold followed by a first release event that corresponds to a decrease in the characteristic intensity of the first contact below a release intensity threshold (that is, optionally, lower than the press intensity threshold) (e.g., as shown in FIG. 5B6-5B8), and the second press input on the home button is a second press event that corresponds to an increase in a characteristic intensity of a second contact (e.g., the same continuous contact as the first contact, or a distinct contact from the first contact) on the home button above the press intensity threshold (e.g., as shown in FIG. 5B10).

Turning now to FIG. 17C, the first press input on the home button is (1724) a first press event that corresponds to an increase in a characteristic intensity of a first contact on the home button above a press intensity threshold followed by a first release event that corresponds to a decrease in the characteristic intensity of the first contact below a release intensity threshold (that is, optionally, lower than the press intensity threshold), and the second press input on the home button is a second press event that corresponds to an increase in a characteristic intensity of a second contact (e.g., the same continuous contact as the first contact, or a distinct contact from the first contact) on the home button above the press intensity threshold followed by a second release event that corresponds to a decrease in the characteristic intensity of the second contact below the release intensity threshold (that is, optionally, lower than the press intensity threshold).

In some embodiments, in response to detecting the first press input on the home button (1726): in accordance with a determination that an intensity-change metric of the first press input has a first value (e.g., a change in the characteristic intensity of a contact in the first press input proximate to a time when the characteristic intensity of the contact in the first press input increases above the press intensity threshold has a first value for an intensity-change metric), the device provides the first non-visual output with a first amplitude that corresponds to the first value for the intensity-change metric (e.g., tactile output 590 (e.g., MiniTap 270 Hz with a gain of 0.5), FIG. 5B63); and in accordance with a determination that the intensity-change metric of the first press input has a second value different from the first value (e.g., the change in the characteristic intensity of the contact in the first press input proximate to the time when the characteristic intensity of the contact in the first press input increases above the press intensity threshold has a second value for the intensity-change metric different from the first value of the intensity-change metric), providing the first non-visual output with a second amplitude that corresponds to the second value for the intensity-change metric (e.g., tactile output 592 (e.g., MiniTap 270 Hz with a gain of 1), FIG. 5B67), wherein the second amplitude is different from the first amplitude. An example of selecting non-visual input based on an intensity-change metric is described above with reference to method 1500.

In some embodiments, in response to detecting the second press input on the home button (1728): in accordance with a determination that the first press input and the second press input are separate inputs: in accordance with a determination that an intensity-change metric of the second press input has a third value (e.g., that a change in a characteristic intensity of a contact in the second press input proximate to a time when the characteristic intensity of the contact in the second press input increases above the press intensity threshold has a third value for the intensity-change metric), the device provides the second non-visual output with a third amplitude that corresponds to the third value for the intensity-change metric; and in accordance with a determination that the intensity-change metric of the second press input has a fourth value (e.g., that the change in the characteristic intensity of the contact in the second press input proximate to when the characteristic intensity of the contact in the second press input increases above the press intensity threshold has a fourth value for the intensity-change metric) different from the third value, the device provides the second non-visual output with a fourth amplitude that corresponds to the fourth value for the intensity-change metric, the fourth amplitude being different from the third amplitude. For example, when the first press input and the second press input are interpreted as separate press inputs, the amplitudes of the tactile outputs for the first and second press inputs are varied based on the rates of increase of the intensity of the press inputs at the times when the first intensity threshold is crossed by the first and second press inputs, and the waveforms and frequencies of the tactile outputs are the same.

Also, in response to detecting the second press input on the home button (1728): in accordance with a determination that the first press input and the second press input are part of the (predefined) input pattern: in accordance with a determination that the intensity-change metric of the second press input has the third value (e.g., that the change in the characteristic intensity of the contact in the second press input proximate to a time when the characteristic intensity of the contact in the second press input increases above the press intensity threshold has the third value for the intensity-change metric), the device provides the third non-visual output with a fifth amplitude that corresponds to the third value for the intensity change metric; and in accordance with a determination that the intensity-change metric of the second press input has a fourth value (e.g., that the change in the characteristic intensity of the contact in the second press input proximate to a time when the characteristic intensity of the contact in the second press input increases above the press intensity threshold has the fourth value for the intensity-change metric), the device provides the third non-visual output with a sixth amplitude that corresponds to the fourth value for the intensity-change metric, wherein the sixth amplitude is different from the fifth amplitude. An example of selecting non-visual input based on an intensity-change metric is described above with reference to method 1500. For example, when the first press input and the second press input are interpreted as part of a same input sequence such as a double click, the amplitude of the tactile output for the second press input is varied based on the rate of increase of the intensity of the press input. Even though the amplitude of the non-visual output provided for each press input of two consecutive press inputs is selected based on the value of the intensity-change metric associated with the press input, the amplitude of the non-visual output for the second press input of two separate inputs is different from the amplitude of the non-visual output for the second press input of a predefined input pattern, even if the two press inputs have the same value for the intensity-change metric, which provides the user with feedback that is more consistent with the user's inputs (e.g., harder presses produce different feedback than softer presses), which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

With reference now to FIG. 17D, in some embodiments, in response to detecting the first press input, the first press input being consistent with a request to transition to a second user interface (e.g., a single click input to transition to a home screen) and a request to transition to a third user interface (e.g., a double click input to transition to a multi-tasking user interface), the device starts (1730) to display a first animated transition from the first user interface to the second user interface (e.g., as shown in FIGS. 5B6-5B10). In response to detecting the second press input, the second press input being detected while the first animated transition is being displayed: in accordance with a determination that the second press input is received at a first time (e.g., a click that is detected before a threshold amount of time for detecting a double click input has elapsed), the device: interrupts the first animated transition from the first user interface to the second user interface at a first point in the first animated transition (e.g., at user interface 525-5, FIG. 5B10), and displays a second animated transition from the first point in the first animated transition (e.g., the second animated transition including user interfaces 526-1, 526-2, and 526-3, FIGS. 5B11-5B13) to the third user interface (e.g., user interface 528, FIG. 5B14).

Also, in response to detecting the second press input: in accordance with a determination that the second press input is received at a second time that is after the first time (e.g., a click that is detected before a threshold amount of time for detecting a double click input has elapsed), the device: interrupts the first animated transition from the first user interface to the second user interface at a second point in the first animated transition (e.g., at user interface 525-6, FIG. 5B21) that is after the first point in the first animated transition (e.g., at user interface 525-5, FIG. 5B10), and displays a third animated transition from the second point in the first animated transition to the third user interface (e.g., the third animated transition including user interfaces 527-1, 527-2, and 527-3, FIGS. 5B22-5B24), wherein the third animated transition is different from the second animated transition. An example of interrupting an animation based on when a second press input is detected is described above with reference to method 900.

It should be understood that the particular order in which the operations in FIGS. 17A-17D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1500, and 1900) are also applicable in an analogous manner to method 1700 described above with respect to FIGS. 17A-17D. For example, the contacts, gestures, user interface objects, tactile outputs, audio outputs, intensity thresholds, time thresholds, focus selectors, and animations described above with reference to method 1700 optionally have one or more of the characteristics of the contacts, gestures, user interface objects, tactile outputs, audio outputs, intensity thresholds, time thresholds, focus selectors, and animations described herein with reference to other methods described herein (e.g., methods 700, 900, 1100, 1300, 1500, and 1900). For brevity, these details are not repeated here.

In accordance with some embodiments, FIG. 18 shows a functional block diagram of an electronic device 1800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 18 are, optionally, combined or separated into sub-blocks to implement the principles of the various described embodiments. Therefore, the description herein optionally supports any possible combination or separation or further definition of the functional blocks described herein.

As shown in FIG. 18, the electronic device 1800, includes a display unit 1801 configured to display information (e.g., touch-sensitive display system 112 (also referred to as a touch screen and touch screen display), FIG. 1A), a touch-sensitive surface unit 1804 (e.g., display controller 156 and touch-sensitive display system 112, FIG. 1A) configured to receive contacts, gestures, and other user inputs on the touch screen display, one or more sensor units 1806 configured to detect intensities of contacts with the touch-sensitive surface unit and/or a respective button of the device (e.g., a home button), one or more tactile output generating units 1807 for generating tactile outputs, and a processing unit 1808 coupled with the display unit 1802, the touch-sensitive surface unit 1804, the one or more sensor units 1806, and the one or more tactile output generating units 1807. For ease of illustration, FIG. 18 shows display unit 1802 and touch-sensitive surface unit 1804 as integrated with electronic device 1800, however, in some embodiments one or both of these units are in communication with the electronic device, although the units remain physically separate from the electronic device (e.g., as shown and explained in reference to FIG. 3). In some embodiments, the processing unit includes a displaying unit (e.g., displaying unit 1810), an input detecting unit (e.g., input detecting unit 1812), a non-visual output providing unit (e.g., non-visual output providing unit 1814), a determining unit (e.g., determining unit 1816), and an operation performing unit (e.g., operation performing unit 1818).

In some embodiments, the processing unit (or one or more components thereof, such as the units 1810-1818) is configured to: display a first user interface (e.g., with the displaying unit 1810); while displaying the first user interface, detect: a first press input on the home button (e.g., with the input detecting unit 1812); and a second press input on the home button that is detected after the first press input (e.g., with the input detecting unit 1812); in response to detecting the first press input and before detecting the second press input, provide a first non-visual output with a first non-visual output profile (e.g., with the non-visual output providing unit 1814), the first non-visual output providing feedback indicating that the first press input was detected and the first non-visual output includes tactile output provided by the one or more tactile output generators; in response to detecting an input sequence including the first press input and the second press input on the home button: in accordance with a determination, based on an amount of time between a first point in time that corresponds to the first press input and a second point in time that corresponds to the second press input, that the first press input and the second press input are separate inputs: perform a first operation associated with the first press input (e.g., with the operation performing unit 1818); and provide a second non-visual output with the first non-visual output profile (e.g., with the non-visual output providing unit 1814), the second non-visual output providing feedback indicating that the second press input was detected and the second non-visual output includes tactile output provided by the one or more tactile output generators; and, in accordance with a determination, based on the amount of time between the first point in time and the second point in time, that the first press input and the second press input are part of an input pattern: perform a second operation associated with the input pattern (e.g., with the operation performing unit 1818), the second operation being different from the first operation; and provide a third non-visual output with a second non-visual output profile that is distinct from the first non-visual output profile (e.g., with the non-visual output providing unit 1814), the third non-visual output providing feedback indicating that the second press input was detected and the third non-visual output includes tactile output provided by the one or more tactile output generators.

In some embodiments, the first point in time is one of: a time at which a characteristic intensity of the first press input increased above a press intensity threshold, and a time at which the characteristic intensity of the first press input decreased below a release intensity threshold.

In some embodiments, the second point in time is one of: a time at which a characteristic intensity of the second press input increased above a press intensity threshold, and a time at which the characteristic intensity of the second press input decreased below a release intensity threshold.

In some embodiments, the processing unit is configured to: in response to detecting the input sequence including the first press input and the second press input on the home button: in accordance with a determination that the first press input and the second press input are separate inputs: perform a third operation associated with the second press input (e.g., with the operation performing unit 1818).

In some embodiments, performing the first operation associated with the first press input includes performing the first operation in response to a release event of the first press input.

In some embodiments, the tactile output of the third non-visual output is different from the tactile output of the first non-visual output.

In some embodiments, a first audio output of the first non-visual output is different from a second audio output of the third non-visual output.

In some embodiments, the first press input on the home button is a first press event that corresponds to an increase in a characteristic intensity of a first contact on the home button above a press intensity threshold followed by a first release event that corresponds to a decrease in the characteristic intensity of the first contact below a release intensity threshold, and the second press input on the home button is a second press event that corresponds to an increase in a characteristic intensity of a second contact on the home button above the press intensity threshold.

In some embodiments, the first press input on the home button is a first press event that corresponds to an increase in a characteristic intensity of a first contact on the home button above a press intensity threshold followed by a first release event that corresponds to a decrease in the characteristic intensity of the first contact below a release intensity threshold, and the second press input on the home button is a second press event that corresponds to an increase in a characteristic intensity of a second contact on the home button above the press intensity threshold followed by a second release event that corresponds to a decrease in the characteristic intensity of the second contact below the release intensity threshold.

In some embodiments, the processing unit is configured to: in response to detecting the first press input on the home button: in accordance with a determination that an intensity-change metric of the first press input has a first value, provide the first non-visual output with a first amplitude that corresponds to the first value for the intensity-change metric (e.g., with the non-visual output providing unit 1814); and in accordance with a determination that the intensity-change metric of the first press input has a second value different from the first value, provide the first non-visual output with a second amplitude that corresponds to the second value for the intensity-change metric, wherein the second amplitude is different from the first amplitude (e.g., with the non-visual output providing unit 1814).

In some embodiments, the processing unit is configured to: in response to detecting the second press input on the home button: in accordance with a determination that the first press input and the second press input are separate inputs: in accordance with a determination that an intensity-change metric of the second press input has a third value, provide the second non-visual output with a third amplitude that corresponds to the third value for the intensity-change metric (e.g., with the non-visual output providing unit 1814); and in accordance with a determination that the intensity-change metric of the second press input has a fourth value different from the third value, provide the second non-visual output with a fourth amplitude that corresponds to the fourth value for the intensity-change metric, wherein the fourth amplitude is different from the third amplitude (e.g., with the non-visual output providing unit 1814); and in accordance with a determination that the first press input and the second press input are part of the input pattern: in accordance with a determination that the intensity-change metric of the second press input has the third value, provide the third non-visual output with a fifth amplitude that corresponds to the third value for the intensity change metric (e.g., with the non-visual output providing unit 1814); and in accordance with a determination that the intensity-change metric of the second press input has a fourth value, provide the third non-visual output with a sixth amplitude that corresponds to the fourth value for the intensity-change metric, the sixth amplitude being different from the fifth amplitude (e.g., with the non-visual output providing unit 1814).

In some embodiments, the processing unit is configured to: in response to detecting the first press input, the first press input being consistent with a request to transition to a second user interface and a request to transition to a third user interface, start to display a first animated transition from the first user interface to the second user interface (e.g., with the displaying unit 1810); in response to detecting the second press input, the second press input being detected while the first animated transition is being displayed: in accordance with a determination that the second press input is received at a first time: interrupt the first animated transition from the first user interface to the second user interface at a first point in the first animated transition (e.g., with the displaying unit 1810), and display a second animated transition from the first point in the first animated transition to the third user interface (e.g., with the displaying unit 1810); and in accordance with a determination that the second press input is received at a second time that is after the first time: interrupt the first animated transition from the first user interface to the second user interface at a second point in the first animated transition that is after the first point in the first animated transition (e.g., with the displaying unit 1810), and display a third animated transition from the second point in the first animated transition to the third user interface, wherein the third animated transition is different from the second animated transition (e.g., with the displaying unit 1810).

The operations in the information processing methods described above are, optionally implemented by running one or more functional modules in information processing apparatus such as general purpose processors (e.g., as described above with respect to FIGS. 1A and 3) or application-specific chips.

The operations described above with reference to FIGS. 17A-17D are, optionally, implemented by components depicted in FIGS. 1A-1B or FIG. 18. For example, displaying operation 1702, detection operation 1704, responding operation 1706, and responding operation 1708 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 19A-19C are flow diagrams illustrating a method 1900 of providing discrete tactile outputs to indicate activation of a persistent non-mechanical button on a device in accordance with some embodiments. The method 1900 is performed at an electronic device (e.g., device 300, FIG. 3, or portable multifunction device 100, FIG. 1A) with a display, a touch-sensitive surface, and one or more sensors to detect intensities of contacts with the touch-sensitive surface. In some embodiments, the display is a touch-screen display and the touch-sensitive surface is on or integrated with the display. In some embodiments, the display is separate from the touch-sensitive surface. In some embodiments, the device includes one or more tactile output generators for generating tactile outputs. In some embodiments, the device includes one or more sensors to detect intensities of contacts with a respective button of the device (e.g., a home button such as a physical home button or a virtual home button). In some embodiments, the method 1900 is governed by instructions that are stored in a computer-readable storage medium (e.g., a non-transitory computer readable storage medium) and that are executed by one or more processors of the electronic device, such as the one or more processors 122 of device 100 (FIG. 1A). For ease of explanation, the following describes method 1900 as performed by the device 100. Some operations in method 1900 are, optionally, combined and/or the order of some operations is, optionally, changed.

Method 1900 relates to specific designs of discrete tactile outputs that are provided to indicate activation of a persistent non-mechanical button on a device. The waveforms (e.g., number of oscillations made by an actuator across a neutral position) and frequency ranges of the tactile outputs together produce natural and succinct feedback to indicate that the button has been activated by a press input, and at the same time, without undue distractions to the user by unnecessarily prolonging the tactile outputs with continued oscillations of the actuator(s), which enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, the carefully selected tactile output patterns improve the efficiency of the feedback provided to the user and thus improve the battery life of the device.

With reference to FIG. 19A, the device detects (1902) an input on the respective button (e.g., button 204, FIG. 5A1), and the one or more tactile output generators are used to generate tactile outputs indicating that the respective button has been activated in place of a mechanical switch that detects activation of the respective button when the respective button is mechanically compressed. In response to detecting the input on the respective button (1904): in accordance with a determination that the input meets activation criteria (e.g., in FIGS. 5A9-5A11), wherein the activation criteria include a requirement that the input includes an intensity above a respective intensity threshold (e.g., a light press intensity threshold $IT_L$) in order for the activation criteria to be met, the device provides a first tactile output with a first tactile output pattern (e.g., tactile output 503 (e.g., MiniTap 270 Hz with a gain of 0.5), FIG. 5A11) that includes: between 0.5 and 4 cycles of an oscillation of the one or more tactile output generators relative to one or more corresponding neutral positions of the one or more tactile output generators, wherein the oscillation of the one or more tactile output generators occurs at a frequency between 80 Hz and 400 Hz (e.g., a MiniTap at 80 Hz, 100 Hz, 125 Hz, 150 Hz, 200 Hz, 230 Hz, 270 Hz, or 300 Hz, as shown in FIGS. 4F and 4G); and in accordance with a determination that the input does not meet the activation criteria, the device forgoes providing the first tactile output (e.g., in FIGS. 5A4-5A8).

In some embodiments, the first tactile output pattern includes (1906) between 0.5 and 2 cycles of oscillation of the one or more tactile output generators relative to the one or more corresponding neutral positions of the one or more tactile output generators (e.g., a FullTap with 2 cycles of oscillation, a MiniTap with 1 cycle of oscillation, or a MicroTap with 0.5 cycle of oscillation, as shown in FIG. 4F).

In some embodiments, the first tactile output pattern includes (1908) between 1 and 2 cycles of oscillation of the one or more tactile output generators relative to the one or more corresponding neutral positions of the one or more tactile output generators (e.g., a FullTap with 2 cycles of oscillation, or a MiniTap with 1 cycle of oscillation, as shown in FIG. 4F).

In some embodiments, the oscillation of the one or more tactile output generators occurs (1910) at a frequency between 200 Hz and 350 Hz (e.g., as shown in FIG. 4F).

In some embodiments, the oscillation of the one or more tactile output generators occurs (1912) at the frequency between 225 Hz and 325 Hz (e.g., a MiniTap at 230 Hz, a MiniTap at 270 Hz, or a MiniTap at 300 Hz, as shown in FIGS. 4F and 4K).

In some embodiments, the oscillation of the one or more tactile output generators occurs (1914) at a variable frequency selected from two or more frequencies between 150 Hz and 400 Hz (e.g., a MiniTap at 230 Hz, a MiniTap at 270 Hz, or a MiniTap at 300 Hz, as shown in FIGS. 4F and 4K).

Turning now to FIG. 19B, in some embodiments, in response to detecting the input on the home button (1916): in accordance with a determination that the input meets the activation criteria (e.g., that the input includes an intensity above the respective intensity threshold) and that a change in a characteristic intensity of the input proximate to a time when the characteristic intensity of the input increases above the respective intensity threshold has a first value for an intensity-change metric (e.g., a "soft" intensity), the device provides the first tactile output with a first amplitude that corresponds to the first value of the intensity-change metric (e.g., tactile output 590 (e.g., MiniTap 270 Hz with a gain of 0.5), FIG. 5B62); and in accordance with a determination that the input meets the activation criteria (e.g., that the input includes an intensity above the respective intensity threshold) and that the change in the characteristic intensity of the input proximate to a time when the characteristic intensity of the input increases above the respective intensity threshold has a second value for the intensity-change metric different from the first value of the intensity-change metric (e.g., a "normal" intensity), the device provides the first tactile output with a second amplitude that corresponds to the second value for the intensity-change metric (e.g., tactile output 592 (e.g., MiniTap 270 Hz with a gain of 1), FIG. 5B67), and the second amplitude is different from the first amplitude. An example of varying the amplitude of a tactile output based on an intensity-change metric is described in greater detail above with reference to method 1500.

In some embodiments, after detecting the input on the home button, the device detects (1918) a second input on the home button. In response to detecting the first input and before detecting the second input, the device provides (1918) the first tactile output with a third amplitude (e.g., tactile output 571 (e.g., MiniTap 270 Hz with a gain of 1), FIG. 5B6, or tactile output 582 (e.g., MiniTap 270 Hz with a gain of 1), FIG. 5B40). In response to detecting an input sequence including the input and the second input, the device determines, based at least in part on an amount of time between a first point in time (e.g., a time at which the press event for the input was detected or a time at which the release event for the input was detected) and a second point in time that corresponds to the second input (e.g., a time at which the press event for the second input was detected or a time at which the release event for the second input was detected), whether the input and the second input are separate inputs (e.g., as shown in FIGS. 5B39-5B48) or are part of an input pattern (e.g., as shown in FIGS. 5B5-5B14).

In accordance with a determination, based on the amount of time between a first point in time that corresponds to the input and a second point in time that corresponds to the second input, that the input and the second input are separate inputs (e.g., because the second point in time is greater than a threshold amount of time after the first point in time) (e.g., as shown in FIGS. 5B39-5B48), the device provides a second tactile output with the third amplitude (e.g., tactile output 584 (e.g., MiniTap 270 Hz with a gain of 1), FIG. 5B45), and the second tactile output provides feedback indicating that the second input was detected. In accordance with a determination, based on the amount of time between the first point in time and the second point in time, that the input and the second input are part of a (predefined) input pattern (e.g., because the second point in time is less than a threshold amount of time after the first point in time) (e.g., as shown in FIGS. 5B5-5B14), the device provides a third tactile output with a fourth amplitude (e.g., tactile output 573 (e.g., MiniTap 270 Hz with a gain of 0.8), FIG. 5B10) that is distinct from the third amplitude, and the third tactile output provides feedback indicating that the second input was detected. In some embodiments, the threshold amount of time is a press event to press event time period. In some embodiments, the threshold amount of time is a release event to release event time period. An example of varying the amplitude of a tactile output based on a time threshold is described in greater detail above with reference to method 1700.

With reference now to FIG. 19C, in some embodiments, the input on the home button was detected while a first user interface is displayed on the display (e.g., user interface 512, FIG. 5A3) (e.g., a user interface of a first application, an expanded folder overlaid on a darkened home screen, an expanded notification overlaid on a darkened home screen, a control panel overlaid on a darkened home screen, a multitasking user interface that concurrently presents multiple user interfaces, a secondary page of a multi-page home screen, a notification screen, a widget screen, etc.). In response to detecting the input on the home button: in accordance with a determination that the input meets the activation criteria (e.g., as shown in FIG. 5A11), the device ceases to display the first user interface and displays a second user interface (e.g., user interface 510, FIG. 5A14)

on the display (e.g., a home screen, a primary page of a multi-page home screen, etc.); and in accordance with a determination that the input does not meet the activation criteria (e.g., as shown in FIGS. 5A4-5A7), the device maintains display of the first user interface on the display (e.g., user interface 512, FIG. 5A8).

In some embodiments, the second user interface is a system user interface (e.g., a home screen, a primary page of a multi-page home screen, a multitasking screen, a virtual assistant screen, etc.), such as user interface 510 in FIG. 5A14.

It should be understood that the particular order in which the operations in FIGS. 19A-19C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300, 1500, and 1700) are also applicable in an analogous manner to method 1900 described above with respect to FIGS. 19A-19C. For example, the contacts, gestures, user interface objects, tactile outputs, audio outputs, intensity thresholds, time thresholds, focus selectors, and animations described above with reference to method 1900 optionally have one or more of the characteristics of the contacts, gestures, user interface objects, tactile outputs, audio outputs, intensity thresholds, time thresholds, focus selectors, and animations described herein with reference to other methods described herein (e.g., methods 700, 900, 1100, 1300, 1500, and 1700). For brevity, these details are not repeated here.

In accordance with some embodiments, FIG. 20 shows a functional block diagram of an electronic device 2000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 20 are, optionally, combined or separated into sub-blocks to implement the principles of the various described embodiments. Therefore, the description herein optionally supports any possible combination or separation or further definition of the functional blocks described herein.

As shown in FIG. 20, the electronic device 2000, includes a display unit 2001 configured to display information (e.g., touch-sensitive display system 112 (also referred to as a touch screen and touch screen display), FIG. 1A), a touch-sensitive surface unit 2004 (e.g., display controller 156 and touch-sensitive display system 112, FIG. 1A) configured to receive contacts, gestures, and other user inputs on the touch screen display, one or more sensor units 2006 configured to detect intensities of contacts with the touch-sensitive surface unit and/or a respective button of the device (e.g., a home button), one or more tactile output generating units 2007 for generating tactile outputs, and a processing unit 2008 coupled with the display unit 2002, the touch-sensitive surface unit 2004, the one or more sensor units 2006, and the one or more tactile output generating units 2007. For ease of illustration, FIG. 20 shows display unit 2002 and touch-sensitive surface unit 2004 as integrated with electronic device 2000, however, in some embodiments one or both of these units are in communication with the electronic device, although the units remain physically separate from the electronic device (e.g., as shown and explained in reference to FIG. 3). In some embodiments, the processing unit includes a displaying unit (e.g., displaying unit 2009), an input detecting unit (e.g., input detecting unit 2010), a determining unit (e.g., determining unit 2012), and a tactile output providing unit (e.g., tactile output providing unit 2014).

In some embodiments, the processing unit (or one or more components thereof, such as the units 2010-2014) is configured to: detect an input on the respective button (e.g., with the input detecting unit 2010), and the one or more tactile output generators are used to generate tactile outputs indicating that the respective button has been activated (e.g., with the tactile output providing unit 2014 in conjunction with the one or more tactile output providing units 2007) in place of a mechanical switch that detects activation of the respective button when the respective button is mechanically compressed; in response to detecting the input on the respective button: (i) in accordance with a determination that the input meets activation criteria (e.g., with the determining unit 2012), the activation criteria including a requirement that the input includes an intensity above a respective intensity threshold in order for the activation criteria to be met, provide a first tactile output with a first tactile output pattern (e.g., with the tactile output providing unit 2014 in conjunction with the one or more tactile output providing units 2007) that includes between 0.5 and 4 cycles of an oscillation of the one or more tactile output generators relative to one or more corresponding neutral positions of the one or more tactile output generators, wherein the oscillation of the one or more tactile output generators occurs at a frequency between 80 Hz and 400 Hz; and (ii) in accordance with a determination that the input does not meet the activation criteria (e.g., with the determining unit 2012), forgo providing the first tactile output.

In some embodiments, the first tactile output pattern includes between 0.5 and 2 cycles of oscillation of the one or more tactile output generators relative to the one or more corresponding neutral positions of the one or more tactile output generators.

In some embodiments, the first tactile output pattern includes between 1 and 2 cycles of oscillation of the one or more tactile output generators relative to the one or more corresponding neutral positions of the one or more tactile output generators.

In some embodiments, the oscillation of the one or more tactile output generators occurs at a frequency between 200 Hz and 350 Hz.

In some embodiments, the oscillation of the one or more tactile output generators occurs at the frequency between 225 Hz and 325 Hz.

In some embodiments, the oscillation of the one or more tactile output generators occurs at a variable frequency selected from two or more frequencies between 150 Hz and 400 Hz.

In some embodiments, the processing unit is configured to: in response to detecting the input on the home button: in accordance with a determination that the input meets the activation criteria and that a change in a characteristic intensity of the input proximate to a time when the characteristic intensity of the input increases above the respective intensity threshold has a first value for an intensity-change metric, provide the first tactile output with a first amplitude that corresponds to the first value of the intensity-change metric (e.g., with the tactile output providing unit 2014 in conjunction with the one or more tactile output providing units 2007); and in accordance with a determination that the input meets the activation criteria and that the change in the characteristic intensity of the input proximate to a time when the characteristic intensity of the input increases above the respective intensity threshold has a second value for the intensity-change metric different from the first value of the intensity-change metric, provide the first tactile output with a second amplitude that corresponds to the second value for the intensity-change metric (e.g., with the tactile output providing unit 2014 in conjunction with the one or more tactile output providing units 2007), wherein the second amplitude is different from the first amplitude.

In some embodiments, the processing unit is configured to: after detecting the input on the home button, detect a second input on the home button (e.g., with the input detecting unit 2010); in response to detecting the first input and before detecting the second input, provide the first tactile output with a third amplitude (e.g., with the tactile output providing unit 2014 in conjunction with the one or more tactile output providing units 2007); in response to detecting an input sequence including the input and the second input: in accordance with a determination, based on an amount of time between a first point in time that corresponds to the input and a second point in time that corresponds to the second input, that the input and the second input are separate inputs: provide a second tactile output with the third amplitude (e.g., with the tactile output providing unit 2014 in conjunction with the one or more tactile output providing units 2007), and the second tactile output provides feedback indicating that the second input was detected; and in accordance with a determination, based on the amount of time between the first point in time and the second point in time, that the input and the second input are part of an input pattern: provide a third tactile output with a fourth amplitude that is distinct from the third amplitude (e.g., with the tactile output providing unit 2014 in conjunction with the one or more tactile output providing units 2007), and the third tactile output provides feedback indicating that the second input was detected.

In some embodiments, the input on the home button was detected while a first user interface is displayed on the display and the processing unit is configured to: in response to detecting the input on the home button: in accordance with a determination that the input meets the activation criteria: cease to display the first user interface (e.g., with the displaying unit 2009); and display a second user interface on the display (e.g., with the displaying unit 2009); and in accordance with a determination that the input does not meet the activation criteria, maintain display of the first user interface on the display (e.g., with the displaying unit 2009).

In some embodiments, the second user interface is a system user interface.

The operations in the information processing methods described above are, optionally implemented by running one or more functional modules in information processing apparatus such as general purpose processors (e.g., as described above with respect to FIGS. 1A and 3) or application-specific chips.

The operations described above with reference to FIGS. 19A-19C are, optionally, implemented by components depicted in FIGS. 1A-1B or FIG. 20. For example, detection operation 1902 and responding operation 1904 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A non-transitory computer-readable storage medium storing one or more programs, the one or more programs comprising instructions that, when executed by an electronic device with a display, a touch-sensitive surface, and one or more tactile output generators for generating tactile outputs, cause the electronic device to:
    display, on the display, a first user interface, wherein a home button is available on the device in a plurality of different contexts to dismiss a currently displayed user interface in response to detecting an input of a first type on the home button;
    while displaying the first user interface, detect a first input of the first type directed to the first user interface;
    in response to detecting the first input of the first type directed to the first user interface:
        in accordance with a determination that user interface tactile outputs are enabled at the electronic device, perform a first operation and provide, via the one or more tactile output generators, a first tactile output that corresponds to the first operation; and
        in accordance with a determination that user interface tactile outputs are disabled at the electronic device, perform the first operation, and forgo providing at least a portion of the first tactile output that corresponds to the first operation;
    after performing the first operation, detect a second input of the first type on the home button; and
    in response to detecting the second input of the first type on the home button:
        perform a second operation that is associated with the home button; and
        provide, via the one or more tactile output generators, a second tactile output that is associated with activation of the home button, without regard to whether or not user interface tactile outputs are enabled at the electronic device.

2. The non-transitory computer-readable storage medium of claim 1, wherein the first user interface is a user interface of a first application, the first operation is an operation of the first application, and the second operation includes dismissing the first application.

3. The non-transitory computer-readable storage medium of claim 1, the programs further comprising instructions that cause the electronic device to:
   after performing the first operation, detect a first input of a second type, distinct from the first type, on the home button; and
   in response to detecting the first input of the second type on the home button:
      perform a third operation, distinct from the second operation, that is associated with the home button; and
      provide, via the one or more tactile output generators, a third tactile output that is associated with activation of the home button, without regard to whether or not user interface tactile outputs are enabled at the electronic device.

4. The non-transitory computer-readable storage medium of claim 1, the programs further comprising instructions that cause the electronic device to:
   after performing the first operation, detect a first input of a third type, distinct from the first type, on the home button; and
   in response to detecting the first input of the third type on the home button:
      perform a fourth operation, distinct from the second operation, that is associated with the home button; and
      provide, via the one or more tactile output generators, a fourth tactile output that is associated with activation of the home button, without regard to whether or not user interface tactile outputs are enabled at the electronic device.

5. The non-transitory computer-readable storage medium of claim 1, wherein the first tactile output and the second tactile output that is associated with activation of the home button are provided by the same one or more actuators of the one or more tactile output generators.

6. The non-transitory computer-readable storage medium of claim 1, wherein a tactile output pattern of a corresponding tactile output that is provided in response to a respective input of the first type on the home button is user-adjustable.

7. The non-transitory computer-readable storage medium of claim 1, the programs further comprising instructions that cause the device to:
   in response to detecting the second input of the first type on the home button, provide an audio output with the tactile output that is associated with activation of the home button, without regard to whether or not user interface tactile outputs are enabled, and without regard to whether or not audio outputs are muted at the electronic device.

8. The non-transitory computer-readable storage medium of claim 1, the programs further comprising instructions that cause the electronic device to:
   in response to detecting the second input of the first type on the home button, provide an audio output with the second tactile output that is associated with activation of the home button, without regard to whether or not user interface tactile outputs are enabled, wherein a volume of the audio output is independent of a current volume setting at the electronic device.

9. The non-transitory computer-readable storage medium of claim 1, the programs further comprising instructions that cause the electronic device to:
   in response to detecting the first input of the first type directed to the first user interface:
      in accordance with a determination that user interface tactile outputs are enabled at the electronic device:
         in accordance with a determination that audio outputs are not muted at the electronic device, provide an audio output with the first tactile output; and
         in accordance with a determination that audio outputs are muted at the electronic device, forgo providing the audio output with the first tactile output.

10. The non-transitory computer-readable storage medium of claim 1, the programs further comprising instructions that cause the electronic device to:
    in response to detecting the first input of the first type directed to the first user interface:
       in accordance with a determination that user interface tactile outputs are enabled at the electronic device:
          in accordance with a determination that audio volumes are set to a first level at the electronic device, provide an audio output with the first tactile output at a first volume that is determined based on the first level of the audio volumes at the electronic device; and
          in accordance with a determination that audio volumes are set to a second level at the electronic device, provide the audio output with the first tactile output at a second volume that is different from the first volume and is determined based on the second level of the audio volumes at the electronic device.

11. The non-transitory computer-readable storage medium of claim 9, the programs further comprising instructions that cause the electronic device to:
    in response to detecting the first input of the first type directed to the first user interface:
       in accordance with a determination that user interface tactile outputs are disabled at the electronic device, forgo providing the audio output with the first tactile output, without regard to whether or not audio outputs are muted at the electronic device.

12. The non-transitory computer-readable storage medium of claim 1, the programs further comprising instructions that cause the electronic device to:
    in response to detecting the first input of the first type directed to the first user interface:
       in accordance with a determination that user interface tactile outputs are disabled at the electronic device and in accordance with a determination that the first operation is a predefined exempted operation, provide the first tactile output that corresponds to the first operation with the one or more tactile output generators.

13. The non-transitory computer-readable storage medium of claim 1, the programs further comprising instructions that cause the electronic device to:
    in response to detecting the first input of the first type directed to the first user interface:
       in accordance with a determination that user interface tactile outputs are disabled at the electronic device:
          in accordance with a determination that the first operation is a first type of predefined operation, provide the first tactile output that corresponds to the first operation with the one or more tactile output generators; and in accordance with a determination that the first operation is a second type of predefined operation, perform the first operation without providing the first tactile output that corresponds to the first operation with the one or more tactile output generators; and in accordance with a determination that user interface tactile outputs are enabled at the electronic device, perform the first operation and provide the first tactile output that corresponds to the first operation with the one or more tactile output generators, without regard to whether the first operation is of the first type of predefined operation or the second type of predefined operation.

14. A method, comprising:

at an electronic device with a touch-sensitive surface, a display, and one or more tactile output generators:

displaying, on the display, a first user interface, wherein a home button is available on the device in a plurality of different contexts to dismiss a currently displayed user interface in response to detecting an input of a first type on the home button;

while displaying the first user interface, detecting a first input of the first type directed to the first user interface;

in response to detecting the first input of the first type directed to the first user interface:

in accordance with a determination that user interface tactile outputs are enabled at the electronic device, performing a first operation and providing, via the one or more tactile output generators, a first tactile output that corresponds to the first operation; and in accordance with a determination that user interface tactile outputs are disabled at the electronic device, performing the first operation, and forgoing providing at least a portion of the first tactile output that corresponds to the first operation;

after performing the first operation, detecting a second input of the first type on the home button; and in response to detecting the second input of the first type on the home button:

performing a second operation that is associated with the home button; and providing, via the one or more tactile output generators, a second tactile output that is associated with activation of the home button, without regard to whether or not user interface tactile outputs are enabled at the electronic device.

15. An electronic device, comprising:

a display;

a touch-sensitive surface;

one or more tactile output generators for generating tactile outputs;

one or more processors; and memory storing one or more programs configured for execution by the one or more processors, the one or more programs including instructions for:

displaying, on the display, a first user interface, wherein a home button is available on the electronic device in a plurality of different contexts to dismiss a currently displayed user interface in response to detecting an input of a first type on the home button;

while displaying the first user interface, detecting a first input of the first type directed to the first user interface;

in response to detecting the first input of the first type directed to the first user interface:

in accordance with a determination that user interface tactile outputs are enabled at the electronic device, performing a first operation and providing, via the one or more tactile output generators, a first tactile output that corresponds to the first operation; and in accordance with a determination that user interface tactile outputs are disabled at the electronic device, performing the first operation, and forgoing providing at least a portion of the first tactile output that corresponds to the first operation;

after performing the first operation, detecting a second input of the first type on the home button; and in response to detecting the second input of the first type on the home button:

performing a second operation that is associated with the home button; and providing, via the one or more tactile output generators, a second tactile output that is associated with activation of the home button, without regard to whether or not user interface tactile outputs are enabled at the electronic device.

16. The method of claim 14, wherein the first user interface is a user interface of a first application, the first operation is an operation of the first application, and the second operation includes dismissing the first application.

17. The method of claim 14, including:

after performing the first operation, detecting a first input of a second type, distinct from the first type, on the home button; and in response to detecting the first input of the second type on the home button:

performing a third operation, distinct from the second operation, that is associated with the home button; and providing, via the one or more tactile output generators, a third tactile output that is associated with activation of the home button, without regard to whether or not user interface tactile outputs are enabled at the electronic device.

18. The method of claim 14, including:

after performing the first operation, detecting a first input of a third type, distinct from the first type, on the home button; and in response to detecting the first input of the third type on the home button:

performing a fourth operation, distinct from the second operation, that is associated with the home button; and providing, via the one or more tactile output generators, a fourth tactile output that is associated with activation of the home button, without regard to whether or not user interface tactile outputs are enabled at the electronic device.

19. The method of claim 14, wherein the first tactile output and the second tactile output that is associated with activation of the home button are provided by the same one or more actuators of the one or more tactile output generators.

20. The method of claim 14, wherein a tactile output pattern of a corresponding tactile output that is provided in response to a respective input of the first type on the home button is user-adjustable.

21. The method of claim 14, including:
in response to detecting the second input of the first type on the home button, providing an audio output with the tactile output that is associated with activation of the home button, without regard to whether or not user interface tactile outputs are enabled, and without regard to whether or not audio outputs are muted at the electronic device.

22. The method of claim 14, including:
in response to detecting the second input of the first type on the home button, providing an audio output with the second tactile output that is associated with activation of the home button, without regard to whether or not user interface tactile outputs are enabled, wherein a volume of the audio output is independent of a current volume setting at the electronic device.

23. The method of claim 14, including:
in response to detecting the first input of the first type directed to the first user interface:
in accordance with a determination that user interface tactile outputs are enabled at the electronic device:
in accordance with a determination that audio outputs are not muted at the electronic device, providing an audio output with the first tactile output; and
in accordance with a determination that audio outputs are muted at the electronic device, forgoing providing the audio output with the first tactile output.

24. The method of claim 14, including:
in response to detecting the first input of the first type directed to the first user interface:
in accordance with a determination that user interface tactile outputs are enabled at the electronic device:
in accordance with a determination that audio volumes are set to a first level at the electronic device, providing an audio output with the first tactile output at a first volume that is determined based on the first level of the audio volumes at the electronic device; and
in accordance with a determination that audio volumes are set to a second level at the electronic device, provide the audio output with the first tactile output at a second volume that is different from the first volume and is determined based on the second level of the audio volumes at the electronic device.

25. The method of claim 23, including:
in response to detecting the first input of the first type directed to the first user interface:
in accordance with a determination that user interface tactile outputs are disabled at the electronic device, forgoing providing the audio output with the first tactile output, without regard to whether or not audio outputs are muted at the electronic device.

26. The method of claim 14, including:
in response to detecting the first input of the first type directed to the first user interface:
in accordance with a determination that user interface tactile outputs are disabled at the electronic device and in accordance with a determination that the first operation is a predefined exempted operation, providing the first tactile output that corresponds to the first operation with the one or more tactile output generators.

27. The method of claim 14, including:
in response to detecting the first input of the first type directed to the first user interface:
in accordance with a determination that user interface tactile outputs are disabled at the electronic device:
in accordance with a determination that the first operation is a first type of predefined operation, providing the first tactile output that corresponds to the first operation with the one or more tactile output generators; and
in accordance with a determination that the first operation is a second type of predefined operation, performing the first operation without providing the first tactile output that corresponds to the first operation with the one or more tactile output generators; and
in accordance with a determination that user interface tactile outputs are enabled at the electronic device, performing the first operation and providing the first tactile output that corresponds to the first operation with the one or more tactile output generators, without regard to whether the first operation is of the first type of predefined operation or the second type of predefined operation.

28. The electronic device of claim 15, wherein the first user interface is a user interface of a first application, the first operation is an operation of the first application, and the second operation includes dismissing the first application.

29. The electronic device of claim 15, the one or more programs including instructions for:
after performing the first operation, detecting a first input of a second type, distinct from the first type, on the home button; and
in response to detecting the first input of the second type on the home button:
performing a third operation, distinct from the second operation, that is associated with the home button; and
providing, via the one or more tactile output generators, a third tactile output that is associated with activation of the home button, without regard to whether or not user interface tactile outputs are enabled at the electronic device.

30. The electronic device of claim 15, the one or more programs including instructions for:
after performing the first operation, detecting a first input of a third type, distinct from the first type, on the home button; and
in response to detecting the first input of the third type on the home button:
performing a fourth operation, distinct from the second operation, that is associated with the home button; and
providing, via the one or more tactile output generators, a fourth tactile output that is associated with activation of the home button, without regard to whether or not user interface tactile outputs are enabled at the electronic device.

31. The electronic device of claim 15, wherein the first tactile output and the second tactile output that is associated with activation of the home button are provided by the same one or more actuators of the one or more tactile output generators.

32. The electronic device of claim 15, wherein a tactile output pattern of a corresponding tactile output that is provided in response to a respective input of the first type on the home button is user-adjustable.

33. The electronic device of claim 15, the one or more programs including instructions for:
in response to detecting the second input of the first type on the home button, providing an audio output with the tactile output that is associated with activation of the home button, without regard to whether or not user interface tactile outputs are enabled, and without regard to whether or not audio outputs are muted at the electronic device.

34. The electronic device of claim 15, the one or more programs including instructions for:
in response to detecting the second input of the first type on the home button, providing an audio output with the second tactile output that is associated with activation of the home button, without regard to whether or not user interface tactile outputs are enabled, wherein a volume of the audio output is independent of a current volume setting at the electronic device.

35. The electronic device of claim 15, the one or more programs including instructions for:
in response to detecting the first input of the first type directed to the first user interface:
in accordance with a determination that user interface tactile outputs are enabled at the electronic device:
in accordance with a determination that audio outputs are not muted at the electronic device, providing an audio output with the first tactile output; and
in accordance with a determination that audio outputs are muted at the electronic device, forgoing providing the audio output with the first tactile output.

36. The electronic device of claim 15, the one or more programs including instructions for:
in response to detecting the first input of the first type directed to the first user interface:
in accordance with a determination that user interface tactile outputs are enabled at the electronic device:
in accordance with a determination that audio volumes are set to a first level at the electronic device, providing an audio output with the first tactile output at a first volume that is determined based on the first level of the audio volumes at the electronic device; and
in accordance with a determination that audio volumes are set to a second level at the electronic device, provide the audio output with the first tactile output at a second volume that is different from the first volume and is determined based on the second level of the audio volumes at the electronic device.

37. The electronic device of claim 35, the one or more programs including instructions for:
in response to detecting the first input of the first type directed to the first user interface:
in accordance with a determination that user interface tactile outputs are disabled at the electronic device, forgoing providing the audio output with the first tactile output, without regard to whether or not audio outputs are muted at the electronic device.

38. The electronic device of claim 15, the one or more programs including instructions for:
in response to detecting the first input of the first type directed to the first user interface:
in accordance with a determination that user interface tactile outputs are disabled at the electronic device and in accordance with a determination that the first operation is a predefined exempted operation, providing the first tactile output that corresponds to the first operation with the one or more tactile output generators.

39. The electronic device of claim 15, the one or more programs including instructions for:
in response to detecting the first input of the first type directed to the first user interface:
in accordance with a determination that user interface tactile outputs are disabled at the electronic device:
in accordance with a determination that the first operation is a first type of predefined operation, providing the first tactile output that corresponds to the first operation with the one or more tactile output generators; and
in accordance with a determination that the first operation is a second type of predefined operation, performing the first operation without providing the first tactile output that corresponds to the first operation with the one or more tactile output generators; and
in accordance with a determination that user interface tactile outputs are enabled at the electronic device, performing the first operation and providing the first tactile output that corresponds to the first operation with the one or more tactile output generators, without regard to whether the first operation is of the first type of predefined operation or the second type of predefined operation.

* * * * *